US009164174B2

(12) United States Patent
Chen et al.

(10) Patent No.: US 9,164,174 B2

(45) Date of Patent: Oct. 20, 2015

(54) GNSS SIGNAL PROCESSING WITH REGIONAL AUGMENTATION POSITIONING

(75) Inventors: Xiaoming Chen, Hoehenkirchen (DE); Ulrich Vollath, Superior, CO (US); Kendall Ferguson, Stafford, VA (US)

(73) Assignee: Trimble Navigation Limited, Sunnyvale, CA (US)

( * ) Notice: Subject to any disclaimer, the term of this patent is extended or adjusted under 35 U.S.C. 154(b) by 498 days.

(21) Appl. No.: 13/522,329

(22) PCT Filed: Feb. 14, 2011

(86) PCT No.: PCT/US2011/024743

§ 371 (c)(1), (2), (4) Date: Jul. 15, 2012

(87) PCT Pub. No.: WO2011/100680

PCT Pub. Date: Aug. 18, 2011

(65) Prior Publication Data

US 2012/0286991 A1 Nov. 15, 2012

Related U.S. Application Data

(60) Provisional application No. 61/396,676, filed on May 30, 2010, provisional application No. 61/337,960, filed on Feb. 14, 2010.

(51) Int. Cl.

| | |
|---|---|
| ***G01S 19/07*** | (2010.01) |
| ***G01S 19/04*** | (2010.01) |

(Continued)

(52) U.S. Cl.

CPC ................. *G01S 19/04* (2013.01); *G01S 19/07* (2013.01); *G01S 19/32* (2013.01); *G01S 19/44* (2013.01); *G01S 1/00* (2013.01); *G01S 5/14* (2013.01); *G01S 19/02* (2013.01); *G01S 19/40* (2013.01)

(58) Field of Classification Search

CPC ........... G01S 19/07; G01S 19/40; G01S 5/02; G01S 5/14; G01S 1/00; G01S 19/04; G01S 19/32; G01S 19/44

USPC ............................................ 342/357, 357.44

See application file for complete search history.

(56) References Cited

U.S. PATENT DOCUMENTS

| | | | |
|---|---|---|---|
| 5,311,194 | A | 5/1994 | Brown |
| 5,323,322 | A | 6/1994 | Mueller et al. |

(Continued)

FOREIGN PATENT DOCUMENTS

| | | | |
|---|---|---|---|
| EP | 1 862 809 | A1 | 12/2007 |
| EP | 2 037 291 | A1 | 3/2009 |

(Continued)

OTHER PUBLICATIONS

S. Banville et al., "Satellite and Receiver Phase Bias Calibration for Undifferenced Ambiguity Resolution," Proceedings of the 2008 National Technical Meeting of the Institute of Navigation, San Diego, CA, Jan. 2008, pp. 711-719.

(Continued)

*Primary Examiner* — Frank J McGue

(74) *Attorney, Agent, or Firm* — Kilpatrick Townsend & Stockton LLP

(57) ABSTRACT

Methods and apparatus for processing of GNSS data derived from multi-frequency code and carrier observations are presented which make available correction data for use by a rover located within the region, the correction data comprising: the ionospheric delay over the region, the tropospherπc delay over the region, the phase-leveled geometric correction per satellite, and the at least one code bias per satellite. In some embodiments the correction data includes an ionospheric phase bias per satellite. Methods and apparatus for determining a precise position of a rover located within a region are presented in which a GNSS receiver is operated to obtain multi-frequency code and carrier observations and correction data, to create rover corrections from the correction data, and to determine a precise rover position using the rover observations and the rover corrections. The correction data comprises at least one code bias per satellite, a fixed-nature MW bias per satellite and/or values from which a fixed-nature MW bias per satellite is derivable, and an ionospheric delay per satellite for each of multiple regional network stations and/or non-ionospheric corrections. Methods and apparatus for encoding and decoding the correction messages containing correction data are also presented, in which network messages include network elements related to substantially all stations of the network and cluster messages include cluster elements related to subsets of the network.

44 Claims, 22 Drawing Sheets

(51) Int. Cl.
*G01S 19/32* (2010.01)
*G01S 19/44* (2010.01)
*G01S 19/02* (2010.01)
*G01S 1/00* (2006.01)
*G01S 19/40* (2010.01)
*G01S 5/14* (2006.01)

(56) References Cited

U.S. PATENT DOCUMENTS 5,828,336 A 10/1998 Yunck et al.
5,893,044 A 4/1999 King et al.
6,295,021 B1 9/2001 Lichten et al.
6,324,473 B1 11/2001 Eschenbach
6,662,107 B2 12/2003 Gronemeyer
7,117,417 B2 10/2006 Sharpe et al.
7,292,185 B2 11/2007 Whitehead et al.
7,312,747 B2 12/2007 Vollath et al.
7,432,853 B2 10/2008 Vollath
7,498,979 B2 3/2009 Liu et al.
7,538,721 B2 5/2009 Vollath et al.
7,541,975 B2 6/2009 Sever et al.
7,576,690 B2 8/2009 Vollath
7,580,794 B2 * 8/2009 Janky et al. .................. 701/486
7,589,668 B2 9/2009 Vollath et al.
7,692,578 B2 4/2010 Vollath et al.
7,746,272 B2 6/2010 Vollath
7,755,542 B2 7/2010 Chen et al.
7,768,449 B2 8/2010 Gaal et al.
7,868,820 B2 1/2011 Kolb
7,961,143 B2 6/2011 Dai et al.
7,982,667 B2 7/2011 Vollath et al.
8,018,377 B2 9/2011 Collins
8,035,552 B2 10/2011 Dai et al.
8,130,143 B2 3/2012 Liu et al.
8,237,609 B2 8/2012 Talbot et al.
8,242,953 B2 8/2012 Dai et al.
8,260,551 B2 9/2012 Janky et al.
8,334,807 B2 12/2012 Gaal et al.
8,368,590 B2 2/2013 Vollath et al.
8,368,591 B2 2/2013 Talbot et al.
8,400,351 B2 3/2013 Talbot et al.
8,542,146 B2 9/2013 Vollath
8,558,736 B2 10/2013 Talbot et al.
8,587,475 B2 11/2013 Leandro
8,614,642 B2 12/2013 Talbot et al.
8,694,250 B2 4/2014 Talbot et al.
8,704,708 B2 4/2014 Vollath
8,704,709 B2 4/2014 Vollath et al.
2003/0016147 A1 1/2003 Evans
2003/0048218 A1 3/2003 Milnes et al.
2005/0055160 A1 3/2005 King
2005/0064878 A1 3/2005 O'Meagher
2005/0101248 A1 5/2005 Vollath
2007/0063894 A1 3/2007 Yu
2007/0200753 A1 8/2007 Fuchs et al.
2008/0036654 A1 2/2008 Hansen et al.
2008/0192242 A1 8/2008 Nichols
2008/0204312 A1 * 8/2008 Euler ...................... 342/357.04
2008/0238768 A1 10/2008 Nosworthy
2008/0258966 A1 10/2008 Sugimoto et al.
2009/0027264 A1 1/2009 Chen et al.
2009/0098880 A1 4/2009 Lindquist
2009/0109090 A1 4/2009 Vollath
2009/0135057 A1 5/2009 Vollath et al.
2009/0140914 A1 6/2009 Talbot et al.
2009/0179792 A1 7/2009 Remondi
2009/0179793 A1 7/2009 Remondi
2009/0184869 A1 7/2009 Talbot et al.
2009/0224969 A1 9/2009 Kolb
2009/0237298 A1 9/2009 Vollath et al.
2009/0322600 A1 12/2009 Whitehead et al.
2010/0033370 A1 2/2010 Lopez et al.
2010/0073229 A1 * 3/2010 Pattabiraman et al. .. 342/357.09
2010/0141515 A1 6/2010 Doucet et al.
2010/0156709 A1 6/2010 Zhang et al.
2010/0177806 A1 7/2010 Normark et al.
2010/0188285 A1 * 7/2010 Collins ................... 342/357.04
2010/0214162 A1 8/2010 Talbot et al.
2010/0245168 A1 9/2010 Rollet et al.
2010/0253575 A1 10/2010 Vollath
2010/0309043 A1 * 12/2010 Guenther ................ 342/357.27
2011/0140958 A1 * 6/2011 Henkel et al. ........... 342/357.27
2011/0140959 A1 6/2011 Vollath
2011/0148698 A1 6/2011 Vollath
2011/0156949 A1 6/2011 Vollath et al.
2011/0187590 A1 8/2011 Leandro
2011/0267228 A1 11/2011 Talbot et al.
2011/0279314 A1 11/2011 Talbot et al.
2011/0285587 A1 11/2011 Vollath et al.
2012/0026038 A1 2/2012 Vollath
2012/0092213 A1 4/2012 Chen
2012/0119944 A1 5/2012 Chen
2012/0154210 A1 6/2012 Landau et al.
2012/0154214 A1 6/2012 Leandro
2012/0154215 A1 6/2012 Vollath et al.
2012/0162007 A1 6/2012 Leandro et al.
2012/0163419 A1 6/2012 Seeger
2012/0229332 A1 9/2012 Vollath et al.
2012/0286991 A1 11/2012 Chen et al.
2012/0293367 A1 11/2012 Chen et al.
2012/0306694 A1 12/2012 Chen et al.
2013/0044026 A1 2/2013 Chen et al.
2013/0335266 A1 12/2013 Vollath et al.
2014/0002300 A1 1/2014 Leandro et al.
2014/0015712 A1 1/2014 Leandro et al.

FOREIGN PATENT DOCUMENTS

EP 2333581 A1 * 12/2009
WO 03/038464 A2 5/2003
WO 2005/043186 A2 5/2005
WO 2007/082038 A1 7/2007
WO 2010/096159 A2 8/2010

OTHER PUBLICATIONS

Y. Bar-Sever et al., "A new model for GPS yaw attitude," Journal of Geodesy, vol. 70, No. 11, Nov. 1996, pp. 714-723 (abstract only).

G. Bierman, Factorization Methods for Discrete Sequential Estimation, Academic Press, Inc., 1977, 129 pp.

S. Bisnath et al., "Precise Orbit Determination of Low Earth Orbiters with GPS Point Positioning," Proceedings of the 2001 National Technical Meeting of the Institute of Navigation, Long Beach, CA, Jan. 2001, pp. 725-733.

P. Collins, "Isolating and Estimating Undifferenced GPS Integer Ambiguities," Proceedings of the 2008 National Technical Meeting of the Institute of Navigation, San Diego, CA, Jan. 2008, pp. 720-732.

P. Collins et al., "Precise Point Positioning with Ambiguity Resolution using the Decoupled Clock Model," Proceedings of the 21st International Technical Meeting of the Satellite Division of the Institute of Navigation (ION GNSS 2008), Savannah, GA, Sep. 2008, pp. 1315-1322.

P. Collins et al., "Accessing and Processing Real-Time GPS Corrections for Precise Point Positioning . . . Some User Considerations," Proceedings of the 18th International Technical Meeting of the Satellite Division of the Institute of Navigation (ION GNSS 2005), Long Beach, CA, Sep. 2005, pp. 1483-1491.

Y. Gao et al., "A New Method for Carrier-Phase-Based Precise Point Positioning", Navigation, Journal of the Institute of Navigation, vol. 49, No. 2, Summer 2002, pp. 109-116.

"GNSS Solutions: Precise Point Positioning and Its Challenges, Aided-GNSS and Signal Tracking," InsideGNSS, Nov./Dec. 2006, pp. 16-21.

M. Gabor et al., "Satellite-Satellite Single-Difference Phase Bias Calibration as Applied to Ambiguity Resolution", Navigation, Journal of the Institute of Navigation, vol. 49, No. 4, Winter 2002-2003, pp. 223-247.

M. Ge et al., "Resolution of GPS carrier-phase ambiguities in Precise Point Positioning (PPP) with daily observations," Journal of Geodesy, Jul. 2008, vol. 82, Issue 7, pp. 389-399.

(56) References Cited

OTHER PUBLICATIONS

A. Hauschild et al., "Real-time Clock Estimation for Precise Orbit Determination of LEO-Satellites," Proceedings of the 21st International Technical Meeting of the Satellite Division of the Institute of Navigation (ION GNSS 2008), Savannah, GA, Sep. 2008, pp. 581-589.
P. Héroux et al., "GPS Precise Point Positioning Using IGS Orbit Products," Phys. Chem. Earth (A), vol. 26, No. 6-8. pp. 573-578, 2001.
P. Héroux et al., "GPS Precise Point Positioning with a Difference," presented at Geomeatics '95, Ottawa, Ontario, Canada, Jun. 13-15, 1995, 11 pp.
S. Hutsell, "Relating the hadamard variance to MCS Kalman filter clock estimation," in Proceedings of the 27th Annual Precise Time and Time Interval (PTTI) Applications and Planning Meeting, p. 293, San Diego, Calif, USA, Dec. 1995.
IERS Conventions (2003), International Earth Rotation and Reference Systems Service, IERS Technical Note No. 32, 127 pp.
"IGS Product Table—updated for 2009," from http://igsch.jpl.nasa.gov/components/prods.html on Aug. 19, 2009, three pages.
J. Kouba, "A simplified yaw-attitude model for eclipsing GPS satellites," GPS Solutions, Jan. 2009, vol. 13, Issue 1, pp. 1-12.
J. Kouba, "A guide to using International GPS Service (IGS) Products," International GPS Service, Feb. 2003, 31 pp.
J. Kouba et al., "Precise Point Positioning Using IGS Orbit and Clock Products," GPS Solutions, Oct. 2001, vol. 5, Issue 2, pp. 12-28.
D. Lapucha et al., "Comparison of the Two Alternate Methods of Wide Area Carrier Phase Positioning," Proceedings of the 17th International Technical Meeting of the Satellite Division of the Institute of Navigation (ION GNSS 2004), Long Beach, CA, Sep. 2004, pp. 1864-1871.
D. Laurichesse et al., "Real Time Zero-difference Ambiguities Fixing and Absolute RTK," Proceedings of the 2008 National Technical Meeting of the Institute of Navigation, San Diego, CA, Jan. 2008, pp. 747-755.
D. Laurichesse et al., "Integer Ambiguity Resolution on Undifferenced GPS Phase Measurements and its Application to PPP," Proceedings of the 20th International Technical Meeting of the Satellite Division of the Institute of Navigation (ION GNSS 2007), Fort Worth, TX, Sep. 2007, pp. 839-848.
R. Leandro et al., "Wide Area Based Precise Point Positioning," Proceedings of the 19th International Technical Meeting of the Satellite Division of the Institute of Navigation (ION GNSS 2006), Fort Worth, TX, Sep. 2006, pp. 2272-2278.
R. Leandro et al., "UNB Neutral Atmosphere Models: Development and Performance," Proceedings of the 2006 National Technical Meeting of the Institute of Navigation, Monterey, CA, Jan. 2006, pp. 564-573.
S. Lo et al., "GNSS Album: Images and Spectral Signature of the New GNSS Signals," InsideGNSS, May/Jun. 2006, pp. 46-56.
W. Melbourne, "The case for ranging in GPS based geodetic systems," Proceedings 1st International Symposium on Precise Positioning with the Global Positioning system, U.S. Departmenet of Commerce, Rockville, Maryland, Apr. 15-19, vol. 1, pp. 373-386.
L. Mervart et al., "Precise Point Positioning with Ambiguity Resolution in Real-Time," Proceedings of the 21st International Technical Meeting of the Satellite Division of the Institute of Navigation (ION GNSS 2008), Savannah, GA, Sep. 2008, pp. 397-405.
Y. Mireault et al., "Online Precise Point Positioning," GPS World, Sep. 2008, pp. 59-64.
A. Niell, "Global mapping functions for the atmosphere delay at radio wavelengths," Journal of Geophysical Research, vol. 101, No. B2, pp. 3227-3246, Feb. 10, 1996.
S. Schaer, [IGSMAIL-287]: Monitoring (P1-C1) code biases, IGS Electronic Mail Message No. 2827, May 9, 2000, two pages.
G. Seeber, Satellite Geodesy, 2d. Ed., 2003, p. 31.
P. Tétrault et al., "CSRS-PPP: An Internet Servic e for GPS User Access to the Canadian Spatial Reference Frame," Geomatica, vol. 59, No. 1, 2005, pp. 17-28.
A. Van Dierendonck et al., "Relationship Between Allan Variances and Kalman Filter Parameters," Proceedings of the 16th Annual Precise Time and Time Interval (PTTI) Applications and Planning Meeting, NASA Goddard Space Flight Center, Nov. 1984, pp. 273-293.
S. Verhagen, "The GNSS integer ambiguities: estimation and validation" PhD dissertation, Delft University of Technology, Publications on Geodesy, vol. 58, Netherlands Geodetic Commission, Delft, 2005, 196 pp.
G. Wübbena, "Software Developments for Geodetic Positioning with GPS Using TI 4100 Code and Carrier Measurements," in Goad C.C. (ed), Proc. of First Int. Sym. on Precise Position. with GPS Rockville, Maryland, pp. 403-412, (1985).
J. Zumberge et al., "Precise point positioning for the efficient and robust analysis of GPS data from large networks," Journal of Geophysical Research: Solid Earth, vol. 102, Issue B3, pp. 5005-5017, Mar. 10, 1997.
International Search Report (Form PCT/ISA/210) and Written Opinion of the International Searching Authority (Form PCT/ISA/237) mailed May 31, 2011 in International Application No. PCT/US2010/002565 (six pages).
International Search Report (Form PCT/ISA/210) and Written Opinion of the International Searching Authority (Form PCT/ISA/237) mailed May 31, 2011 in International Application No. PCT/US2010/002564 (seven pages).
International Search Report (Form PCT/ISA/210) and Written Opinion of the International Searching Authority (Form PCT/ISA/237) mailed May 30, 2011 in International Application No. PCT/US2010/002563 (six pages).
International Search Report (Form PCT/ISA/210) and Written Opinion of the International Searching Authority (Form PCT/ISA/237) mailed May 26, 2011 in International Application No. PCT/US2010/002562 (six pages).
International Search Report (Form PCT/ISA/210) and Written Opinion of the International Searching Authority (Form PCT/ISA/237) mailed May 31, 2011 in International Application No. PCT/US2010/002581 (six pages).
International Search Report (Form PCT/ISA/210) and Written Opinion of the International Searching Authority (Form PCT/ISA/237) mailed Sep. 27, 2011 in International Application No. PCT/US2011/024733 (ten pages).
International Search Report (Form PCT/ISA/210) and Written Opinion of the International Searching Authority (Form PCT/ISA/237) mailed Oct. 6, 2011 in International Application No. PCT/US2011/024743 (ten pages).
International Search Report (Form PCT/ISA/210) and Written Opinion of the International Searching Authority (Form PCT/ISA/237) mailed Sep. 26, 2011 in International Application No. PCT/US2011/024763 (ten pages).
International Search Report (Form PCT/ISA/210) and Written Opinion of the International Searching Authority (Form PCT/ISA/237) mailed Oct. 12, 2012 in International Application No. PCT/US2012/029694 (fourteen pages).
International Search Report (Form PCT/ISA/210) and Written Opinion of the International Searching Authority (Form PCT/ISA/237) mailed Oct. 16, 2012 in International Application No. PCT/US2012/028670 (eight pages).
International Search Report (Form PCT/ISA/210) and Written Opinion of the International Searching Authority (Form PCT/ISA/237) mailed Sep. 5, 2012 in International Application No. PCT/US2012/028671 (eight pages).
Non-Final Office Action of Apr. 3, 2015 for U.S. Appl. No. 13/522,323, 12 pages.
Final Office Action of Jun. 9, 2015 for U.S. Appl. No. 13/522,323, 12 pages.
Notice of Allowance of Aug. 24, 2015 for U.S. Appl. No. 13/522,323, 7 pages.

* cited by examiner

Troposcaling Example

GNSS SIGNAL PROCESSING WITH REGIONAL AUGMENTATION POSITIONING

CROSS REFERENCE TO RELATED APPLICATIONS

The following are related hereto and incorporated herein in their entirety by this reference: U.S. Provisional Application for Patent No. 61/277,184 filed 19 Sep. 2009 (TNL A-2585P); International Patent Application PCT/US2009/059552 filed 5 October 2009 (TNL A-2288PCT); U.S. Provisional Application for Patent No. 61/195,276 filed 6 Oct. 2008 (TNL A-2288P); International Patent Application PCT/US/2009/00441 filed 5 Aug. 2009 (TNL A-2526PCT); International Patent Application PCT/US/2009/004473 filed 5 Aug. 2009 (TNL A-2525PCT); International Patent Application PCT/US/2009/004474 filed 5 Aug. 2009 (TNL A-2524PCT); International Patent Application PCT/US/2009/004472 filed 5 Aug. 2009 (TNL A-2523PCT); International Patent Application PCT/US/2009/004476 filed 5 Aug. 2009 (TNL A-2339PCT); U.S. Provisional Application for Patent No. 61/189,382 filed 19 Aug. 2008 (TNL A-2339P); U.S. patent application Ser. No. 12/224,451 filed 26 Aug. 2008, United States Patent Application Publication US 2009/0027625 A1 (TNL A-1789US); International Patent Application PCT/US07/05874 filed 7 Mar. 2007, International Publication No. WO 2008/008099 A2 (TNL A-1789PCT); U.S. patent application Ser. No. 11/988,763 filed 14 Jan. 2008, United States Patent Application Publication US 2009/0224969 A1 (TNL A-743US); International Patent Application No. PCT/US/2006/034433 filed 5 Sep. 2006, International Publication No. WO 2007/032947 A1 (TNL A-1743PCT); U.S. Pat. No. 7,432,853 granted 7 Oct. 2008; (TNL A-1403US); (TNL A-1403PCT); International Patent Application No. PCT/US2004/035263 filed 22 Oct. 2004 and International Publication Number WO 2005/045463 A1 (TNL A-1403PCT; U.S. Pat. No. 6,862,526 granted 1 Mar. 2005 (TNL A-1006US); and U.S. Provisional Application for Patent No. 61/396,676, filed 30 May 2010 (TNL A-2751P).

TECHNICAL HELD

The present invention relates to the field of Global Navigation Satellite Systems GNSS). More particularly, the present invention relates to methods and apparatus for processing of GNSS data with regional augmentation for enhanced precise point positioning.

BACKGROUND ART

Global Navigation Satellite Systems (GNSS) include the Global Positioning System (GPS), the Glonass system, the proposed Galileo system, the proposed Compass system, and others. Each UPS satellite transmits continuously using two radio frequencies in the L-band, referred to as L1 and L2, at respective frequencies of 1575.41 MHz and 1227.60 MHz. Two signals are transmitted on L1, one for civil users and the other for users authorized by the United States Department of Defense (DoD), One signal is transmitted on L2, intended only for DoD-authorized users. Each GPS signal has a carrier at the L1 and L2 frequency, a pseudo-random number (PRN) code, and satellite navigation data. Two different PRN codes are transmitted by each satellite: a coarse acquisition (C/A) code and a precision (P/Y) code which is encrypted for DoD-authorized users. Each C/A code is a unique sequence of 1023 bits, which is repeated each millisecond. Other GNSS systems likewise have satellites which transmit multiple signals on multiple carrier frequencies.

FIG. 1 schematically illustrates a typical prior-art scenario to determine the position of a mobile receiver (rover). Rover 100 receives UPS signals from any number of satellites in view, such as SV1, SV2, and SYM, shown respectively, at 110, 120 and 130. The signals pass through the earth's ionosphere 140 and through the earth's troposphere 150. Each signal has two frequencies, L1 and L2. Receiver 100 determines from the signals respective pseudo-ranges, PR1, PR2, . . . , PRM, to each of the satellites. Pseudo-range determinations are distorted by variations in the signal paths which result from passage of the signals through the ionosphere 140 and the troposphere 150, and from multipath effects, as indicated schematically at 160.

Pseudo-range can be determined using the C/A code with an error of about one meter, a civil receiver not using the military-only P/Y code determines rover position with an error in the range of meters. However, the phases of the L1 and L2 carriers can be measured with an accuracy of 0.01-0.05 cycles (corresponding to pseudo-range errors of 2 mm to 1 cm), allowing relative position of the rover to be estimated with errors in the range of millimeters to centimeters. Accurately measuring the phase of the L1 and L2 carriers requires a good knowledge of the effect of the ionosphere and the troposphere for all observation times.

Relative positioning allows common-mode errors to be mitigated by differencing the observations of the rover with observations of a reference station at a known location near the rover, e.g., within 50-100 km. The reference station observations can be collected at a physical base station or estimated from observations of a network of reference stations. See for example U.S. Pat. No. 5,477,458 "Network for Carrier Phase Differential GPS Corrections" and U.S. Pat. No. 5,899,957 "Carrier Phase Differential GPS Corrections Network."

Precise point positioning (PPP), also called absolute positioning, uses a single GNSS receiver together with precise satellite orbit and clock data to reduce satellite-related error sources. A dual-frequency receiver can remove the first-order effect of the ionosphere for position solutions of centimeters to decimeters. The utility of PPP is limited by the need to wait longer than desired for the float position solution to converge to centimeter accuracy. And unlike relative positioning techniques in which common-mode errors are eliminated by differencing of observations, PPP processing uses undifferenced carrier-phase observations so that the ambiguity terms are corrupted by satellite and receiver phase biases. Methods have been proposed for integer ambiguity resolution in PPP processing. See, for example, Y. Ciao et al., GNSS Solutions: Precise Point Positioning and its Challenges, inside GNSS, November/December 2006, pp. 16-18. See also U.S. Provisional Application for Patent No. 61/277,184 filed 19 Sep. 2009 (TNL A-2585P).

Improved GNSS processing methods and apparatus are desired, especially to achieve faster convergence to a solution, improved accuracy and/or greater availability.

SUMMARY

Improved methods and apparatus for processing of GNSS data with augmentation for enhanced precise positioning are presented.

Some embodiments of the invention provide methods and/or apparatus for processing of GNSS data derived from multi-frequency code and carrier observations are presented which make available correction data for use by a rover located within the region, the correction data comprising: the ionospheric delay over the region, the tropospheric delay over the region, the phase-leveled geometric correction per satellite, and the at least one code bias per satellite.

Some embodiments provide methods and apparatus for determining a precise position of a rover located within a region in which a GNSS receiver is operated to obtain multi-frequency code and carrier observations and correction data, to create rover corrections from the correction data, and to determine a precise rover position using the rover observations and the rover corrections.

In some embodiments the correction data comprises at least one code bias per satellite, a fixed-nature MW bias per satellite and/or values from which a fixed-nature MW bias per satellite is derivable, and an ionospheric delay per satellite for each of multiple regional network stations and/or non-ionospheric corrections.

In some embodiments the correction data comprises at least one code bias per satellite, a fixed-nature MW bias per satellite and/or values from which a fixed-nature MW bias per satellite is derivable, and an ionospheric delay per satellite for each of multiple regional network stations and an ionospheric phase bias per satellite, and/or non-ionospheric corrections.

Some embodiments provide methods and apparatus for encoding and decoding the correction messages containing correction data in which network messages include network elements related to substantially all stations of the network and cluster messages include cluster elements related to subsets of the network.

Some embodiments provide regional correction data streams prepared in accordance with the methods and suitable for broadcast and use by mobile GNSS receivers within a network area.

Some embodiments provide computer program products embodying instructions for carrying out the methods.

BRIEF DESCRIPTION OF DRAWING FIGURES

These and other aspects and features of the present invention will be more readily understood from the embodiments described below with reference to the drawings, in which:

FIG. 1 schematically illustrates a typical prior-art scenario to determine a rover position;

FIG. 2 schematically illustrates a system in accordance with some embodiments of the invention;

FIG. 3 schematically illustrates a global network processor in accordance with some embodiments of the invention;

FIG. 4 schematically illustrates a regional network processor in accordance with some embodiments of the invention;

FIG. 5 schematically illustrates a regional network process in accordance with some embodiments of the invention;

FIG. 6 schematically illustrates augmented precise point positioning in accordance with some embodiments of the invention;

FIG. 7 schematically illustrates generating synthetic reference station data for augmented precise point positioning in accordance with some embodiments of the invention;

FIG. 8 schematically illustrates augmented precise point positioning with differential processing in accordance with some embodiments of the invention;

FIG. 9 schematically illustrates augmented precise point positioning with differential processing in accordance with some embodiments of the invention;

FIG. 10 schematically illustrates augmented precise point positioning with differential processing accordance with some embodiments of the invention;

FIG. 11 schematically illustrates construction of synthetic reference station observations in accordance with some embodiments of the invention;

FIG. 12 schematically illustrates an ionospheric shell and a portion of a tropospheric shell surrounding the Earth;

FIG. 13 illustrates a slanted ray path from a satellite to a receiver passing through the troposphere;

FIG. 14 illustrate the relation between Total Electron Content along a slant path and Vertical Total Electron content;

FIG. 15 illustrates how ionosphere parameters describe the ionosphere at a piercepoint relative to a reference point;

FIG. 16 schematically illustrates troposcaling in accordance with some embodiments of the invention;

FIG. 17 schematically illustrates spacing of locations for geometric correction terms are determined in accordance with some embodiments of the invention;

FIG. 18 schematically illustrates a linear model for determining the geometric correction at a rover location from geometric corrections three arbitrary locations in accordance with some embodiments of the invention;

FIG. 19 schematically illustrates ionospheric delay IPBS at a physical base station location PBS and ionospheric delay ISRS at a synthetic reference station location SRS;

FIG. 20 schematically illustrates regional correction message encoding M accordance with some embodiments of the invention;

FIG. 21 schematically illustrates clusters of regional network stations in accordance with some embodiments of the invention;

FIG. 22 shows an example of a rover located within a regional network having clusters in accordance with some embodiments of the invention;

FIG. 23 is a schematic diagram of a computer system in accordance with some embodiments of the invention; and FIG. 24 is a schematic diagram of a GNSS receiver system in accordance with some embodiments of the invention;

DETAILED DESCRIPTION

Part 1: Introduction

Methods and apparatus in accordance with some embodiments involve making available and/or using correction data with rover observations of GNSS satellite signals for precise navigation or positioning of a rover located within a region. The correction data comprises (1) at least one code bias per satellite, i.e. a fixed-nature MW bias per satellite (or values from which a fixed-nature MW bias per satellite is derivable), (2) a phase-leveled geometric correction per satellite derived from the network fixed double difference ambiguities, and (3) an ionospheric delay per satellite for each of multiple regional network stations, and optionally an ionospheric phase bias per satellite, and/or non-ionospheric corrections.

The corrections are determined at least in part from code and carrier phase observations of GNSS satellite signals by reference stations of a network distributed over the region. The code bias is derived from fixed ambiguities (e.g., double-differenced) of the regional reference station network.

The corrections enable reconstruction of code and phase observations of the reference stations. The ability to reconstruct the geometric part (ionospheric-free Observation combinations) is based on the phase-leveled geometric correction term per satellite. This geometric correction term encapsulates the integer nature of the ambiguity and compensates the orbit error and satellite clock error seen in the regional reference station network.

If m stations of the regional network observe n satellites, the transmission bandwidth needed to transmit m×n observations and m×n carrier observations on each GNSS frequency would be impractical. Some embodiments of the invention substantially reduce this bandwidth requirement. Only one or three geometric corrections is/are transmitted for each of the n satellites in accordance with some embodiments. Only one code bias is transmitted for each of the n satellites in accordance with some embodiments. Only one tropospheric value is optionally transmitted for each of the m stations. The non-ionospheric part of the regional network correction comprises the code biases, phase-leveled geometric correction and the optional tropospheric values.

In some embodiments, the ionospheric part of the regional reference station network correction is based on observation space. It is derived from the ionospheric carrier-phase dual-frequency combination minus the ambiguity determined from processing the regional network observations. Thus m×n ionospheric corrections are optionally transmitted for processing of rover observations.

In some embodiments, an absolute ionosphere model estimated from the network, or a global/regional ionosphere model like WAAS, IONEX or GAIM is used an ionospheric phase bias per satellite and per station is derived together with the ionospheric correction per satellite per station. Thus m×n ionospheric corrections plus n ionospheric phase biases are optionally transmitted for processing of rover observations, Carrier phase observations of the regional network's reference stations (e.g., on carriers L1 and L2) can be fully reconstructed using the geometric part (phase-leveled geometric correction and tropospheric corrections) together with the ionospheric part (ionospheric corrections ions and optional ionospheric phase biases). If the optional tropospheric corrections are not provided, the tropospheric delay at the rover can be estimated in rover processing, at the cost of slower convergence.

Double differencing of the reconstructed observations of the regional network stations with raw L1 and L2 carrier-phase observations of the rover receiver results in ambiguity values which are close to integer.

Some advantages of this approach are:

No master station is required. This leads to a simpler algorithm for generating synthetic reference station data and reduced burden for encoding and decoding the correction messages when these are transmitted for processing of rover observations.

Multipath mitigation and noise reduction. The phase-leveled geometric correction term per satellite is generated using all stations in the regional reference station network. Reconstructed observations thus mitigate the multipath of all stations, instead of the inherent mitigation of the full multipath and noise of a master station. In addition, the ionospheric part is in some embodiments smoothed over time by the regional network processor to reduce noise.

Smooth transition from only global network corrections to global corrections augmented with regional corrections when the rover moves into a region covered by a regional network. The regional corrections add a geometric correction per satellite together with ionospheric and/or non-ionospheric corrections. When a rover moves into a region covered by a regional network, processing of the rover observations benefits immediately from the added regional corrections.

Bandwidth reduction. With a regional network of, for example, 80 reference stations tracking 12 satellites, a transmission bandwidth of about 2200-2500 bits/second should provide an update rate of 10 seconds even without optimizations (described below) that become possible because of the changed information content of the messages.

Part 2: Reconstructing Code and Carrier-Phase Observations

Part 2.1 Carrier-Phase Observation Data with Fixed Double-Difference Ambiguities GPS $L_1$ and $L_2$ carrier phase observations can be expressed as:

$$L_1 = \lambda_1\varphi_1 = \rho + T + I_1 + c\cdot(t_r - t^s) + b_1^r - b_1^s + \lambda_1 N_1 + v_1 \tag{1}$$

$$L_2 = \lambda_2\varphi_2 = \rho + T + \frac{\lambda_2^2}{\lambda_1^2} I_1 + c\cdot(t_r - t^s) + b_2^r - b_2^s + \lambda_2 N_2 + v_2 \tag{2}$$

where $L_1$ and $L_2$ are the $L_1$ and $L_2$ carrier phase observations in metric units, $\phi_1$ and $\phi_2$ are the $L_1$ and $L_2$ carrier phase observations in cycles, $\rho$ is the geometric range between antenna phase centers of satellite and receiver, T is the tropospheric delay, $I_1$ is the $L_1$ ionospheric delay, $t^s$ and $t_r$ are the satellite clock error and receiver clock error, respectively, $b_1^s$ and $b_2^s$ are the satellite $L_1$ phase bias and satellite $L_2$ phase bias, respectively, $b_1^r$ and $b_2^r$ are the receiver $L_1$ phase bias and satellite $L_2$ phase bias, respectively, $N_1$ and $N_2$ are "true" $L_1$ and $L_2$ integer ambiguities, respectively, and $v_1$ and $v_2$ are phase noise plus multipath of $L_1$ and $L_2$, respectively.

The ionospheric-free carrier-phase observation can be expressed as $$L_{IF} = \rho + T + c\cdot(t_r - t^s) + b_c^r - b_c^s + N_c + \upsilon_c \tag{3}$$

where $$N_c = \frac{\lambda_1\lambda_2^2}{\lambda_2^2-\lambda_1^2}N_1 + \frac{\lambda_1^2\lambda_2}{\lambda_2^2-\lambda_1^2}N_2 = \frac{\lambda_1\lambda_2^2}{\lambda_2^2-\lambda_1^2}N_w + \frac{\lambda_1\lambda_2}{\lambda_1+\lambda_2}N_2 \tag{4}$$

is the ionospheric-free ambiguity, $$b_c^r = \frac{\lambda_2^2}{\lambda_2^2-\lambda_1^2}b_1^r - \frac{\lambda_1^2}{\lambda_2^2-\lambda_1^2}b_2^r \text{ and } b_c^s = \frac{\lambda_2^2}{\lambda_2^2-\lambda_1^2}b_1^s - \frac{\lambda_1^2}{\lambda_2^2-\lambda_1^2}b_2^s \tag{5}$$

are respectively the receiver and satellite ionospheric-free satellite phase biases, and $$N_w = N_1 - N_2. \tag{6}$$

is the widelane ambiguity.

The ionospheric phase observation $L_{I1}$ mapped to frequency L1 can be written as $$L_{I1} = \frac{\lambda_1^2}{\lambda_1^2-\lambda_2^2}(L_1 - L_2) = I_1 + b_I^r - b_I^s + N_I + v_I \tag{7}$$

where

-continued $$N_I = \frac{\lambda_1^3}{\lambda_1^2-\lambda_2^2}N_1 - \frac{\lambda_1^2\lambda_2}{\lambda_1^2-\lambda_2^2}N_2 = \frac{\lambda_1^3}{\lambda_2^2-\lambda_1^2}N_w + \frac{\lambda_1^2}{\lambda_1+\lambda_2}N_2 \tag{8}$$

is the ionospheric ambiguity, and $$b_I^r = \frac{\lambda_1^2}{\lambda_2^2-\lambda_1^2}(b_2^r - b_1^r) \text{ and } b_I^s = \frac{\lambda_1^2}{\lambda_2^2-\lambda_1^2}b_1^s + \frac{\lambda_1^2}{\lambda_1^2-\lambda_2^2}b_2^s \tag{9}$$

are respectively the receiver and satellite ionospheric phase biases.

The formulas are simplified by forming the single difference of Observations of two satellites at each reference station to cancel out receiver clock error and receiver phase bias. The single-difference L1 and L2 carrier-phase combinations are $$\nabla L_1 = \lambda_1\nabla\varphi_1 = \nabla\rho + \nabla T + \nabla I_1 - c\cdot\nabla t^s + \nabla b_1^s + \lambda_1\nabla N_1 + \nabla v_1 \tag{10}$$

$$\nabla L_2 = \lambda_2\nabla\varphi_2 = \nabla\rho + \nabla T + \frac{\lambda_2^2}{\lambda_1^2}\nabla I_1 - c\cdot\nabla t^s + \nabla b_2^s + \lambda_2\nabla N_2 + \nabla v_2 \tag{11}$$

The single difference ionospheric-free phase is then expressed as $$\nabla L_{IF} = \nabla\rho + \nabla T - c\nabla t^s + \nabla b_c^s + \frac{\lambda_1\lambda_2^2}{\lambda_2^2-\lambda_1^2}\nabla N_w + \frac{\lambda_1\lambda_2}{\lambda_1+\lambda_2}\nabla N_2 + \nabla\upsilon_c \tag{12}$$

Assuming the single difference integer ambiguities estimated by the network processor are $\nabla\bar{N}_w$, $\nabla\bar{N}_2$, the estimated single-difference ionospheric-free satellite phase bias $\nabla\bar{b}_c^s$ can be derived as $$\nabla\bar{b}_c^s = \nabla L_c - \nabla\tilde{\rho} - \nabla\tilde{T} + c\nabla\tilde{t}^s - \left(\frac{\lambda_1\lambda_2^2}{\lambda_2^2-\lambda_1^2}\nabla\bar{N}_w + \frac{\lambda_1\lambda_2}{\lambda_1+\lambda_2}\nabla\bar{N}_2\right) \tag{13}$$

where $\nabla\tilde{\rho}$ is the single difference geometric range computed from the ephemeris, $\nabla\tilde{t}^s$ is the single difference satellite clock error computed from the ephemeris, and $\nabla\tilde{T}$ is the single difference tropospheric delay estimated in the network processor.

If the satellite orbits and clocks are perfect and the tropospheric delays estimated from the network are also perfect, and ignoring the phase noise, the relationship of the derived single-difference ionospheric-free satellite phase bias $\nabla\bar{b}_c^s$ to the "true" bias $\nabla b_c^s$ is $$\begin{aligned}\nabla\bar{b}_c^s &= \nabla b_c^s + \frac{\lambda_1\lambda_2^2}{\lambda_2^2-\lambda_1^2}(\nabla N_w - \nabla\bar{N}_w) + \frac{\lambda_1\lambda_2}{\lambda_1+\lambda_2}(\nabla N_2 - \nabla\bar{N}_2) \\ &= \nabla b_c^s + \frac{\lambda_1\lambda_2^2}{\lambda_2^2-\lambda_1^2}\nabla dN_w + \frac{\lambda_1\lambda_2}{\lambda_1+\lambda_2}\nabla dN_2\end{aligned} \tag{14}$$

The derived single-difference ionospheric-free satellite phase bias is offset by a linear combination of integer widelane and L2 cycles if the fixed ambiguities are not equal to the "true" ambiguities. If the double difference ambiguities between all the reference stations are fixed correctly, this equation is valid for all the stations A network-derived ionospheric-free phase bias per satellite is generated by combining the ionospheric-free biases derived from all stations (for example, by averaging or least squares). In reality, the orbit, clock computed from ephemeris and estimated tropospheric delay are not perfect, all the common errors mapped to line of sight from receiver to satellite are absorbed by this satellite bias term. As this term preserves the integer nature of phase observations and purely geometric correction, this term is also called a phase-leveled geometric correction.

The single difference ionospheric phase observation can be expressed as $$\nabla L_{I1} = \nabla I_1 + \nabla b_I^s - \frac{\lambda_1^3}{\lambda_2^2-\lambda_1^2}\nabla N_w + \frac{\lambda_1^2}{\lambda_1+\lambda_2}\nabla N_2 + \nabla v_I. \tag{15}$$

Ignoring the phase noise and assuming the satellite bias cannot be separated from the ionospheric delay, with the network derived single difference ambiguities the derived L1 ionospheric delay is expressed as:

$$\begin{aligned}\nabla\bar{I}_1 &= \nabla L_{I1} + \left(\frac{\lambda_1^3}{\lambda_2^2-\lambda_1^2}\nabla\bar{N}_w - \frac{\lambda_1^2}{\lambda_1+\lambda_2}\nabla\bar{N}_2\right) \\ &= \nabla I_1 + \nabla b_I^s - \frac{\lambda_1^3}{\lambda_2^2-\lambda_1^2}(\nabla N_w - \nabla\bar{N}_w) + \frac{\lambda_1^2}{\lambda_1+\lambda_2}(\nabla N_2 - \nabla\bar{N}_2) \\ &= \nabla I_1 + \nabla b_I^s - \frac{\lambda_1^3}{\lambda_2^2-\lambda_1^2}\nabla dN_w + \frac{\lambda_1^2}{\lambda_1+\lambda_2}\nabla dN_2.\end{aligned} \tag{16}$$

This is not the "true" ionospheric delay, but is biased by a combination of integer widelane L2 cycles and an ionospheric phase bias.

Alternatively, if the absolute ionosphere model is estimated with the network data (for example as described in U.S. Provisional Application for Patent No. 61/396,676, filed 30 May 2010, the content of which is incorporated herein by this reference), or a global ionosphere model is available (for example WAAS, GAIM, or IONEX), by using Eq (15), the satellite ionosphere bias can be estimated with a least squares filter or Kalman filter. To avoid rank deficiency, one satellite bias can be set to zero, or a zero mean constraint (the sum of all satellite biases equal to zero) can be used.

The L1 ionospheric delay can be expressed as:

$$\nabla\bar{I}_1 = \nabla L_{I1} - \nabla\bar{b}_I^s + \left(\frac{\lambda_1^3}{\lambda_2^2-\lambda_1^2}\nabla\bar{N}_w - \frac{\lambda_1^2}{\lambda_1+\lambda_2}\nabla\bar{N}_2\right) \tag{16a}$$

Where $\nabla\bar{b}_I^s$ is the estimated single difference ionospheric phase bias.

The main difference between Eq (16) and Eq (16a) is that, in Eq (16a), the single-differenced ionospheric satellite phase bias $\nabla b_I^s$ is estimated with an ionosphere model and excluded from single-differenced ionospheric correction, while in Eq (16) the single-differenced ionospheric satellite phase bias $\nabla b_I^s$ is inherently included in the ionospheric delay.

In principle, with Eq (16), it is not necessary to estimate an ionosphere model over the network as far as the network ambiguities can be fixed, i.e., with the MW combination to fix widelane ambiguities and ionospheric-free phase combination to fix narrowlane ambiguities. An advantage of this approach is that the system is insensitive to the activity of ionosphere. A disadvantage is that the derived ionospheric correction is not bias free. For satellite-to-satellite single-differenced ionospheric correction, it contains the single-differenced satellite ionospheric phase bias. For undifferenced ionospheric correction, it contains a satellite ionospheric phase bias and a receiver ionospheric phase bias. So the ionospheric correction generated with Eq (16) is only consistent in double difference. This means the computation of the ionospheric correction at a Synthetic Reference Station (WS) location has to be done in differential way—difference between the SRS location and a nearby physical reference station (termed a Physical Base Station, or PBS) and then add to the ionospheric correction from one of the physical reference stations. This implies that the SRS data cannot be generated for a satellite for which ambiguities are not fixed at the PBS. If there are only a few satellites in view at the SRS location or the satellite geometry is bad, this could lead to large positioning error for the rover.

In contrast, the ionospheric correction generated with Eq (16a) is consistent with the used absolute ionosphere model. By estimating the satellite/receiver ionospheric phase bias, the derived ionospheric corrections are consistent in undifferenced mode, so the generation of ionospheric correction at the SRS location does not rely on any physical reference station. Insofar as ambiguities are fixed for a satellite at some reference stations, the ionospheric correction can be generated for the SRS location. When used with the ionospheric-free correction per satellite, the generated SRS data is fully synthetic.

With derived single difference ionospheric-free satellite phase bias and ionospheric delay/ionospheric satellite phase bias. L1 and L2 phase observations can be fully reconstructed. The reconstructed single difference L1 carrier phase is $$\begin{aligned}\nabla\hat{L}_1 &= \lambda_1\nabla\hat{\varphi}_1 \\ &= \nabla\hat{L}_c+\nabla\hat{I}_1 \\ &= \nabla\rho+\nabla T-c\nabla t^s+\nabla b_c^s+\frac{\lambda_1\lambda_2^2}{\lambda_2^2-\lambda_1^2}\nabla dN_w+\frac{\lambda_1\lambda_2}{\lambda_1+\lambda_2}\nabla dN_2+ \\ &\quad \nabla I_1+\nabla b_I^s+\frac{\lambda_1^3}{\lambda_1^2-\lambda_2^2}\nabla dN_w+\frac{\lambda_1^2}{\lambda_1+\lambda_2}\nabla dN_2 \\ &= \nabla\rho+\nabla T-c\nabla t^s+\nabla I_1+\nabla b_1^s+\lambda_1(\nabla dN_w+\nabla dN_2) \\ &= \nabla\rho+\nabla T-c\nabla t^s+\nabla I_1+\nabla b_1^s+\lambda_1\nabla dN_1\end{aligned} \tag{17}$$

and the reconstructed single difference L2 carrier phase is $$\begin{aligned}\nabla\hat{L}_2 &= \lambda_2\nabla\hat{\varphi}_2 \\ &= \nabla\hat{L}_c+\nabla\hat{I}_1\frac{\lambda_2^2}{\lambda_1^2} \\ &= \nabla\rho+\nabla T-c\nabla t^s+\nabla b_c^s+\frac{\lambda_1\lambda_2^2}{\lambda_2^2-\lambda_1^2}\nabla dN_w+\frac{\lambda_1\lambda_2}{\lambda_1+\lambda_2}\nabla dN_2+ \\ &\quad \left(\nabla I_1+\nabla b_I^s+\frac{\lambda_1^3}{\lambda_1^2-\lambda_2^2}\nabla dN_w+\frac{\lambda_1^2}{\lambda_1+\lambda_2}\nabla dN_2\right)\frac{\lambda_2^2}{\lambda_1^2} \\ &= \nabla\rho+\nabla T-c\nabla t^s+\frac{\lambda_2^2}{\lambda_1^2}\nabla I_1+\nabla b_2^s+\lambda_2\nabla dN_2\end{aligned} \tag{18}$$

Comparing Eq. (17) and Eq. (18) with Eq. (10) and Eq. (11), it can be seen that the reconstructed single difference L1 and L2 phases are the original phases plus an offset of integer ambiguity.

The formulas above are derived in satellite-to-satellite single differences. These apply to non-differenced observations if a receiver-dependent bias is added to each satellite observed at the reference station. The receiver bias term is absorbed by the receiver clock term.

Tropospheric delay is estimated in the regional network using zenith total delay (ZTD) per station or a troposcaling factor per station and using a standard tropospheric model (e.g. Neill, Hopfield, etc.) and a mapping function to map a tropospheric delay for line of sight from each reference station to each satellite, in some embodiments. The a priori tropospheric model used at the regional network processor is the same as that used in processing of rover observations in some embodiments.

The relation between the estimated tropospheric delay to estimated zenith total delay and troposcaling can be written as:

$$T=\mathrm{ZTD}\cdot MP=(1+T_s)\cdot\mathrm{ZTD}_{model}MP \tag{19}$$

where:

- T is the tropospheric delay of a given satellite at a reference station,
- ZTD is the estimated tropospheric zenith total delay at the reference station,
- MP is the mapping function of the a priori troposphere model used in the network processor,
- $T_s$ is the troposcaling factor, and
- $\mathrm{ZTD}_{model}$ is the zenith total delay computed from the a priori troposphere model.

Part 2.2 Reconstructing L1 and L2 Pseudorange Observations

For the narrow-lane pseudorange combination $P_N$, narrow-lane code biases (derived, for example, from a global network) are applied to obtain integer nature wide-lane carrier phase ambiguities using wide-lane carrier minus narrow-lane code filters; this is also known as the Melbourne-Wübbena (MW) widelaning technique.

The constructed narrow-lane code combinations are bias free in the sense of a geometric pseudorange measurement if the MW code bias is estimated in the regional network processor. If the MW code bias is derived from another source (e.g., a global network) and applied in the regional network processor to determine widelane ambiguities, the constructed narrow-lane codes are also bias free. While it is not required that the narrowlane code be bias free, in some embodiments it is bias free.

The single difference narrowlane code and widelane phase can be written, respectively, as $$\nabla P_N=\nabla\rho+\nabla T-c\nabla t^s+\frac{\lambda_2^2}{(\lambda_2-\lambda_1)^2}\nabla I_1+\nabla B_N+\nabla\varepsilon_N, \tag{20}$$

$$\begin{aligned}\nabla L_W &= \lambda_W\varphi_W \\ &= \nabla\rho+\nabla T-c\nabla t^s+\frac{\lambda_2^2}{(\lambda_2-\lambda_1)^2}\nabla I_1+\nabla b_W+\lambda_W\nabla N_W+\nabla v_W.\end{aligned} \tag{21}$$

The Melbourne-Wübbena combination is given by $$\lambda_W \nabla \overline{N}_W = \frac{\sum_{t=1}^{n} (\nabla L_W - \nabla P_N)}{n} + (\nabla b_W - \nabla B_N) = \frac{\sum_{t=1}^{n} (\nabla L_W - \nabla P_N)}{n} + \nabla B_{NW} \tag{22}$$

where $\nabla B_{NW}$ is the MW code bias derived, for example, by the global network processor. This MW code bias term $\nabla B_{NW}$ is a combination of code bias and carrier-phase bias acid is used when fixing the widelane ambiguity m the network processing.

Narrowlane code observations and ionospheric-free code observations can be reconstructed respectively as $$\nabla \hat{P}_N = \nabla \hat{L}_c + \frac{\lambda_2^2}{(\lambda_2 - \lambda_1)^2} \nabla I_1 + \nabla B_{NW} \tag{23}$$

$$\nabla \hat{P}_{IF} = \nabla \hat{L}_{IF} \tag{24}$$

Finally, L1 code observations and L2 code observations can be reconstructed respectively as $$\nabla \hat{P}_1 = \nabla \hat{L}_{IF} - \nabla I_1 + \alpha \nabla B_{NW} \tag{25}$$

$$\nabla \hat{P}_2 = \nabla \hat{L}_{IF} - \frac{\lambda_2^2}{\lambda_1^2} \nabla I_1 + \beta \nabla B_{NW} \tag{26}$$

where $\alpha = \frac{\lambda_1}{\lambda_2}$ and $\beta = \frac{\lambda_2}{\lambda_1}$.

By using these two factors, the MW code bias term is cancelled out in the ionospheric-free code combination and is only present in narrowlane code combination.

In summary, the regional network processor generates correction terms comprising a code bias per satellite and at least one of an ionospheric delay per satellite and a non-ionospheric correction. They may include:

- A satellite-dependent bias term per satellite derived from the network fixed double difference ambiguities. This bias term encapsulates the integer nature of the ambiguities and compensates the orbit error and satellite clock error seen in the regional reference station network (Eq. 13).
- A tropospheric zenith total delay per station or troposcaling per station (Eq. 19).
- An ionospheric correction per station per satellite (Eq, 16) or, alternatively, an ionospheric correction per station per satellite plus an ionospheric phase bias per satellite Eq. (16a).
- An MW code bias term. This term can be derived from a global network processor or regional network (Eq. 22). For an explanation of the satellite dependent bias term, also called "uncalibrated phase delays" ("UPD"), see Ge et al., "Resolution of GPS carrier-phase ambiguities in Precise Point Positioning (PPP) with daily Observations," Journal of Geodesy, Vol. 82, No. 7, July 2008, pages 401-412.

Code observations and carrier-phase observations of each reference station in the regional network can be reconstructed using these corrections.

Part 2.3 Constructing Synthetic Reference Station Data for Processing of Rover Observations The construction of synthetic reference station (SRS) data is similar to the reconstruction of pseudorange and carrier phase data at a reference station described in Part 2.2 above, except that the tropospheric delays are derived (or interpolated) from the troposcaling (zenith total delay) corrections and the and the ionosphere delays are derived (or interpolated) from the ionospheric corrections supplied by the regional network, For example, constructed observations for an SRS location within the region of the regional network are given by $$\hat{L}_{1_{SRS}} = \lambda_1 \hat{\varphi}_{1_{SRS}} = (\tilde{\rho}_{SRS} - c\tilde{t}^s + \overline{b}_c^s) + I_{1SRS} + T_{SRS}, \tag{27}$$

$$\hat{L}_{2_{SRS}} = \lambda_2 \hat{\varphi}_{2_{SRS}} = (\tilde{\rho}_{SRS} - c\tilde{t}^s + \overline{b}_c^s) + \frac{\lambda_2^2}{\lambda_1^2} I_{1_{SRS}} + T_{SRS}, \tag{28}$$

$$T_{SRS} = (TS_{SRS} + 1) \cdot ZTD_{model_{SRS}} \cdot MP, \tag{29}$$

where:

$\hat{L}_{1_{SRS}}$ is the constructed SRS L1 carrier-phase observation in metric units, $\hat{L}_{2_{SRS}}$ is the constructed SRS L2 carrier-phase observation in metric units, $\hat{\phi}_{1_{SRS}}$ is the constructed SRS L1 carrier-phase observation in cycles, $\hat{\phi}_{2_{SRS}}$ is the constructed SRS L2 carrier-phase observation in cycles, $\tilde{\rho}_{SRS}$ is the geometric range from the selected (SRS) location to the satellite computed from ephemeris (precise orbits 350 and clocks 375 from global network processor, or IGU URO; or broadcast orbits and clocks from satellite navigation message or any other source of orbits and clock with enough accuracy to correctly fix ambiguities in the regional network processor; the required accuracy depends on the size of the regional network), $\tilde{t}^s$ is the satellite clock error computed from ephemeris, $\overline{b}_c^s$ is the phase-leveled geometric correction derived from the network processing, $I_{1SRS}$ is the ionospheric correction mapped to GPS L1 frequency for the selected (SRS) location, $T_{SRS}$ is the tropospheric correction for the selected (SRS) location, and $TS_{SRS}$ is the troposcaling for the selected (SRS) location from regional network troposcaling estimation.

Synthetic reference station (SRS) observations are in some embodiments generated in an SRS module. The SRS module can be situated at the regional network processor (at the "server side," e.g., in a server computer), at the rover (at the "rover side," e.g., in the rover processor or in a client computer associated with the rover), or at any other suitable location.

If the SRS observations are generated at the regional network processor, the ephemeris used to generate SRS corrections can be exactly the same as the one used in the network processing, $\overline{b}_c^s$ can be used directly to generate SRS observations.

However, if the SRS observations are generated on the rover side, transmission latency and data corruption via the communication link from network processor to rover side processor may make it impractical or impossible to assure the same ephemeris is used unless a complicated validation algorithm is implemented. Instead, in some embodiments a geometric correction which contains geometric range for an arbitrary location combined with (minus) satellite clock error and (plus) satellite bias is transmitted. This geometric correction term carries over to the rover side the orbit and clock used on the server side, avoiding the need to maintain consistency of orbit and clock between server side and rover side, In addition, if this geometric correction term is transmitted for three arbitrary locations (e.g., within the region of the regional network), a linear model can be used to compensate the satellite orbit error for other locations (e.g., the selected SRS location which may be a rover location known only with low accuracy). A linear model is suitable for this purpose because the orbit error mapped to line of sight is very linear over a local region.

The corrected geometric range computed for a given location i is written as:

$$G_i=\tilde{\rho}_i-c\tilde{t}^s+\bar{b}_c^{\,s} \tag{30}$$

where $\tilde{\rho}_i$ is the geometric range computed from server ephemeris, $\tilde{t}^s$ is the satellite clock error, and $\bar{b}_c^{\,s}$ is ionospheric-free carrier phase satellite bias derived from the net processing.

Geometric range $\check{\rho}$ and satellite clock error $\check{t}$ can be computed (e.g., at the rover) for the same location using the satellite's broadcast navigation message (broadcast ephemeris). The geometric range difference $d\rho_i$ between the geometric range $\check{\rho}$ computed from broadcast ephemeris adjusted for broadcast satellite clock error $\check{t}$ and the geometric correction $G_i$ from the regional network for the same location is $$d\rho_i=(\check{\rho}-c\check{t})-G_i \tag{31}$$

With geometric range correction values $dr_i$ for three locations in the network region, a linear model is used in some embodiments to calculate a geometric range correction $d\rho_{SRS}$ for a selected (SRS) location within the network region. The corrected geometric range for the selected (SRS) location is then $$G_{SRS}=(\check{\rho}-\check{t})-d\rho_{SRS} \tag{32}$$

where $\check{\rho}_{SRS}$ is the geometric range from satellite to the selected (SRS) location determined from the broadcast ephemeris, $\check{t}^S$ is the satellite clock error determined from the broadcast ephemeris, and $d\rho_{SRS}$ is the geometric range correction for the selected (SRS) location.

In this case, the rover does not require precise orbit and clock; broadcast orbit and clock information is sufficient. Spacing between the three arbitrary locations should be large enough and with good geometry to minimize the error of building the linear model.

In some embodiments the geometric bias per satellite is transmitted to the SRS module (e.g., at the rover) for each epoch of synthetic reference station data to be generated. Eq. (27) and Eq. (28) can be rewritten respectively for the SRS location as $$\hat{L}_{1_{SRS}}=\lambda_1\hat{\varphi}_{1_{SRS}}=G_{SRS}+I_{1_{SRS}}+T_{SRS} \tag{33}$$

$$\hat{L}_{2_{SRS}}=\lambda_2\hat{\varphi}_{2_{SRS}}=G_{SRS}+\frac{\lambda_2^2}{\lambda_1^2}I_{1_{SRS}}+T_{SRS} \tag{34}$$

Troposcaling and ionospheric correction for the selected (SRS) location are computed for example using interpolation, least squares adjustment with the troposcaling, and ionospheric correction from the reference stations. While the coordinates of the reference stations are used in troposcaling and residual interpolation, a resolution of 10 m to 100 m is sufficient for this purpose.

A method used in some embodiments is the WLIM (Weighted Linear Interpolation Method), in which a linear model centered at SRS location is computed using least square adjustment with the corrections from at least three reference stations.

$$\begin{bmatrix} r_1 \\ r_2 \\ \vdots \\ r_n \end{bmatrix} = \begin{bmatrix} 1 & \Delta N_1 & \Delta E_1 \\ 1 & \Delta N_2 & \Delta E_2 \\ \vdots & \vdots & \vdots \\ 1 & \Delta N_n & \Delta E_n \end{bmatrix} \begin{bmatrix} a \\ b \\ c \end{bmatrix} \text{ or } R = AX \tag{35}$$

where $r_i$ (i=1, 2 . . . n) are troposcaling values at each of a reference stations, or ionospheric correction of a satellite (or satellite to satellite difference of observations at a reference station) for each of a reference stations, $\Delta N_i$, $\Delta E_i$ are the north and east coordinate differences, respectively, from the selected (SRS) location to the reference stations, and a, b, c are estimates for constant part, north and east gradient.

Using least squares adjustment gives an estimate X where $$X=(A^TPA)^{-1}A^TPR, \tag{36}$$

where

P is a distance-dependent weighting matrix, and a corresponding variance of unit weight: $\sigma_0^2$ where $$\sigma_0^2=\frac{V^TPV}{n-3} \tag{37}$$

and a covariance matrix Q for X:

$$Q=\sigma_0^2\cdot(A^TPA)^{-1}. \tag{38}$$

In some embodiments, the troposcaling correction for a selected (SRS) location is obtained by taking the constant part from the model, because the model is centered at the SRS location. For ionospheric correction, this method is applicable only when the ionospheric delay per satellite/per station is computed with Eq(16a).

In some embodiments, the troposcalnig correction and/or ionospheric correction for a selected (SRS) location is/are obtained by taking*the difference between the SRS location and the nearest reference station to the SRS location, and adding the respective troposcaling/ionospheric correction of that reference station $$r_{SRS}=BX+r_1 \text{ and } \sigma_{SRS}^2=BQB^T \tag{39}$$

where $B=[0\ \Delta N\ \Delta E]$ and $\Delta N$, $\Delta E$ are the respective north coordinate difference and east coordinate difference between the SRS and nearest reference station to SRS location, and $r_1$ is the troposcaling/ionospheric correction respectively of the nearest reference station.

Part 3: System Overview

FIG. 2 schematically illustrates a system 200 in accordance with some embodiments of the invention. Reference stations of a global (worldwide) tracking network, such as reference stations 205, 210, . . . 215, are distributed about the Earth with the aim of having substantially continuous observability of most or all GNSS satellites. The position of each reference station is known very precisely, e.g., within less than 2 cm. Each reference station is equipped with an antenna and tracks the GNSS signals transmitted by the satellites in view at that station, such as GNS satellites 220, 225, . . . 230. The GNSS signals have codes modulated on each of two or more carrier frequencies. Each reference station of the global network acquires GNSS data 305 representing, for each satellite in view at each epoch, carrier-phase (carrier) observations of at least two carriers, and pseudorange (code) observations of the respective codes modulated on at least two carriers. The reference stations also obtain the broadcast navigation message with almanac and ephemerides of the satellites from the satellite signals. The almanac contains the rough position of all satellites of the GNSS, while the so-called broadcast ephemerides provide more precise predictions (ca. 1 m) of the satellites' positions and the satellites' clock error (ca. 1.5 m) over specific time intervals.

GNSS data collected at the reference stations of the global network are transmitted via communications channels 235 to a global network processor 240. Global network processor 240 uses the GNSS data from the reference stations of the global network with other information to generate a global correction message containing precise satellite position and clock data, as described for example in U.S. Provisional Application for Patent No. 61/277,184 filed 19 Sep. 2009 (TNL A-2585P), The global correction message is transmitted for use by any number of GNSS rover receivers. The global correction message is transmitted for example as shown in FIG. 2 via communications channel/s 245 and an uplink 250 and a communications satellite 255 for broadcast over a wide area; any other suitable transmission medium may be used including but not limited to radio broadcast or mobile telephone link. Rover 260 is an example of a GNSS rover receiver having a GNSS antenna 265 for receiving and tracking the signals of GNSS satellites in view at its location, and optionally having a communications antenna 270. Depending on the transmission band of the global correction message, it can be received by rover 260 via GNSS antenna 265 or communications antenna 270. The system of FIG. 1 as described thus far is as described in U.S. Provisional Application for Patent No. 61/277,184 filed 19 Sep. 2009 (TNL A-2585P).

FIG. 2 shows additional elements of a system in accordance with embodiments of the present invention, Reference stations of a regional (local) tracking network, such as reference stations 280, 282, . . . 284, are distributed within a region of the Earth with the aim of observing GNSS satellites when they are visible over the region. The position of each reference station is known very precisely, e.g., within less than 2 cm. Each reference station is equipped with an antenna and tracks the GNSS signals transmitted by the satellites in view at that station, such as GNS satellites 220, 225, . . . 230, Each reference station of the regional network acquires GNSS data representing, for each satellite in view at each epoch, carrier-phase (carrier) observations of at least two carriers, and pseudorange (code) observations of the respective codes modulated on at least two carriers. The regional reference stations typically also obtain the broadcast navigation message with almanac and ephemerides of the satellites from the satellite signals.

GNSS data collected at the reference stations of the regional network are transmitted via communications channels 288 to a regional network processor 290. Regional network processor 290 uses the GNSS data from the reference stations of the regional network with other information to generate a regional correction message containing correction data as described below. The regional correction message is transmitted for use by any number of GNSS rover receivers within the region of the regional network. The regional correction message is transmitted for example as shown in FIG. 2 via communications channel/s 292 and an uplink such as uplink 250 and a communications satellite 255; any other suitable transmission medium may be used including but not limited to radio broadcast or mobile telephone link. The regional correction message can also be transmitted using an uplink and/or communications satellite other than those used for the global network message.

Part 3: Global Network Corrections

FIG. 3 is a schematic diagram showing principal components of the process flow 300 of a global network processor 240. Detailed description is provided in U.S. Provisional Application for Patent No. 61/277,184 filed 19 Sep. 2009 (TNL A-2585P). Data from the global network of reference stations are supplied without corrections as GNSS data 305 or after correction by an optional data corrector 310 as corrected GNSS data 315, to four processors: a code clock processor 320, a Melbourne-Wübbena (MW) bias processor 325, an orbit processor 330, and a phase clock processor 335.

Data corrector 310 optionally analyzes the raw GNSS data 305 from each reference station to check for quality of the received observations and, where possible, to correct the data for cycle slips, which are jumps in the carrier-phase observations occurring, e.g., each time the receiver has a loss of lock. Commercially-available reference stations typically detect cycle slips and flag the data accordingly. Cycle slip detection and correction techniques are summarized, for example, in G. Seeber, Satellite Geodesy, 2nd Ed. (2003) at pages 277-281. Data corrector 310 optionally applies other corrections, Though not all corrections are needed for all the processors, they do no harm if applied to the data. For example as described below some processors use a linear combination of code and carrier observations in which some uncorrected errors are canceled in forming the combinations.

Observations are acquired epoch by epoch at each reference station and transmitted with time tags to the global network processor 240. For some stations the observations arrive delayed. This delay can range between milliseconds and minutes. Therefore an optional synchronizer 318 collects the data of the corrected reference station data within a predefined time span and passes the observations for each epoch as a set to the processor. This allows data arriving with a reasonable delay to be included in an epoch of data.

The MW bias processor 325 takes either uncorrected GNSS data 305 or corrected GNSS data 315 as input, since it uses the Melbourne-Wübbena linear combination which cancels out all but the ambiguities and the biases of the phase and code observations. Thus only receiver and satellite antenna corrections are important for the widelane processor 325. Based on this linear combination, one MW bias per satellite and one widelane ambiguity per receiver-satellite pairing are computed. The biases are smooth (not noisy) and exhibit only some sub-daily low-rate variations. The widelane ambiguities are constant and can be used as long as no cycle slip occurs in the observations on the respective satellite-receiver link. Thus the bias estimation is not very time critical and can be run,e.g., with a 15 minute update rate. This is advantageous because the computation time grows with the third power of the number of stations and satellites. As an example, the computation time for a global network with 80 stations can be about 15 seconds. The values of fixed widelane ambiguities 340 and/or widelane biases 345 are optionally used in the orbit processor 330 and/or the phase clock processor 335, and/or are supplied to a scheduler 355. MW bias processor 325 is described in detail in Part 7 of U.S. Provisional Application for Patent No. 61/277,184 filed 19 Sep. 2009 (TNL A-2585P), attached as Appendix A.

Some embodiments of orbit processor 330 are based on a prediction-correction strategy. Using a precise force model and starting with an initial guess of the unknown values of the satellite's parameters (initial position, initial velocity and dynamic force model parameters), the orbit of each satellite is predicted by integration of the satellite's nonlinear dynamic system. The sensitivity matrix containing the partial derivatives of the current position to the unknown parameters is computed at the same time. Sensitivities of the initial satellite state are computed at the same time for the whole prediction. That is, starting with a prediction for the unknown parameters, the differential equation system is solved, integrating the orbit to the current time or into the future. This prediction can be linearized into the direction of the unknown parameters. Thus the partial derivatives (sensitivities) serve as a measure of the size of the change in the current satellite states if the unknown parameters are changed, or vice versa.

In some embodiments these partial derivatives are used in a Kalman filter to improve the initial guess by projecting the GNSS Observations to the satellite's unknown parameters. This precise initial state estimate is used to again integrate the satellite's dynamic system and determine a precise orbit. A time update of the initial satellite state to the current epoch is performed from time to time. In some embodiments, ionospheric-free ambiguities are also states of the Kalman filter. The fixed widelane ambiguity values 340 are used to fix the ionospheric-free ambiguities of the orbit processor 330 to enhance the accuracy of the estimated orbits. A satellite orbit is very smooth and can be predicted for minutes and hours. The precise orbit predictions 350 are optionally forwarded to the standard clock processor 320 and to the phase clock processor 335 as well as to a scheduler 355.

Ultra-rapid orbits 360, such as IGU orbits provided by the International GNSS Service (IGS), can be used as an alternative to the precise orbit predictions 355. The IGU orbits are updated four times a day and are available with a three hour delay.

Standard clock processor 320 computes code-leveled satellite clocks 360 (also called standard satellite clocks), using GNSS data 305 or corrected GNSS data 315 and using precise orbit predictions 355 or ultra-rapid orbits 365. Code-leveled means that the clocks are sufficient for use with ionospheric-free code observations, but not with carrier-phase observations, because the code-leveled clocks do not preserve the integer nature of the ambiguities. The code-leveled clocks 360 computed by standard clock processor 320 represent clock-error differences between satellites. The standard clock processor 320 uses the clock errors of the broadcast ephemerides as pseudo observations and steers the estimated clocks to UPS time so that they can be used to compute, e.g., the exact time of transmission of a satellite's signal. The clock errors change rapidly, but for the use with code measurements, which are quite noisy, an accuracy of some centimeter is enough. Thus a "low rate" update rate of 30 seconds to 60 seconds is adequate. This is advantageous because computation time grows with the third power of number of stations and satellites. The standard clock processor 325 also determines troposphere zenith delays 365 as a byproduct of the estimation process. The troposphere zenith delays and the code-leveled clocks are sent to the phase clock processor 335. Standard clock processor 320 is described in detail in Part 6 of U.S. Provisional Application for Patent No. 61/277,184 filed 19 Sep. 2009 (TNL A-2585P).

The phase clock processor 335 optionally uses the fixed widelane ambiguities 340 and/or MW biases 345 from widelane processor 325 together with the troposphere zenith delays 365 and the precise orbits 350 or IGU orbits 360 to estimate single-differenced clock mots and narrowlane ambiguities for each pairing of satellites. The single-differenced clock mots and narrowlane ambiguities are combined to obtain single-differenced phase-leveled clock errors 370 for each satellite (except for a reference satellite) which are single-differenced relative to the reference satellite. The low-rate code leveled clocks 360, the troposphere zenith delays 365 and the precise orbits 350 or IGU orbits 360 are used to estimate high-rate code-leveled clocks 375. Here, the computational effort is linear with the number of stations and to the third power with the number of satellites. The rapidly-changing phase-leveled clocks 370 and code-leveled clocks 375 are available, for example, with a delay of 0.1 sec-0.2 sec. The high-rate phase-leveled clocks 370 and the high-rate code-leveled clocks 375 are sent to the scheduler 355 together with the MW biases 340. Phase clock processor 340 is described in detail in Part 9 of U.S. Provisional Application for Patent No. 61/277,184 filed 19 Sep. 2009 (TNL, A-2585P).

Scheduler 355 receives the orbits (precise orbits 350 or IGU orbits 360), the MW biases 340, the high-rate phase-leveled clocks 370 and the high-rate code-leveled clock 375. Scheduler 355 packs these together and forwards the packed orbits and clocks and biases 380 to a message encoder 385 which prepares a correction message 390 in compressed format for transmission to the rover. Transmission to a rover takes for example about 10 sec-20 sec over a satellite link, but can also be done using a mobile phone or a direct internet connection or other suitable communication link. Transmission to regional network processor 290 is also via a suitable communication link. Scheduler 355 and message encoder are described in detail in Part 10 of U.S. Provisional Application for Patent No. 61/277,184 filed 19 Sep. 2009 (TNL A-2585P).

Part 3: Regional Network Corrections

FIG. 4 schematically illustrates a regional network processor 400, such as regional network processor 290, in accordance with some embodiments of the invention. A data synchronizer 405 receives reference data from each reference station of the regional network, such as reference data 410, 415, . . . 420 from respective reference stations 280, 284, . . . 286. Synchronizer 405 also receives precise satellite orbits and clocks 425 from global network processor 300 or any other available source. Synchronizer 405 also optionally receives MW biases 430, such as MW biases 340 from global network processor 300; if MW biases are not supplied to regional network processor 400 from an external source, these are optionally estimated in regional network processor 400.

Observations are acquired epoch by epoch at each regional network reference station and transmitted with time tags to iterative filters(s) 440. For some stations the observations may arrive delayed. This delay can range between milliseconds and minutes. Therefore the optional synchronizer 435 collects the regional network reference station data within a predefined time span and passes the observations for each epoch as a set to iterative filter(s) 440. This allows data arriving with a reasonable delay to be included the processing of an epoch of data. Iterative filter(s) 440 can be implemented using least squares, using a single Kalman filter or, for better computing efficiency, as factorized filters using techniques described in U.S. Pat. No. 7,432,853 (TNL A-1403), United States Patent Application Publication US 2009/0224969 A1 (TNL A-1743) and/or United States Patent Application Publication US 2009/0027264 A1 (TNL A-1789). If implemented as optional factorized fillers, the synchronized data set 435 is supplied for example to one or more banks of code/carrier filters 442 which produce estimates for the code/carrier combinations and associated statistical information 444, to ionospheric filters 446 which produce estimates for the ionospheric combinations and associated statistical information 448, to a geometric filter 450 which produces an estimate for the geometric combination and associated statistical information 452, and the estimates are combined in a combiner 455. Quintessence filters (not Shown) may optionally be used if the reference station data are obtained from GNSS signals having three or more carriers, as described in U.S. Pat. No. 7,432,853 (TNL A-1403).

The array of estimates and associated statistical information 458 from iterative filter(s) 440, which includes float-solution ambiguity values, is supplied to a "fixing" element 460. Some embodiments "fixing" element 460 employ any suitable techniques known in the art, such as simple rounding, bootstrapping, integer least squares based on the Lambda method, or Best Integer Equivariant. See for example P. Teunissen et al.; *GNSS Carrier Phase Ambiguity Resolution: Challenges and Open Problems*, In M. G. Sideris (ed.); Observing our Changing Earth, International Association of Geodesy Symposia 133, Spinger Verlag Berlin-Heidelberg 2009 and Verhagen, Sandra, *The GNSS integer ambiguities: estimation and validation*, Publications on Geodesy 58, Delft, 2005. 194 pages, ISBN-13: 978 90 6132 290 0. ISBN-10: 90 6132 290 1. See also the discussion of ambiguity fixing in U.S. Pat. No. 7,432,853. The term "fixing" as used here is intended to include not only fixing of ambiguities to integer values using techniques such as rounding, bootstrapping and Lambda search, but also to include forming a weighted average of integer candidates to preserve the integer nature of the ambiguities if not fixing them to integer values. The weighted average approach is described in detail in unpublished International Patent Applications PCT/US/2009/004471, PCT/US/2009/0044472, PCT/US/2009/004473, PCT/US/2009/004474 and PCT/US/2009/004476 filed 5 Aug. 2009 (TNL A-2339PCT) and U.S. Provisional Application for Patent No. 61/189,382 filed 19 Aug. 2008 (TNL A-2339P).

A regional correction data generation element 465 prepares regional correction data 470 comprising, for example, at least one code bias per satellite, and at least one of an ionospheric delay per satellite at multiple regional network stations, an optional ionospheric phase bias per satellite, and non-ionospheric corrections. The non-ionospheric corrections comprise, for example, a tropospheric delay per regional network station and/or a geometric correction per satellite.

FIG. 5 schematically illustrates a regional network process 465 for generating the regional correction data 470 from correction data 500 in accordance with some embodiments of the invention. At least one code bias per satellite 505 is obtained at 510. The code bias per satellite can be determined in the global network processor, in the regional network processor, or in another processor. An ionospheric delay 515 over a region, which may be all or a part of the region of the regional network, is obtained at 520, and optionally an ionospheric phase bias per satellite. The ionospheric delay 515 may be determined from an ionospheric model or by estimating ionospheric delay per satellite per station. A tropospheric delay 525 over a region, which may be all or a part of the region of the regional network, is obtained at 530. The tropospheric delay 525 may be determined for example by estimating a zenith total delay (ZTD) per regional network station in the regional network processor. A phase-leveled geometric correction per satellite 535 is obtained at 540. The phase-leveled geometric correction per satellite is estimated, after fixing ambiguities, in the global network processor or in the regional network processor. Further details of the regional correction 470 data are explained below.

Part 3: Precise Navigation/Positioning With Regional Network Corrections

FIG. 6 schematically illustrates an augmented precise navigation/positioning scenario 600 in accordance with some embodiments of the invention. Global network processor 240 delivers global correction data 390 to regional network processor 290, Global correction data comprises, for example, phase-leveled clocks 370, code-leveled clocks 365, MW biases 345 and satellite orbit position and velocity information 350, Regional network processor 290 also receives data from regional network stations and generates regional correction data 470. Regional correction data comprises, for example, MW biases (MW biases 345 from global correction message 390 or MW biases estimated in regional network processor 290 or MW biases obtained from any other available source), a phase-leveled geometric correction per satellite 535 estimated in regional network processor 290, ionospheric delay per satellite per station, 515 and optionally an ionospheric phase bias per satellite, and tropospheric delay per station 525.

Regional correction data 470 from server side processing 605 is delivered, e.g., as encoded regional correction data 480, for use in rover side processing 610, GNSS signals from GNSS satellites 615, 620, 625 are observed by rover receiver 630 which provides GNSS observation data 635. An optional navigation engine 640 estimates a rough position of the antenna of rover receiver 630, typically without the use of corrections. This rough position, or an approximate position of rover receiver 630 known from another source, is used as an approximate rover position 645 in preparing regional corrections (e.g., 715), appropriate to the approximate position 645. A time tag 650 is associated with the approximate rover position 650. The GNSS observation data 635, approximate rover position 645 and time tag 650, and regional correction data 470 (with MW biases optionally coming directly from global correction data 390) are supplied to a rover data corrector 655. Rover data corrector 655 applies the regional correction data 470 with MW biases to the GNSS observation data 635 to obtain corrected rover data 660 for the approximate rover position 645 which corresponds in time with the GNSS data 635. A non-differential processor 665, such as a Precise Point Positioning (PPP) engine, estimates a precise rover position 670 from the corrected rover data 660.

While the rover data corrector 655 and non-differential processor 665 are shown in FIG. 6 as being located within the rover side processing 610, either or both of these may be located elsewhere, such as at server side processing 605. Such a configuration may be advantageous in situations where the rover receiver has limited processing power and has two-way communication with a remotely-located computer having available processing capacity and/or in tracking applications (e.g., tracking location of mobile objects or persons carrying the rover receiver 630) where knowledge of the rover receiver's precise position is needed at a location remote from the rover receiver.

FIG. 7 schematically illustrates augmented precise navigation/positioning in accordance with some embodiments of the invention. GNSS data 710 (e.g., GNSS data 635) comprising code and carrier observations are obtained from the rover receiver at 705. Regional correction data 470 comprising one or more code biases per satellite, together with ionospheric corrections and/or non-ionospheric corrections and MW biases, are obtained at 710. Regional corrections 720 are prepared at 725. GNSS data 710 and regional corrections 720 are used at 730 to determine a precise rover location 735.

FIG. 8 schematically illustrates augmented precise navigation/positioning with differential processing in accordance with some embodiments of the invention. Global network processor 240 delivers global correction data 390 to regional network processor 290. Global correction data comprises, for example, phase-leveled clocks 370, code-leveled clocks 365, MW biases 345 and satellite orbit position and velocity information 350. Regional network processor 290 also receives data from regional network stations and generates regional correction data 470. Regional correction data comprises, for example, MW biases (MW biases 345 from global correction message 390 or MW biases estimated in regional network processor 290 or MW biases obtained from any other available source), a phase-leveled geometric correction per satellite 535 estimated in regional network processor 290, ionospheric delay per satellite per station 515, and optionally an ionospheric phase bias per satellite, and tropospheric delay per station 525.

Regional correction data 470 from server side processing 805 is delivered, e.g., as encoded regional correction data 480, for use in rover side processing 810. GNSS signals from GNSS satellites 815, 820, 825 are observed by rover receiver 830 which provides GNSS observation data 835. An optional navigation engine 840 estimates a rough position of the antenna of rover receiver 830, typically without the use of corrections. This rough position, or an approximate position of rover receiver 830 known from another source, is taken as a synthetic reference station (SRS) location 845. A time tag 850 is associated with SRS location 845. A synthetic reference station module 855 uses the current SRS location 845 and current regional correction data 470 to construct a set of synthetic reference station observations 860 for processing of each epoch of GNSS data 835 in a differential processor 865. Differential processor 865 is, for example, a conventional real time kinematic (RTK) positioning engine of a commercially available GNSS receiver. Differential processor uses the SRS observations 860 and the GNSS data 835 to determine a precise rover position 870, for example at each epoch of GNSS data 835.

In some embodiments the MW biases 345 from global network processor 240 are passed through the regional network processor 290 and provided to SRS module 855 as a part of regional correction data 470. In some embodiments the MW biases 345 from global network processor 240 are passed directly from global network processor 240 to SRS module 855 as a part of global correction data 390, e.g., if the rover has the capability to receive global correction data 390 in addition to regional correction data 480. In some embodiments the MW biases are estimated by the regional network processor 290 and provided to SRS module 855 as a part of regional correction data 470.

While the SRS module 855 and differential processor 865 are shown in FIG. 8 as being, located within the rover side processing 810, either or both of these may be located elsewhere, such as at server side processing 805. Such a configuration may be advantageous in situations where the rover receiver has limited processing power and has two-way communication with a remotely-located computer having available processing capacity and/or as in tracking applications where knowledge of the rover receiver's position is needed at a location remote from the rover receiver.

FIG. 9 schematically illustrates augmented precise navigation/positioning with differential processing in accordance with some embodiments of the invention. In this example the server side processing includes the SRS module, Global network processor 240 delivers global correction data 390 to regional network processor 290. Global correction data comprises, for example, phase-leveled clocks 370, code-leveled clocks 365, MW biases 345 and satellite orbit position and velocity information 350. Regional network processor 290 also receives data from regional network stations and generates regional correction data 470, Regional correction data comprises, for example, MW biases (MW biases 345 from global correction message 390 or MW biases estimated in regional network processor 290 or MW biases obtained from any other available source a phase-leveled geometric correction per satellite 535 estimated in regional network processor 290, ionospheric delay per satellite per station 515, and tropospheric delay per station 525.

GNSS signals from GNSS satellites 915, 920, 925 are observed by rover receiver 930 which provides GNSS observation data 935. An optional navigation engine 940 estimates a rough position of the antenna of rover receiver 930, typically without the use of corrections. This rough position, or an approximate position of rover receiver 930 known from another source, is taken as a synthetic reference station (SRS) location 945. A time tag 950 is associated with SRS location 945. Server side processing 905 includes an SRS module 955 which uses the current SRS location 945 and current regional correction data 470 to construct a set of synthetic reference station observations 960 for processing of each epoch of GNSS data 935 in a differential processor 965. Differential processor 865 is, for example, a conventional real time kinematic (RTK) positioning engine of a commercially available GNSS receiver, Differential processor uses the SRS observations 960 and the GNSS data 935 to determine a precise rover position 970, for example at each epoch of GNSS data 935.

Sources of an approximate position of rover receiver to use as SRS location 845 or 945 include, without limitation, (a) the autonomous position of the rover receiver as determined by navigation engine 840 or 940 using rover data 835, (h) a previous precise rover position such as a precise rover position determined for a prior epoch by differential processor 865 or 965, (c) a rover position determined by an inertial navigation system (INS) collocated with the rover, (d) the position of a mobile phone (cell) tower in proximity to a rover collocated with a mobile telephone communicating with the tower, (e) user input such as a location entered manually by a user for example with the aid of keyboard or other user input device, and (f) any other desired source.

Regardless of the source, some embodiments update the SRS location 845 or 945 from time to time. The SRS location 845 or 945 is updated, for example: (a) never, (b) for each epoch of rover data, (c) for each $n^{th}$ epoch of rover data, (d) after a predetermined time interval, (e) when the distance between the SRS location 845 or 945 and the approximate rover antenna position from navigation engine 840 or 940 exceeds a predetermined threshold, (f) when the distance between the approximate rover antenna position and the precise rover position exceeds a predetermined threshold, (g) for each update of the approximate rover antenna position, or (h) for each update of the precise rover antenna position 870 or 970. In some embodiments the SRS location 945 is not the same as the autonomous as the autonomous position solution, but somewhere close to it.

FIG. 10 schematically illustrates augmented precise navigation positioning with differential processing accordance with some embodiments of the invention. At 1005 the SRS location and time tag information 1010 are obtained. At 1015 the SRS location is verified as current, for example by comparing its time tag with a time tag of the current epoch of rover observations to be processed. At 102.5 the rover corrections 1030 for the current SRS location are determined from the current SRS location and the regional correction data 470. At 1035 the current SRS observations 1040 are constructed from the rover corrections 1030. At 1045 the precise rover location 730 is determined by differential processing of the current SRS observations 1040 and the GNSS data 635.

FIG. 11 schematically illustrates construction of synthetic reference station observations m accordance with some embodiments of the invention. At 1105 the regional correction message 1110 received from a transmission channel such as communications satellite 255 is decoded. The decoding unpacks regional correction data elements comprising a geometric correction (code bias) per satellite 1115, a troposcaling value (Zenith Total Delay) per station 1120 and an ionospheric correction per satellite per station, and optionally ionospheric phase bias per satellite 1125. An SRS location 1130 is obtained as described above. Satellite orbits and clocks 1110 are obtained from the broadcast GNSS satellite navigation message or precise satellite orbit and clock information is optionally retrieved at 1140 by decoding global correction message 390. MW biases 1142 are obtained from regional correction message 1110 via regional correction message decoding er 1105 or MW biases 1144 are obtained from global correction message 390 via global correction message decoder 1140.

A module 1145 constructs ionospheric-free phase observations 1150 for satellites in view at the SRS location using the SRS location information 1130 and the satellite orbits and clocks information 1135 to compute a range and the geometric correction per satellite 1115 to correct the computed range (Eq32). A module 1155 determines a tropospheric delay 1160 for the SRS location from the troposcaling per station 1120 (Eq. 36,Eq. 39. A module 1165 determines an ionospheric delay 1170 for the SRS location from the ionospheric correction per satellite per station data optionally ionospheric phase bias per satellite 1125 (Eq.36,Eq.39). At 1175 the SRS carrier-phase observations 1180 are constructed for two (or more) carrier frequencies by combining the ionospheric free-phase observations 1150 with the tropospheric correction 1160 for the SRS location and the ionospheric correction for the SRS location 1175 (Eq. 33,Eq.34). At 1185 the SRS code observations 1190 are constructed by combining the SRS carrier-phase observations 1180 with MW biases 1142 or MW biases 1144 (Eq. 25,Eq.26). The SRS carrier Observations 1180 and SRS code observations 1190 comprise the SRS observations 1095 at each epoch.

Part 4: Correction for Atmospheric Effects

FIG. 12 schematically illustrates an ionospheric shell 1200 and a portion 1205 of a tropospheric shell surrounding the Earth 1210, with ground-based reference stations 1220, 1225, 1230, . . . 1235 of a network each receiving signals from GNSS satellites 1260, 1265, 1270. For convenience of illustration, only the portion 1205 of the tropospheric shell surrounding reference station 1220 is shown. The troposphere has a depth of, for example zero to about 11 km. Tropospheric delay affects the signals received by each reference station in a manner depending on atmospheric temperature, pressure and humidity in the vicinity of the reference station, as well as the elevation of the satellite relative to the reference station. The error is about 1 mm per meter at ground level, such that the last meter of the signal path to the reference station gives about 1 mm of error in the tropospheric model.

Various techniques are known for modeling tropospheric path delay on the signals. See, for example, B. Hofmann-Wellenhof et al., Global Positioning System: Theory and Practice, 2d Ed., 1993, section 6.3.3, pp. 98-106. Tropospheric scaling (tropo-scaling) which lumps the atmospheric parameters into one tropo-scaling parameter can be implemented in at least three ways. A first approach is to model Zenith Total Delay (ZTD) representing tropospheric delay in a vertical direction relative to the reference station as a value representing range error $\delta r$, e.g., 2.58 meters. A second approach is to model the sum of one plus a scaling factor (1+S) such that tropospheric delay in the vertical direction $T'=(1+S)T$, where is a constant, e.g., 1+S=1.0238. A more convenient approach is to model S directly, e.g., S=2.38%. For purposes of the present invention, it is sufficient to treat as "tropospheric effect" all that affects different signal frequencies in the same way (non-dispersive).

FIG. 13 illustrates a slanted ray path from a satellite to a receiver passing through the troposphere. Except when a satellite is directly over a reference station, signal rays penetrate the atmosphere in a slant path from satellite to receiver as shown in FIG. 13, such as a straight-line path 1310 from satellite 1260 to reference station 1220. The slant path of the signal ray from a given satellite to each reference station penetrates the troposphere at an angle $\alpha$ which is different for each satellite in view at the station. The tropospheric mapping function is thus different for each satellite-to-reference-station combination. The effect of the different slant angles can be compensated by relating the geometry-dependent zenith delay $T\alpha$ with a geometry-independent $T_{90}°$ (Vertical T) by a mapping function $m(\alpha)$: $T\alpha=m(\alpha)T_{90}°$.

Except when a satellite is directly over a reference station, signal rays penetrate the ionosphere in a slant path from satellite to receiver as shown in FIG. 14, such as straight-line path 1405 from satellite 1260 to reference station 1220. This slant path is \ explicitly accounted for by the so-called mapping function $f_{mapping}(\zeta)=1/\cos(\zeta)$, where $\zeta$ is the angle of the signal ray with the line perpendicular to the ionospheric sphere through the piercepoint (e.g., line 1410). Since the slant path of the signal ray from a given satellite to each reference station penetrates the ionosphere at a different angle, the angle is different for each reference station. The mapping function is thus different for each satellite-to-reference-station combination. The effect of the different slant angles can be compensated by relating the geometry-dependent Total Electron Content (TEC) with a geometry-independent VTEC (Vertical TEC) by $TEC/f_{mapping}(\zeta)=TEC\cos(\zeta)=VTEC$. As shown for example in FIG. 14 with respect to reference station 1220 and satellite 1260, the TEC determined along slant path 1405 corresponds to the VTEC along the line 1410 perpendicular to the ionospheric sphere 1415 at piercepoint 1420.

With the relative coordinates that were introduced above and the concept of the mapping function, the ionospheric advance across the network area can be written as (here the uppercase i and j are to be understood as exponents, not indices)

$$I(\Delta\lambda,\Delta\varphi)=m(\Delta\lambda,\Delta\varphi)\left(\sum_{i,j=0}^{\infty}\alpha_{i,j}\Delta\lambda^i\Delta\varphi^j\right). \tag{40}$$

That is, the ionospheric advance across the network area is expressed in terms of its Taylor series (or any other set of orthogonal functions, such as spherical Bessel functions). For most purposes, and as illustrated here, the expansion can be stopped at first order, and the terminology $a_{1,0}=a_\lambda$ and $a_{0,1}=a_\phi$ can be introduced. The expression $a_{0,0}=I_0$ is the ionospheric advance as the reference point, while $a_\lambda$ and $a_\phi$ are the gradients in the ionosphere in the relative coordinates. The ionosphere at the piercepoints is therefore expressed as $$I_n^m=m_n^m(I_0^m+a_\lambda^m\Delta\lambda_n^m+a_\phi^m\Delta\phi_n^m). \tag{41}$$

Thus for each satellite in view the parameters ($I_0^m$, $a_\lambda^m$, $a_\phi^m$) characterize the ionosphere across the network area. Those parameters are estimated, together with the carrier-phase integer ambiguity and multipath states. Generally, if the expansion Eq. (39) is carried to k-th order, the number of states introduced for the ionosphere is (k+1)(k+2)/2. The other terms of Eq. (39) ($m_n^m$, $\Delta\lambda_n^m$, $\Delta\phi_n^m$) are given by the geometry of the network and the position of satellite m.

FIG. 15 illustrates how the ionosphere parameters ($I_0^m$, $a_\lambda^m$, $a_\phi^m$) describe the ionosphere at a piercepoint relative to a reference point. The ionosphere has a TEC of $I_0^m$ at the reference point, with a slope $a_0^m$ in angular direction λ and a slope $a_\phi^m$ in angular direction ϕ, in the example of FIG. 15, the TEC 1500 at piercepoint 1505 is the sum of a contribution 1510 equal to $I_0^m$, a contribution 1520 based on slope $a_\lambda^m$ and the angular distance of piercepoint 1505 from reference point 1525 in direction λ, and a contribution 1530 based on slope $a_\phi^m$ and the angular distance of piercepoint 1505 from reference point 1525 in direction ϕ.

While a linear treatment of the ionosphere delivers excellent availability, reliability is increased with an even more realistic model which takes into account the thickness of the ionosphere. As is known (for example from D. Bilitza, *International Reference Ionosphere* 2000, Radio Science 2 (36) 2001, 261), the electron density of the ionosphere has a certain profile $f(h)$ as a function of altitude h which peaks sharply at a height between 300-400 kilometers above ground. To calculate the electron content that a ray experiences from satellite m to station n one would calculate the integral $$I_n^m \propto \int_{(x^m,y^m,z^m)}^{(x_n,y_n,z_n)} ds f(h), \tag{41}$$

where s is the measure along the direct line of sight between station and satellite. Notice how for the simple shell model already considered, $f(h)=\Delta(h-h_0)$ (Dirac Delta distribution), this expression returns the previous mapping function as $$\frac{ds}{ds}\bigg|_{h_0} = \frac{1}{\cos\varphi}.$$

Using suitable parameters for f(h), the integral for all station-satellite pairs can be numerically computed at each epoch. For practical purposes an approximation in terms of a box profile is fully sufficient and delivers improvements over the shell model. It is further assumed that the gradients in the ionosphere do not depend on altitude. This assumption can easily be relaxed by adding further gradient states for different altitudes. That the finite thickness of the ionosphere is an important feature of the model can be understood by, picturing the entry and exit point of the ray of a low elevation satellite, e.g., as shown in FIG. 8 of United States Patent Application Publication US 2009/0224969 A1. If the thickness of the ionospheric shell is 200 kilometers, the entry point and exit point might be separated by some 1000 kilometers. With typical gradients of $a_\lambda$, $a_\phi \sim 10^{-3}$ m/km, the contributions to the calculation of ionospheric advance differ greatly from entry point to exit point.

FIG. 16 schematically illustrates troposcaling.

FIG. 19 schematically illustrates ionospheric delay IPBS at a physical base station location PBS and ionospheric delay ISRS at a synthetic reference station location SRS.

Part 5: Message Encoding & Decoding

It will be recalled that an objective of making regional correction data 470 available for processing of rover observations is to enable reconstruction of regional network observations and/or construction of synthetic reference station observations based on the regional network observations. Some embodiments mitigate the bandwidth required and/or speed the rover processing by encoding the regional correction data, e.g., as at 475 in FIG. 4.

FIG. 20 schematically illustrates a correction message encoding scheme in accordance with some embodiments. Regional correction data 470 is divided into network elements 2005 which apply to the entire regional network of, for example 80 reference stations, and cluster elements 2010 which apply to subsets ("clusters") of, for example, up to 16 reference stations of the regional network. The encoded regional correction data 480 is then segmented into a network message 2015 containing the network elements and a series of cluster messages 2020, 2025, 2030, . . . 2035 containing cluster elements of respective station clusters 1, 2, 3, . . . n.

The network elements 2005 include, for example, a time tag, a geometric correction per satellite, a location of an arbitrary point in the network to which corrections are referenced, MW biases, and the number of cluster messages to follow in the epoch, and optionally an ionospheric phase bias per satellite. The cluster elements 2010 include, for example, a tropo scaling value per station, an ionospheric correction per station per satellite, and the station locations, Station height is not needed if corrections are referenced to a standard elevation which is known to a rover receiving, the correction data. The station locations need not be physical station locations, but may instead be virtual station locations for which the corrections are estimated from the observations at physical reference stations of the regional network, FIG. 21 schematically illustrates clusters of regional network stations: cluster 1 at 2105, cluster 2 at 2110, cluster 3 at 2115, cluster 4 at 2120. Each cluster in this simplified example has four stations, though the number of stations is a matter of design choice. Cluster 1 has stations 1-1, 1-2, 1-3 and 1-4; cluster 2 has stations 12-1, 2-2, 2-3 and 2-4; cluster 3 has stations 3-1, 3-2, 3-3 and 3-4; and cluster 4 has stations 4-1, 4-2, 4-3 and 4-4. The cluster elements of clusters 1, 2, 3 and 4 are used respectively to construct cluster message 2125, 2130, 2135 and 2140.

In some embodiments, a regional correction message epoch has one network message 2105 followed by a series of cluster messages 2020-2035, the number and sequence of which may vary from epoch to epoch. In some embodiments, each correction message epoch has a network message and a subset of cluster messages, with the clusters in the subset rotating over a series of epochs. In some embodiments, the order of clusters in the correction message epoch is based on an expected or estimated or known number of rovers physically located in the cluster. For example:

| Network | Cluster 1 | Cluster 2 | . . . | Cluster n |
|---|---|---|---|---|
| Message | Message | Message | . . . | Message |

A rover does not need all the cluster messages to construct a synthetic reference station correction for its approximate location. FIG. 22 shows an example in which a rover 2205 is located within a regional network having clusters 2210, 2220, 2230 and 2240, each having a respective network station (or virtual network station) 2215, 2225, 2235, 2245. Rover 2205 is surrounded by network stations 2215, 2225 and 2235 which are well distributed around it and within a suitable radius for preparing corrections for the rover's location from their observations (or virtual observations). The observations of network station 2245 are not needed by rover 2205 at its current location. If the rover moves for example well into cluster 2210 where it no longer needs cluster elements from clusters 2220 or 2230, the rover can use the cluster elements only from cluster 2210.

In some embodiments, rover 2205 uses the location information of the network message to construct a list of clusters, compares its approximate current location with the list to determine which cluster messages are needed to construct synthetic reference station corrections appropriate to its current location, and retrieves the cluster elements from the corresponding cluster messages. This approach can save memory, processor time, and other resources when processing rover observations to determine the precise rover location.

As discussed above with reference to Eq. (30), Eq. (31) and Eq. (32), the geometric correction term can be transmitted for three arbitrary locations in the network. Alternatively, the geometric correction term can be transmitted for a single arbitrary location in the network, along with the delta (difference from this term) for each of two other arbitrary locations in the network. From these geometric correction terms (or geometric correction term plus deltas), the rover constructs a linear model to estimate the geometric correction applicable to its approximate location.

FIG. 17 shows for example three arbitrary locations 1705, 1710, 1715 for which the geometric correction terms are determined in the network processor. Spacing between the three arbitrary locations should be large enough (e.g., 5 degrees of latitude and 5 degrees of longitude) and with good geometry to minimize error when building a linear model for a rover location 1720 within the network. FIG. 18 schematically illustrates a linear model for determining the geometric correction 1820 at rover location 1720 from the geometric corrections 1805, 1810, 1815 for a given satellite at respective arbitrary locations 1705, 1710, 1715. This approach helps to minimize bandwidth by reducing the number of geometric correction values needed to construct the corrections needed at the rover.

In some embodiments the regional network processing is carried out independently by multiple regional network processors to provide redundancy. Operating the regional network processors independently (and possibly with non-identical sets of network station observations) means that biases and scalings may differ from between regional network processors. In some embodiments a network message includes a processor identifier so that the rover will know to react appropriately if its source of network messages changes, e.g., by resetting its filters to avoid using incompatible biases and scalings. Some embodiments include a cycle slip indicator to signal the rover that a cycle slip has occurred on a satellite in the regional network processing, so that the rover can reset the ambiguity values in its filters. To further save transmission bandwidth, some embodiments use an optional ionospheric correction general model from which the cluster message gives delta (difference) values; the rover uses the optional model from the network message with the difference values from the cluster message(s) to construct the ionospheric correction for the rover's approximate location, e.g., for the SRS location, Some embodiments have a network correction message structured as follows:

| # of items | description |
|---|---|
| 1 | processor id |
| 3 (or 1 + 3) | 3 arbitrary locations (lat, long),<br>[or 1 arbitrary location plus delta to other two locations] |
| 3 | 1 geometric correction per satellite for each of<br>3 arbitrary locations |
| 3 (optional) | optional iono correction general model from which<br>cluster message gives deltas |
| 1 | cycle slip indicator (CTC) |

Some embodiments have cluster messages structured as follows satellites and with m stations per cluster):

| # of items | description |
|---|---|
| 1 | time tag |
| m | station position (B,L) (lat,lon) |
| m | tropo scaling |
| m × n | iono correction |
| m | site iono bias |

Part 6: Receiver and Processing Apparatus

FIG. 23 is a schematic diagram of a computer system in accordance with some embodiments of the invention. Computer system 2320 includes one or more processors 2330, one or more data storage elements 2335, program code 2340 with instructions for controlling the processor(s) 2330, and user input/output devices 2445 which may include one or more output devices 2350 such as a display or speaker or printer and one or more devices 2355 for receiving user input such as a keyboard or touch pad or mouse or microphone.

FIG. 24 is a block diagram of a typical integrated GNSS receiver system 2400 with GNSS antenna 2405 and communications antenna 2410. The Trimble R8 GNSS System is an example of such a system. Receiver system 2400 can serve as a rover or base station or reference station. Receiver system 2400 includes a GNSS receiver 2415, a computer system 2420 and one or more communications links 2425. Computer system 2420 includes one or more processors 2430, one or more data storage elements 2435, program code 2440 with instructions for controlling the processor(s) 2430, and user input/output devices 2445 which may include one or more output devices 2450 such as a display or speaker or printer and one or more devices 2455 for receiving user input such as a keyboard or touch pad or mouse or microphone.

Part 7: General Remarks

The inventive concepts can be employed in a wide variety of processes and equipment. Some exemplary embodiments will now be described. It will be understood that these are intended to illustrate rather than to limit the scope of the invention, Those of ordinary skill in the art will realize that the detailed description of embodiments of the present invention is illustrative only and is not intended to be in any way limiting. Other embodiments of the present invention will readily suggest themselves to such skilled persons having the benefit of this disclosure. For example, while a minimum-error combination is employed in the examples, those of skill in the art will recognized that many combinations are possible and that a combination other than a minimum-error combination can produce acceptable if less than optimum results; thus the claims are not intended to be limited to minimum-error combinations other than where expressly called for.

Reference is made in detail to implementations of the present invention as illustrated in the accompanying drawings. The same reference indicators are used throughout the drawings and the following detailed description to refer to the same or like parts, In the interest of clarity, not all of the routine features of the implementations described herein are shown and described. It will be appreciated that in the development of any such actual implementation, numerous implementation-specific decisions roust be made to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with embodiments of the present invention, the components, process steps and/or data structures may be implemented using various types of operating systems (OS), computer platforms, firmware, computer programs, computer languages and/or general-purpose machines. The methods can be run as a programmed process running on processing circuitry. The processing circuitry can take the form of numerous combinations of processors and operating systems, or a stand-alone device. The processes can be implemented as instructions executed by such hardware, by hardware alone, or by any combination thereof. The software may be stored on a program storage device readable by a machine. Computational elements, such as filters and banks of filters, can be readily implemented using an object-oriented programming language such that each required filter is instantiated as needed.

Those of skill in the art will recognize that devices of a less general-purpose nature, such as hardwired devices, field programmable logic devices (FPLDs), including field programmable gate arrays (FPGAs) and complex programmable logic devices (CPLDs), application specific integrated circuits (ASICs), or the like, may also be used without departing from the scope and spirit of the inventive concepts disclosed herein.

In accordance with an embodiment of the present invention, the methods may be implemented on a data processing computer such as a personal computer, workstation computer, mainframe computer, or high-performance server running an OS such as Microsoft® Windows® XP and Windows® 2000, available from Microsoft Corporation of Redmond, Wash., or Solaris® available from Sun Microsystems, Inc. of Santa Clara, Calif., or various versions of the Unix operating system such as Linux available from a number of vendors. The methods may also be implemented on a multiple-processor system, or in a computing environment including various peripherals such as input devices, output devices, displays, pointing, devices, memories, storage devices, media interfaces for transferring data to and from the processor(s), and the like. Such a computer system or computing environment may be networked locally, or over the Internet.

Part 8: Summary of Inventive Concepts

In addition to the foregoing, embodiments in accordance with the invention may comprise, for example, one or more of the following:

Part 8.A: Regional Augmentation Network

Methods

1. A method of processing GNSS data derived from observations at multiple stations, located within a region, of GNSS signals of multiple satellites over multiple epochs, wherein the GNSS signals have at least two carrier frequencies and the observations include code observations and carrier-phase observations, comprising:
   a. obtaining at least one code bias per satellite;
   b. obtaining an ionospheric delay over the region;
   c. obtaining a tropospheric delay over the region;
   d. obtaining a phase-leveled geometric correction per satellite; and
   e. making available correction data for use by a rover located within the region, the correction data comprising: the ionospheric delay over the region, the tropospheric delay over the region, the phase-leveled geometric correction per satellite, and the at least one code bias per satellite.
2. The method of 1, wherein obtaining at least one code bias per satellite comprises obtaining, an estimated code bias per satellite from a global network processor.
3. The method of 1, wherein obtaining at least one code bias per satellite comprises operating a processor to estimate a code bias per satellite from GNSS Observations of reference stations of a regional network.
4. The method of 3, wherein operating a processor to estimate a code bias comprises operating a processor to fix a set of ambiguities and to estimate at least one code bias per satellite which is consistent with integer carrier-phase ambiguities.
5. The method of 4, wherein the code bias comprises a MW bias which is consistent with integer carrier ambiguities
6. The method of one of 4-5, wherein the set of ambiguities comprises at least one of: (i) widelane ambiguities and (ii) L1 and L2 ambiguities, (iii) L2E and L2C ambiguities, and (iv) a combination of carrier-phase ambiguities from which widelane ambiguities can be determined.
7. The method of one of 1-6, wherein obtaining an ionospheric delay over the region comprises operating a processor to determine the ionospheric delay over the region from a model.
8. The method of one of 1-6, wherein obtaining an ionospheric delay over the region comprises operating a processor to estimate from the observations an ionospheric delay per station per satellite.
9. The method of one of 1-6, wherein obtaining an ionospheric delay over the region comprises operating, a processor to estimate from the observations an ionospheric delay per station per satellite and an ionospheric phase bias per satellite.
10. The method of one of 1-9, wherein obtaining a tropospheric delay over the region comprises operating a processor to estimate from the observations a tropospheric delay per station.
11. The method of 10, wherein the tropospheric delay per station comprises a zenith total delay per station.
12. The method of one of 1-11, wherein obtaining a phase-leveled geometric correction per satellite comprises operating a processor to estimate a set of ambiguities for satellites observed by the stations.
13. The method of one of 1-12, wherein obtaining a phase-leveled geometric correction per satellite comprises operating a processor to estimate a geometric correction which preserves integer nature of carrier-phase ambiguities.
14. The method of one of 1-13, wherein the phase-leveled geometric correction includes an integer-cycle bias per satellite.

15. The method of one of 1-14, wherein the correction data comprises at least one of (i) an ionospheric delay per station per satellite, (ii) an ionospheric delay per station per satellite and an ionospheric phase bias per satellite, and (iii) a tropospheric delay per station.
16. The method of one of 1-15, wherein the phase-leveled geometric correction per satellite comprises a geometric correction term for each of three locations within the region from which a geometric correction at an arbitrary location within the region can be determined.

Computer Program Product

17. A computer program product comprising: a computer usable medium having computer readable instructions physically embodied therein, the computer readable instructions when executed by a processor enabling the processor to perform the method of one of 1-16.
18. A computer program comprising a set of instructions which when loaded in and executed by a processor enable the processor to perform the method of one of 1-16.

Apparatus

19. Apparatus for processing GNSS data derived from observations at multiple stations, located within a region, of GNSS signals of multiple satellites over multiple epochs, wherein the GNSS signals have at least two carrier frequencies and the observations include code observations and carrier-phase observations, comprising:
   a. at least one processor configured to obtain at least one code bias per satellite, an ionospheric delay over the region, a tropospheric delay over the region, and a phase-leveled geometric correction per satellite; and
   b. a communication channel to make available correction data for use by a rover located within the region, the correction data comprising: the ionospheric delay over the region, the tropospheric delay over the region, the phase-leveled geometric correction per satellite, and the at least one code bias per satellite.
20. The apparatus of 19, wherein the at least one processor obtains the at least one code bias per satellite from a global network processor.
21. The apparatus of 19, wherein the at least one processor is operative to estimate a code bias per satellite from GNSS observations of reference stations of a regional network.
22. The apparatus of 21, wherein the at least one processor is operative to fix a set of ambiguities and to estimate at least one code bias per satellite which is consistent with integer carrier-phase ambiguities.
23. The apparatus of 22, wherein the code bias comprises a MW bias which is consistent with integer carrier ambiguities
24. The apparatus of one of 22-23, wherein the set of ambiguities comprises at least one of: (i) widelane ambiguities and (ii) L1 and L2 ambiguities, (iii) L2E and L2C ambiguities, and (iv) a combination of carrier-phase ambiguities from which widelane ambiguities can be determined.
25. The apparatus of one of 19-24, wherein the at least one processor is operative to determine the ionospheric delay over the region from a model.
26. The apparatus of one of 19-25, wherein the at least one processor is operative to estimate from the observations an ionospheric delay per station per satellite.
27. The apparatus of one of 19-25, wherein the at least one processor is operative to estimate from the observations an ionospheric delay per station per satellite and an ionospheric phase bias per satellite.
28. The apparatus of one of 19-27, wherein the at least one processor is operative to estimate from the observations a tropospheric delay per station.
29. The apparatus of 28, wherein the tropospheric delay per station comprises a zenith total delay per station.
30. The apparatus of one of 19-29, wherein the at least one processor is operative to estimate a set of ambiguities for satellites observed by the stations.
31. The apparatus of one of 19-30, wherein the at least one processor is operative to estimate a geometric correction which preserves integer nature of carrier-phase ambiguities.
32. The apparatus of one of 19-31, wherein the phase-leveled geometric correction includes an integer-cycle bias per satellite,
33. The apparatus of one of 19-32, wherein the correction data comprises at least one of (i) an ionospheric delay per station per satellite, and (ii) a tropospheric delay per station.
34. The apparatus of one of 19-33, wherein the phase-leveled geometric correction per satellite comprises a geometric correction term for each of three locations within the region from which a geometric correction at an arbitrary location within the region can be determined.

Part 8.B: Rover Positioning with Regional Augmentation

Methods

1. A method of determining a precise position of a rover located within a region, comprising:
   a. operating a receiver to obtain rover observations comprising code observations and carrier-phase observations of GNSS signals on at least two carrier frequencies,
   b. receiving correction data comprising
      at least one code bias per satellite,
      at least one of: (i) a fixed-nature MW bias per satellite and (ii) values from which a fixed-nature MW bias per satellite is derivable, and
      at least one of: (iii) an ionospheric delay per satellite for each of multiple regional network stations, and (iv) non-ionospheric corrections;
   c. creating rover corrections from the correction data;
   d. operating a processor to determine a precise rover position using the rover observations and the rover corrections.
2. The method of one of 1, wherein the code bias per satellite comprises a code bias per satellite estimated by a global network processor.
3. The method of one of 1-2, wherein the ionospheric delay per satellite comprises an ionospheric delay estimated from observations of multiple regional network stations.
4. The method of one of 1-2, wherein the ionospheric delay per satellite is estimated from a model of ionospheric delay over the region.
5. The method of 1, wherein the correction data further comprises an ionospheric phase bias per satellite.

6. The method of one of 1-5, wherein the non-ionospheric corrections comprise a tropospheric delay for each of multiple regional network stations.
7. The method of one of 1-6, wherein the non-ionospheric corrections comprise a geometric correction per satellite.
8. The method of one of 1-7, wherein the non-ionospheric corrections comprise, for each satellite in view at the receiver, a geometric correction representing satellite position error and satellite clock error.
9. The method of 8, wherein creating rover corrections from the data set comprises identifying each geometric correction with a respective satellite observed at the rover.
10. The method of one of 8-9, wherein using the rover observations and the rover corrections to determine a precise rover position comprises: determining a geometric range per satellite using at least one of (i) broadcast ephemeris and (ii) precise ephemeris and, for each satellite, applying the geometric correction to the geometric range to obtain a corrected geometric range per satellite.
11. The method of one of 1-10, wherein the non-ionospheric corrections comprise, for each satellite in view at the rover, a geometric correction for each of three locations in the regions, and wherein creating rover corrections from the correction data comprises, for each satellite in view at the rover, determining a geometric correction for an approximate rover location from the geometric corrections for the three locations.
12. The method of one of 1-11, wherein the correction data comprises an ionospheric delay per satellite at multiple regional network stations, and wherein creating rover corrections from the data set comprises interpolating an ionospheric delay for the rough position.
13. The method of one of 1-11, wherein the correction data comprises an ionospheric delay per satellite at multiple regional network stations and an ionospheric phase bias per satellite, and wherein creating rover corrections from the data set comprises, for each satellite, interpolating an absolute ionospheric delay for the rough position and combining with the ionospheric phase bias.
14. The method of one of 1-13, wherein the data set comprises a tropospheric delay per satellite at multiple regional network stations, and wherein creating rover corrections from the data set comprises interpolating a tropospheric delay for the rough position.
15. The method of one of 1-14 wherein using the rover observations and the rover corrections to determine a precise rover position comprises: combining the rover corrections with the rover observations to obtain corrected rover observations, and determining the precise rover position from the corrected rover observations.
16. The method of one of 1-14, wherein using the rover observations and the rover corrections to determine a precise rover position comprises:
   a. using the rover corrections to estimate simulated reference station observables for each of multiple satellites in view at a selected location;
   b. differentially processing the rover observations with the simulated reference station observables to obtain the precise rover position.
17. The method of 16, wherein using the rover corrections to estimate simulated reference station observables for each of multiple satellites in view at a selected location comprises using the rover corrections to estimate at least one simulated reference station carrier-phase observation for each of multiple satellites Observable at a selected location.
18. The method of one of 16-17, wherein using the rover corrections to estimate simulated reference station observables for each of multiple satellites in view at a selected location comprises using the rover corrections to estimate at least one simulated reference station code observation for each of multiple satellites observable at the selected location.
19. The method of one of 16-18, wherein the selected location is one of (i) the rough position of the rover and (ii) a location within 100 m of the rough position of the rover.
20. The method of one of 16-19, wherein using the rover corrections to estimate simulated reference station observables for each of multiple satellites in view at a selected location is performed in a processor at a location remote from the rover.
21 The method of one of 16-19, wherein using the rover corrections to estimate simulated reference station observables for each of multiple satellites in view at a selected location is performed in a processor at the rover.

Computer Program Product

22. A computer program product comprising: a computer usable medium having computer readable instructions physically embodied therein, the computer readable instructions when executed by a processor enabling the processor to perform the method of one of 1-21.
23. A computer program comprising a set of instructions which when loaded in and executed by a processor enable the processor to perform the method of one of 1-21.

Apparatus

24. Apparatus for determining a precise position of a rover located within a region, comprising:
   a. a receiver operative to obtain rover observations comprising code observations and carrier-phase observations of GNSS signals on at least two carrier frequencies,
   b. a correction data receiver operative to receive correction data comprising at least one code bias per satellite,
   at least one of: (i) a fixed-nature MW bias per satellite and (ii) values from which a fixed-nature MW bias per satellite is derivable, and
   at least one of: (iii) an ionospheric delay per satellite for each of multiple regional network stations, and (iv) non-ionospheric corrections; and
   c. at least one processor operative to create rover corrections from the correction data and operative to determine a precise rover position using the rover observations and the rover corrections.
25. The apparatus of 24, wherein the code bias per satellite comprises a code bias per satellite estimated by a global network processor.
26. The apparatus of one of 24-25, wherein the ionospheric delay per satellite comprises an ionospheric delay estimated from observations of multiple regional network stations.
27. The apparatus of one of 24-25, wherein the ionospheric delay per satellite is estimated from a model of ionospheric delay over the region.

28. The apparatus of 24, wherein the correction data further comprises an ionospheric phase bias per satellite.

29. The apparatus of one of 24-28, wherein the non-ionospheric corrections comprise a tropospheric delay for each of multiple regional network stations.

30. The apparatus of one of 24-29, wherein the non-ionospheric corrections comprise a geometric correction per satellite.

31. The apparatus of one of 24-30, wherein the non-ionospheric corrections comprise, for each satellite in view at the receiver, a geometric correction representing satellite position error and satellite clock error.

32. The apparatus of 31, wherein said at least one processor is operative to identify each geometric correction with a respective satellite observed at the rover.

33. The apparatus of one of 31-32, wherein said at least one processor is operative to determine a geometric range per satellite using at least one of (i) broadcast ephemeris and (ii) precise ephemeris and, for each satellite, and to apply the geometric correction to the geometric range to obtain a corrected geometric range per satellite.

34. The apparatus of one of 24-33, wherein the non-ionospheric corrections comprise, for each satellite in view at the rover, a geometric correction for each of three locations in the regions, and wherein the at least one processor is operative to determine, for each satellite in view at the rover, a geometric correction for an approximate rover location from the geometric corrections for the three locations.

35. The apparatus of one of 24-33, wherein the correction data comprises an ionospheric delay per satellite at multiple regional network stations, and wherein the at least one processor is operative to interpolate an ionospheric delay for the rough position.

36. The apparatus of one of 24-35, wherein the correction data comprises an ionospheric delay per satellite at multiple regional network stations and an ionospheric phase bias per satellite, and wherein the at least one processor is operative to, for each satellite, interpolate an absolute ionospheric delay for the rough position and combine with the ionospheric phase bias.

37. The apparatus of one of 24-36, wherein the data set comprises a tropospheric delay per satellite at multiple regional network stations, and wherein the at least one processor is operative to interpolate a tropospheric delay for the rough position.

38. The apparatus of one of 24-37, wherein the at least one processor is operative to combine the rover corrections with the rover observations to obtain corrected rover observations, and to determine the precise rover position from the corrected rover observations.

39. The apparatus of one of 24-38, wherein the at least one processor is operative to use the rover corrections to estimate simulated reference station observables for each of multiple satellites in view at a selected location, and to differentially process the rover observations with the simulated reference station observables to obtain the precise rover position.

40. The apparatus of 39, wherein the at least one processor is operative to use the rover corrections to estimate at least one simulated reference station carrier-phase observation for each of multiple satellites observable at a selected location.

41. The apparatus of one of 39-40, wherein the at least one processor is operative to use the rover corrections to estimate at least one simulated reference station code observation for each of multiple satellites observable at the selected location, 42. The apparatus of one of 39-41, wherein the selected location is one of (i) the rough position of the rover and (ii) a location within 100 m of the rough position of the rover.

43. The apparatus of one of 39-42, wherein the at least one processor is remote from the rover.

44. The apparatus of one of 39-42, wherein the at least one processor is at the rover.

Part 8.C: Regional Correction Data

Data Stream

1. A correction data stream for use in determining a precise position of a rover located within a region from rover observations comprising code observations and carrier-phase observations of GNSS signals on at least two carrier frequencies, the correction data stream comprising at least one code bias per satellite, ionospheric delay over the region, tropospheric delay over the region, and a phase-leveled geometric correction per satellite.

2. The correction data stream of 1, wherein the correction data stream is produced by processing GNSS data derived from observations at multiple stations, located within a region, of GNSS signals of multiple satellites over multiple epochs, wherein the GNSS signals have at least two carrier frequencies and the observations include code observations and carrier-phase observations.

3. The correction data stream of one of 1-2, wherein the correction data stream is produced by obtaining at least one code bias per satellite, obtaining an ionospheric delay over the region, obtaining a tropospheric delay over the region, and obtaining a phase-leveled geometric correction per satellite.

4. The correction data stream of one of 1-3, wherein the at least one code bias per satellite is consistent with integer carrier-phase ambiguities.

5. The correction data stream of one of 1-4, wherein the code bias comprises a MW bias which is consistent with integer carrier ambiguities 6. The correction data stream of one of 4-5, wherein ambiguities comprise at least one of: (i) widelane ambiguities and (ii) L1 and L2 ambiguities, (iii) L2E and L2C ambiguities, and (iv) a combination of carrier-phase ambiguities from which widelane ambiguities can be determined.

7. The correction data stream of one of 1-6, wherein the ionospheric delay over the region is estimated from observations of an ionospheric delay per station per satellite.

8. The correction data stream of one of 1-6, wherein the ionospheric delay over the region is obtained from a model, 9. The correction data stream of one of 1-8, further comprising an ionospheric phase bias per satellite.

10. The correction data stream of one of 1-9, wherein the tropospheric delay over the region is estimated from the observations of a tropospheric delay per station.

11. The correction data stream of 10, wherein the tropospheric delay per station comprises a zenith total delay per station.

12. The correction data stream of one of 1-11, wherein the phase-leveled geometric correction per satellite is estimated so as to preserve integer nature of carrier-phase ambiguities.

13. The correction data stream of one of 1-12, wherein the phase-leveled geometric correction includes an integer-cycle bias per satellite.
14. The correction data stream of one of 1-13, comprising at least one of (i) an ionospheric delay per station per satellite, and (ii) a tropospheric delay per station.
15. The correction data stream of one of 1-14, wherein the phase-leveled geometric correction per satellite comprises a geometric correction term for each of three locations within the region from which a geometric correction at an arbitrary location within the region can be determined.

Part 8.D: Regional Correction Data Format

Encoding—Methods

1. A method of preparing a GNSS correction message, comprising:
   a. receiving correction data derived from observations at multiple stations, located within a region, of GLASS signals of multiple satellites over multiple epochs,
   b. separating the regional correction data into network elements relating to substantially all of the stations and cluster elements relating to subsets of the stations,
   c. constructing a correction message comprising at least one network message containing network elements and at least one cluster message containing cluster elements.
2. The method of 1, wherein the correction message comprises a plurality of correction-message epochs, each correction-message epoch comprising a network message and at least one cluster message.
3. The method of one of 1-2, wherein the correction message of a first correction-message epoch comprises cluster messages of a first group of clusters, and the correction message of a second correction message epoch comprises cluster messages of a second group of clusters.
4. The method of one of 1-3, wherein at least one cluster message for each subset of the stations is included in a series of correction-message epochs.
5. The method of one of 1-4, wherein the network elements comprise at least one of a geometric correction per satellite and a code bias per satellite.
6. The method of 5, wherein the network elements comprise at least one of a time tag, a location of a point in the network, and a number of following cluster messages.
7. The method of one of 1-6, wherein the cluster elements comprise at least one of a tropospheric scaling per station, an ionospheric correction per station per satellite, and a location per station.
8. The method of one of 1-7, wherein the correction data comprises at least one code bias per satellite, at least one of a fixed-nature MW bias per satellite and values from which a fixed-nature MW bias per satellite is derivable, and at least one of: an ionospheric delay per satellite for each of multiple regional network stations, and non-ionospheric corrections.
9. The method of one of 1-8, wherein the correction data comprises an ionospheric delay per satellite for each of multiple regional network stations and an ionospheric phase bias per satellite.
10. The method of one of 1-8, wherein the network elements comprise an ionospheric phase bias per satellite and the duster elements comprise an ionospheric delay per satellite for each of multiple regional network stations.

Encoding—Computer Program Product

11. A computer program product comprising: a computer usable medium having computer readable instructions physically embodied therein, the computer readable instructions when executed by a processor enabling the processor to perform the method of one of 1-10.
12. A computer program comprising a set of instructions which when loaded in and executed by a processor enable the processor to perform the method of one of 1-10.

Encoding—Apparatus

13. Apparatus comprising a processor with instructions enabling the processor to prepare a GNSS correction message for correction derived from observations at multiple stations, located within a region, of GNSS signals of multiple satellites over multiple epochs by separating the regional correction data into network elements relating to substantially all of the stations and cluster elements relating to subsets of the stations, and constructing a correction message comprising at least one network message containing network elements and at least one cluster message containing cluster elements.
14. The apparatus of 13, wherein the correction message comprises a plurality of correction-message epochs, each correction-message epoch comprising a network message and at least one cluster message.
15. The apparatus of one of 1-14, wherein the correction message of a first correction-message epoch comprises cluster messages of a first group of clusters, and the correction message of a second correction message epoch comprises cluster messages of a second group of clusters.
16. The apparatus of one of 13-15, wherein at least one cluster message for each subset of the stations is included M a series of correction-message epochs.
17. The apparatus of one of 13-16, wherein the network elements comprise at least one of a geometric correction per satellite and a code bias per satellite.
18. The apparatus of 17, wherein the network elements comprise at least one of a time tag, a location of a point in the network, and a number of following cluster messages.
19. The apparatus of one of 13-18, wherein the cluster elements comprise at least one of a tropospheric scaling per station, an ionospheric correction per station per satellite, and a location per station.
20. The apparatus of one of 13-19, wherein the correction data comprises at least one code bias per satellite, at least one of a fixed-nature MW bias per satellite and values from which a fixed-nature MW bias per satellite is derivable, and at least one of: an ionospheric delay per satellite for each of multiple regional network stations, and non-ionospheric corrections.
21. The apparatus of one of 13-20, wherein the correction data comprises an ionospheric delay per satellite for each of multiple regional network stations and an ionospheric phase bias per satellite.
22. The apparatus of one of 13-20, wherein the network elements comprise an ionospheric phase bias per satellite and the cluster elements comprise an ionospheric delay per satellite for each of multiple regional network stations, Decoding—Methods 1A method of preparing regional GNSS corrections from a correction message having at least one network message containing network elements relating to substantially all stations of a network of stations located within a region, and having at least one duster message with each cluster message containing duster elements relating to a respective subset of the stations, comprising: extracting network elements from the at least one network message, extracting cluster elements from the at least one duster message, and preparing from the network elements and the cluster elements correction data suitable for use with rover observations to determine a precise position of a rover within the region.

2. The method of 1, wherein the correction message comprises a plurality of correction-message epochs, each correction-message epoch comprising a network message and at least one cluster message.

3. The method of one of 1-2, wherein the correction message of a first correction-message epoch comprises cluster messages of a first group of clusters, and the correction message of a second correction message epoch comprises cluster messages of a second group of clusters.

4. The method of one of 1-3, wherein at least one cluster message for each subset of the stations is included in a series of correction-message epochs.

5. The method of one of 1-4, wherein the network elements comprise at least one of a geometric correction per satellite and a code bias per satellite.

6. The method of 5, wherein the network elements comprise at least one of a time, tag, a location of a point in the network, and a number of following cluster messages.

7. The method of one of 1-6, wherein the cluster elements comprise at least one of a tropospheric scaling per station, an ionospheric correction per station per satellite, and a location per station.

8. The method of one of 1-7, wherein the correction data comprises at least one code bias per satellite, at least one of a fixed-nature MW bias per satellite and values from which a fixed-nature. MW bias per satellite is derivable, and at least one of: an ionospheric delay per satellite for each of multiple regional network stations, and non-ionospheric corrections.

9. The method of one of 1-8, wherein the correction data comprises an ionospheric delay per satellite for each of multiple regional network stations and an ionospheric phase bias per satellite.

10. The method of one of 1-8, wherein the network elements comprise an ionospheric phase bias per satellite and the cluster elements comprise an ionospheric delay per satellite for each of multiple regional network stations.

Decoding—Computer Program Product

11. A computer program product comprising: a computer usable medium having computer readable instructions physically embodied therein, the computer readable instructions when executed by a processor enabling the processor to perform the method of one of 1-10.

12. A computer program comprising a set of instructions which when loaded in and executed by a processor enable the processor to perform the method of one of 1-10.

Decoding—Apparatus

13. Apparatus comprising a processor with instructions enabling the processor to prepare regional GNSS corrections from a correction message having at least one network message containing network elements relating, to substantially all stations of a network of stations located within a region, and having at least one cluster message with each cluster message containing cluster elements relating to a respective subset of the stations, by extracting network elements from the at least one network message, extracting duster elements from the at least one cluster message, and preparing from the network elements and the cluster elements correction data suitable for use with rover observations to determine a precise position of a rover within the region.

14. The apparatus of 13, wherein the correction message comprises a plurality of correction-message epochs, each correction-message epoch comprising a network message and at least one cluster message.

15. The apparatus of one of 13-14, wherein the correction message of a first correction-message epoch comprises cluster messages of a first group of clusters, and the correction message of a second correction message epoch comprises cluster messages of a second group of clusters.

16. The apparatus of one of 13-15, wherein at least one cluster message for each subset of the stations is included in a series of correction-message epochs.

17. The apparatus of one of 13-16, wherein the network elements comprise at least one of a geometric correction per satellite and a code bias per satellite.

18. The apparatus of 17, wherein the network elements comprise at least one of a time tag, a location of a point in the network, and a number of following cluster messages.

19. The apparatus of one of 13-18, wherein the cluster elements comprise at least one of a tropospheric scaling per station, an ionospheric correction per station per satellite, and a location per station.

20. The apparatus of one of 13-19, wherein the correction data comprises at least one code bias per satellite, at least one of a fixed-nature MW bias per satellite and values from which a fixed-nature MW bias per satellite is derivable, and at least one of: an ionospheric delay per satellite for each of multiple regional network stations, and non ionospheric corrections.

21. The apparatus of one of 13-20, wherein the correction data comprises an ionospheric delay per satellite for each of multiple regional network stations and an ionospheric phase bias per satellite, 22. The apparatus of one of 13-20, wherein the network elements comprise an ionospheric phase bias per satellite and the cluster elements comprise an ionospheric delay per satellite for each of multiple regional network stations.

Appendix A
PROVISIONAL APPLICATION FOR UNITED STATES PATENT

GNSS SIGNAL PROCESSING WITH PRECISE SATELLITE DATA

CROSS-REFERENCE TO RELATED APPLICATIONS

BACKGROUND

BRIEF SUMMARY

Section A: Melbourne-Wübbena Bias Processing

[(FIG. 11)]

Section B: Orbit Processing

[(FIG. 26B)]

Section C: Phase-Leveled Clock Processing

[(FIG. 29)]

Section D: Rover Processing with Synthesized Base Station Data

[(FIG. 38)]

Section E: Rover Processing with Ambiguity Fixing

[(FIG. 48)]

Appendix A

PROVISIONAL APPLICATION FOR UNITED STATES PATENT

Appendix A
PROVISIONAL APPLICATION FOR UNITED STATES PATENT

Figure 18:
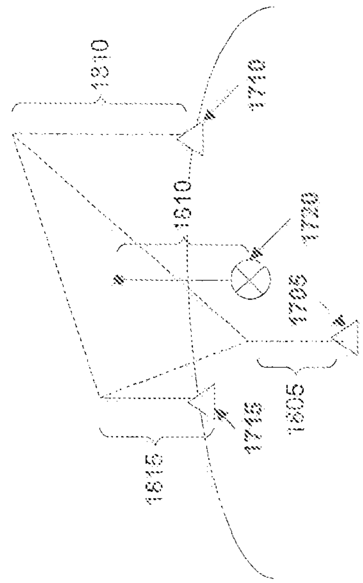
Figure 20:
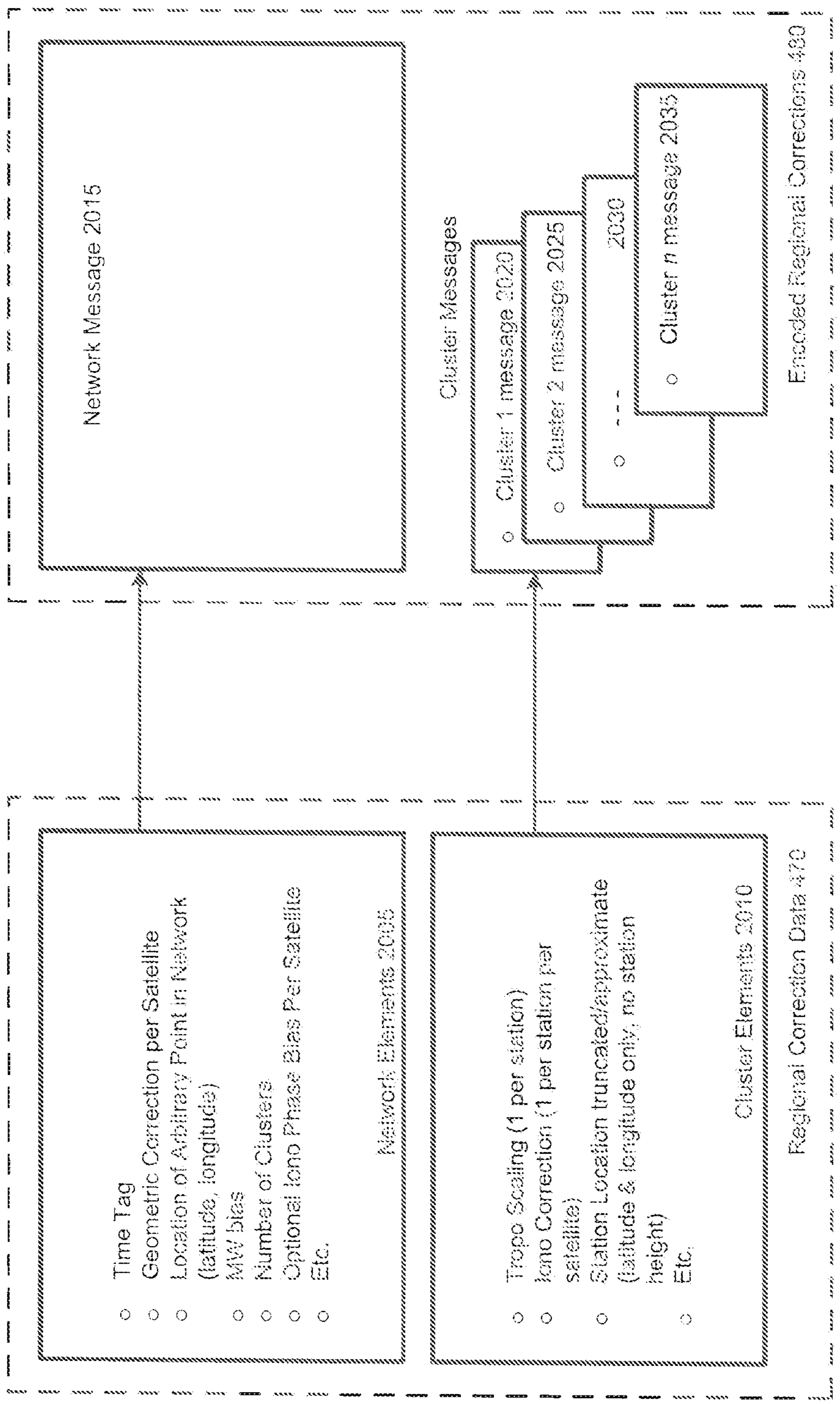
Figure 21:
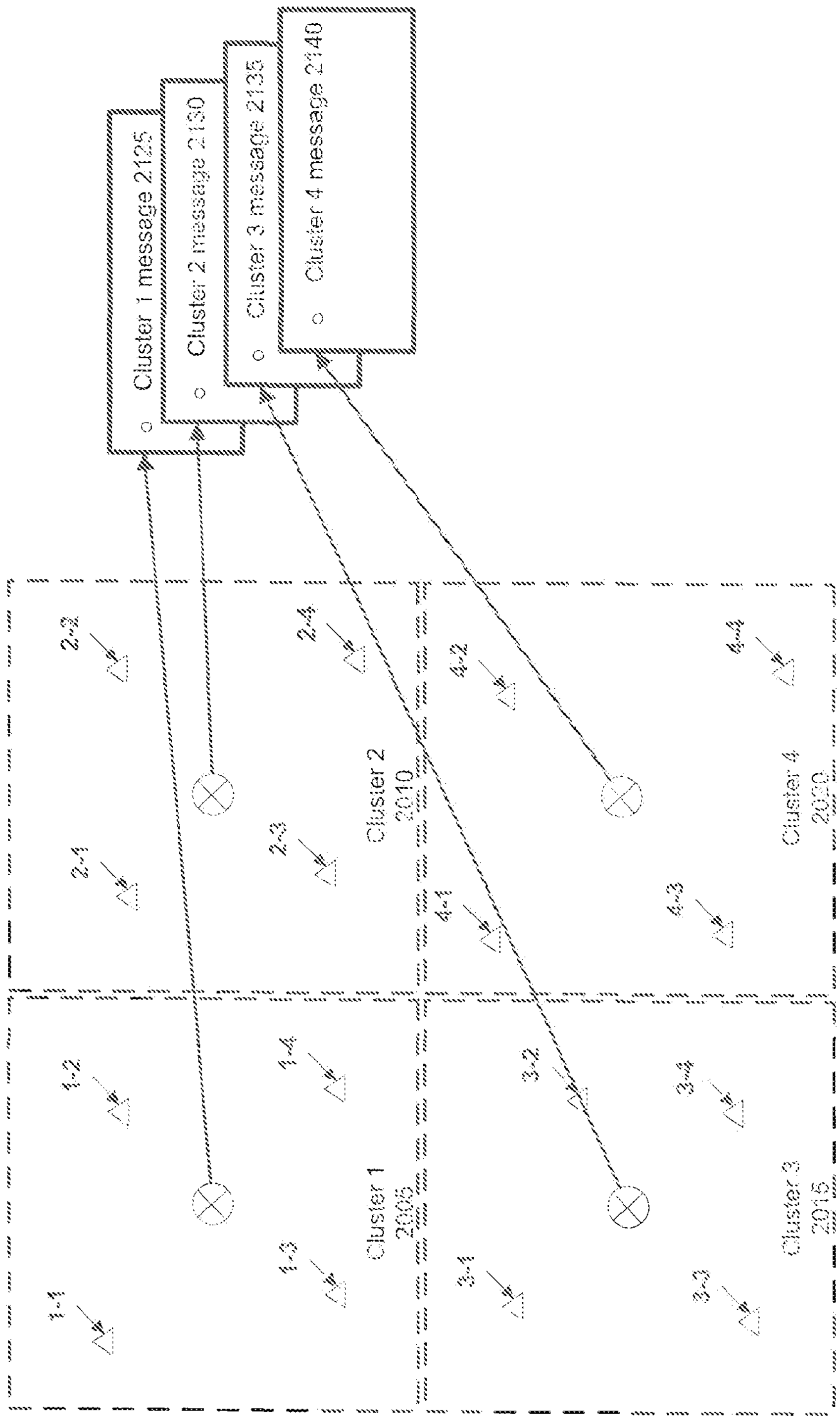
Figure 22:
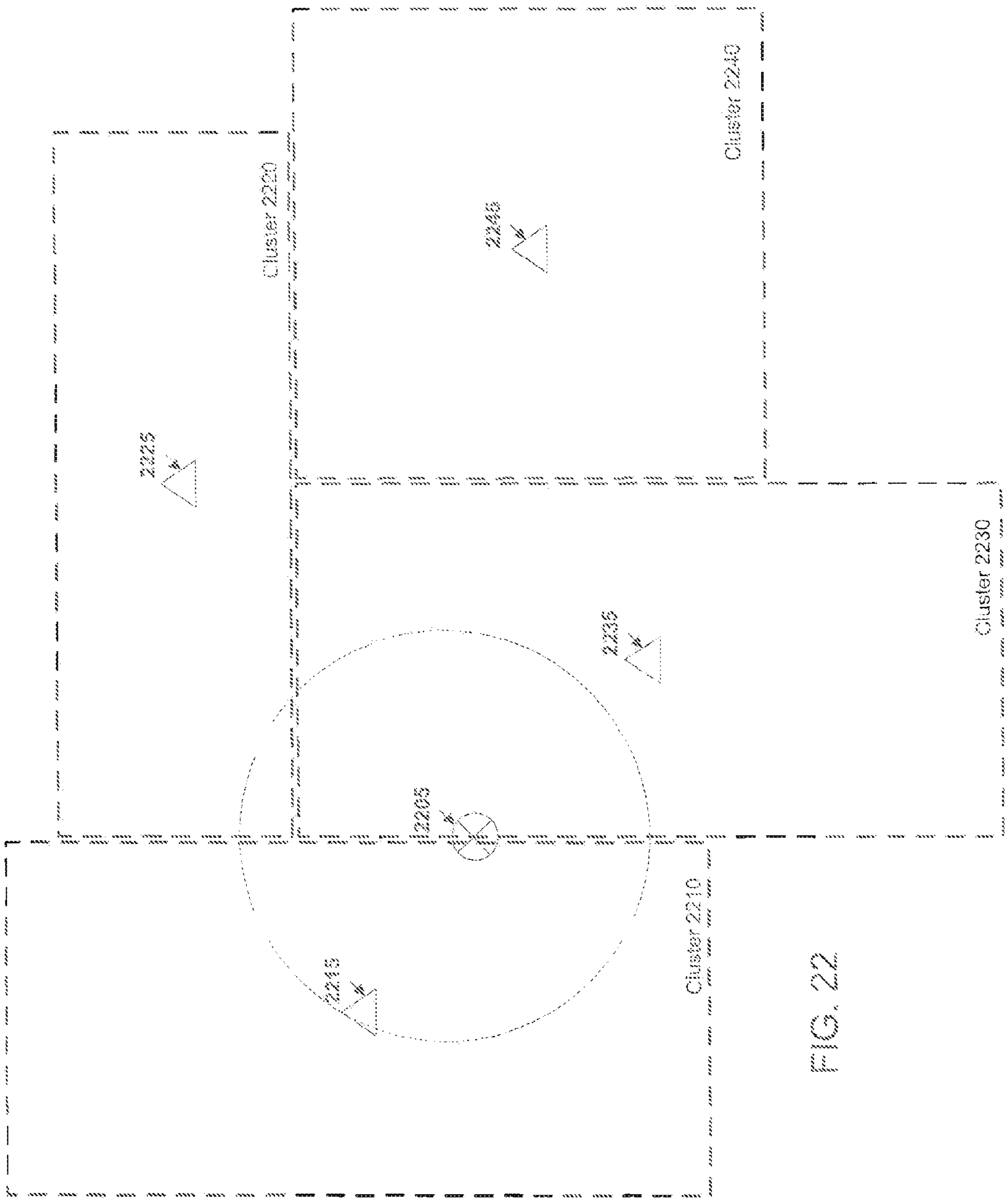
Figure 23:
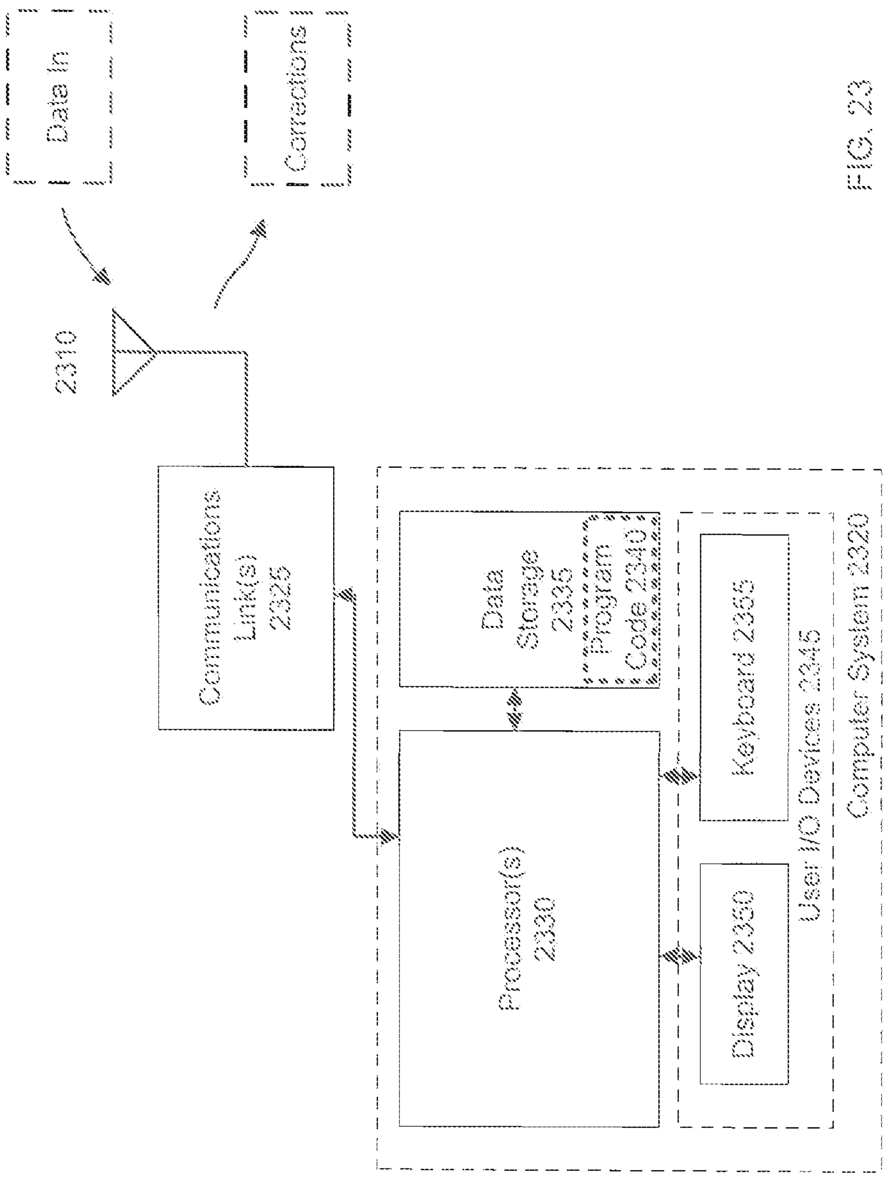
Figure 24:
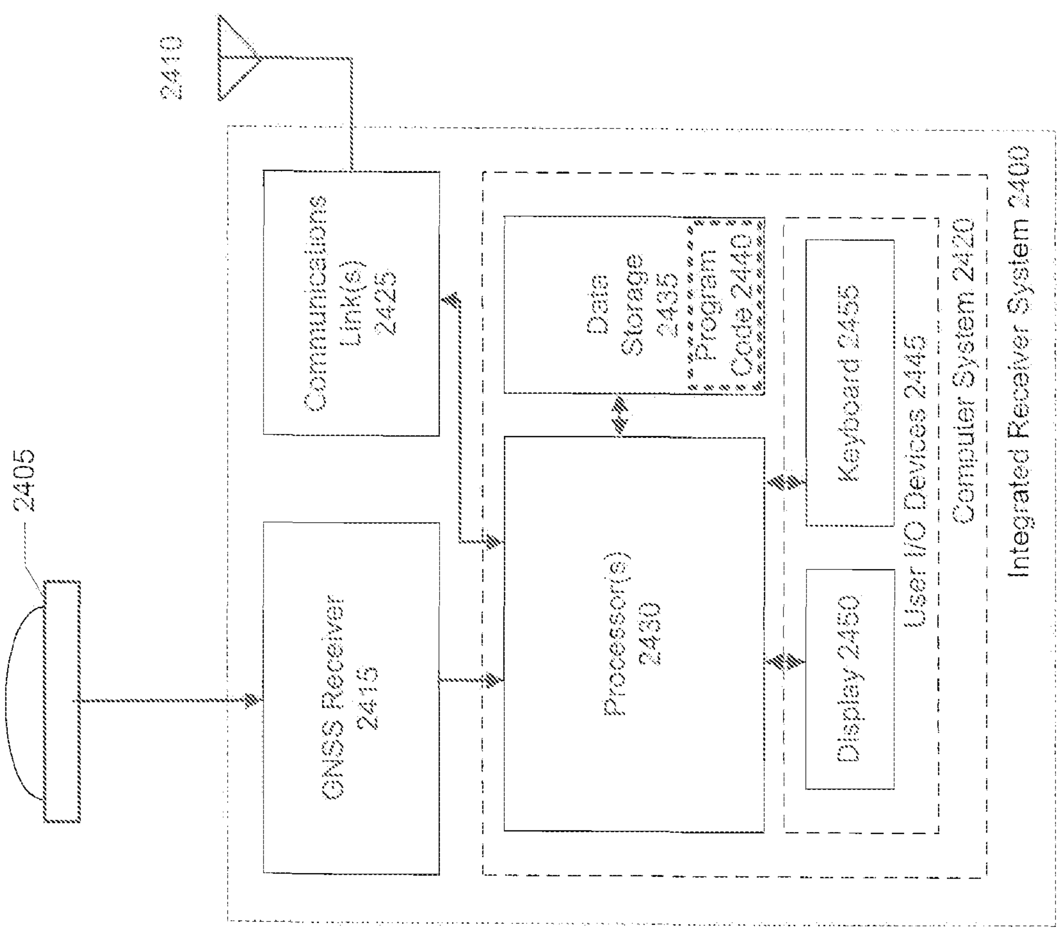
Figure 1:
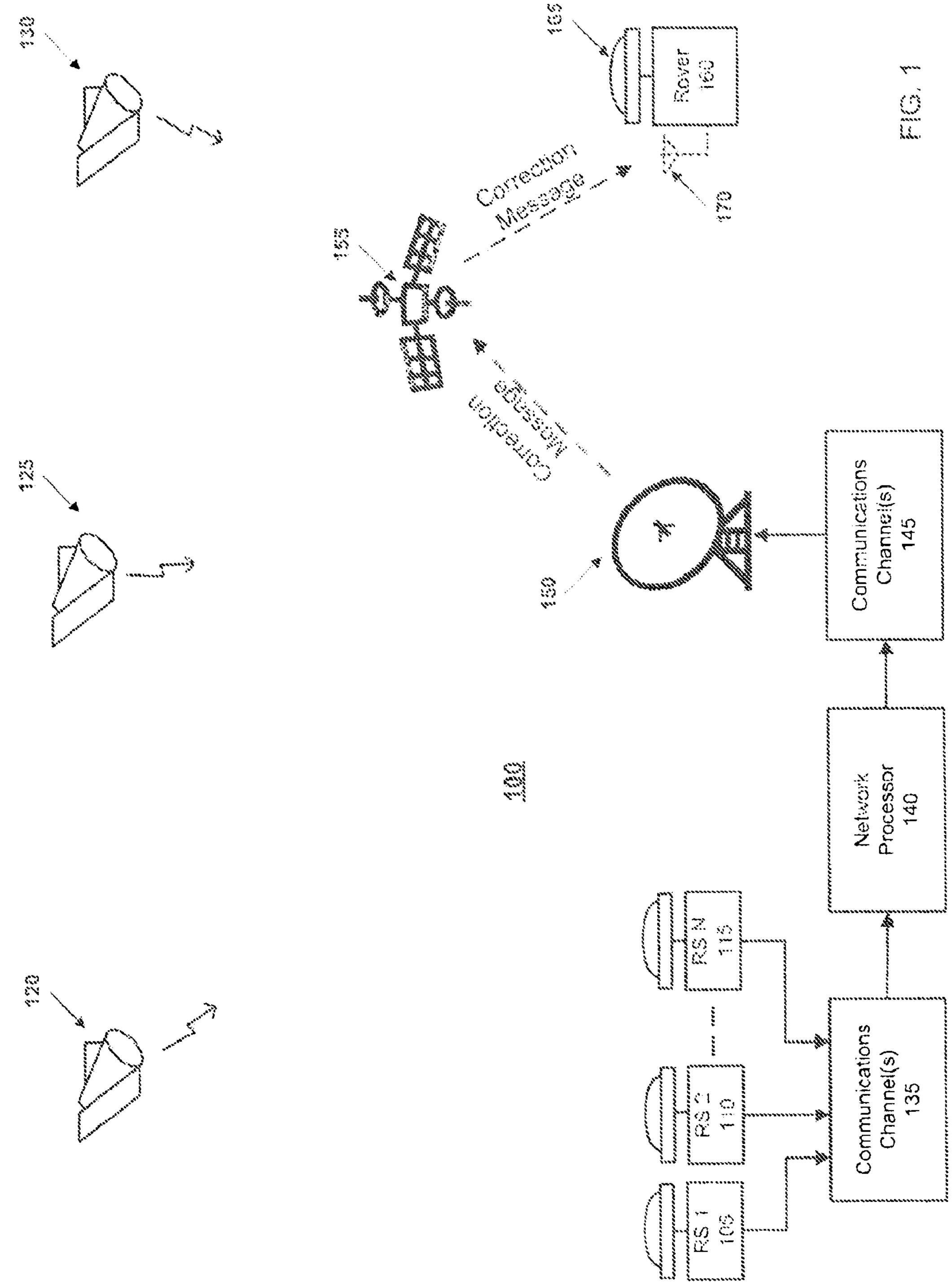
Figure 2:
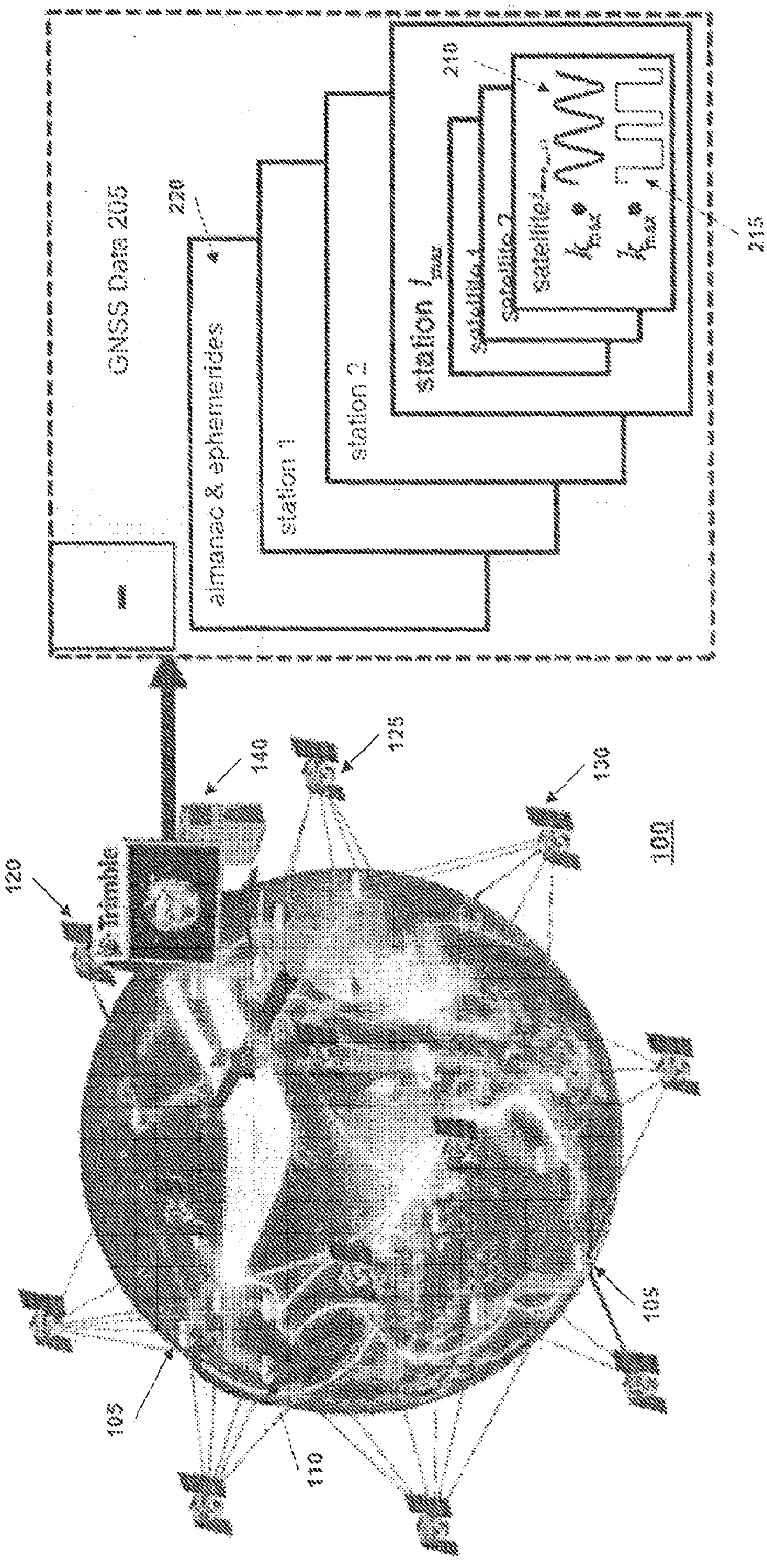
Figure 3:
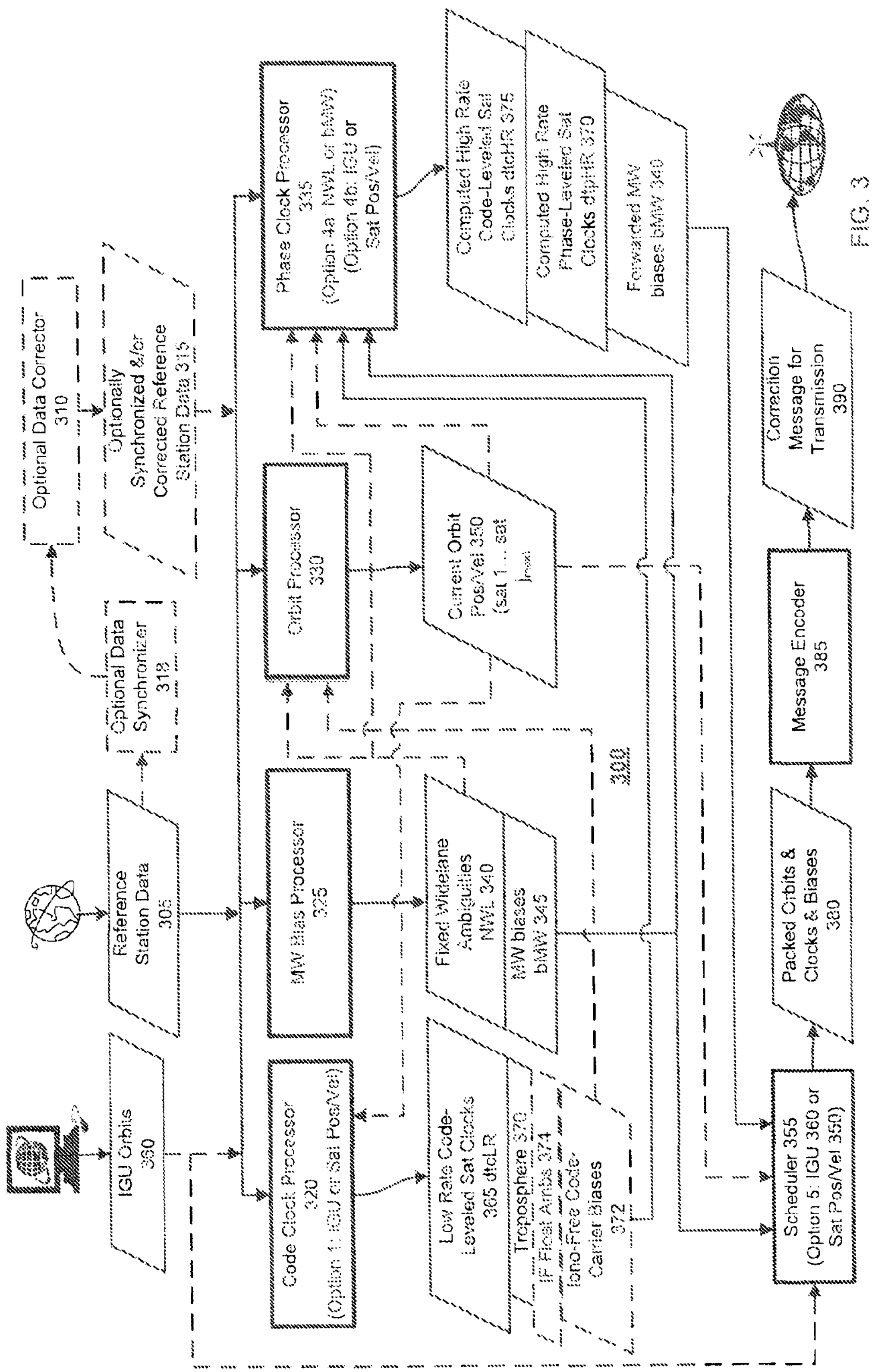
Figure 4:
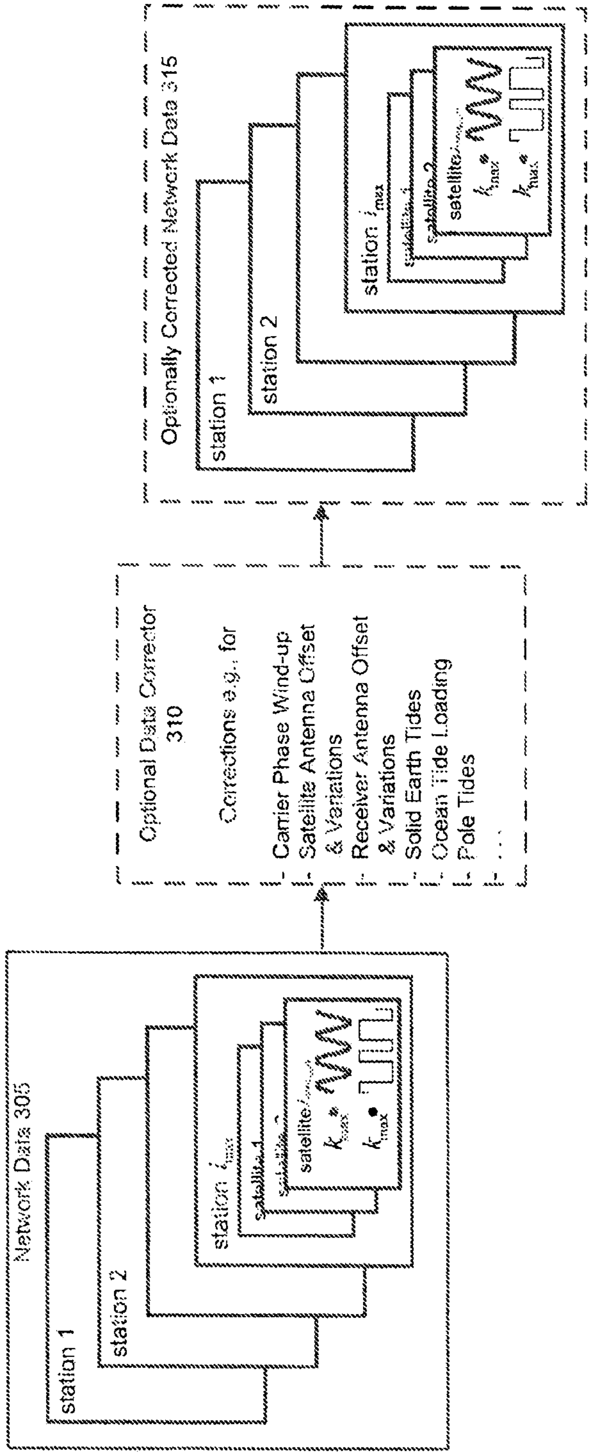
Figure 5:
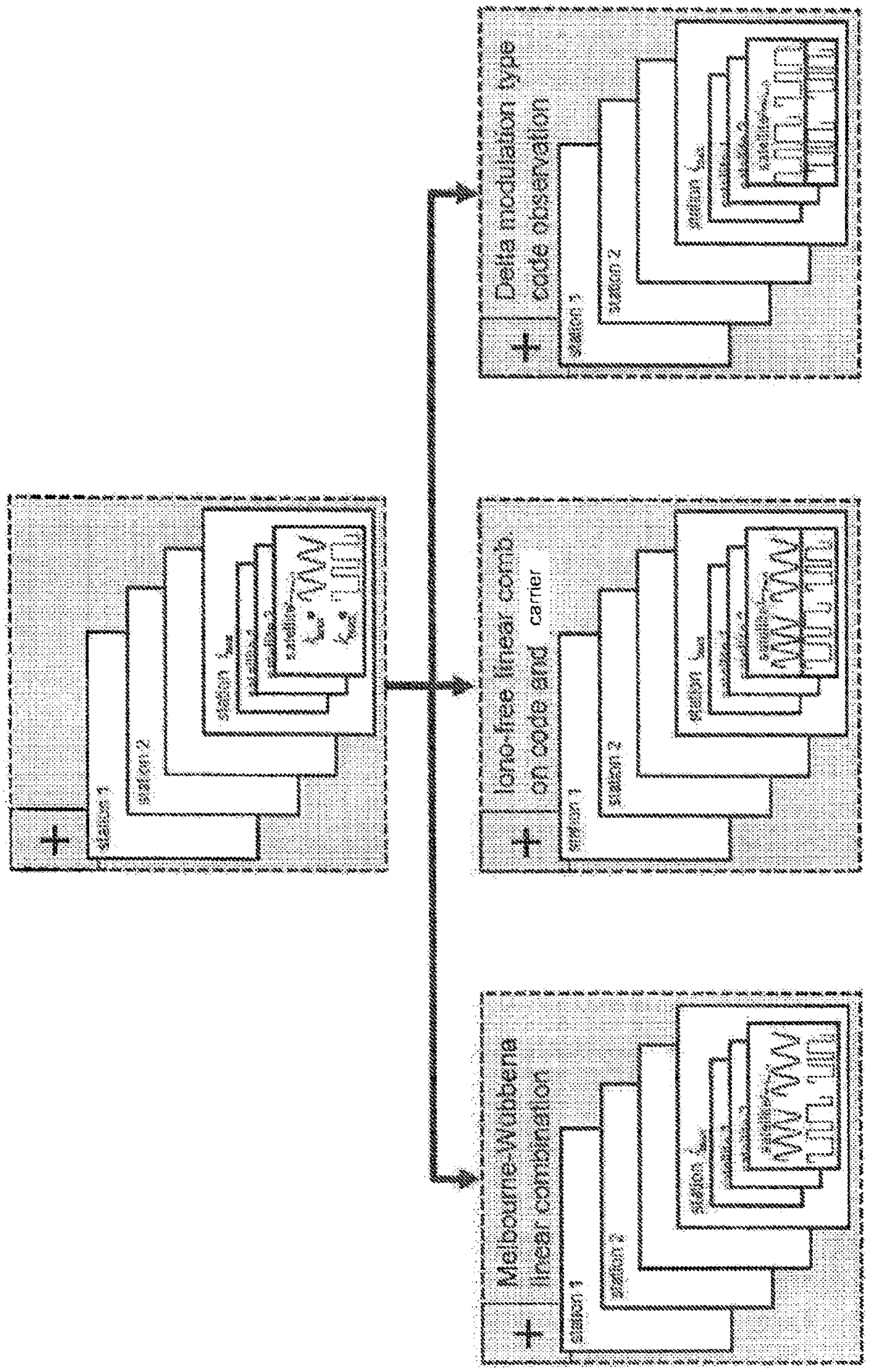
Figure 6:
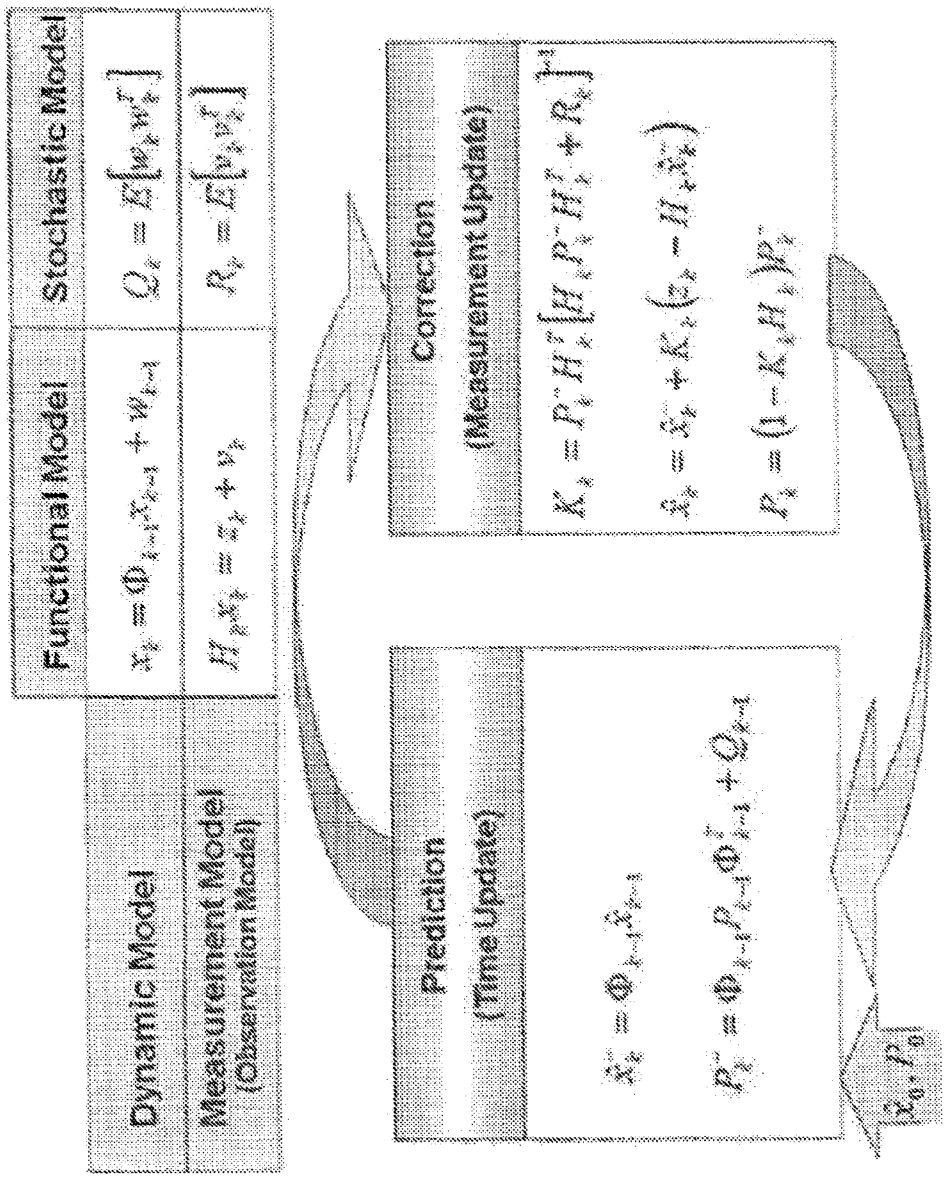
Figure 7:
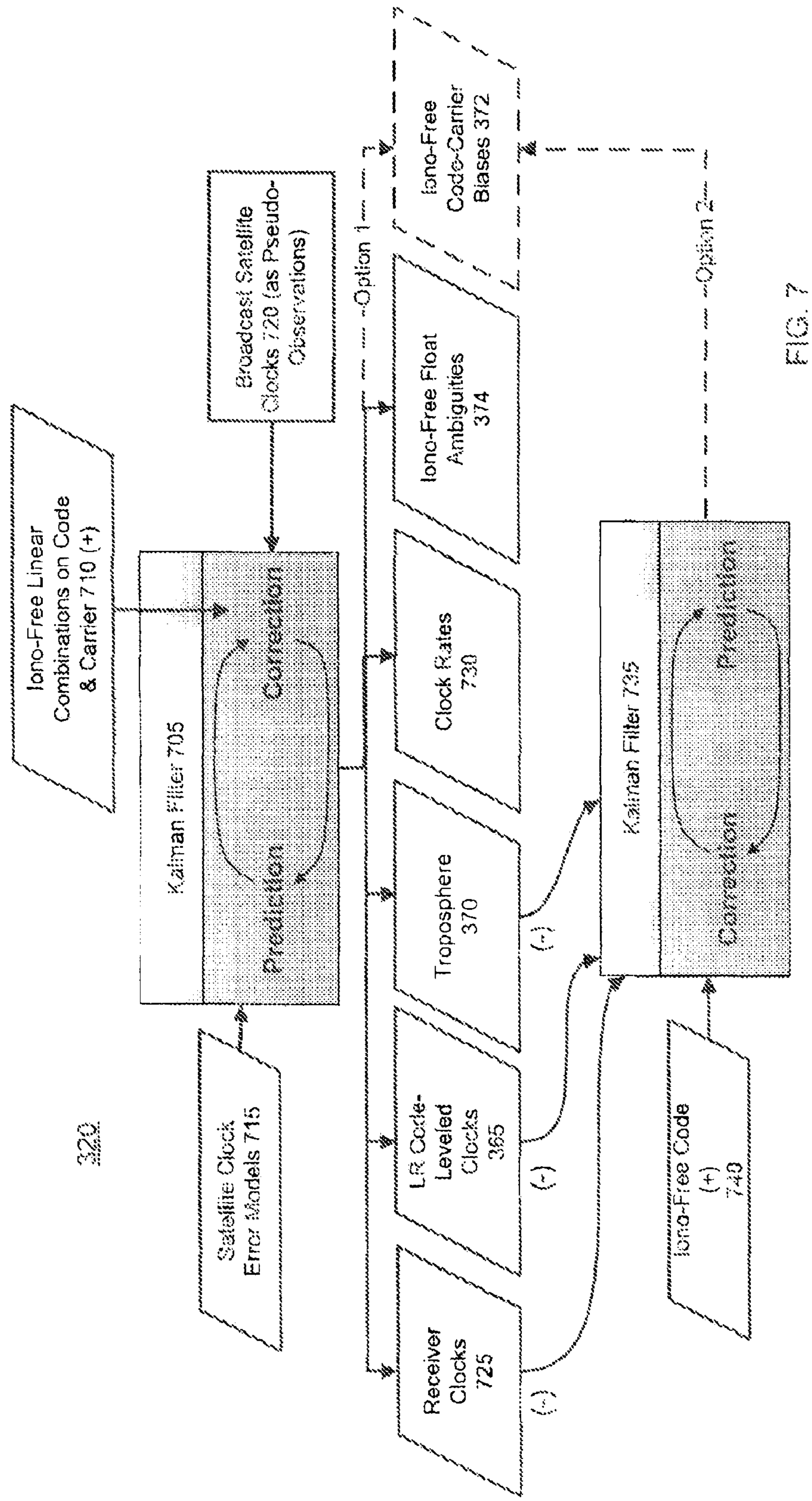
Figure 11:
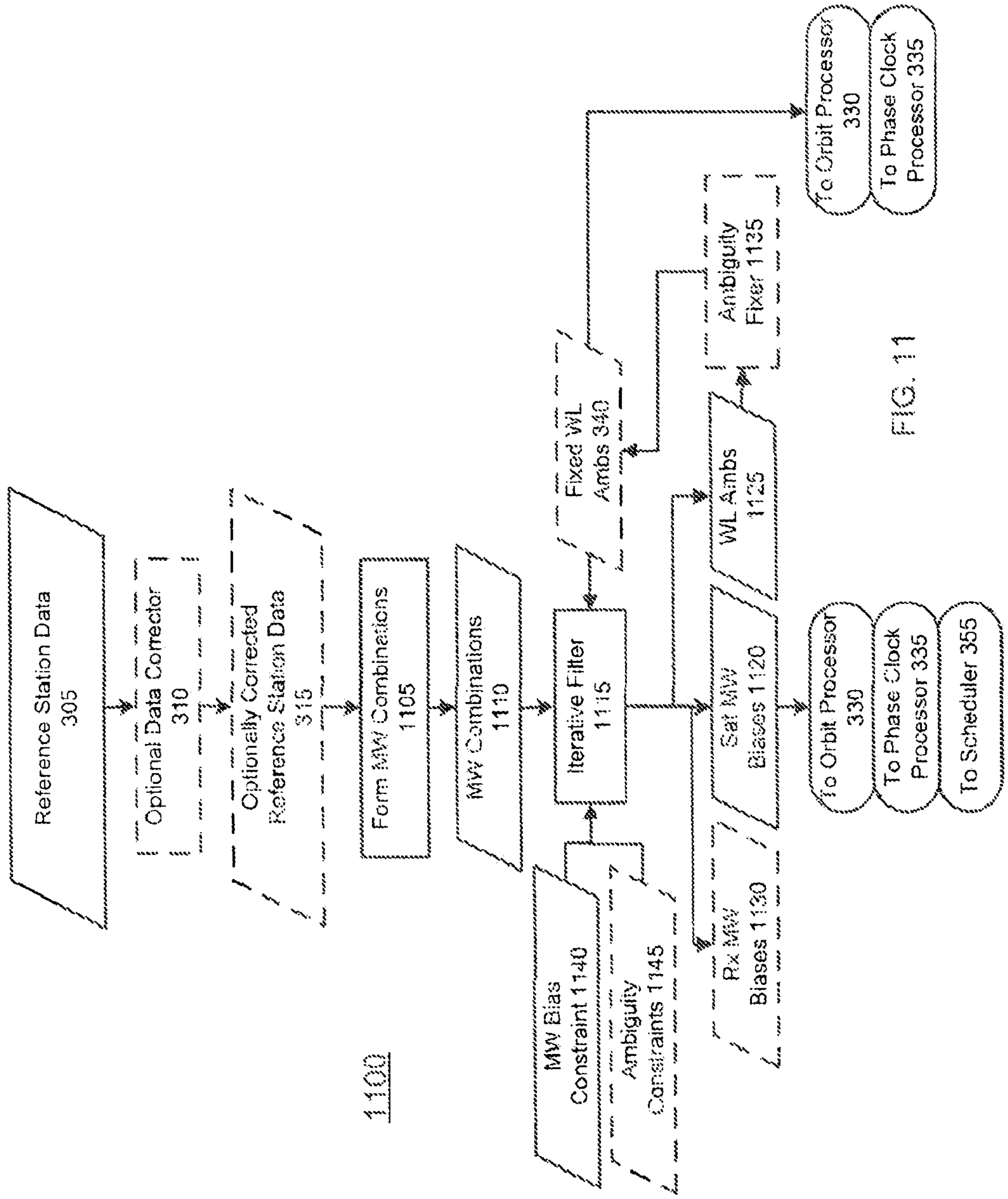
Figure 12:
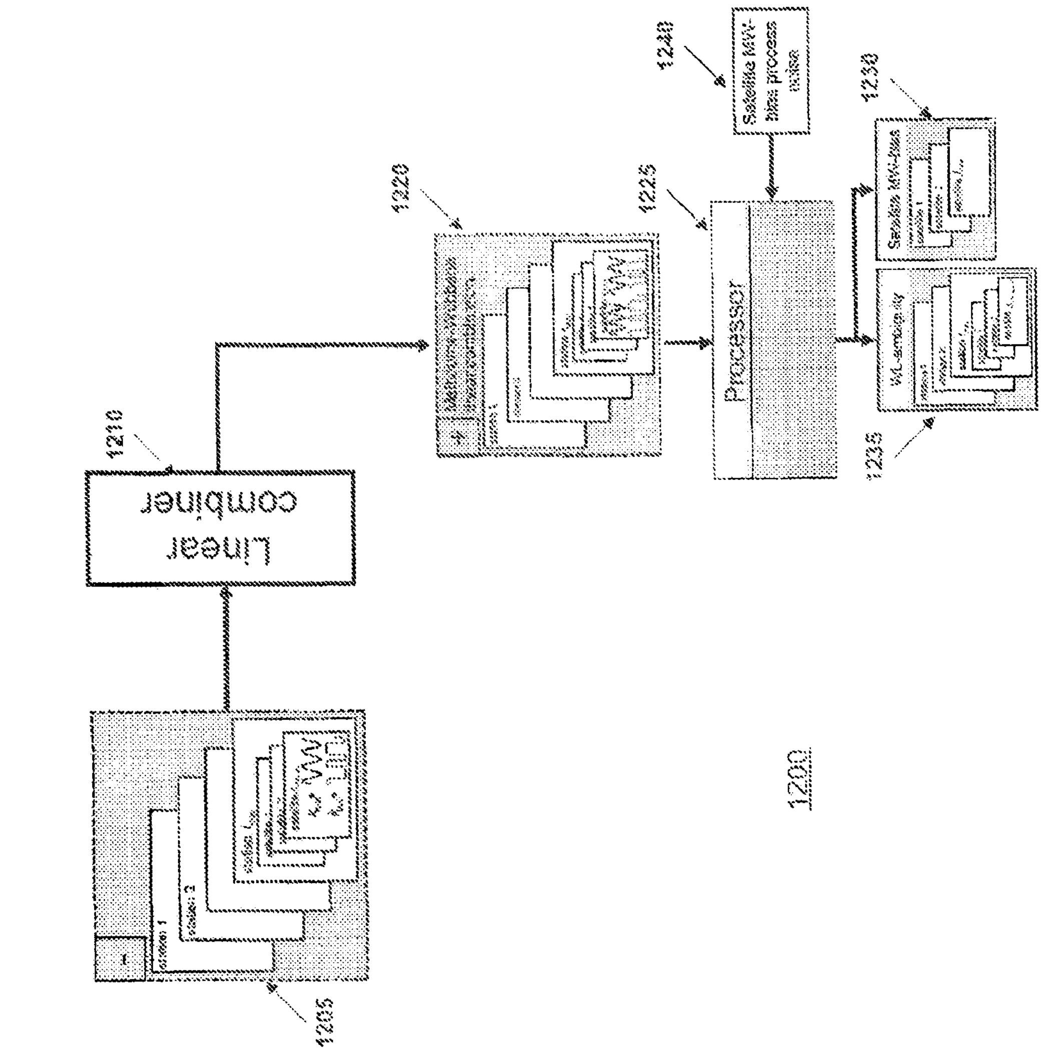
Figure 19A:
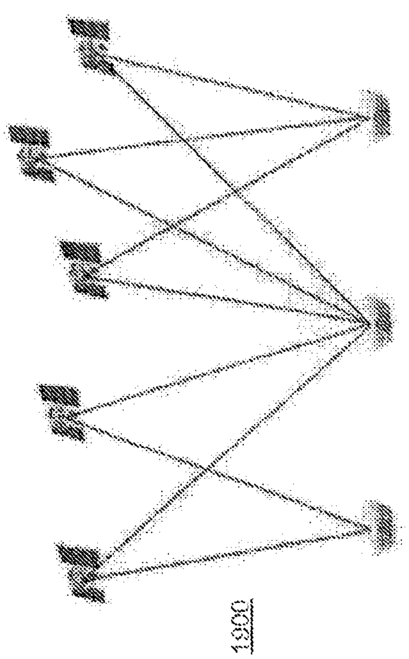
Figure 19B:
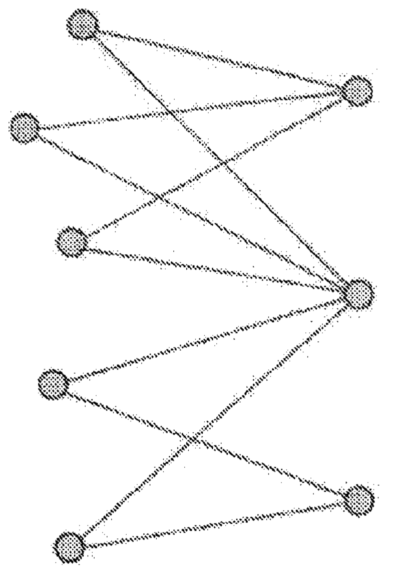
Figure 19C:
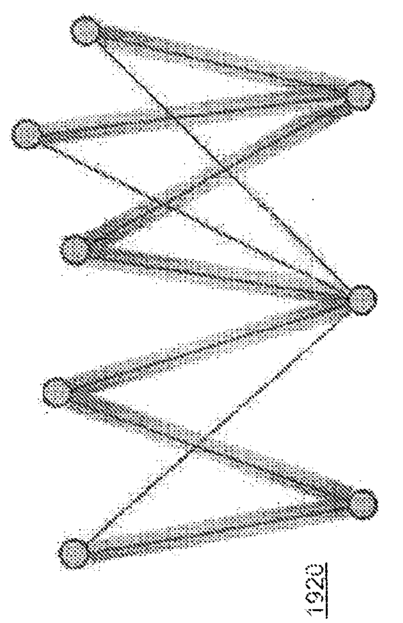
Figure 19D:
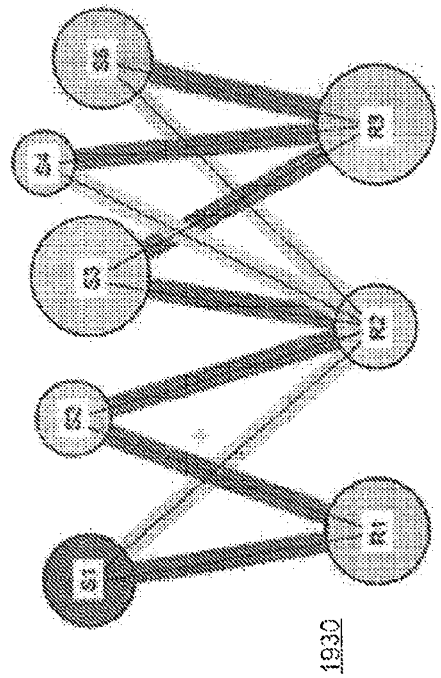
Figure 19E:
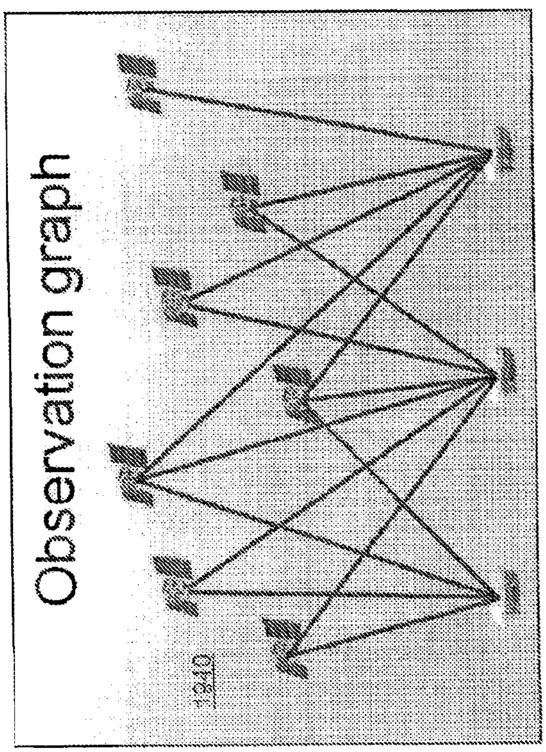
Figure 19F:
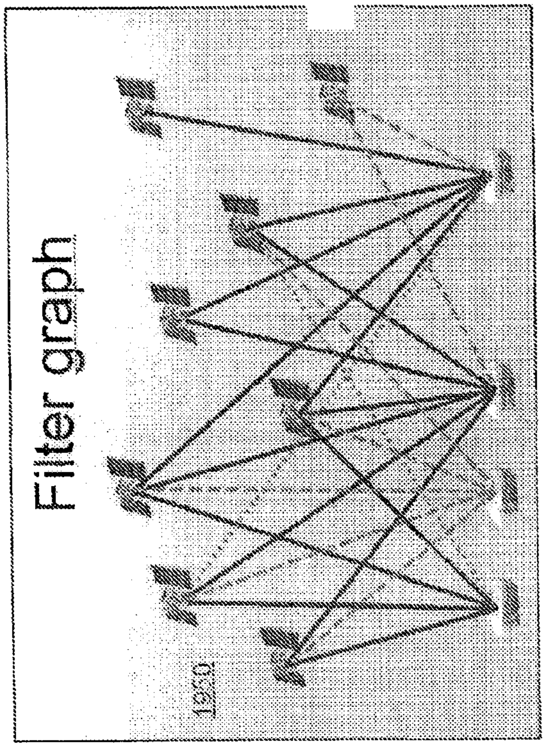
Figure 19G:
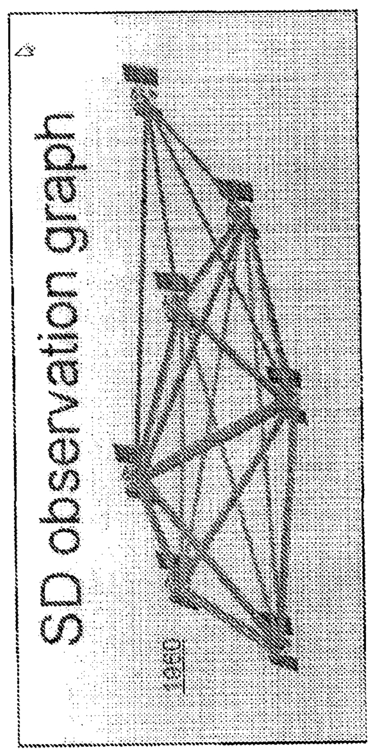
Figure 19H:
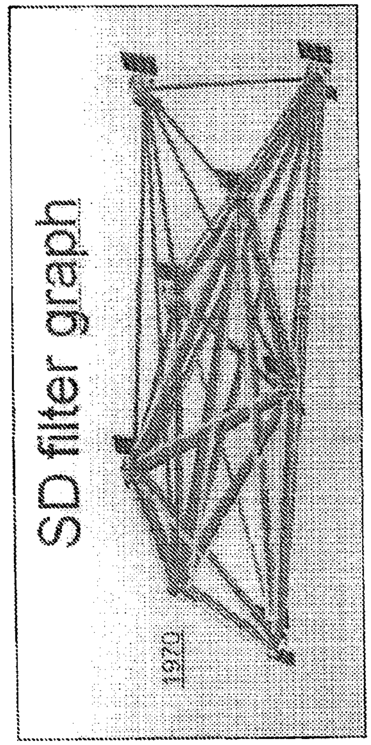
Figure 19I:
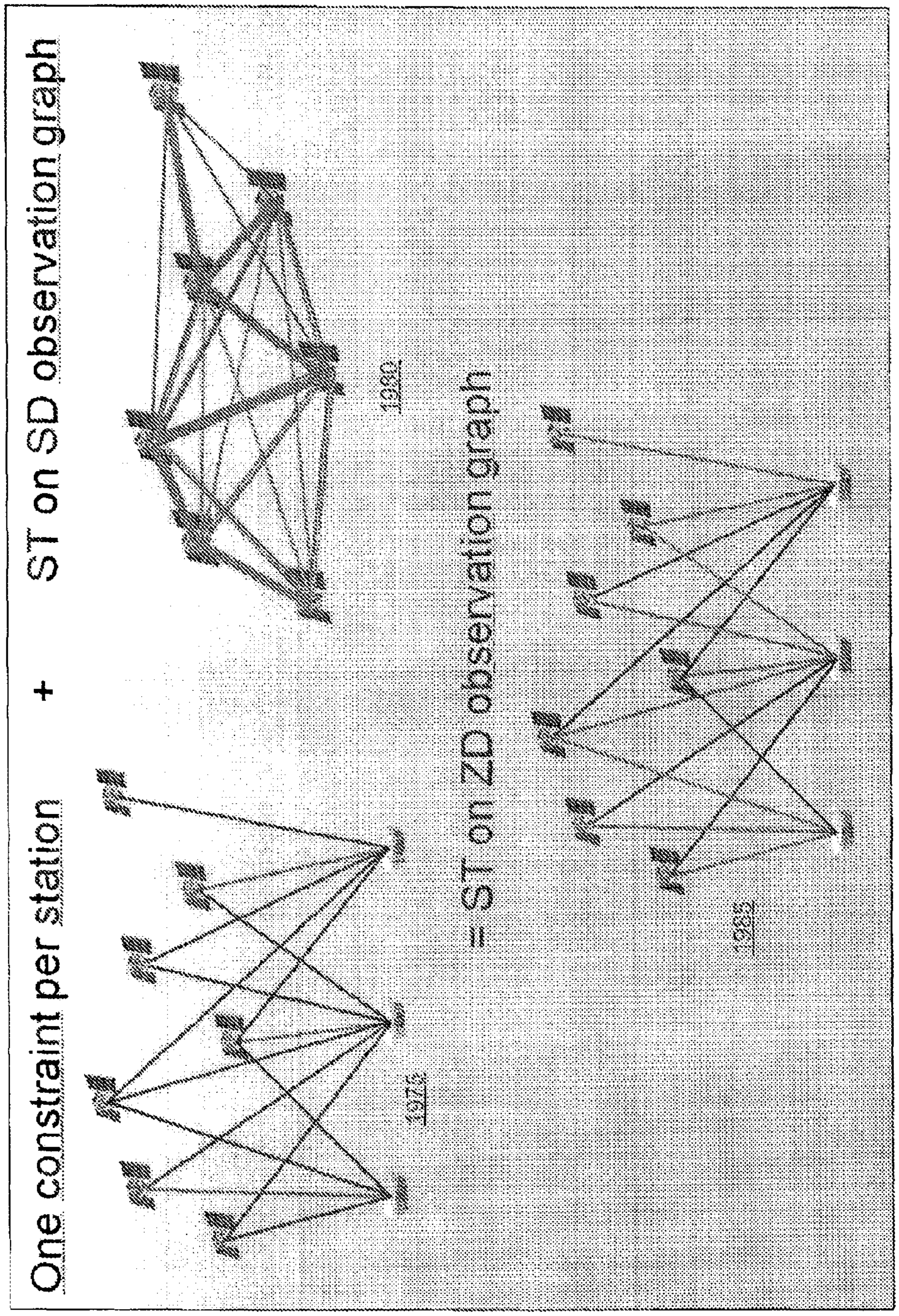
Figure 20:
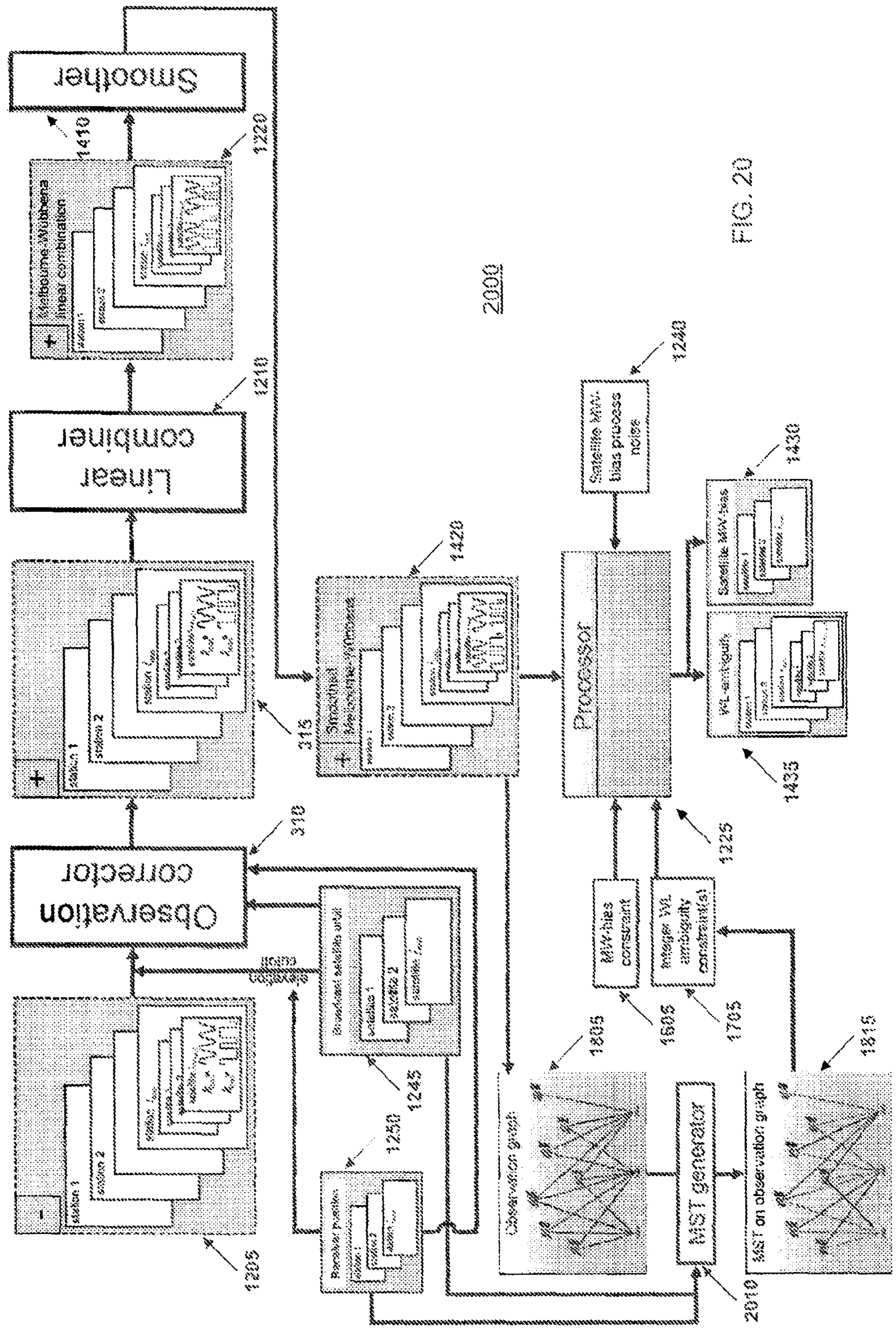
Figure 21A:
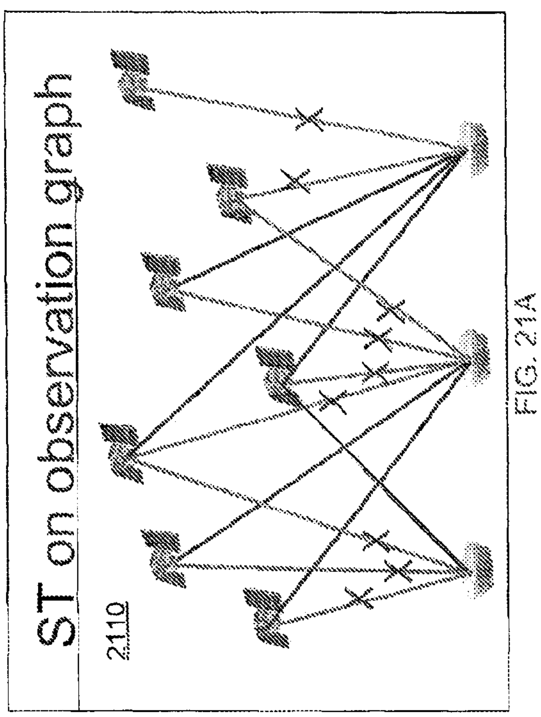
Figure 21B:
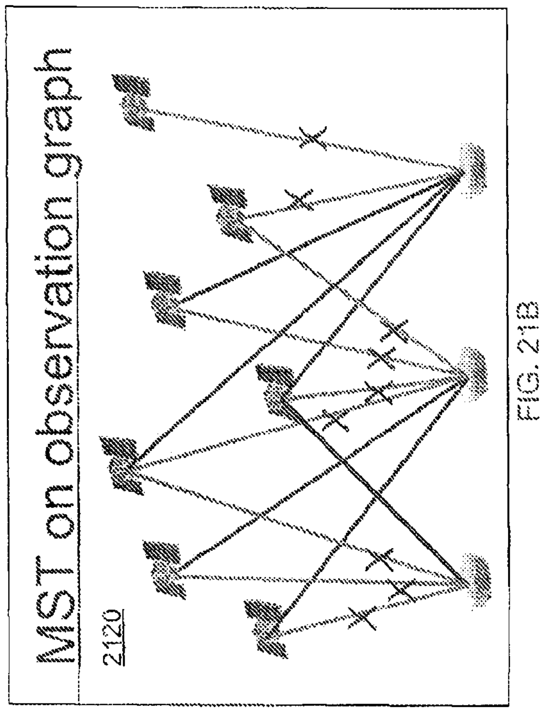
Figure 21C:
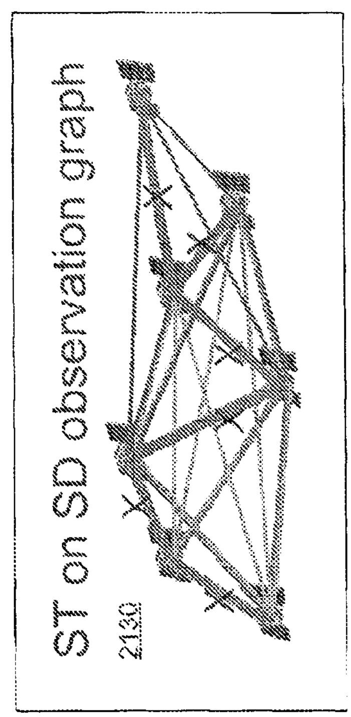
Figure 21D:
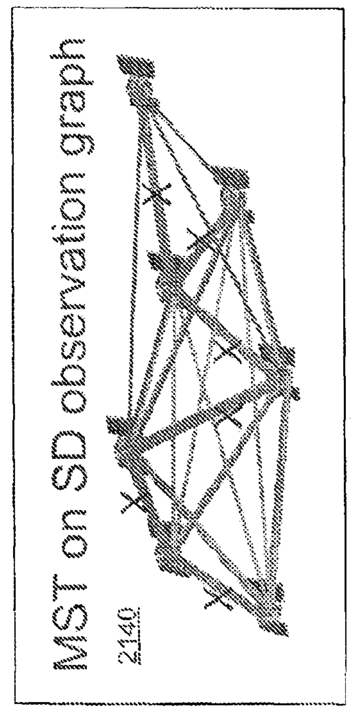
Figure 22:
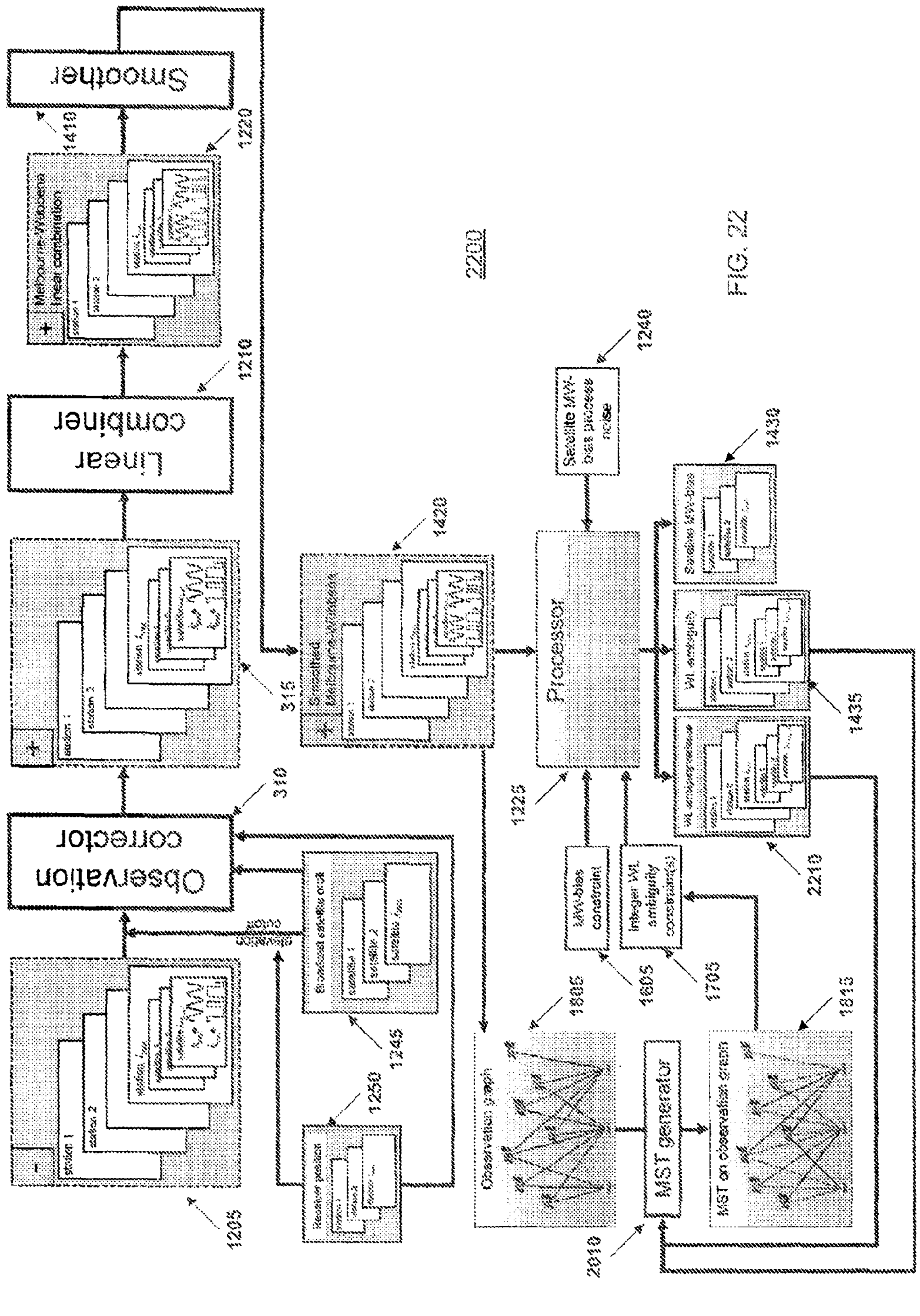
Figure 23A:
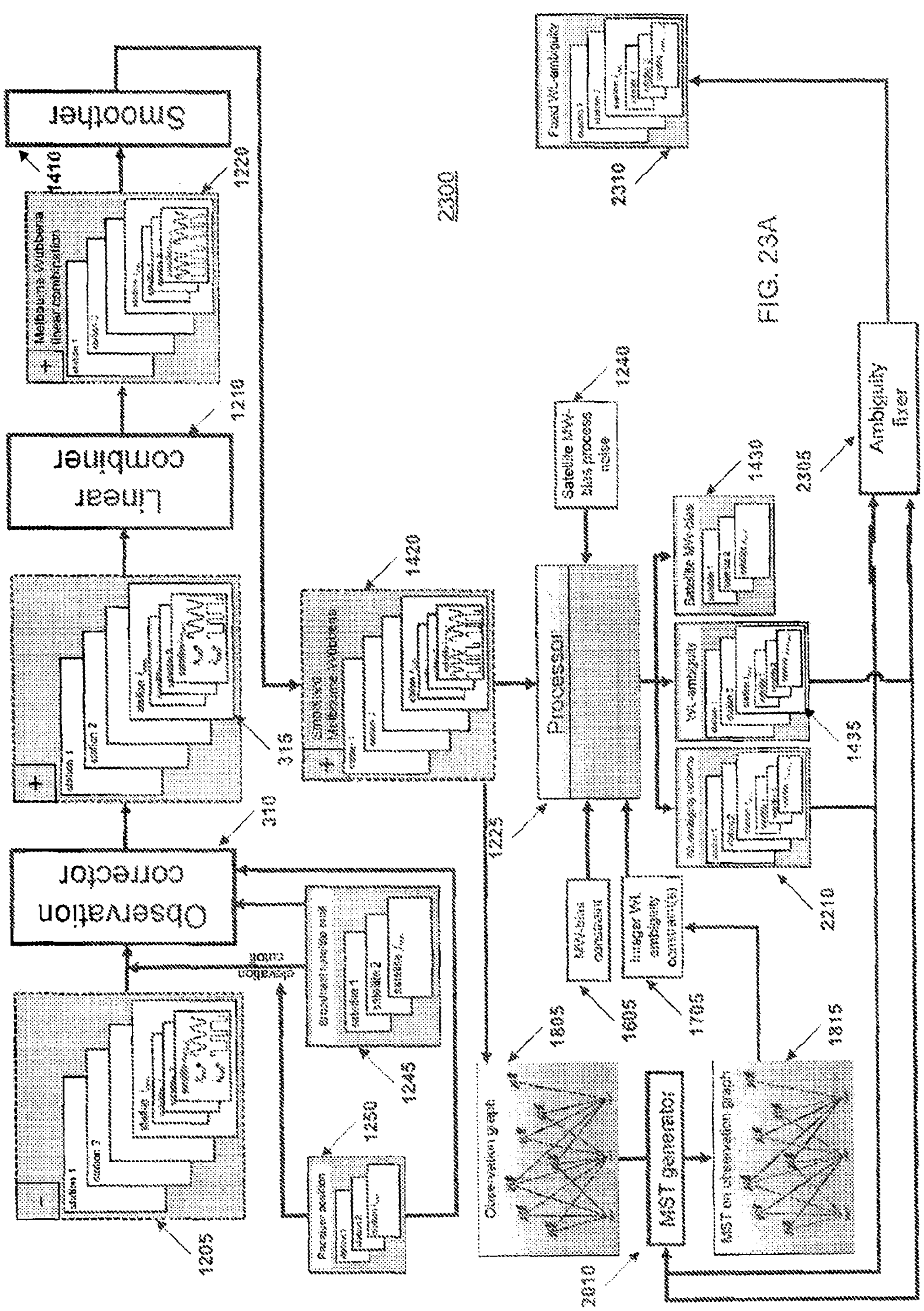
Figure 23B:
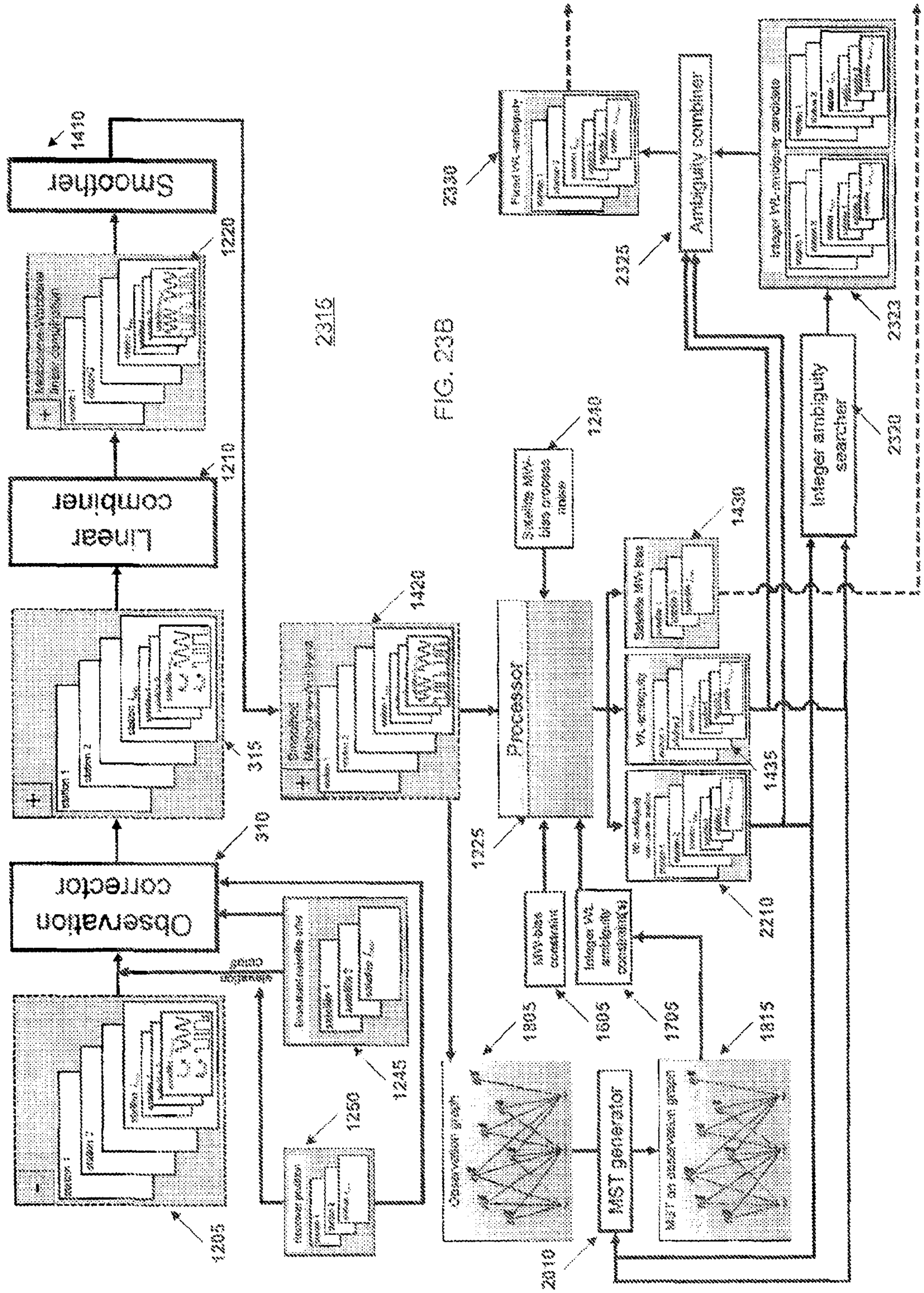
Figure 24A:
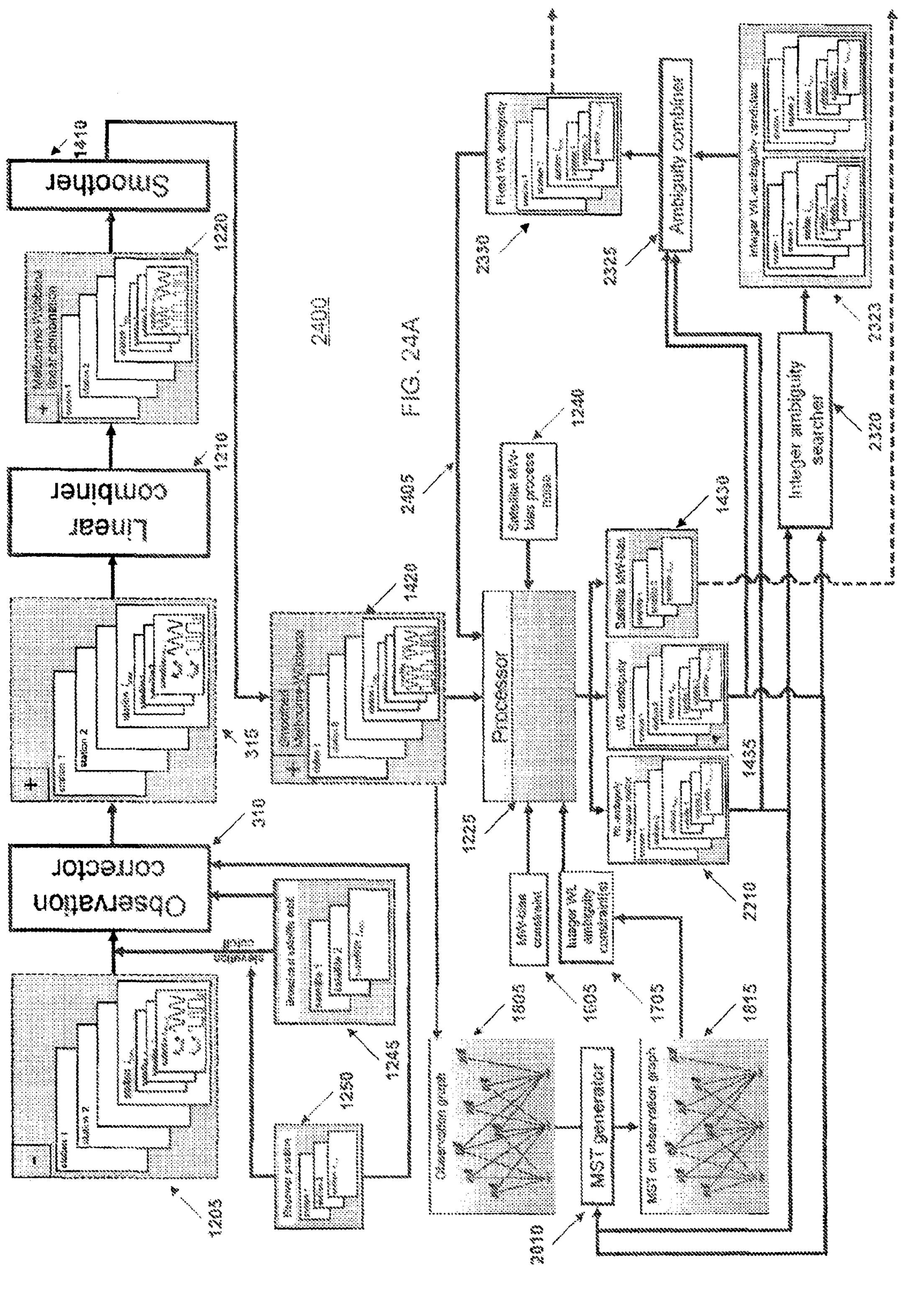
Figure 24B:
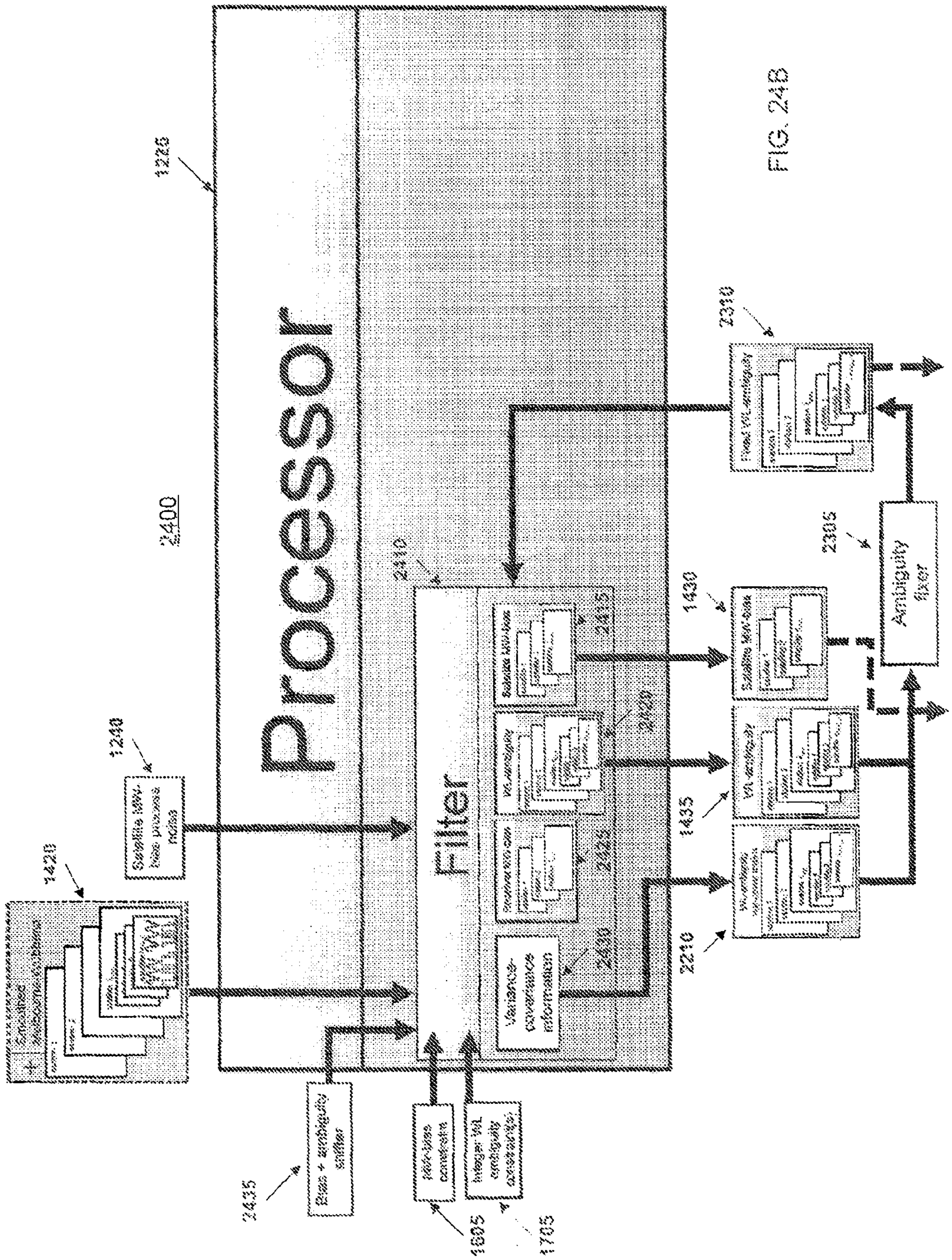
Figure 24C:
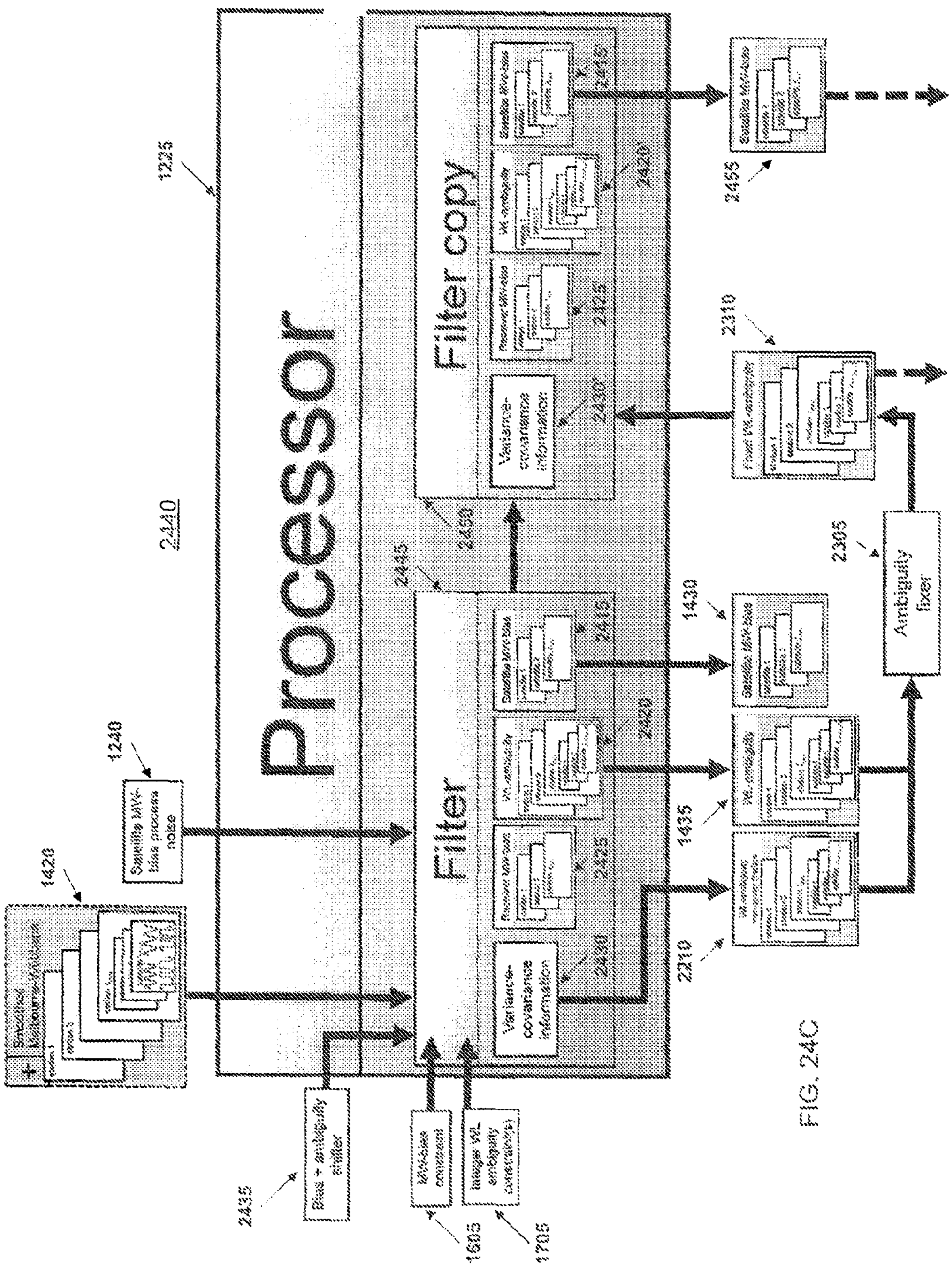
Figure 24D:
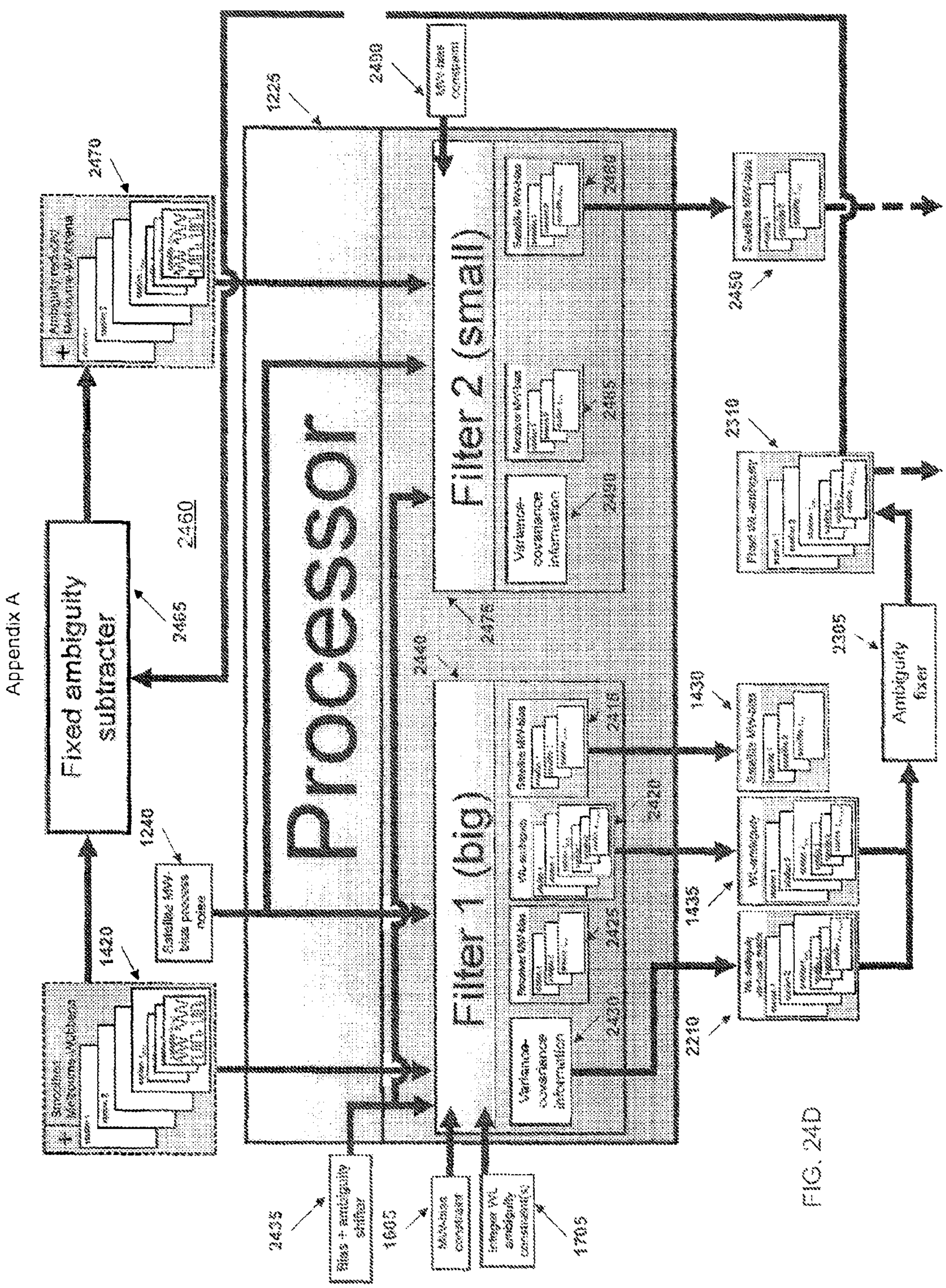

FIG. 18 is a schematic diagram of a Melbourne-Wübbena bias processor in accordance with some embodiments of the invention;

FIG. 19A is an observation graph of GNSS stations and satellites;

FIG. 19B is an abstract graph showing stations and satellites as vertices and station-satellite observations as edges;

FIG. 19C depicts a minimum spanning tree of the graph of FIG. 19B;

FIG. 19D depicts a minimum spanning tree with constrained edges;

FIG. 19E is an undifferenced observation graph of GNSS stations and satellites;

FIG. 19F is an filter graph corresponding to the observation graph of FIG. 19E;

FIG. 19G is a single-differenced observation graph of GNSS stations and satellites;

FIG. 19H is a filter graph corresponding to the observation graph of FIG. 19G;

FIG. 19I is a set of observations graphs comparing constraints in undifferenced and single-differenced processing;

FIG. 20 is a schematic diagram of a Melbourne-Wübbena bias processor in accordance with some embodiments of the invention;

FIG. 21A shows a spanning tree on an undifferenced observation graph;

FIG. 21B shows a minimum spanning tree on an undifferenced observation graph;

FIG. 21C shows a spanning tree on a single-differenced observation graph;

FIG. 21D shows a minimum spanning tree on a single-differenced observation graph;

FIG. 22 is a schematic diagram of a Melbourne-Wübbena bias processor in accordance with some embodiments of the invention;

FIG. 23A is a schematic diagram of a Melbourne-Wübbena bias processor in accordance with some embodiments of the invention;

FIG. 23B is a schematic diagram of a Melbourne-Wübbena bias processor in accordance with some embodiments of the invention;

FIG. 24A is a schematic diagram of a Melbourne-Wübbena bias processor in accordance with some embodiments of the invention;

FIG. 24B is a schematic diagram of a Melbourne-Wübbena filtering process in accordance with some embodiments of the invention;

FIG. 24C is a schematic diagram of a Melbourne-Wübbena filtering process in accordance with some embodiments of the invention;

FIG. 24D is a schematic diagram of a Melbourne-Wübbena filtering process in accordance with some embodiments of the invention;

Appendix A
PROVISIONAL APPLICATION FOR UNITED STATES PATENT

Figure 25A:
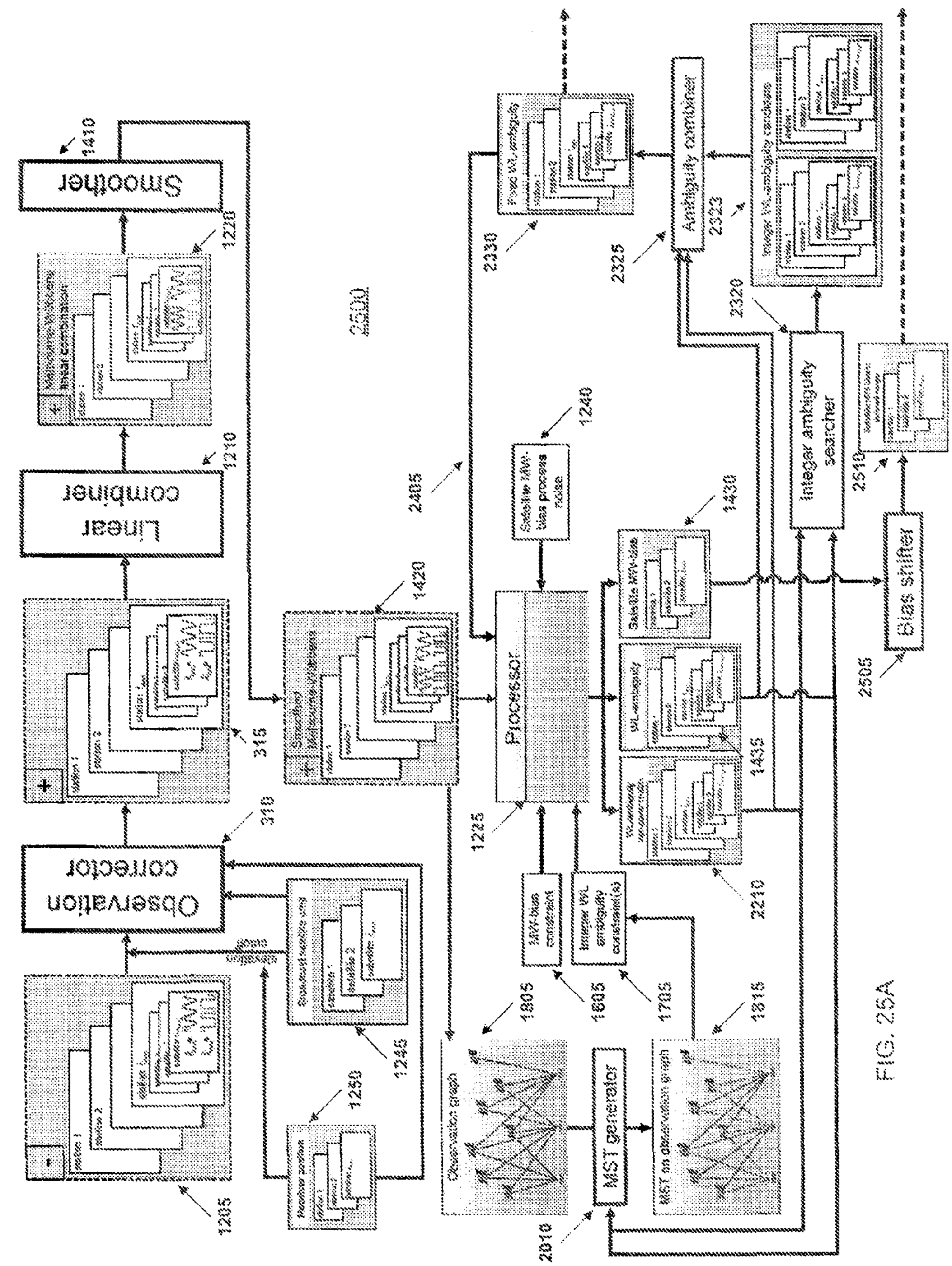
Figure 25B:
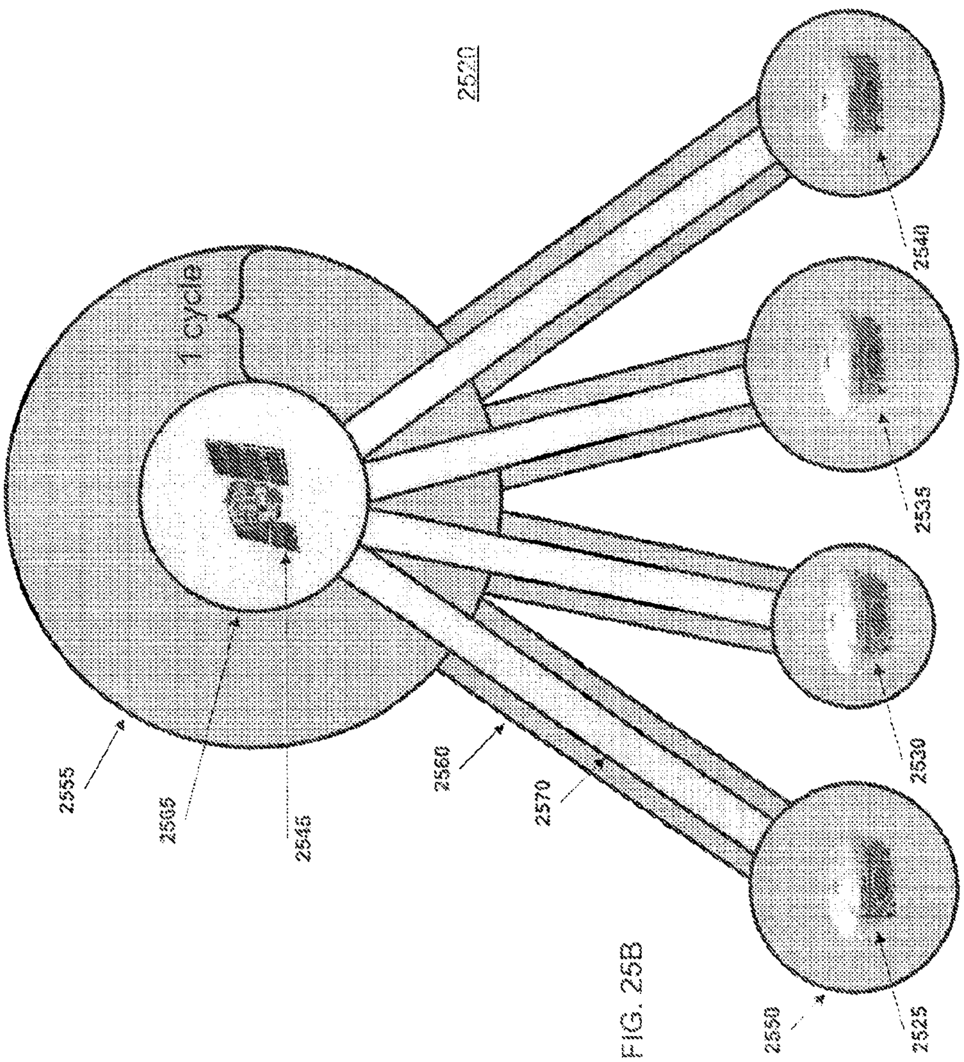
Figure 25C:
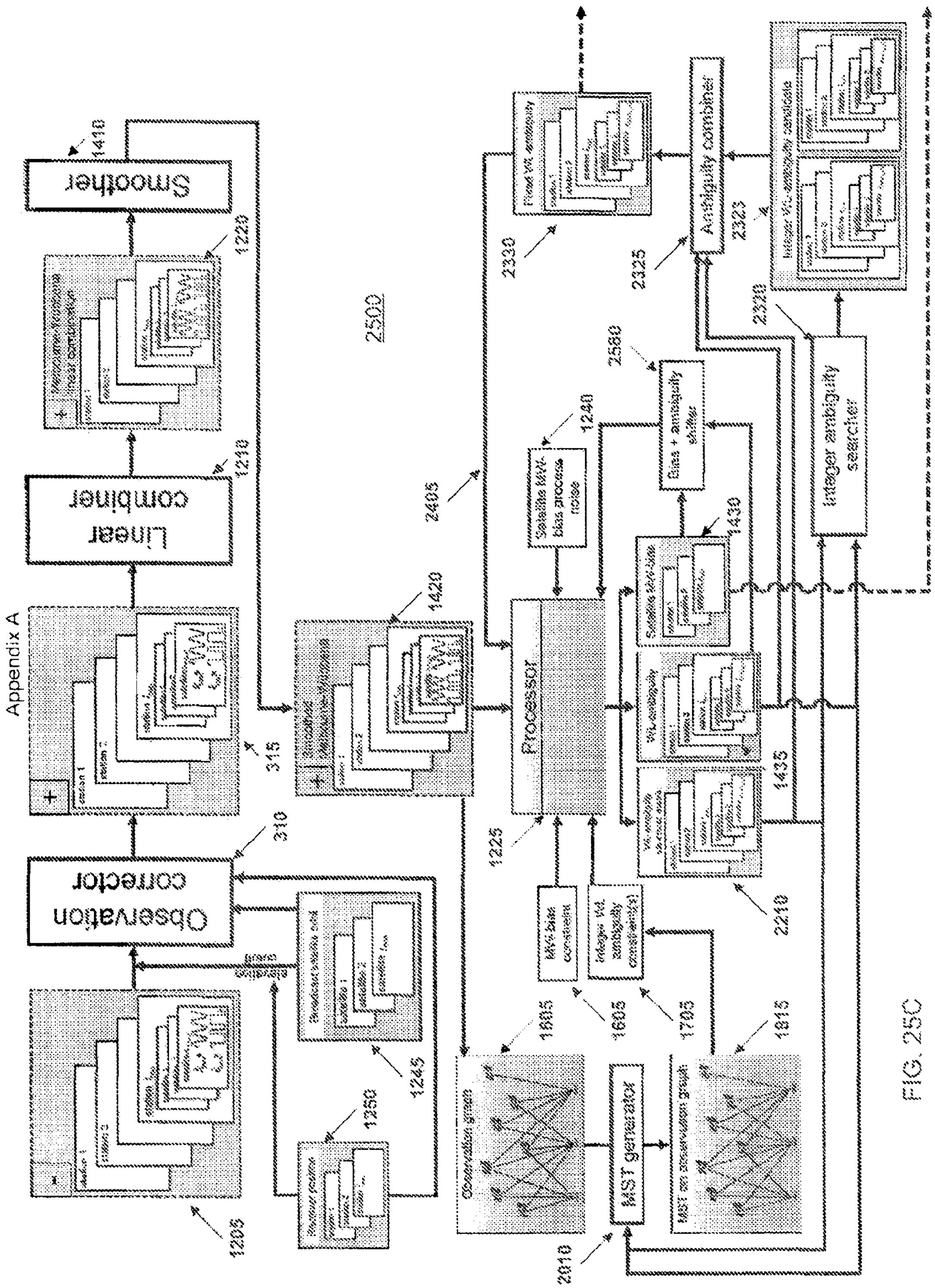
Figure 26A:
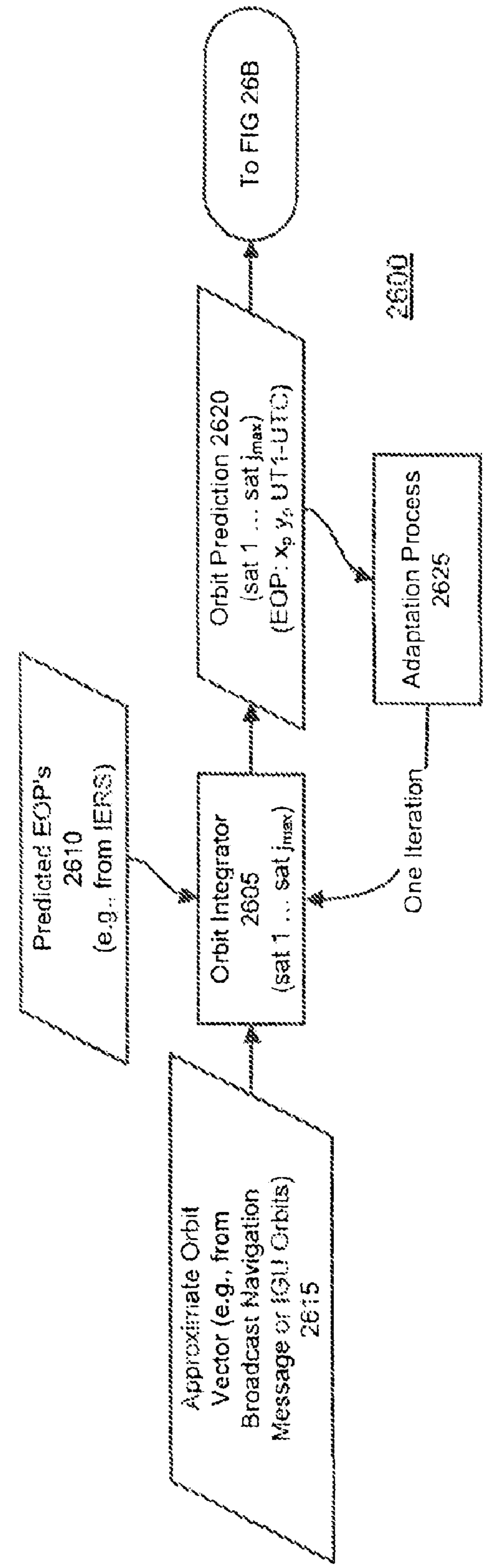
Figure 26B:
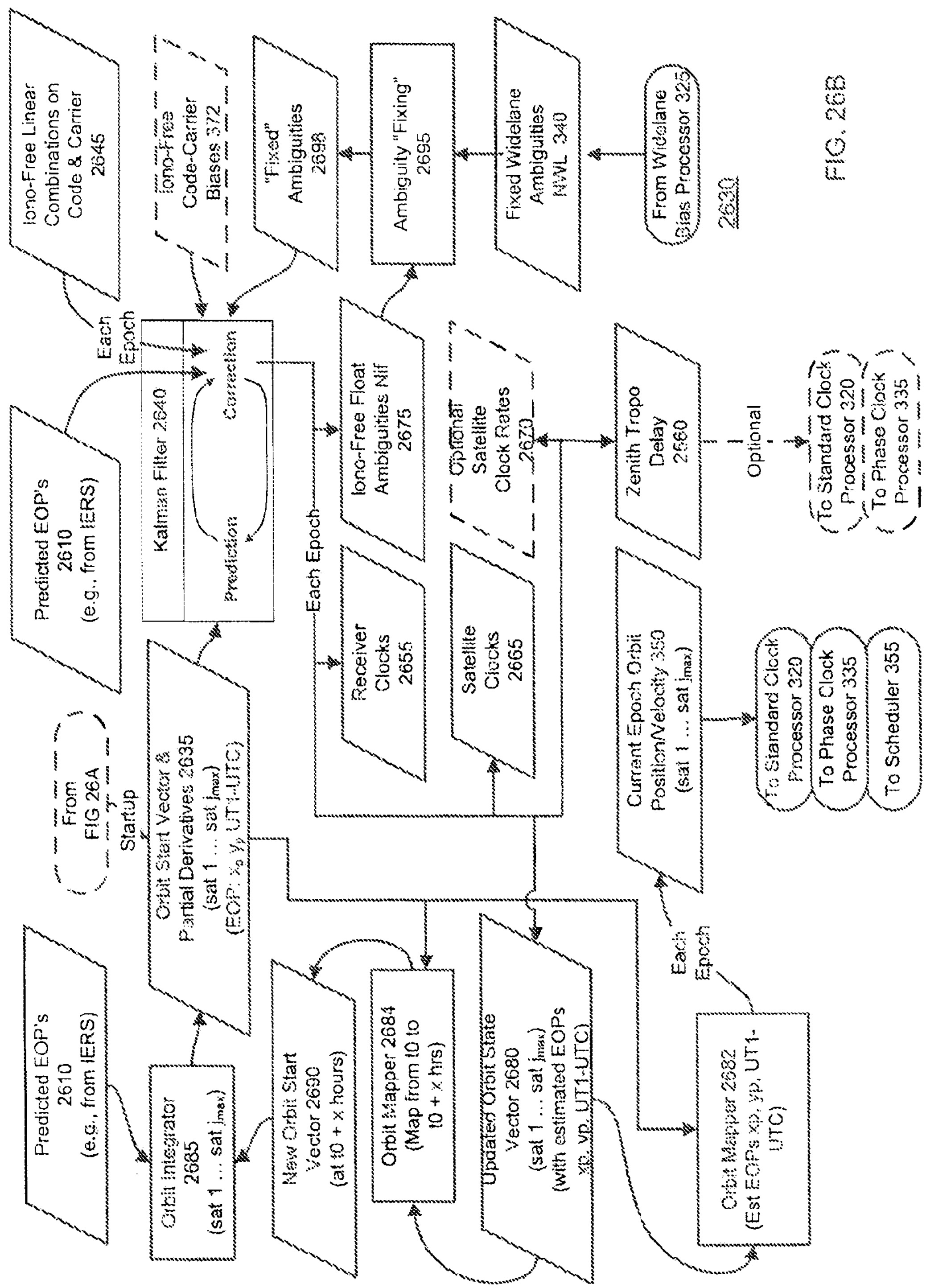
Figure 26C:
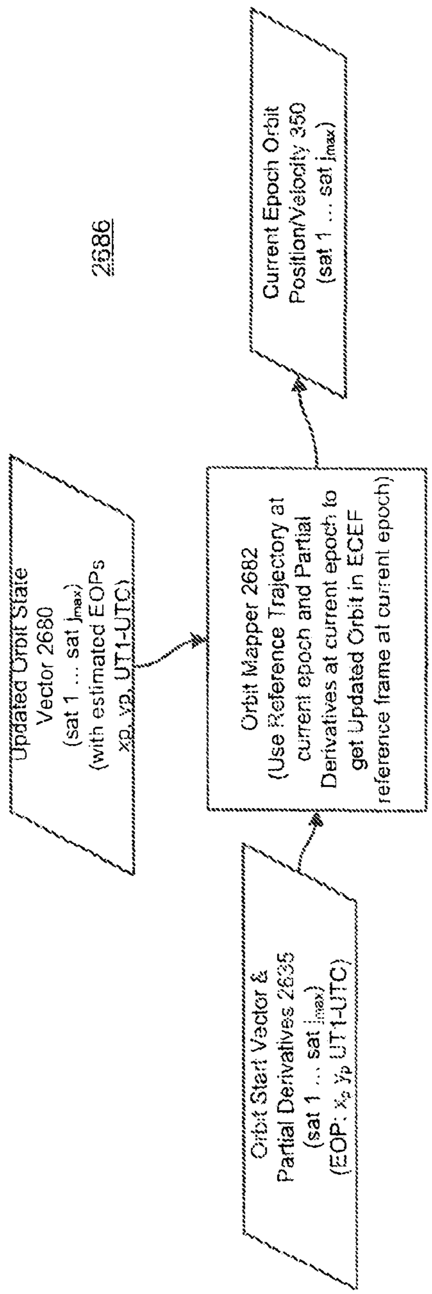
Figure 26D:
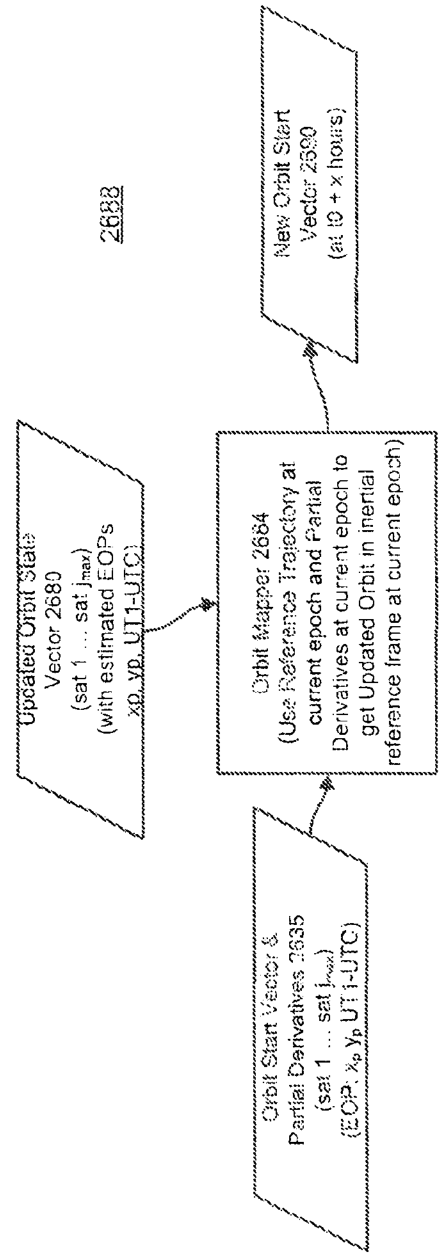
Figure 27A:
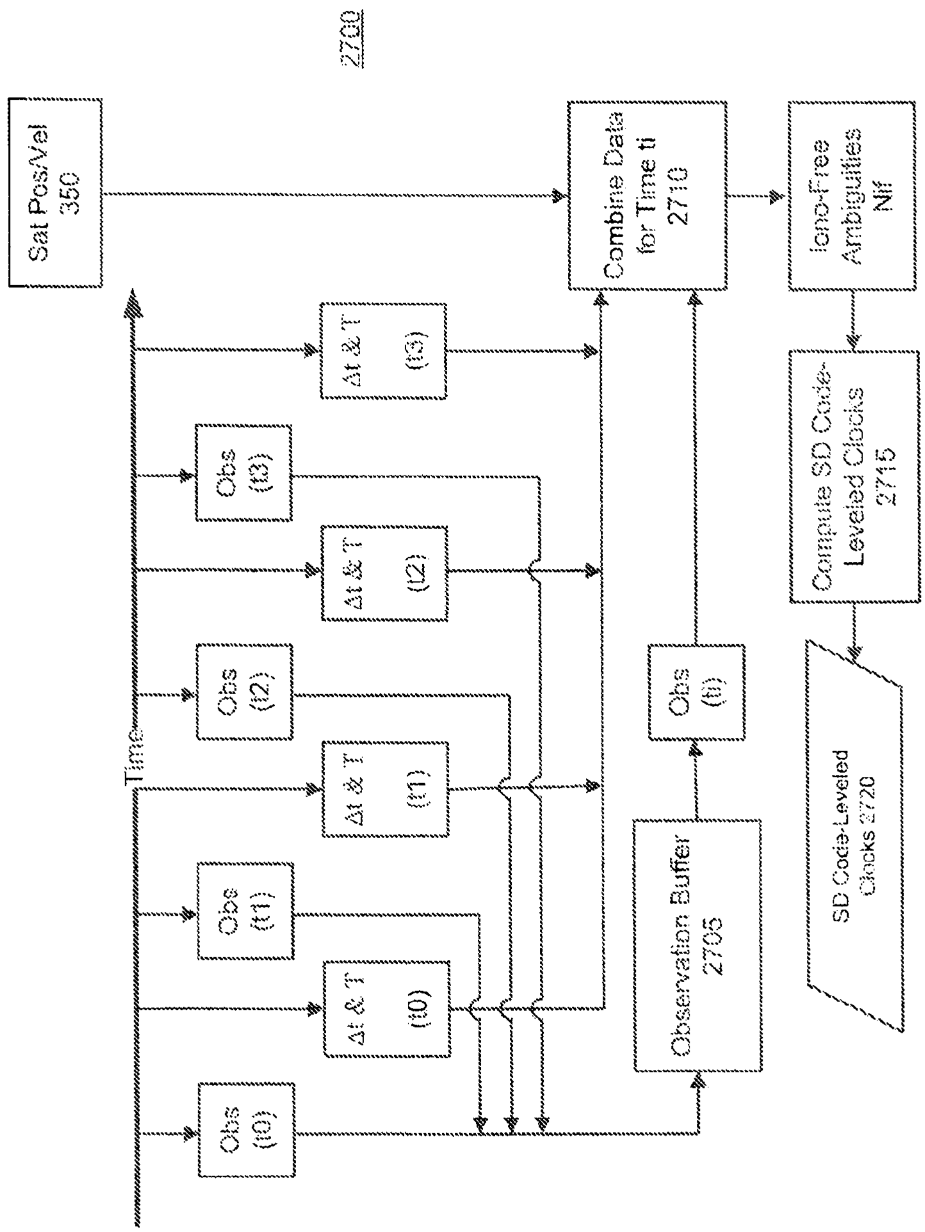
Figure 27B:
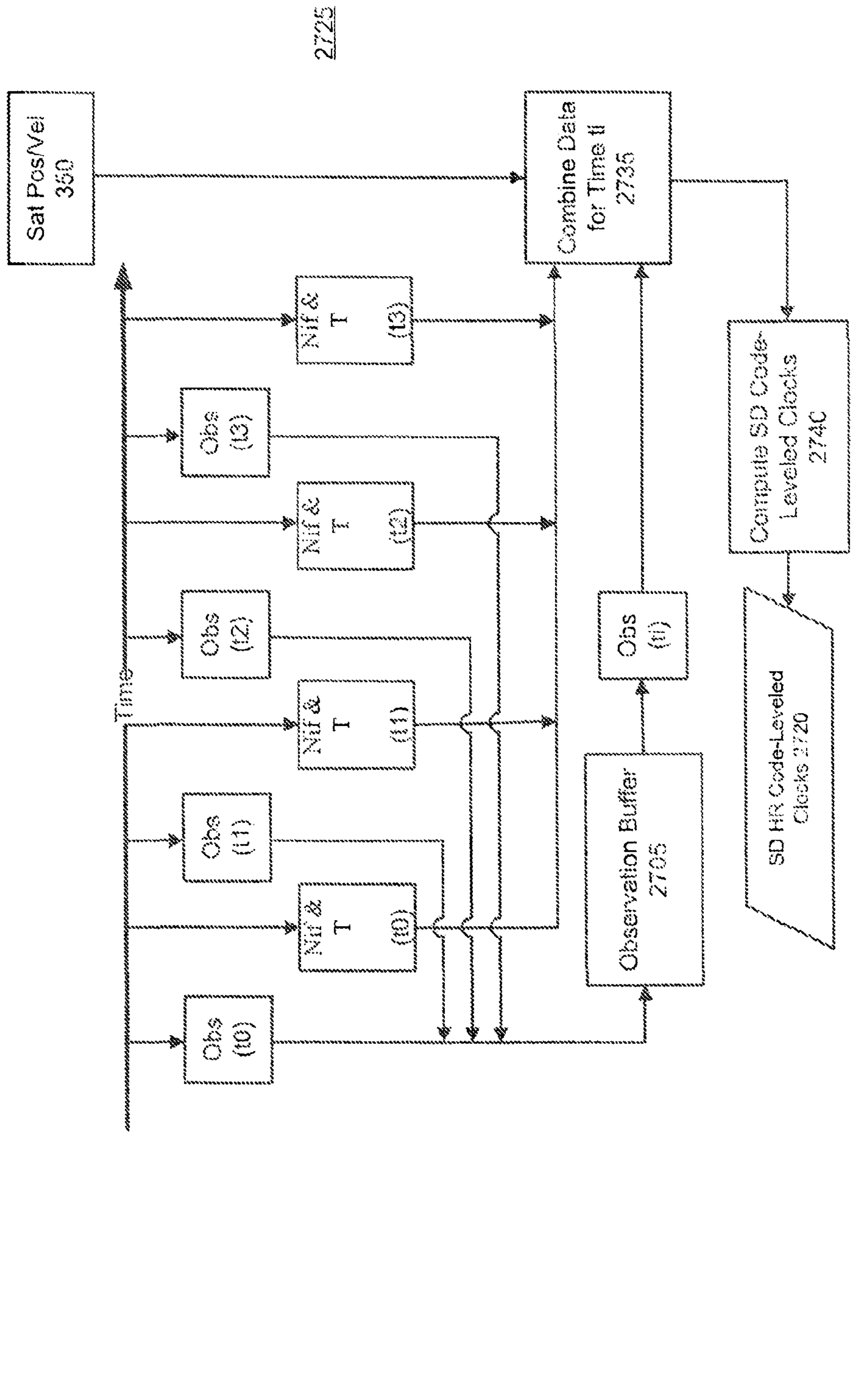
Figure 28A:
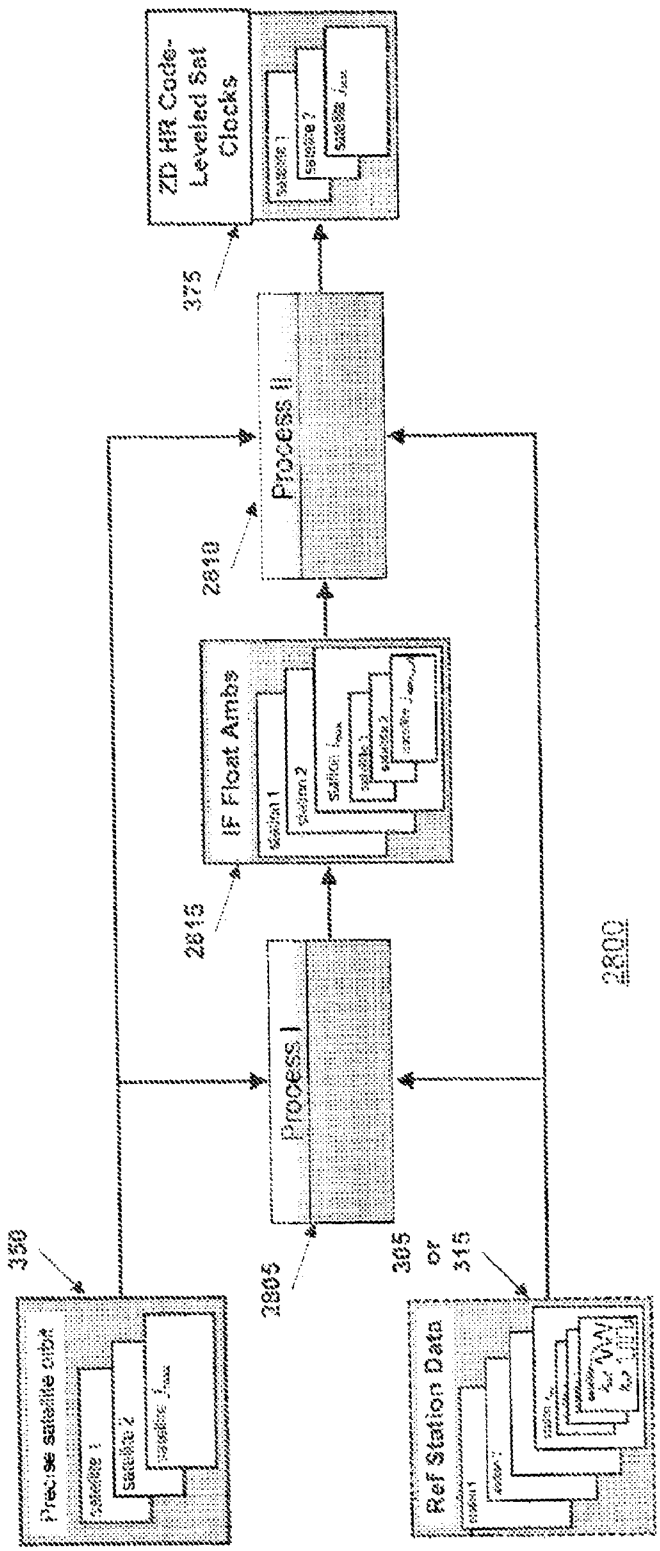
Figure 28B:
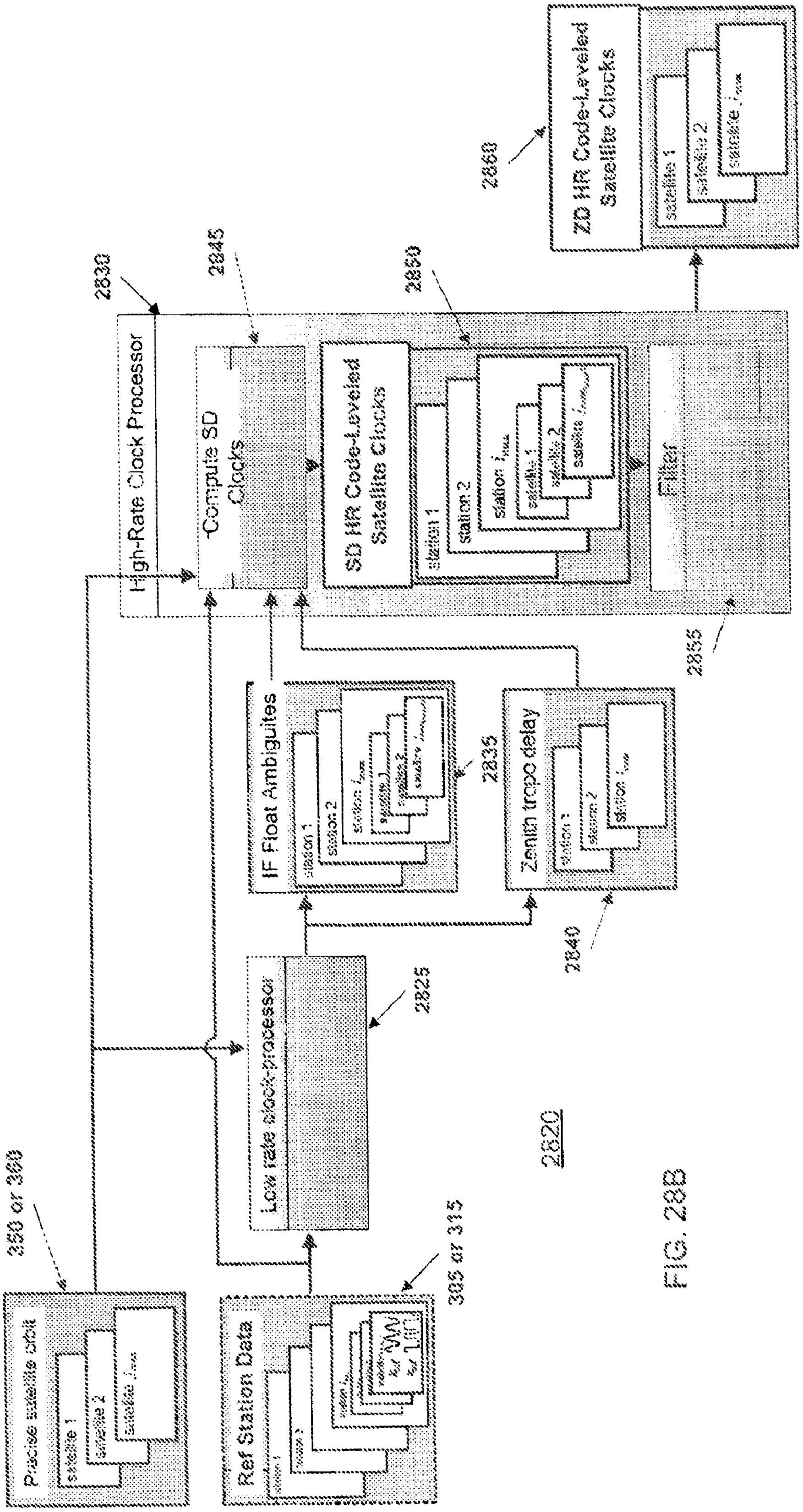
Figure 28C:
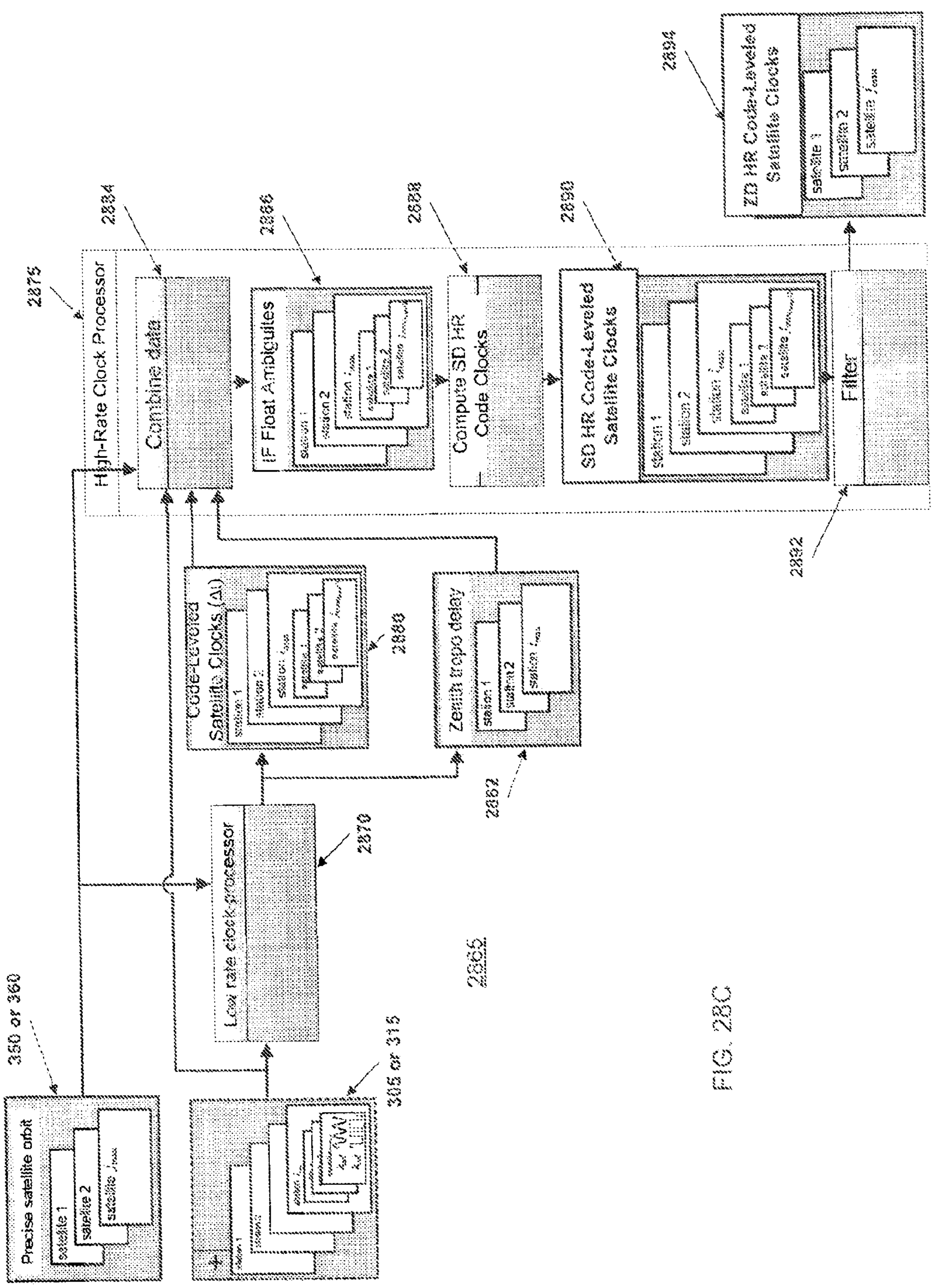
Figure 29:
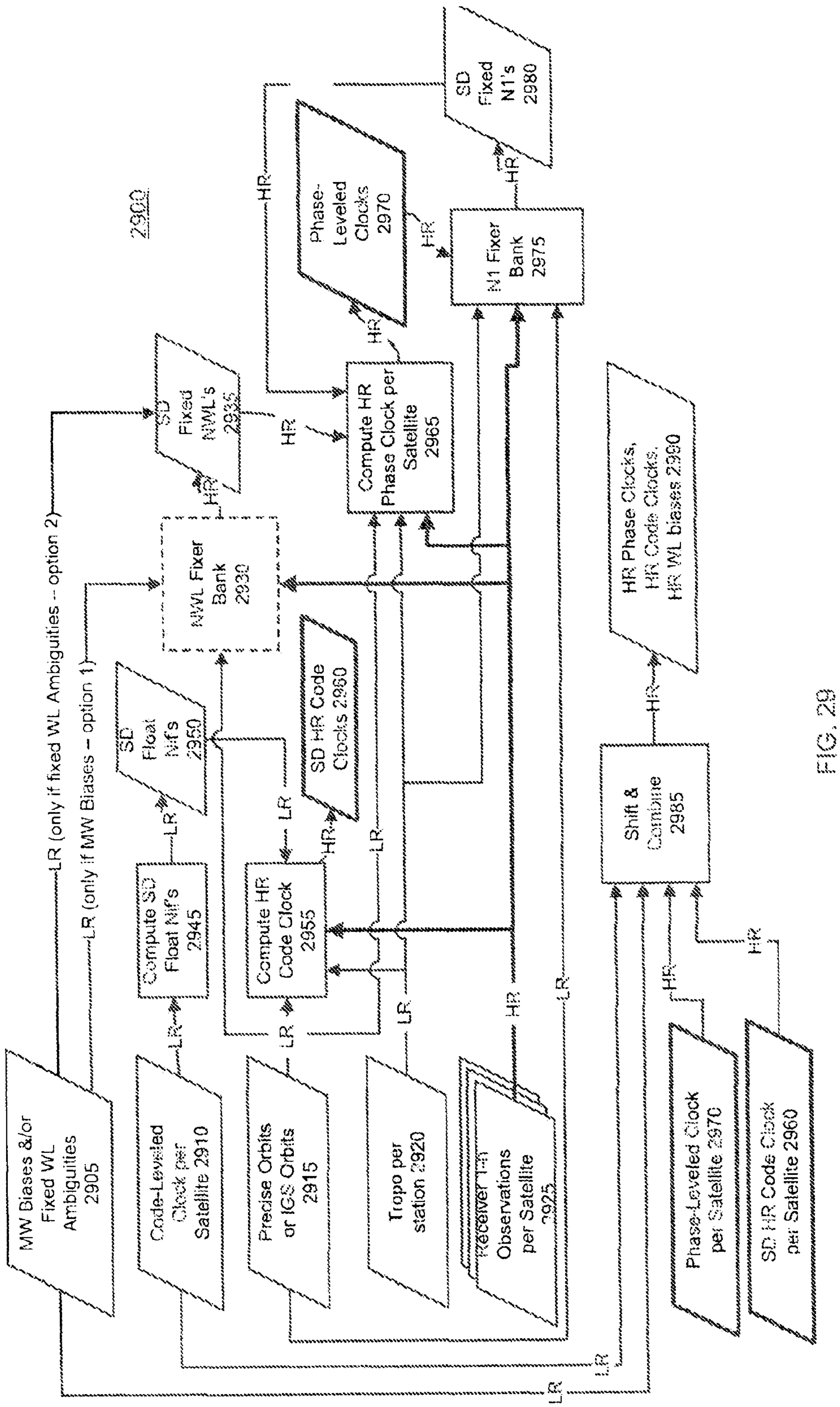
Figure 30A:
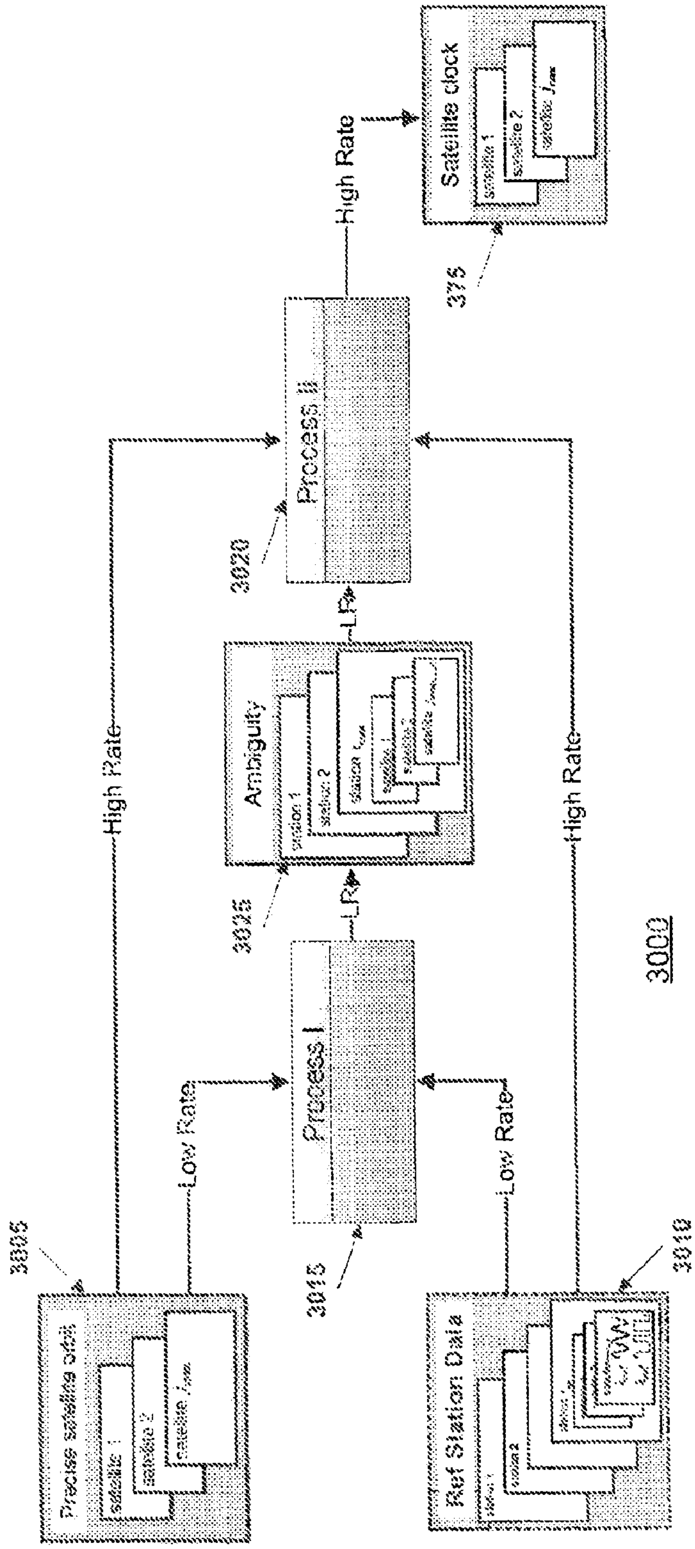
Figure 30B:
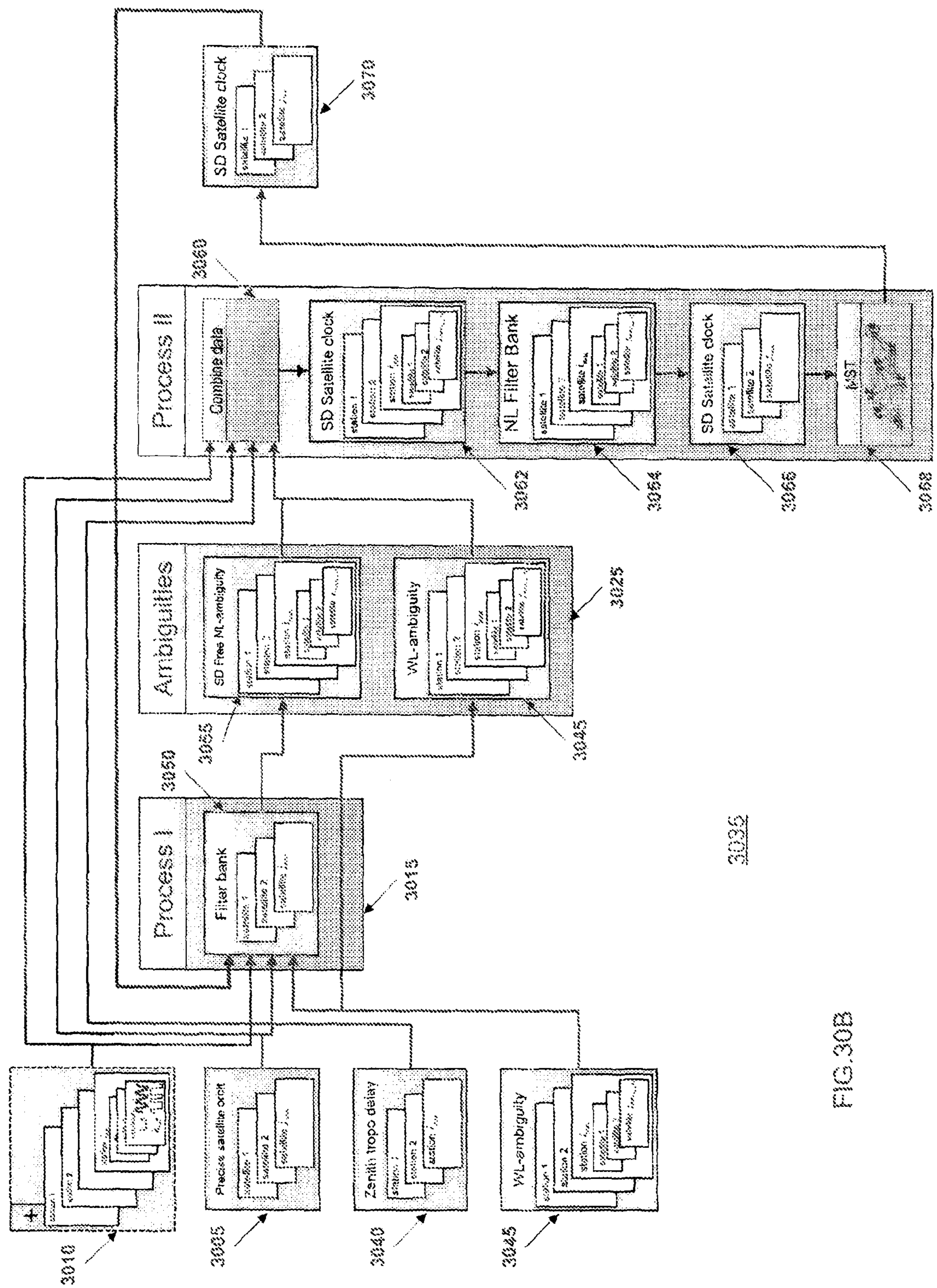
Figure 30C:
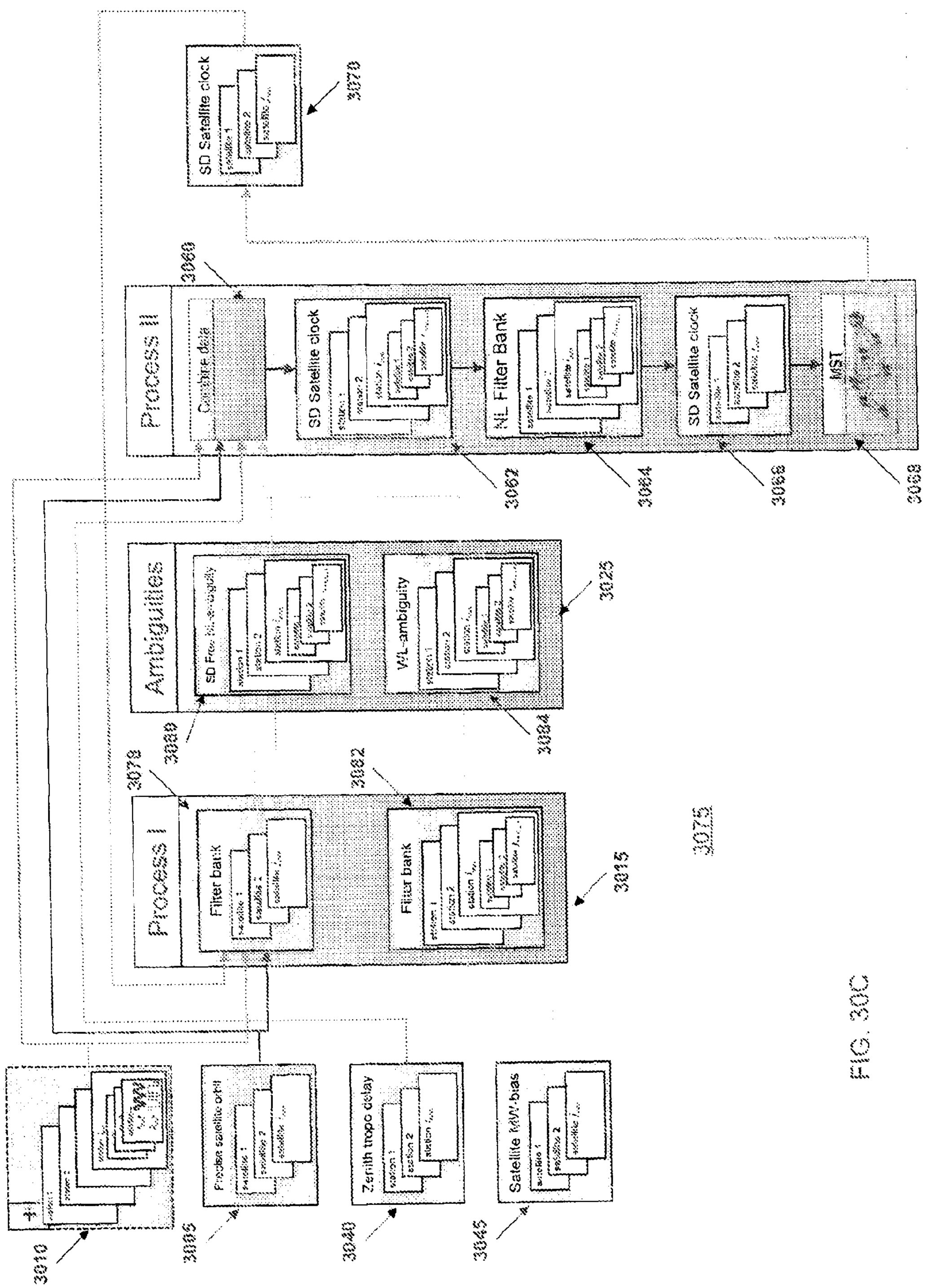

FIG. 25A is a schematic diagram of a Melbourne-Wübbena bias processor in accordance with some embodiments of the invention;

FIG. 25B illustrates the effect of shifting biases in accordance with some embodiments of the invention;

FIG. 25C is a schematic diagram of a Melbourne-Wübbena bias processor in accordance with some embodiments of the invention;

FIG. 26A is a schematic diagram of the startup of an orbit processor in accordance with some embodiments of the invention;

FIG. 26B is a schematic diagram of an orbit processor in accordance with some embodiments of the invention;

FIG. 26C is a schematic diagram of an orbit mapper of an orbit processor in accordance with some embodiments of the invention;

FIG. 26D is a schematic diagram of an orbit mapper of an orbit processor in accordance with some embodiments of the invention;

FIG. 27A is a timing diagram of code-leveled clock processing in accordance with some embodiments of the invention;

FIG. 27B is a timing diagram of code-leveled clock processing in accordance with some embodiments of the invention;

FIG. 28A is a schematic diagram of a high-rate code-leveled satellite clock processor in accordance with some embodiments of the invention;

FIG. 28B is a schematic diagram of a high-rate code-leveled satellite clock processor in accordance with some embodiments of the invention;

FIG. 28C is a schematic diagram of a high-rate code-leveled satellite clock processor in accordance with some embodiments of the invention;

FIG. 29 is a schematic diagram of a high-rate phase-leveled satellite clock processor in accordance with some embodiments of the invention;

FIG. 30A is a schematic diagram of a high-rate phase-leveled satellite clock processor in accordance with some embodiments of the invention;

FIG. 30B is a schematic diagram of a high-rate phase-leveled satellite clock processor in accordance with some embodiments of the invention;

FIG. 30C is a schematic diagram of a high-rate phase-leveled satellite clock processor in accordance with some embodiments of the invention;

Appendix A
PROVISIONAL APPLICATION FOR UNITED STATES PATENT

Figure 31:
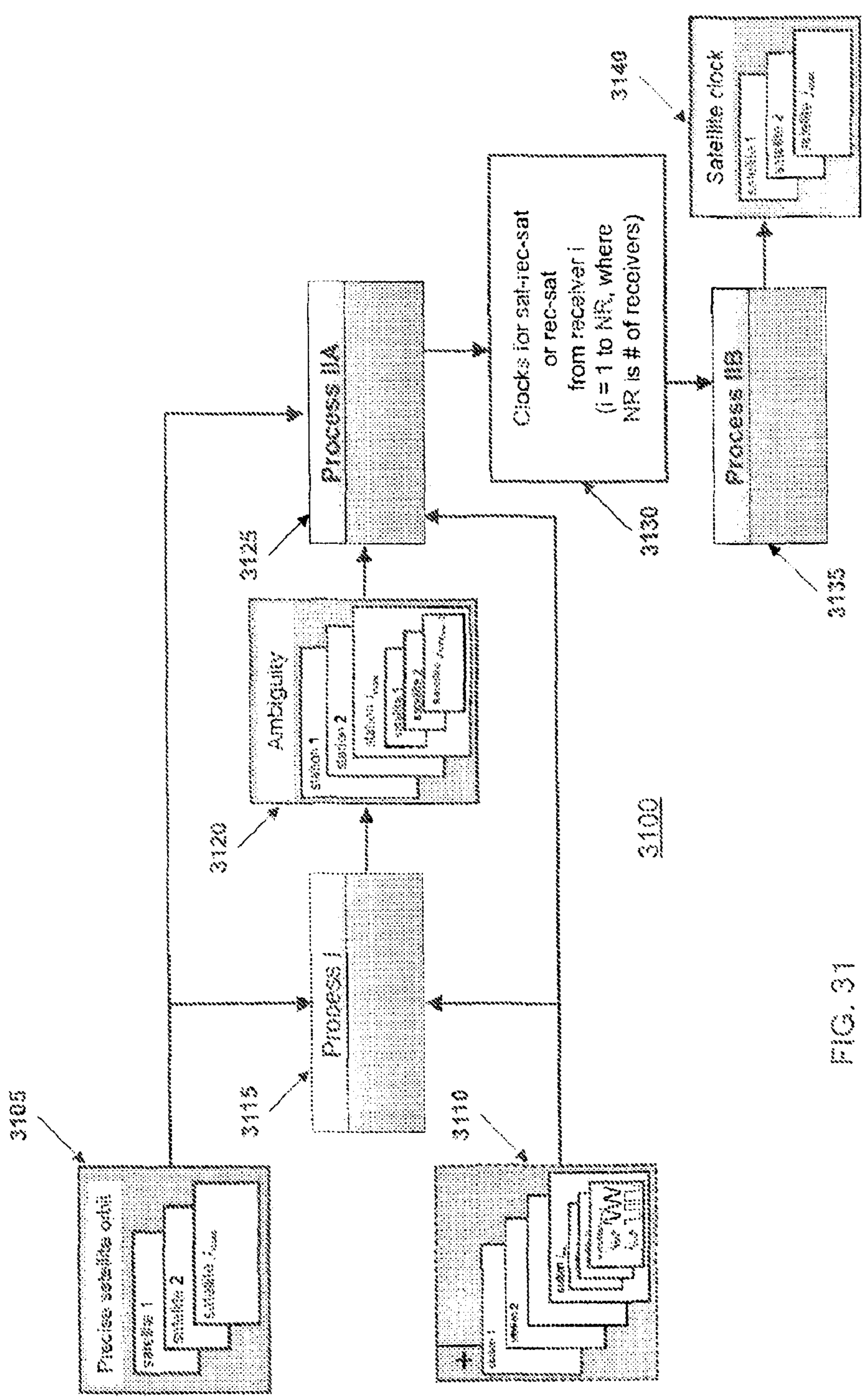
Figure 32:
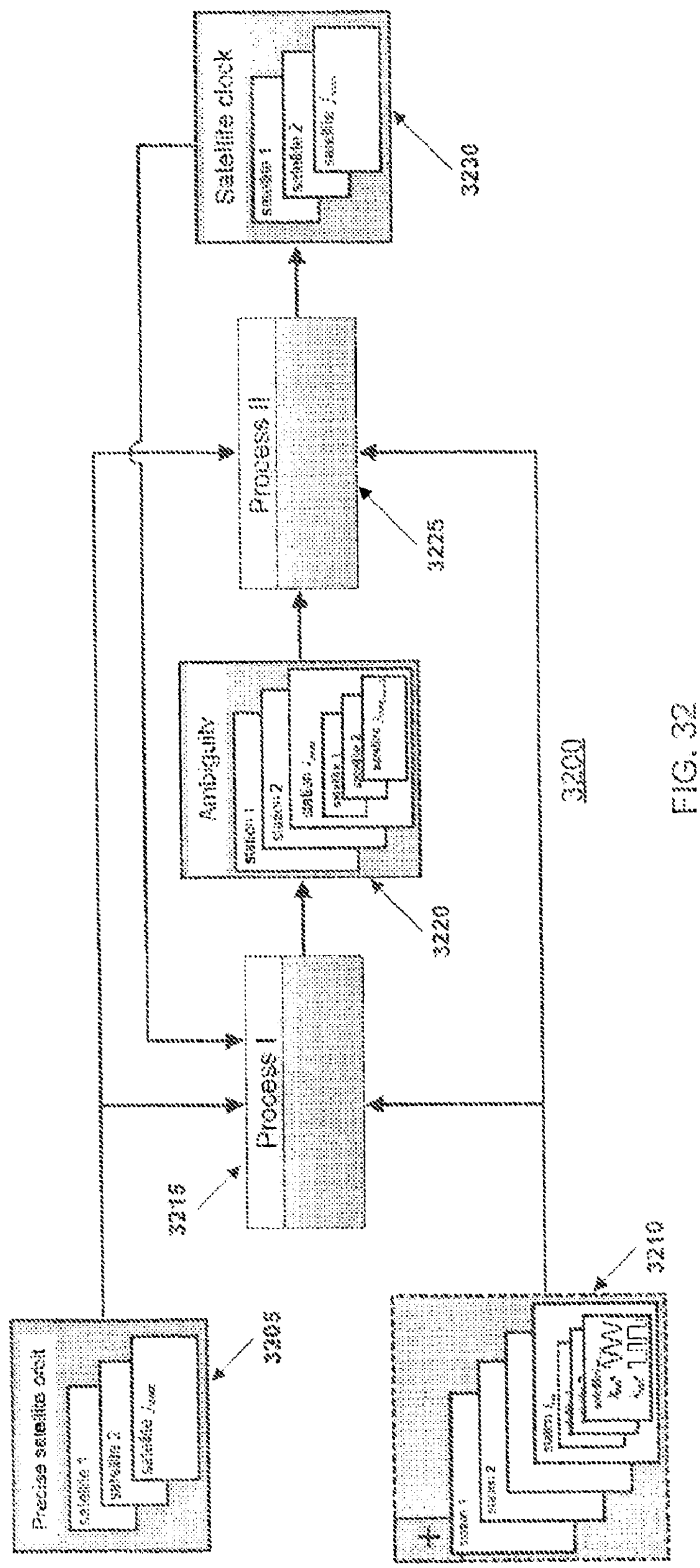
Figure 33:
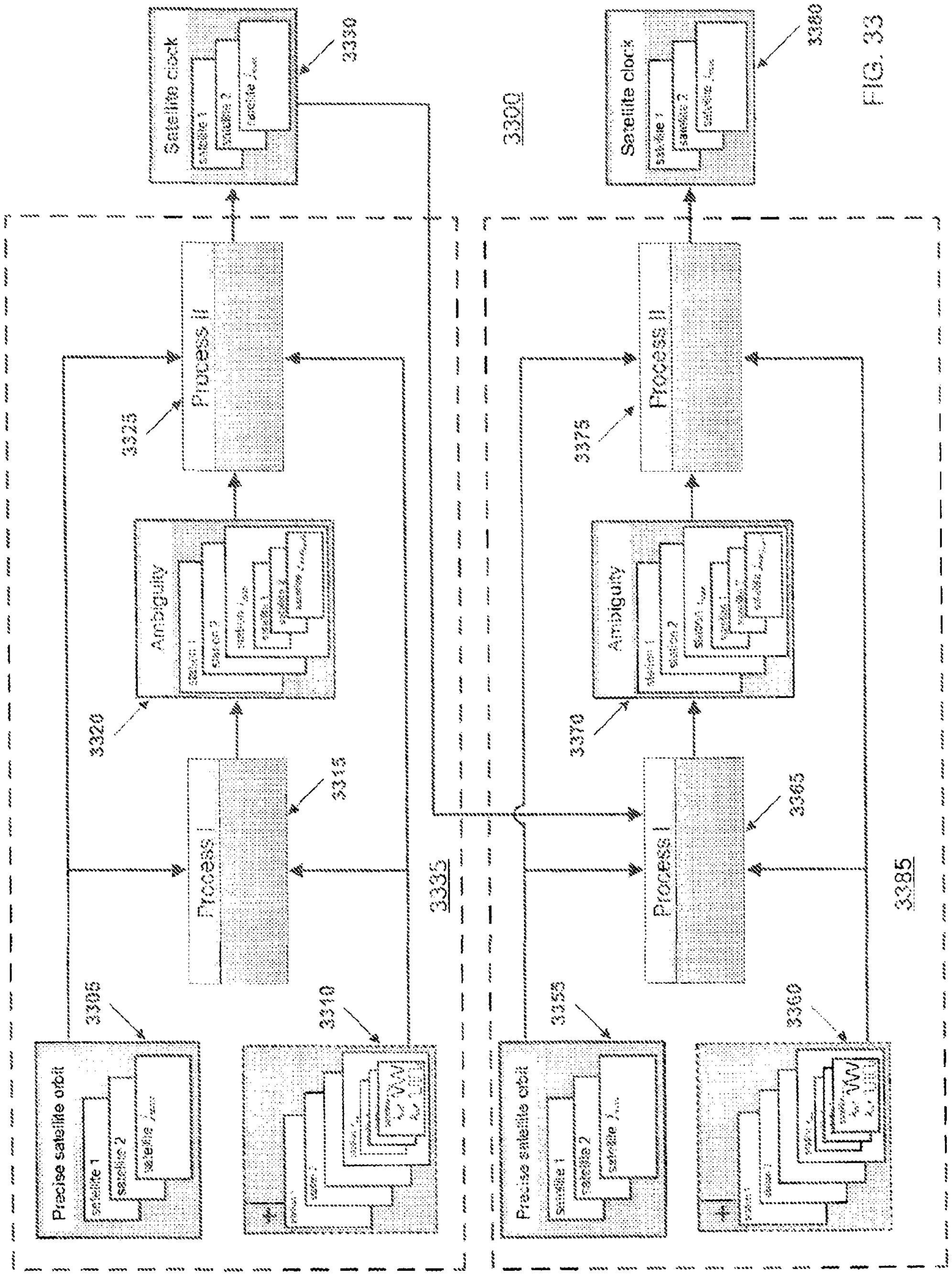
Figure 34:
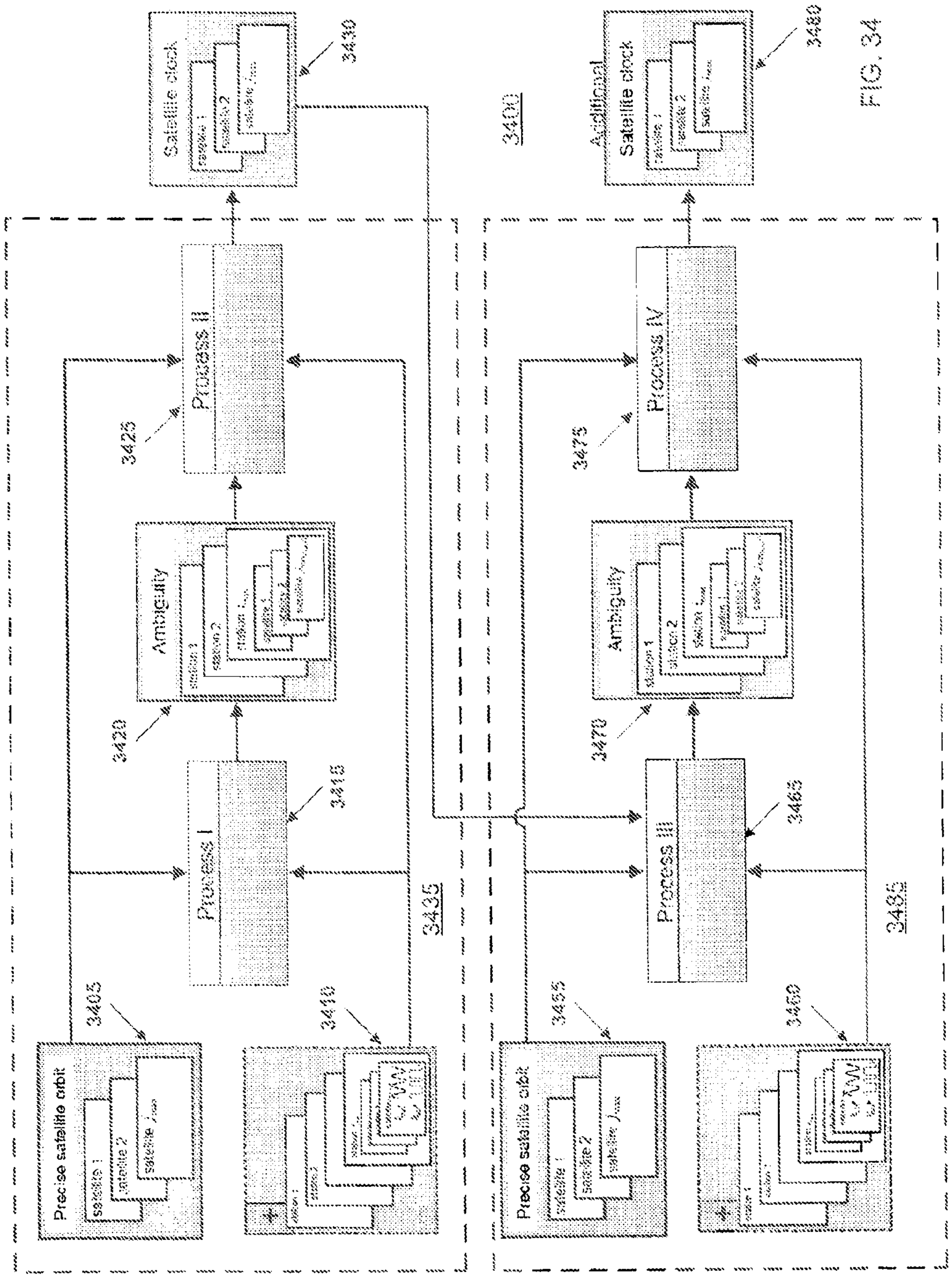
Figure 36:
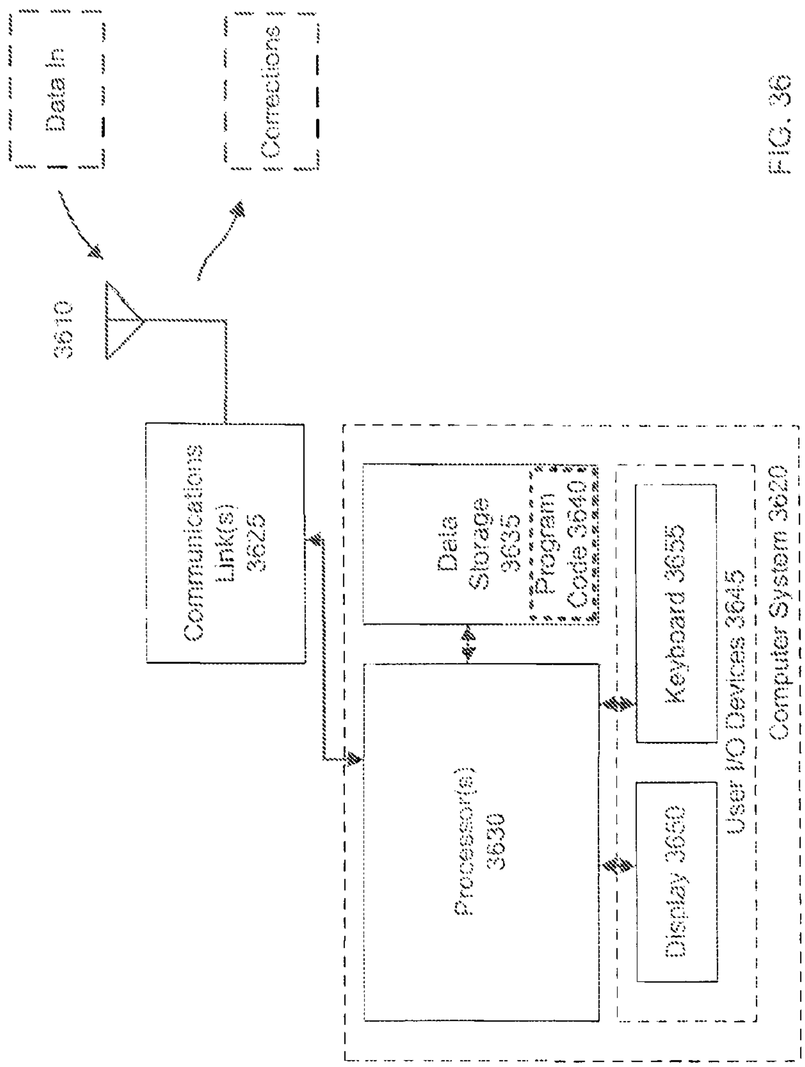
Figure 37:
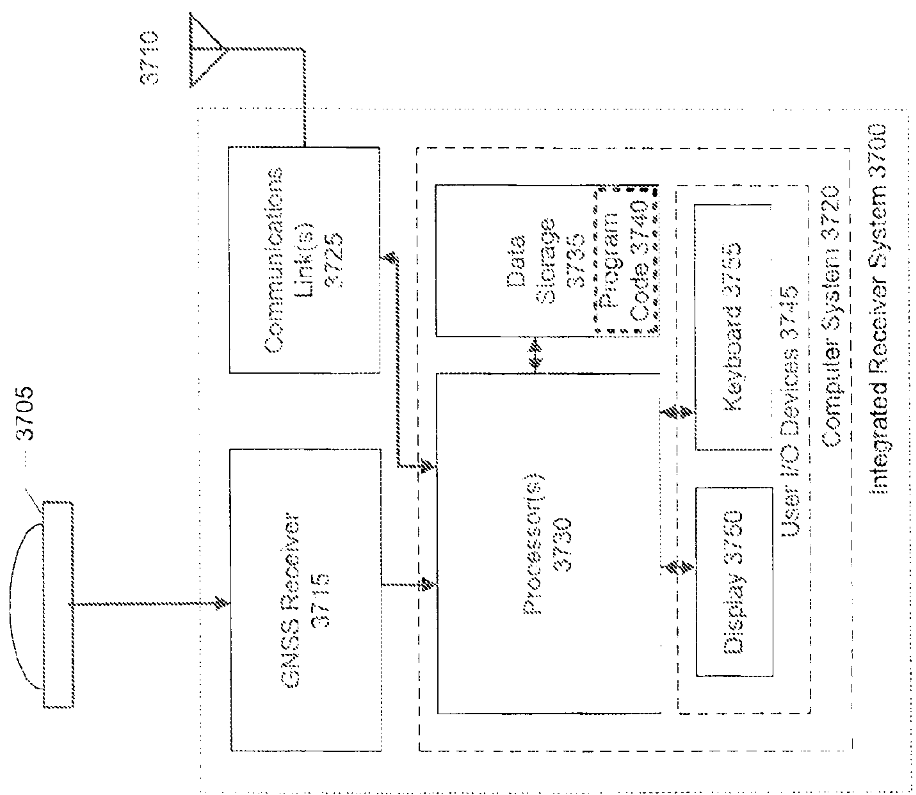
Figure 3B:
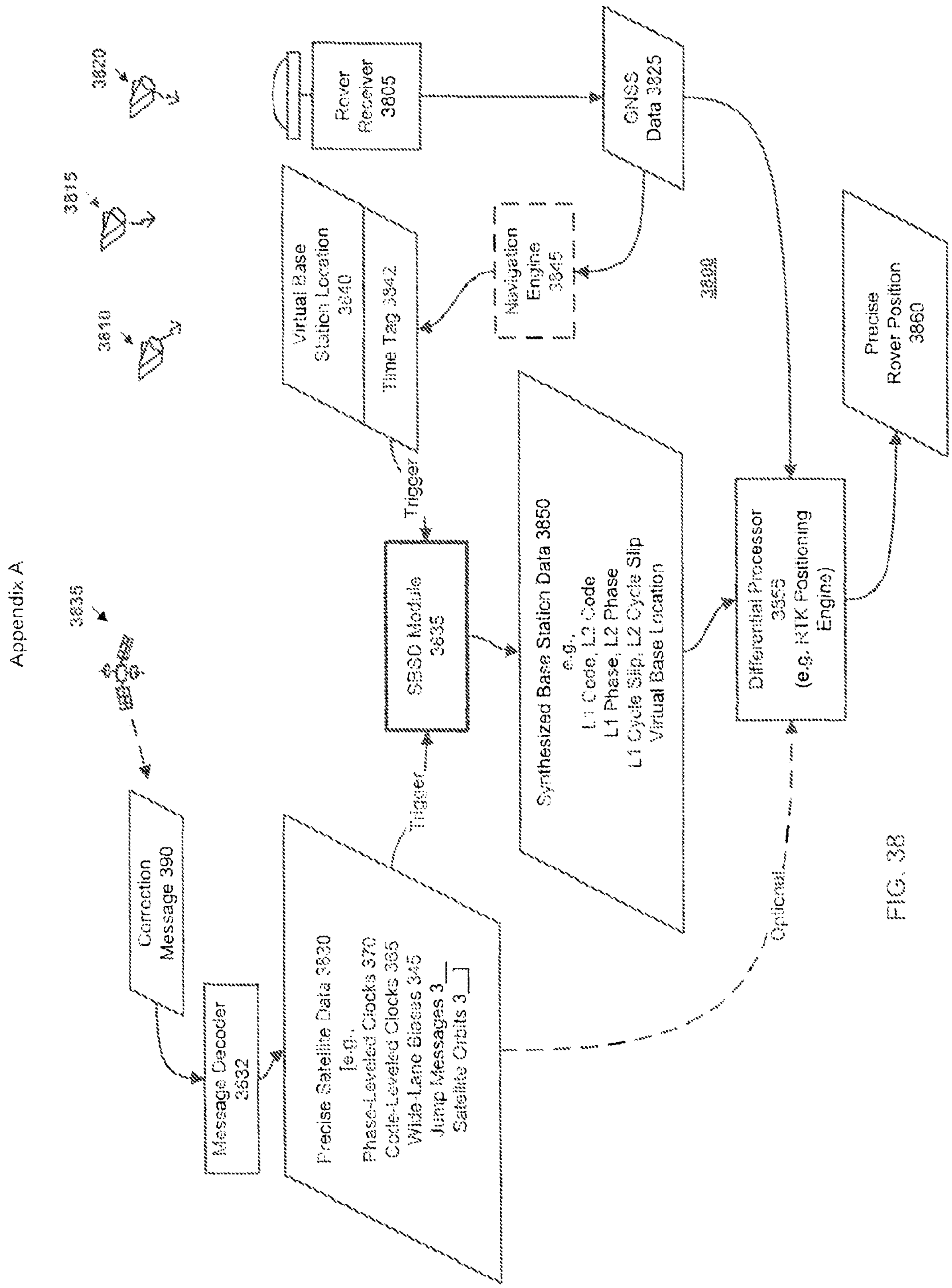
Figure 39:
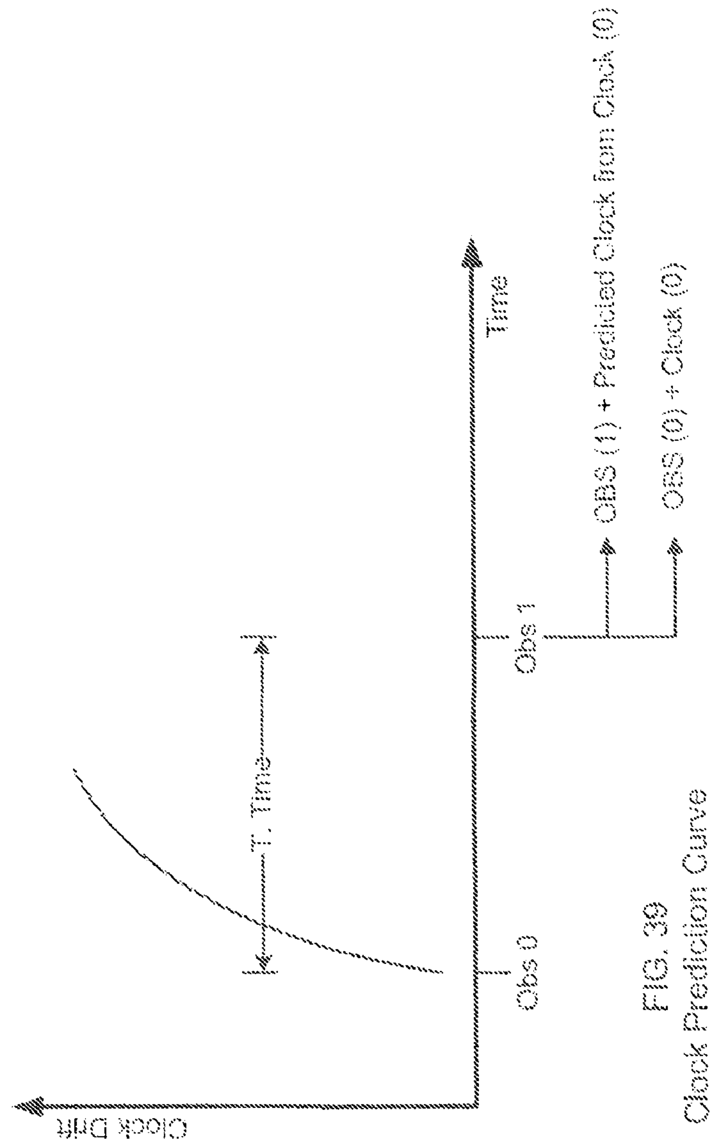
Figure 40:
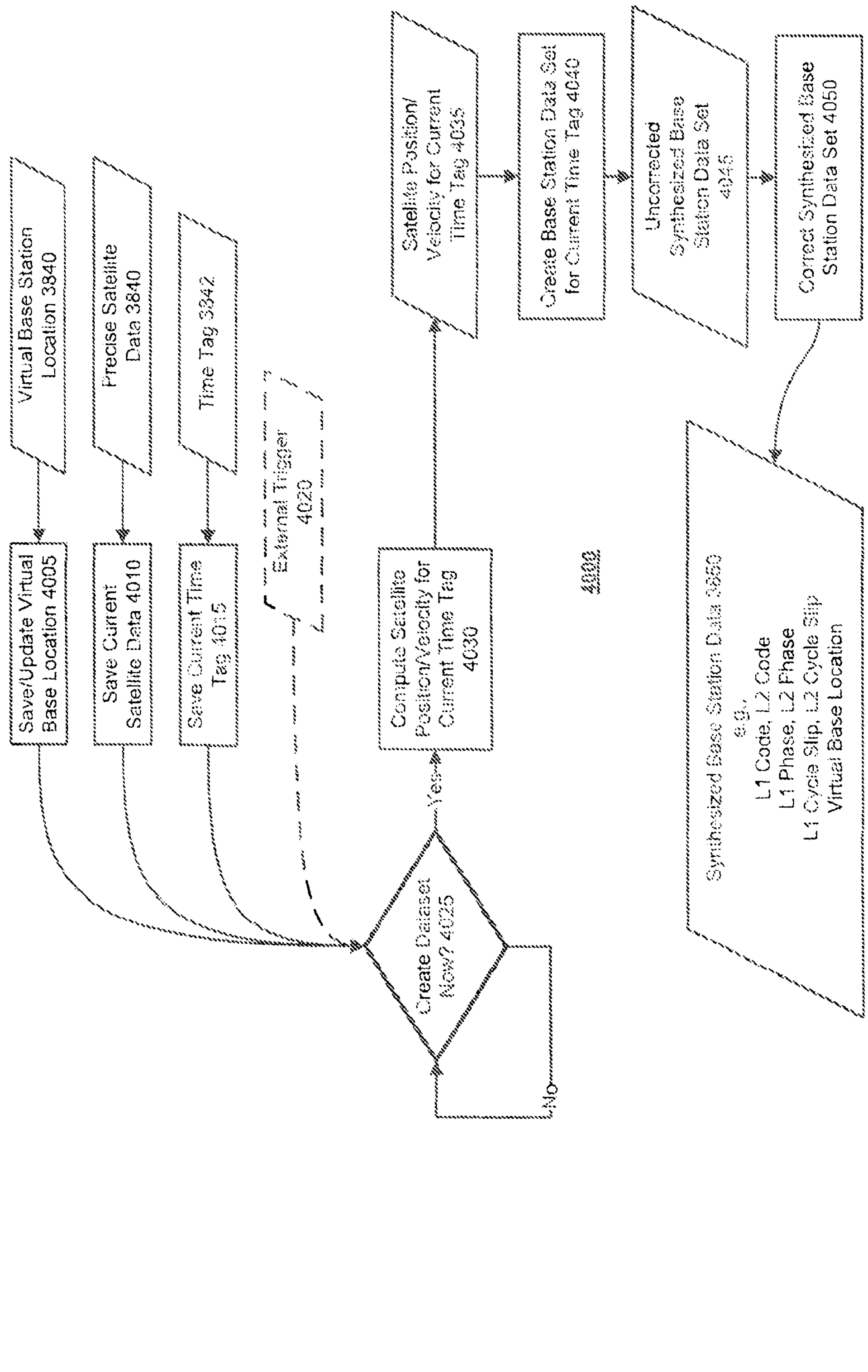
Figure 42:
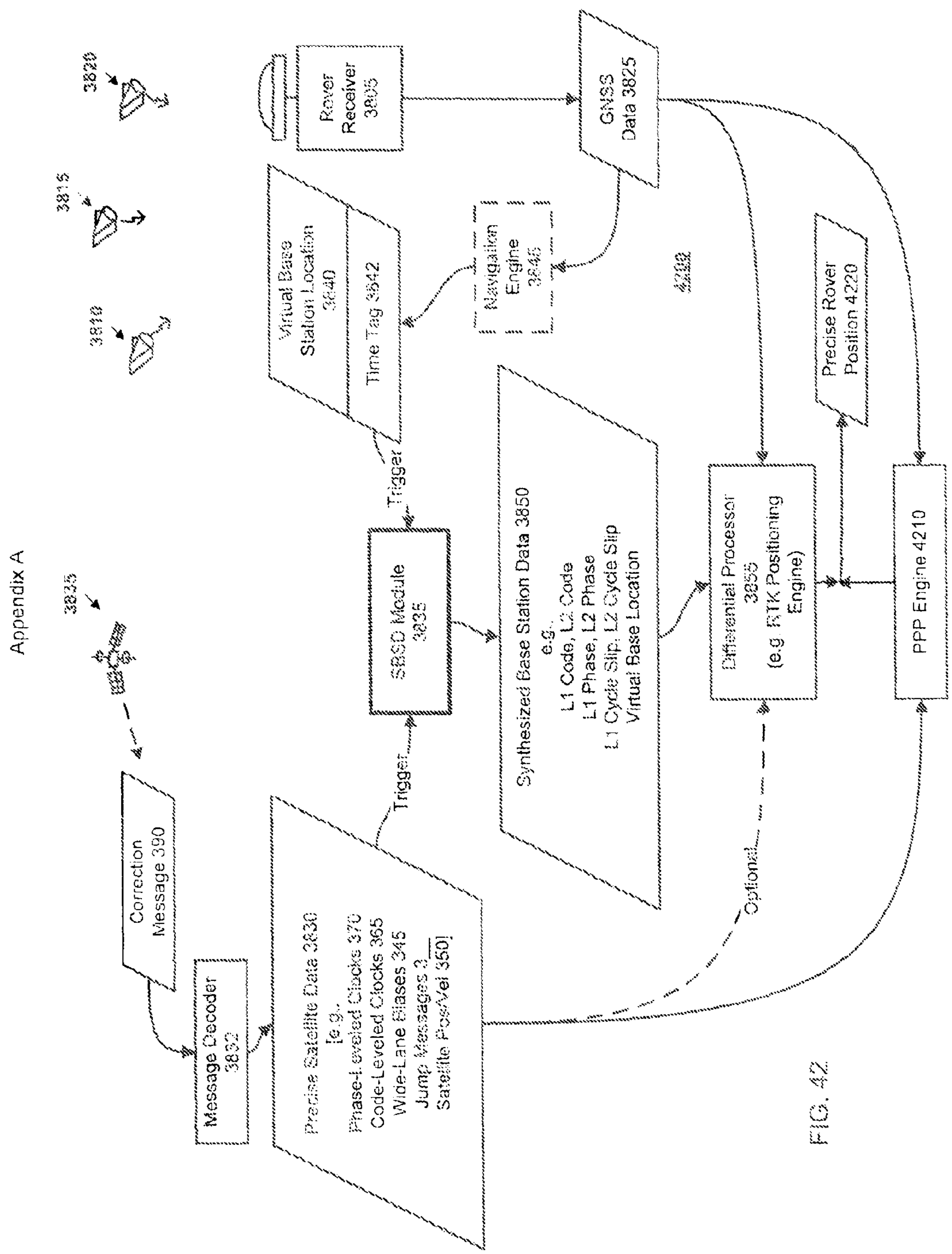
Figure 43:
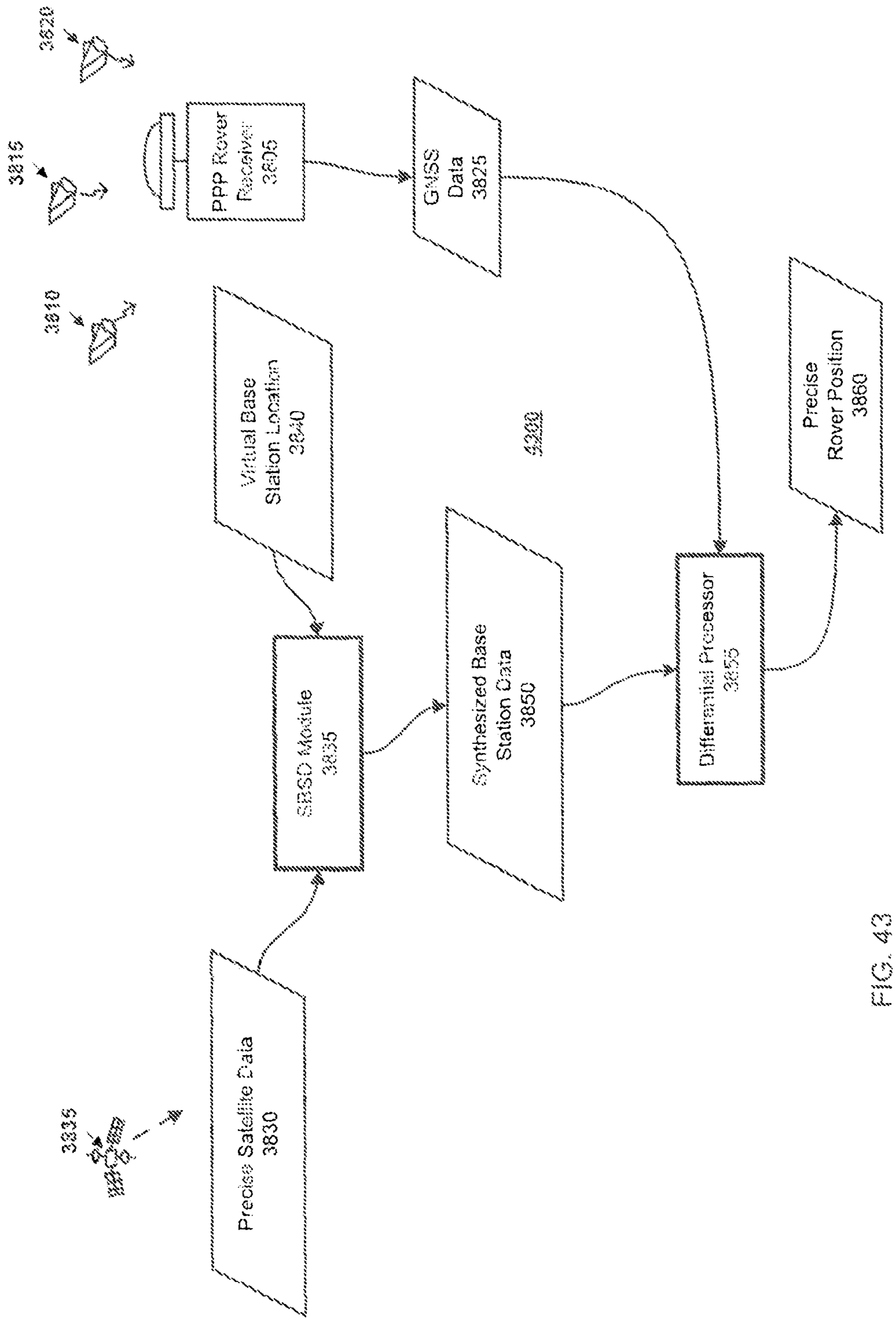
Figure 44:
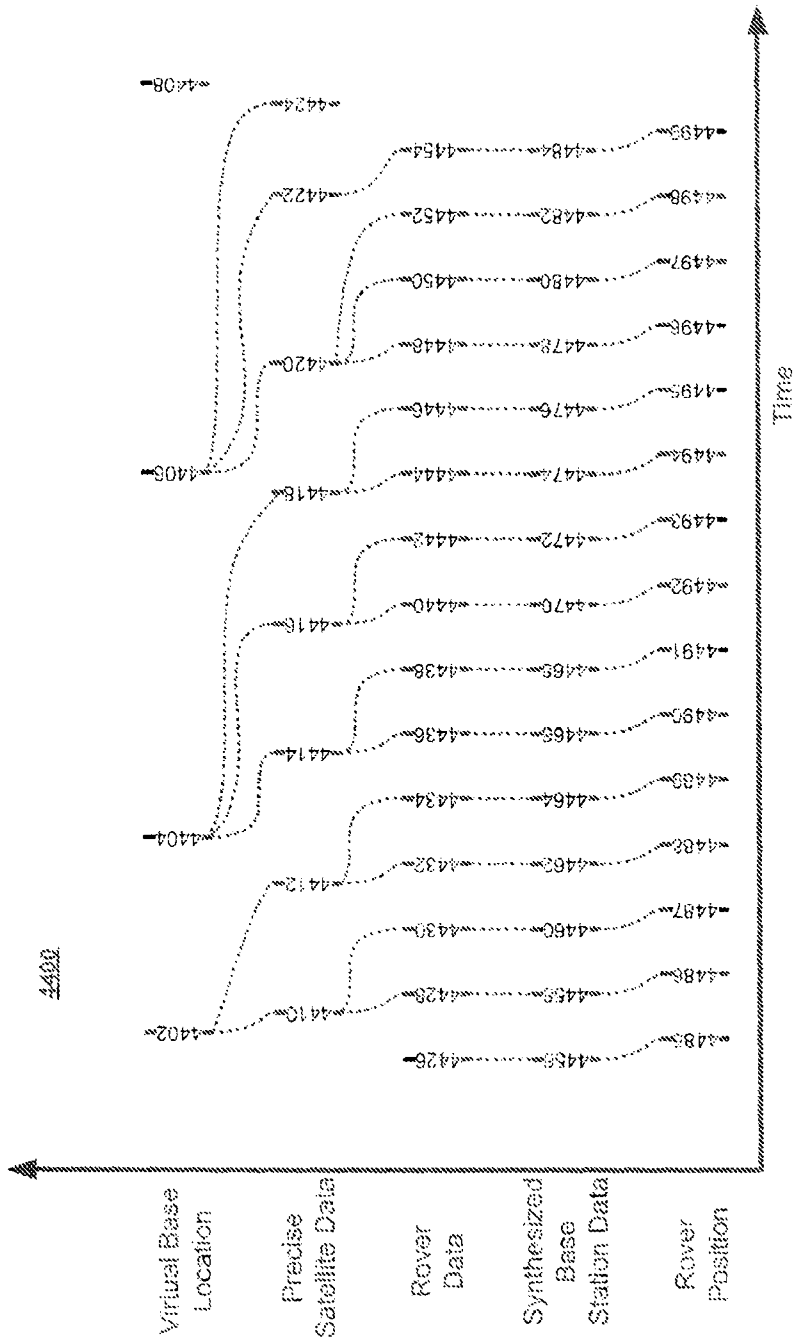
Figure 45:
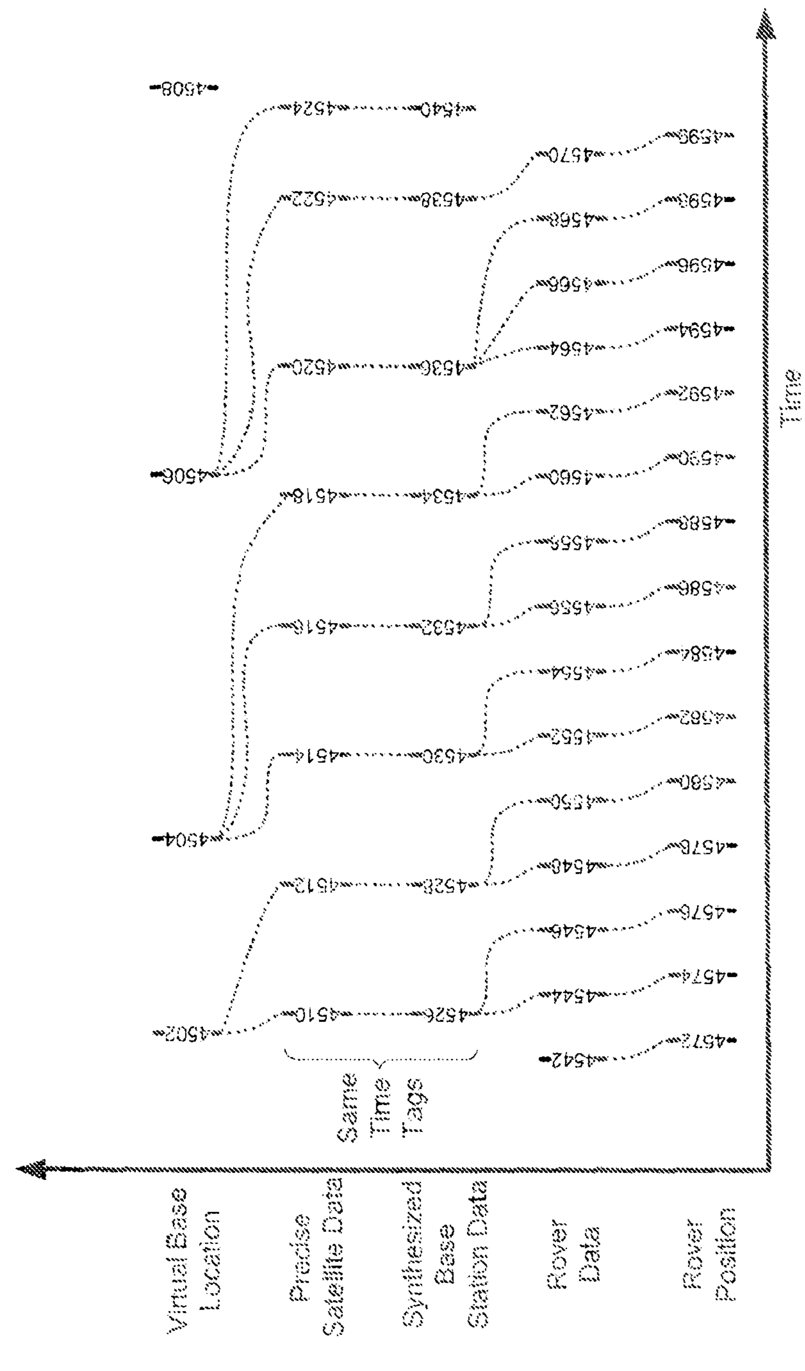
Figure 46:
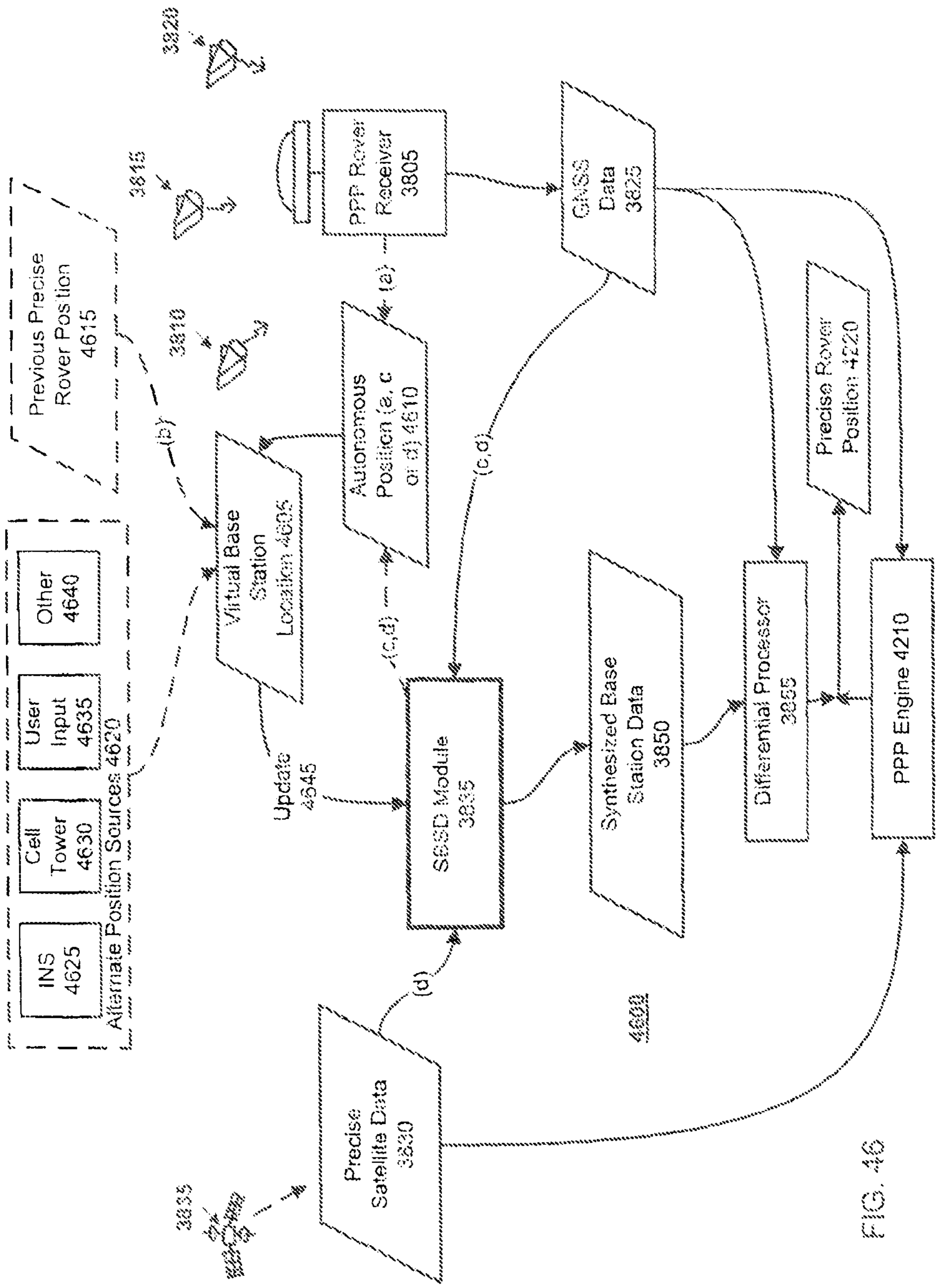
Figure 47:
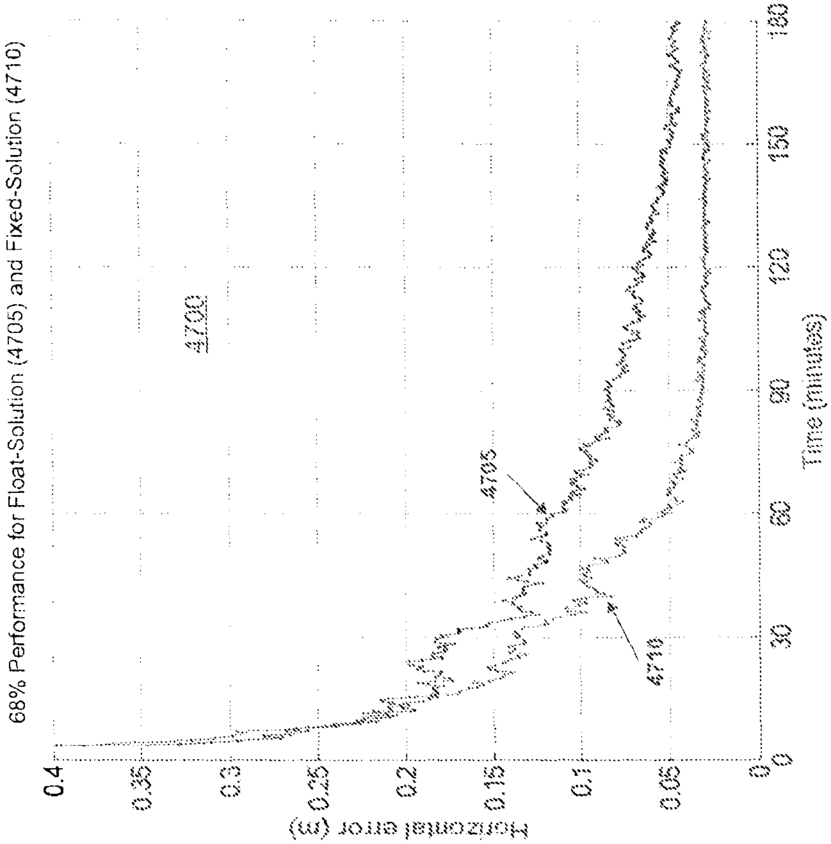

FIG. 31 is a schematic diagram of a high-rate phase-leveled satellite clock processor in accordance with some embodiments of the invention;

FIG. 32 is a schematic diagram of a high-rate phase-leveled satellite clock processor in accordance with some embodiments of the invention;

FIG. 33 is a schematic diagram of a high-rate phase-leveled satellite clock processor in accordance with some embodiments of the invention;

FIG. 34 is a schematic diagram of a high-rate phase-leveled satellite clock processor in accordance with some embodiments of the invention;

FIG. 35 is blank;

FIG. 36 is a schematic diagram of a network processor computer system in accordance with some embodiments of the invention;

FIG. 37 is a simplified schematic diagram of an integrated GNSS receiver system in accordance with some embodiments of the invention;

FIG. 38 is a schematic diagram of a GNSS rover process with synthesized base station data in accordance with some embodiments of the invention;

FIG. 39 depicts observation clock prediction in accordance with some embodiments of the invention;

FIG. 40 is a schematic diagram of a process for generating synthesized base station data in accordance with some embodiments of the invention;

FIG. 41 is blank;

FIG. 42 is a schematic diagram of an alternate GNSS rover process with synthesized base station data in accordance with some embodiments of the invention;

FIG. 43 is a simplified schematic diagram of a GNSS rover process with synthesized base station data in accordance with some embodiments of the invention;

FIG. 44 is a timing diagram of a low-latency GNSS rover process with synthesized base station data in accordance with some embodiments of the invention;

FIG. 45 is a timing diagram of a high-accuracy GNSS rover process with synthesized base station data in accordance with some embodiments of the invention;

FIG. 46 is a schematic diagram of an alternate GNSS rover process with synthesized base station data in accordance with some embodiments of the invention;

FIG. 47 depicts performance of a GNSS rover process with ambiguity fixing in accordance with some embodiments of the invention in relation to a GNSS rover process without ambiguity fixing;

Appendix A
PROVISIONAL APPLICATION FOR UNITED STATES PATENT

Figure 48:
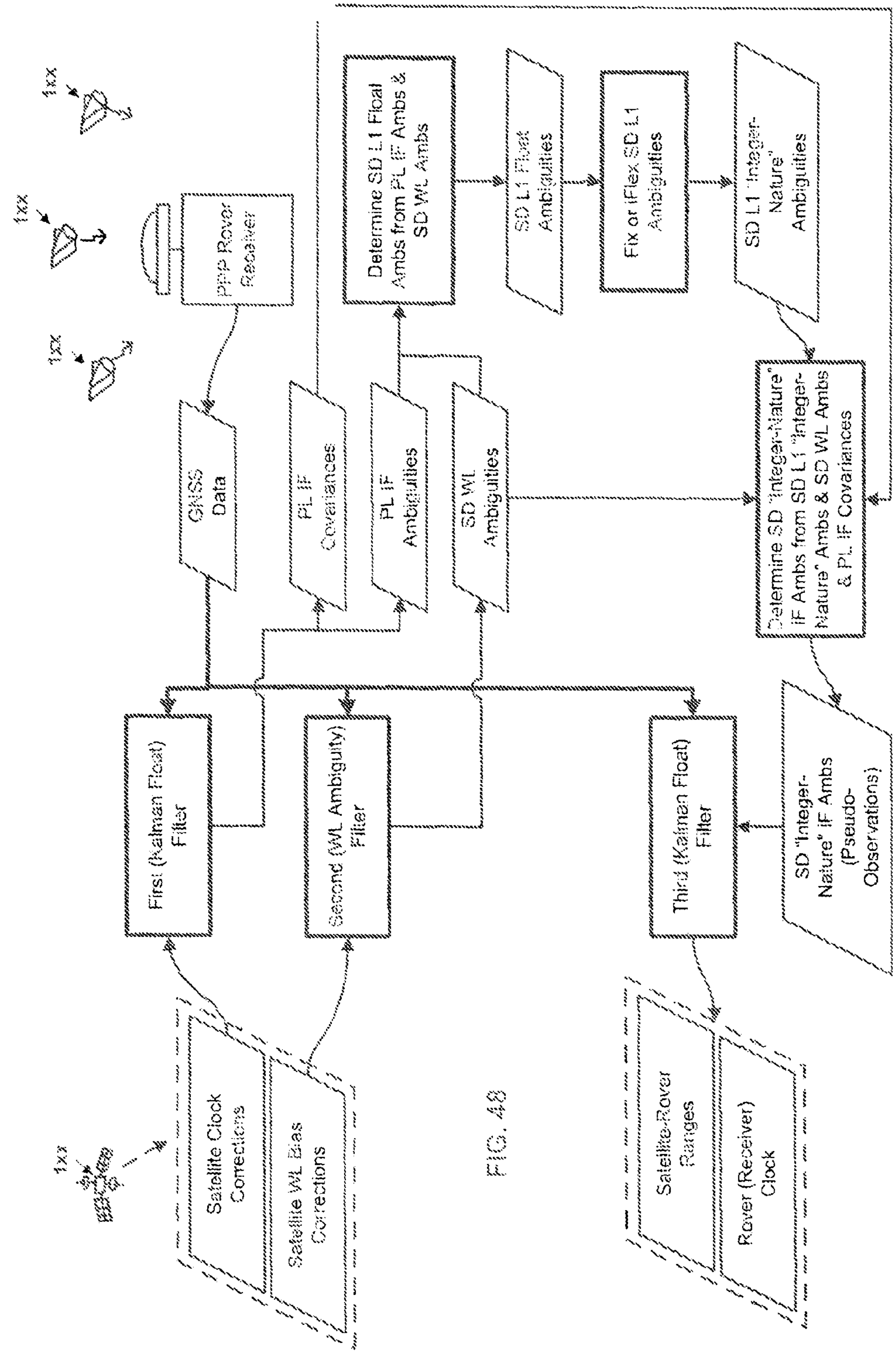
Figure 49:
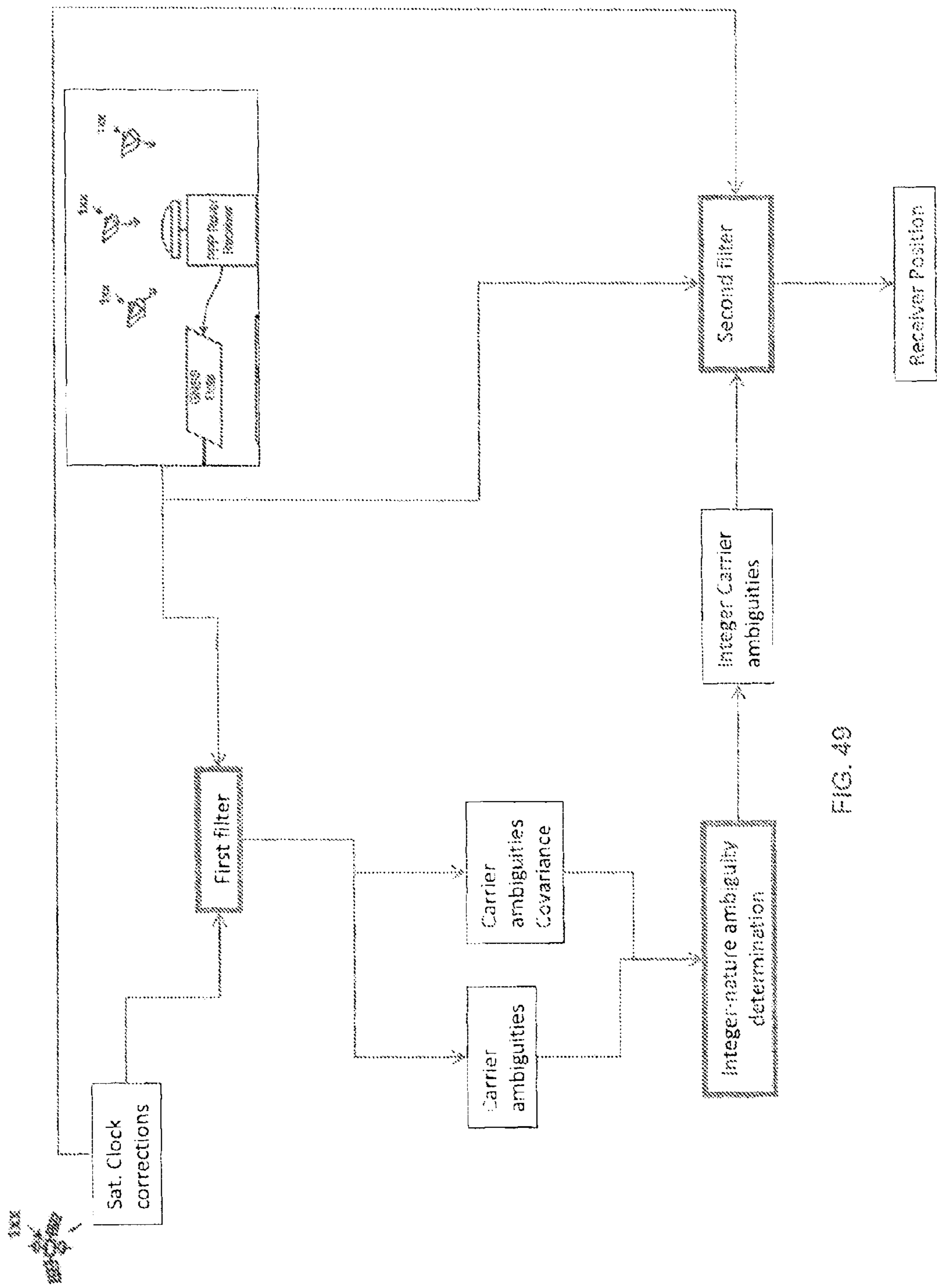
Figure 50:
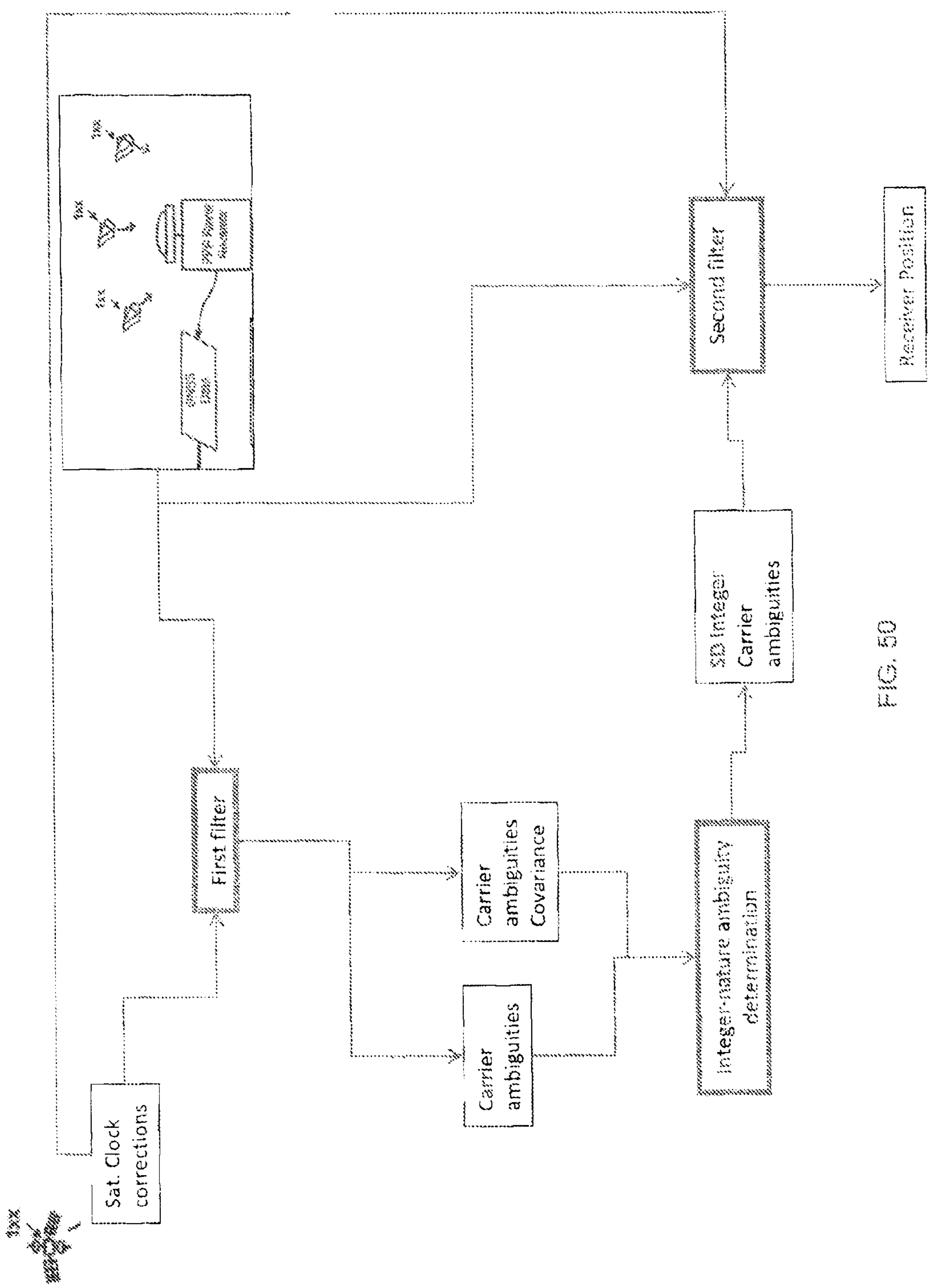
Figure 51:
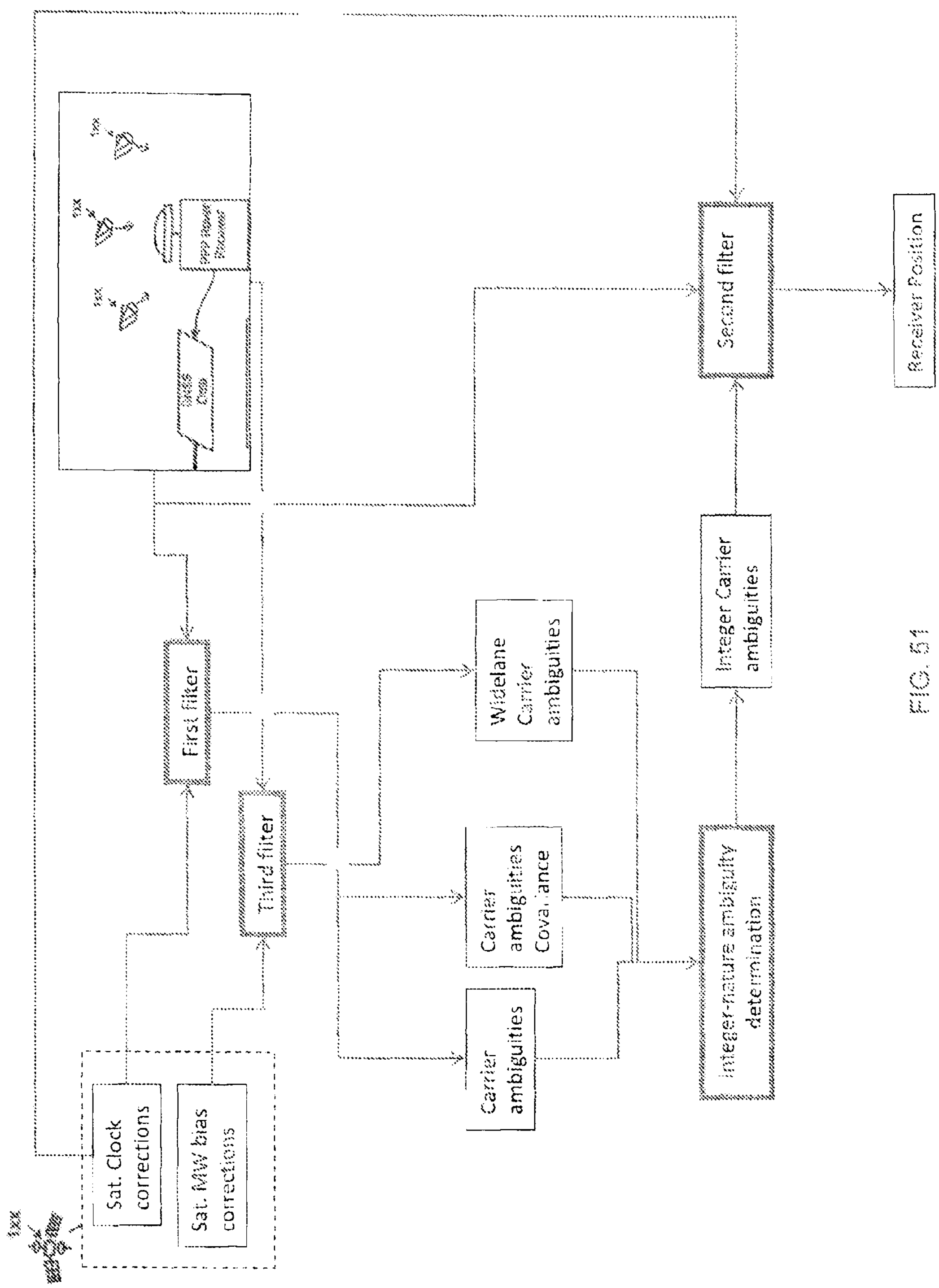
Figure 52:
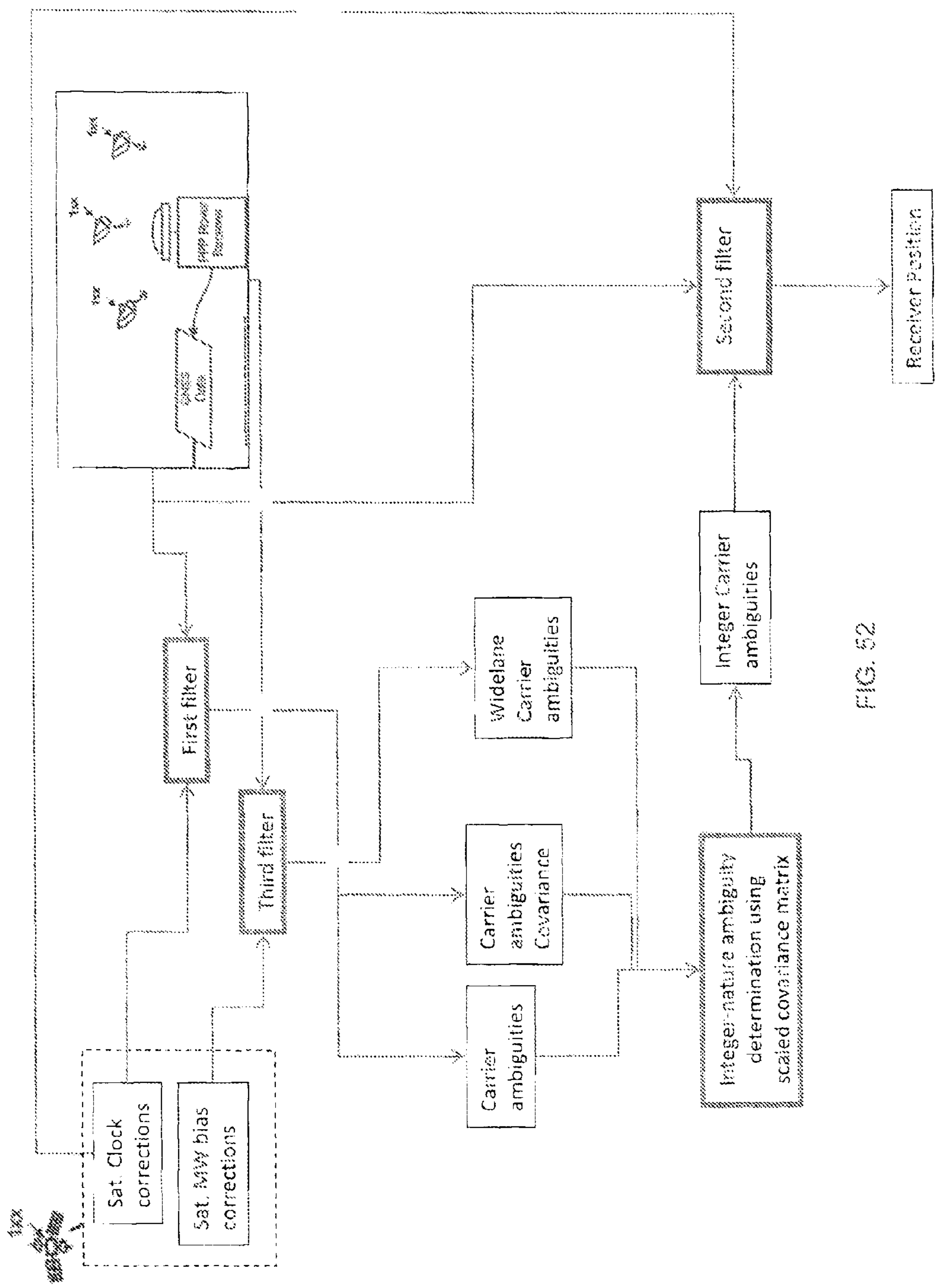
Figure 53:
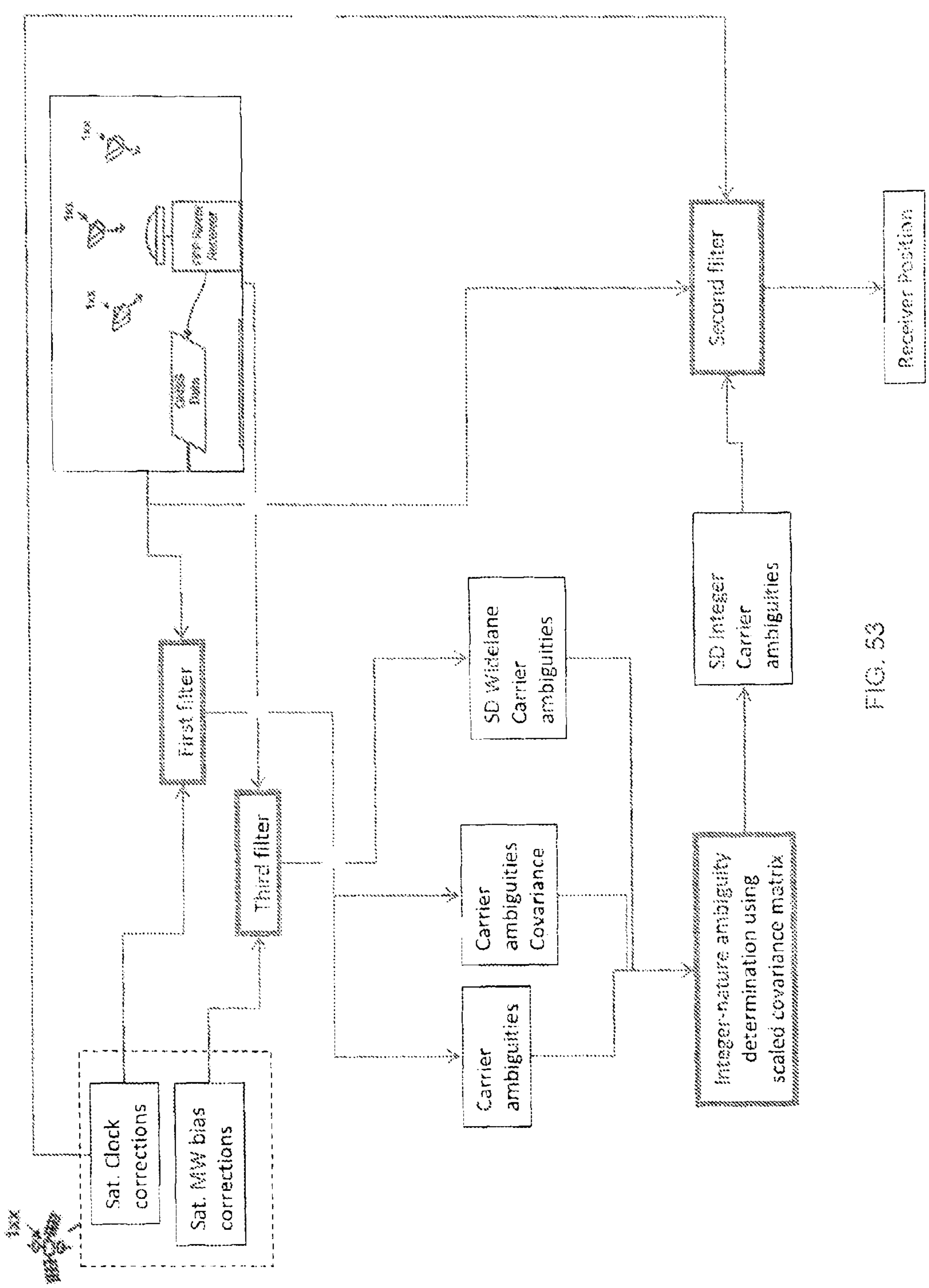
Figure 54:
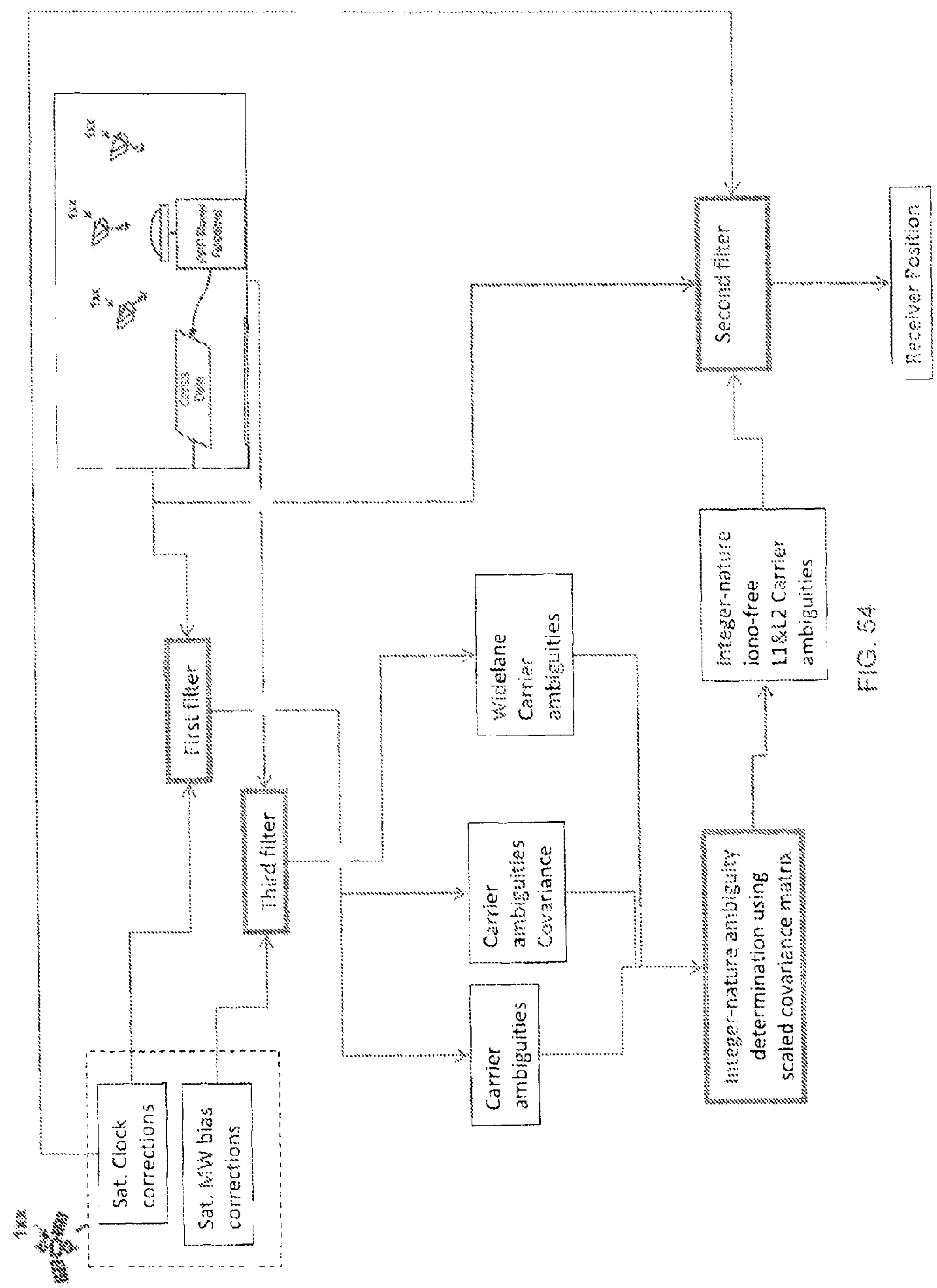
Figure 55:
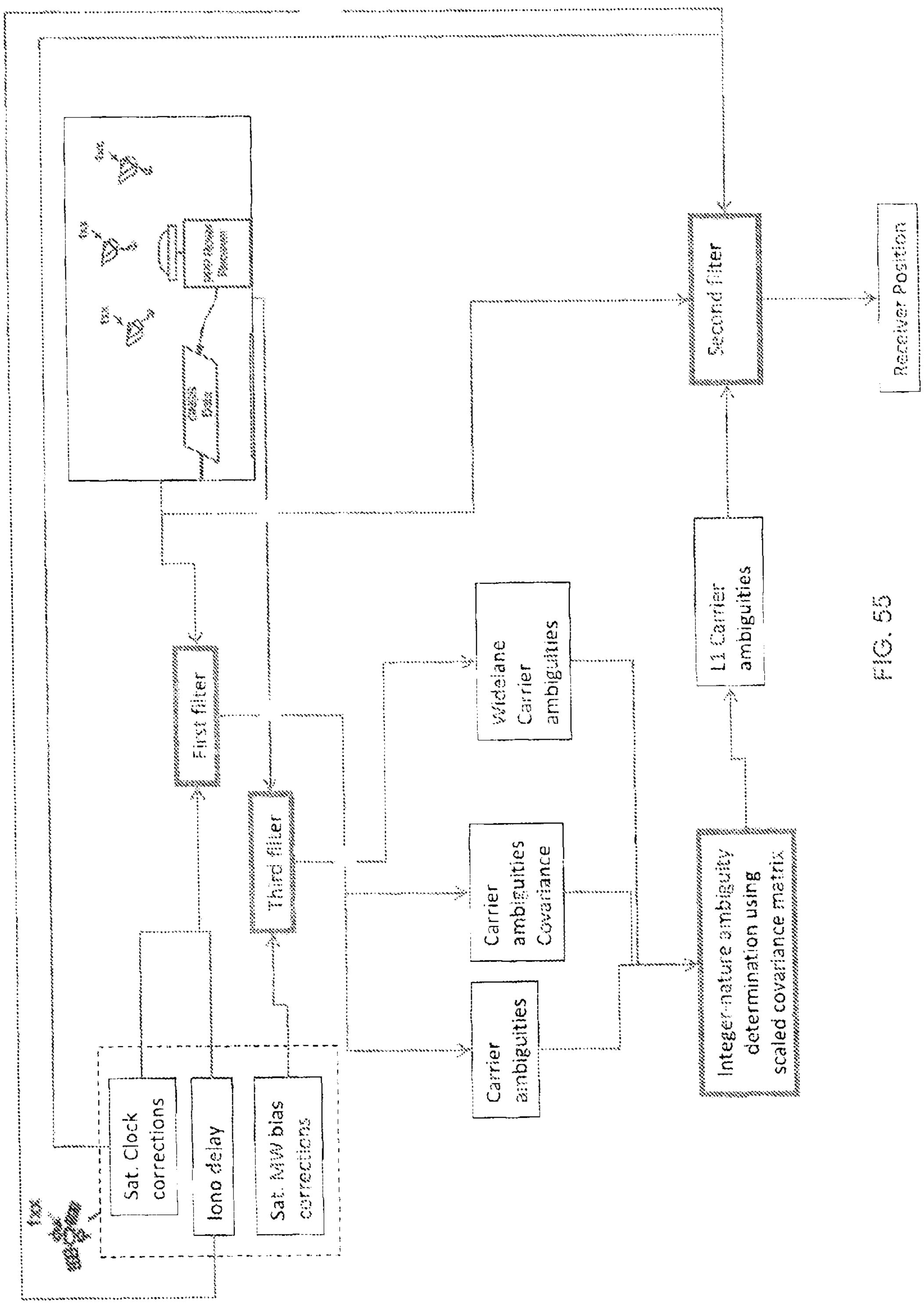
Figure 56:
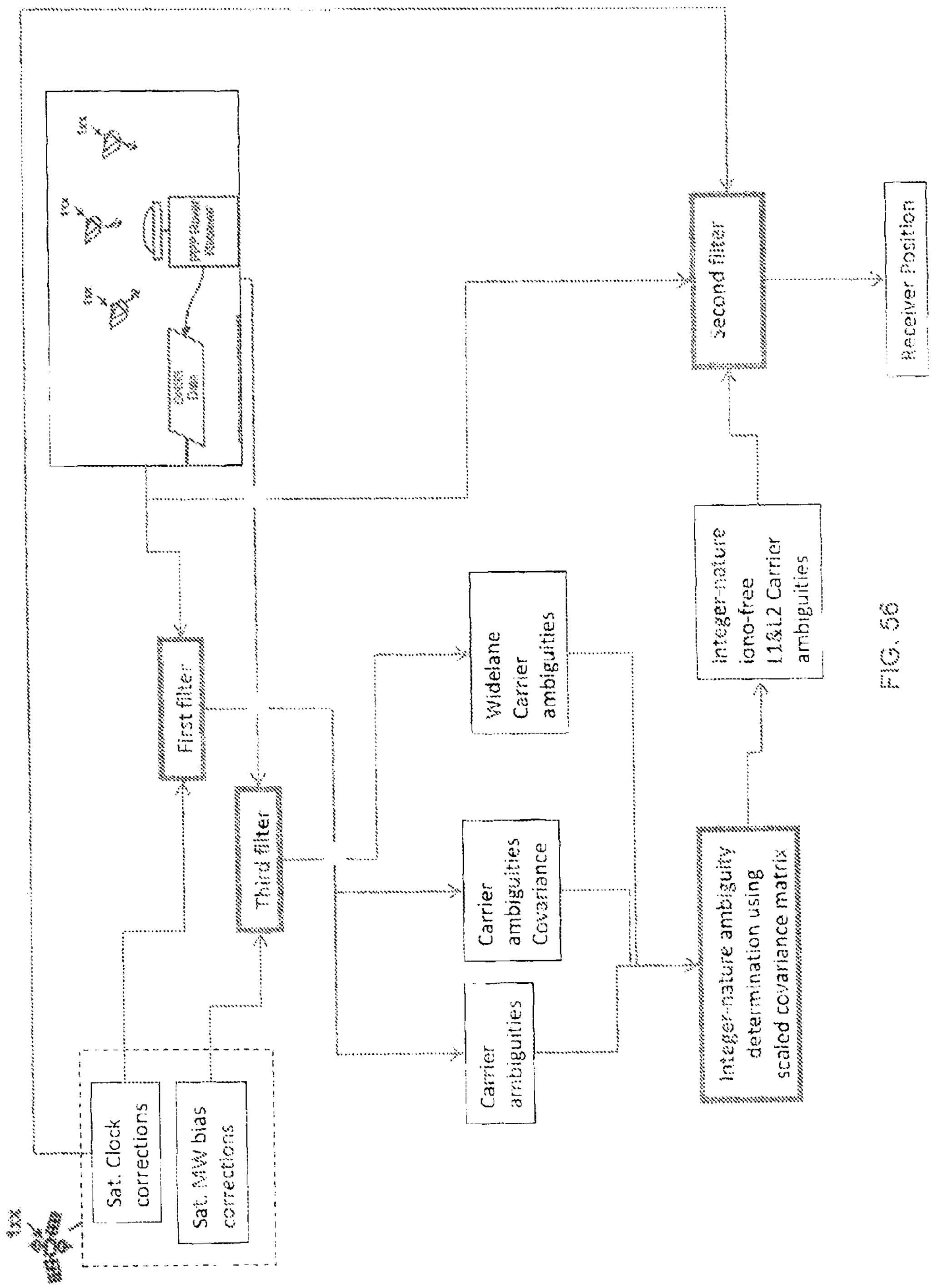
Figure 57:
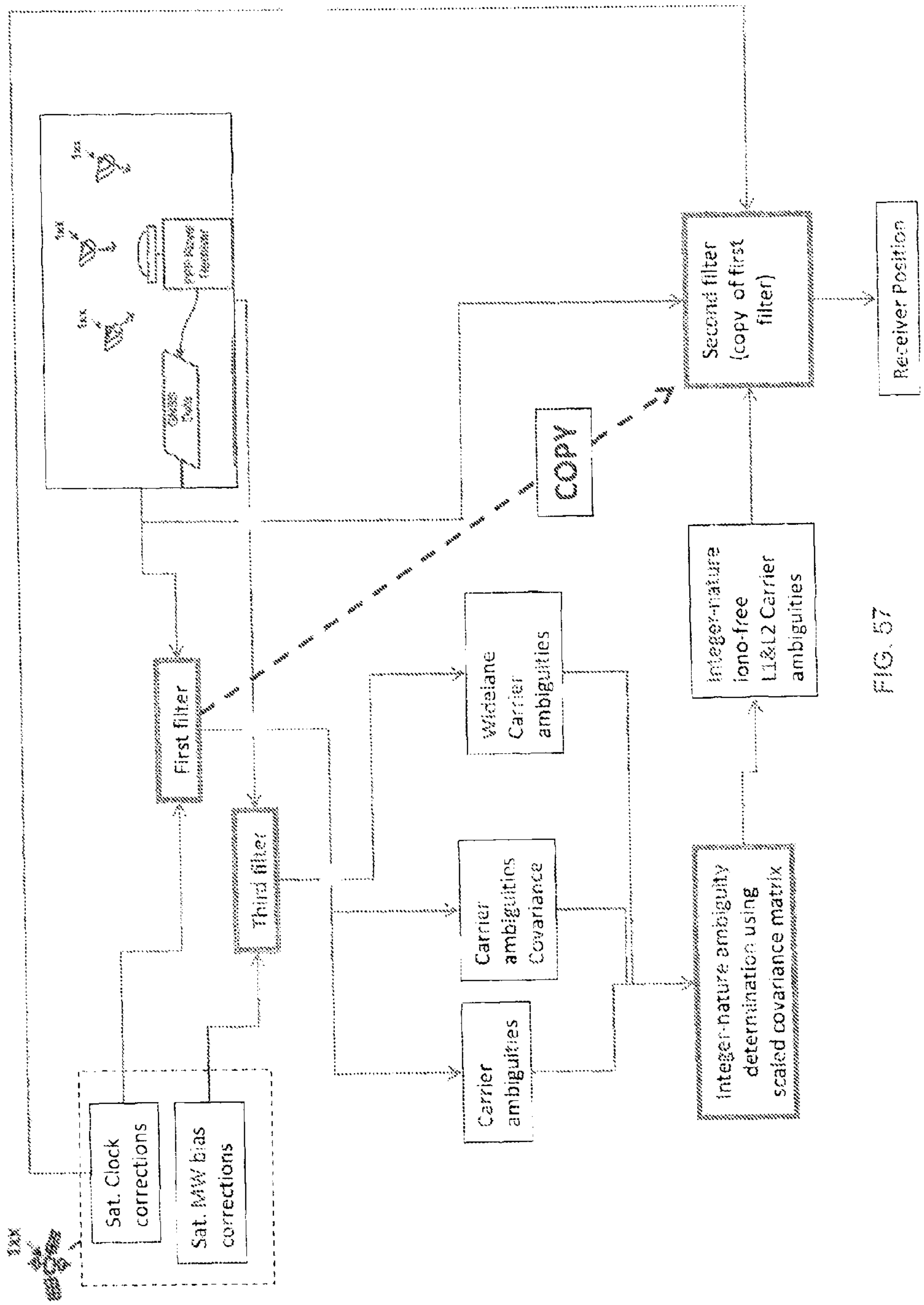
Figure 58:
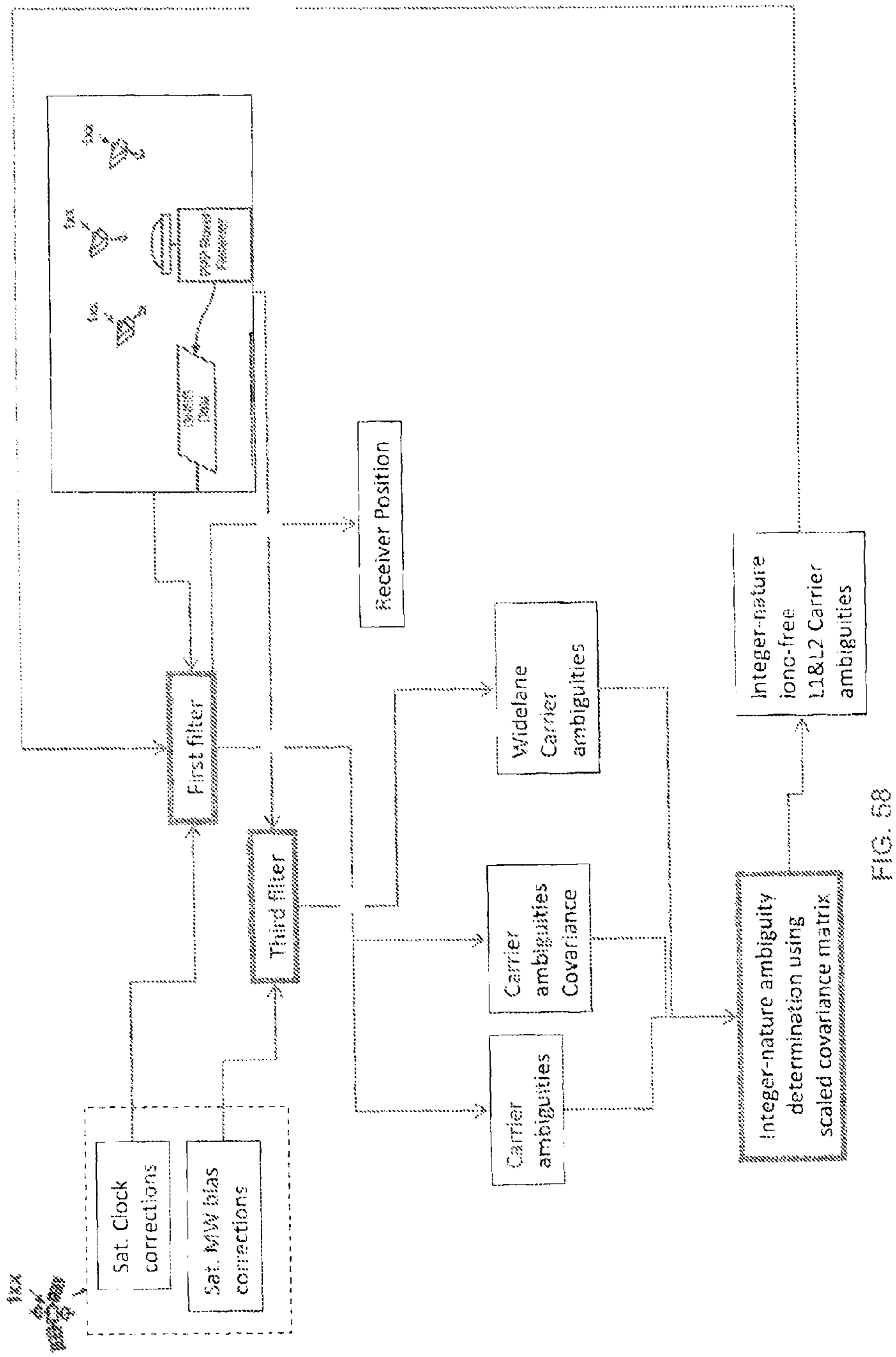
Figure 59:
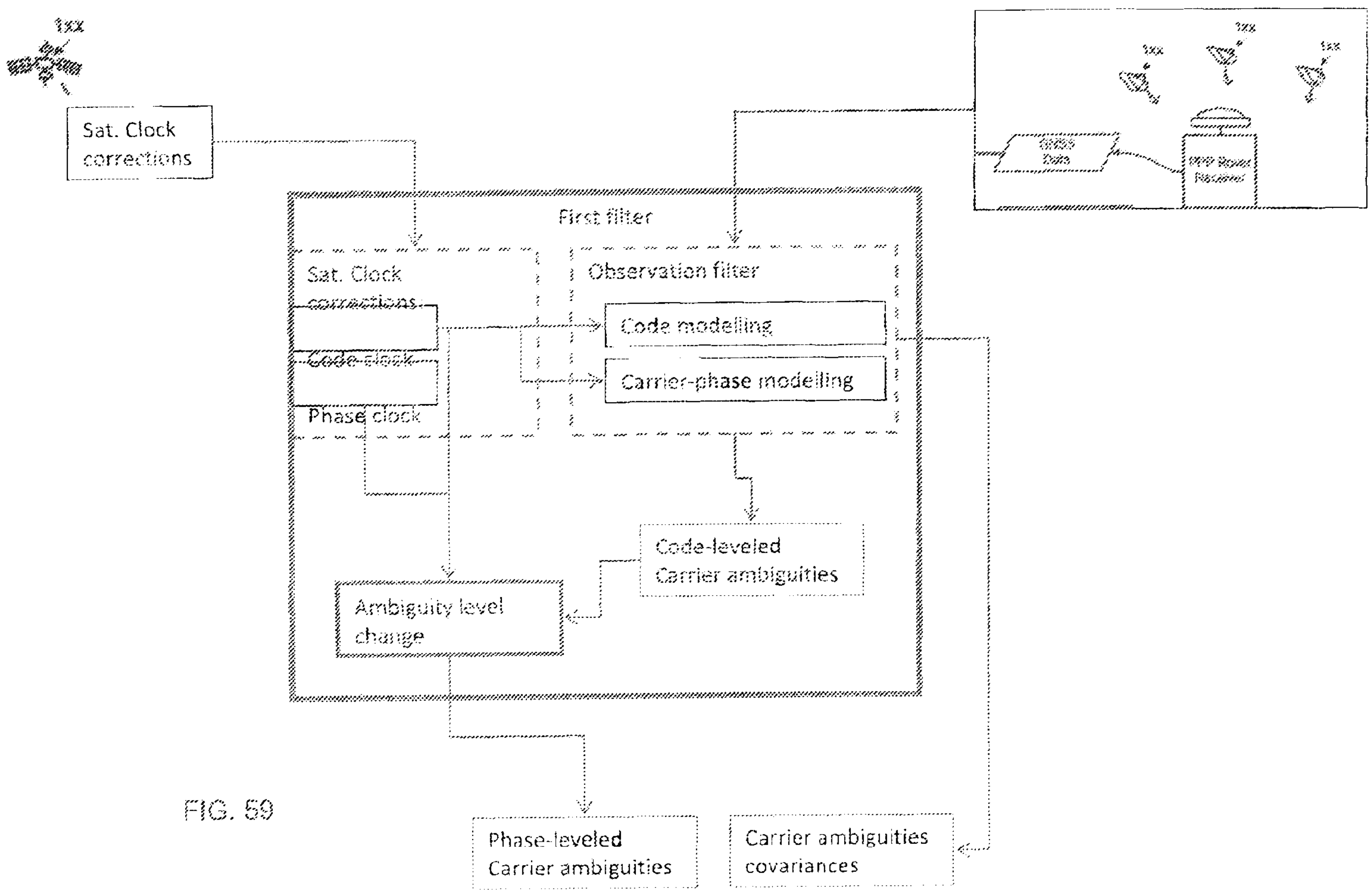
Figure 60:
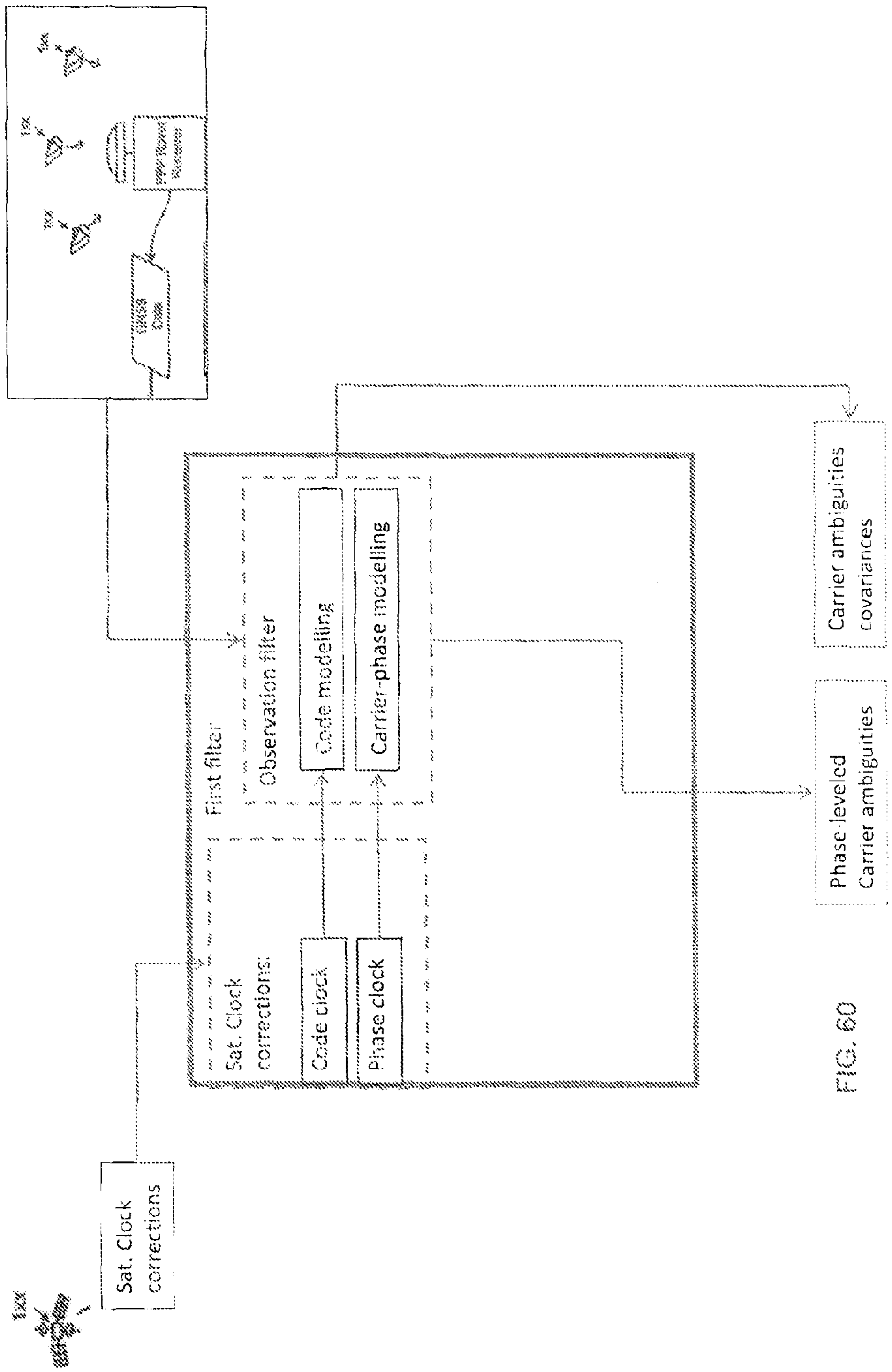
Figure 61:
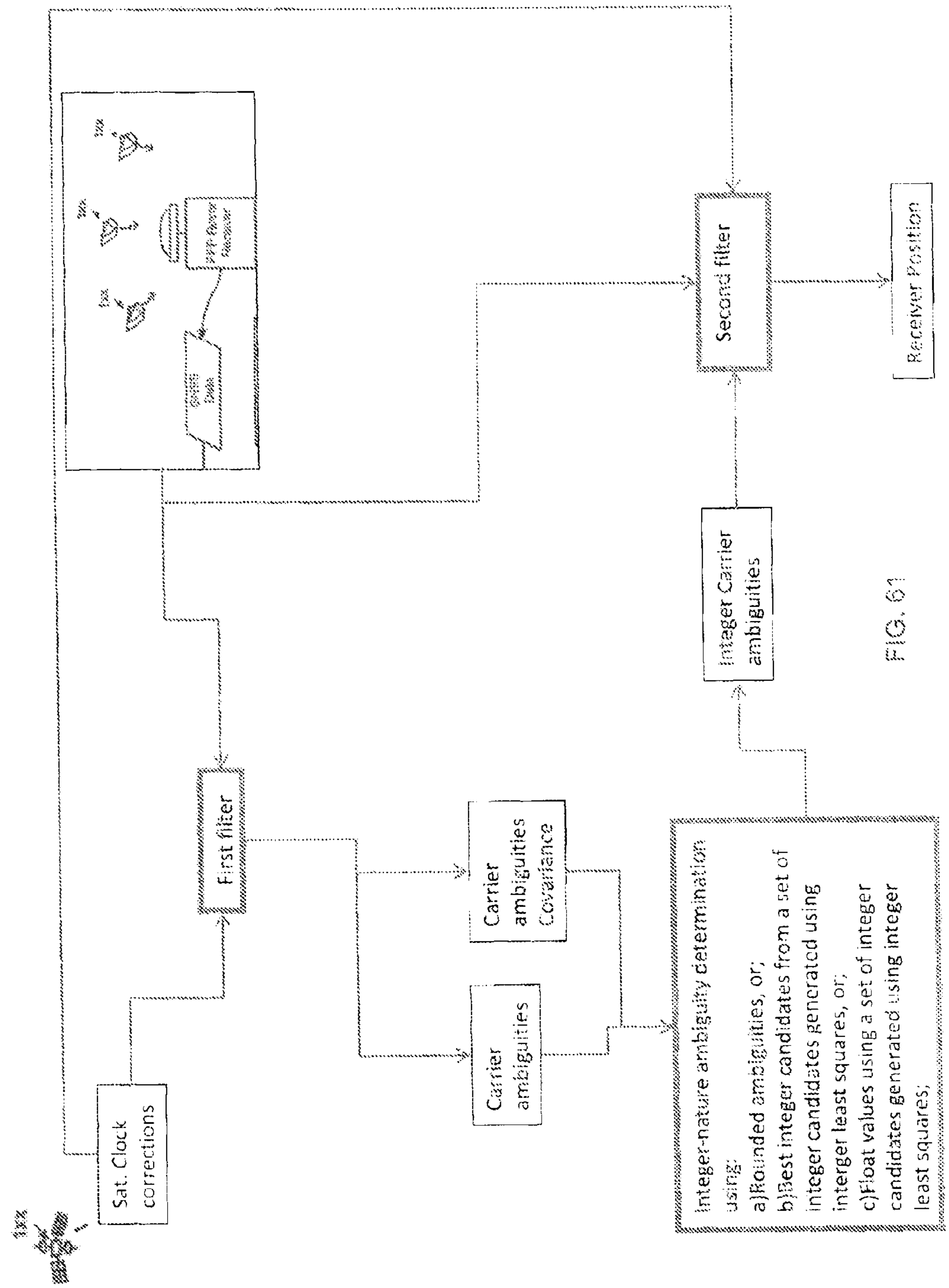
Figure 62:
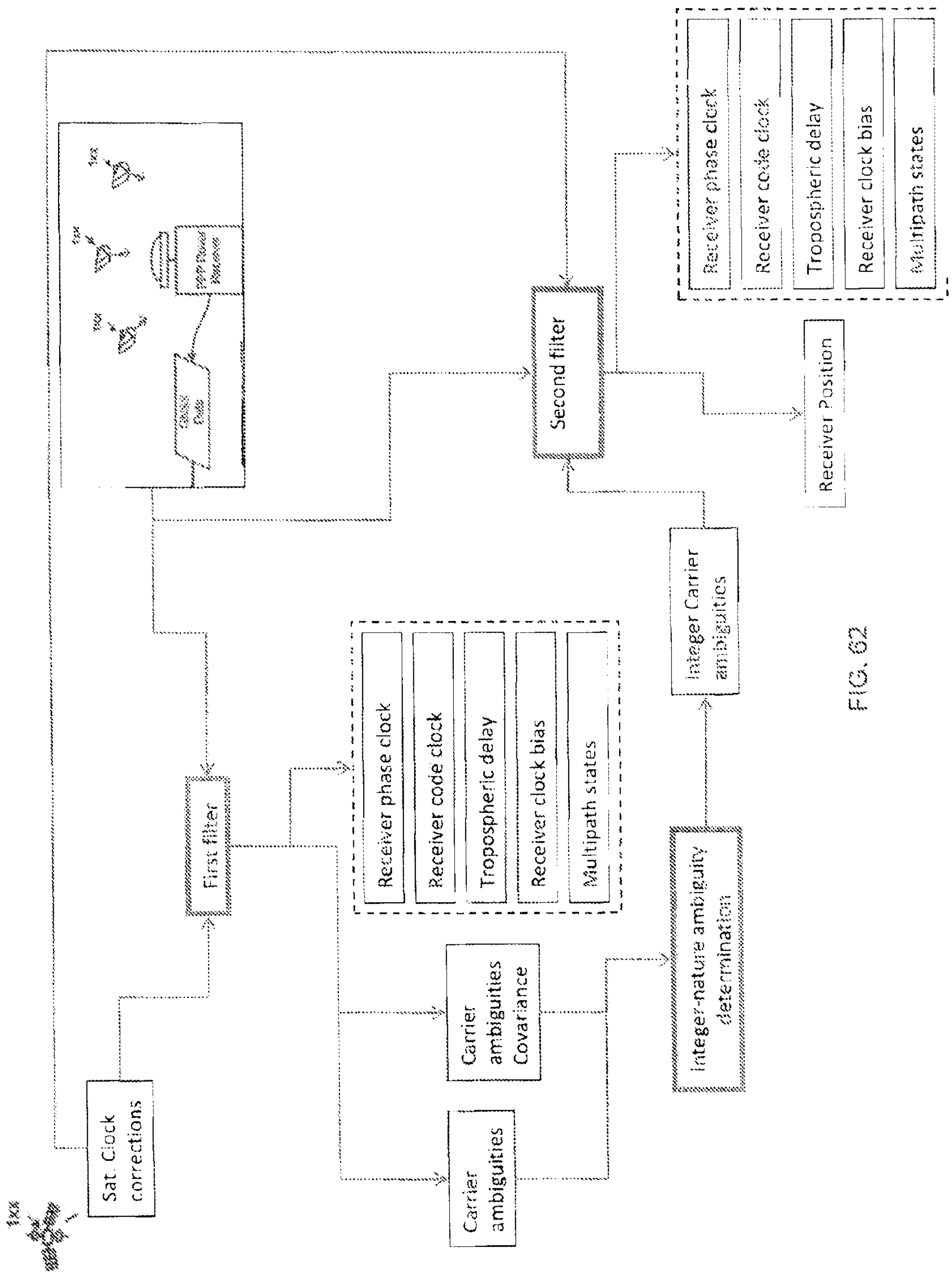

FIG. 48 is a schematic diagram of a GNSS rover process with ambiguity fixing in accordance with some embodiments of the invention;

FIG. 49 is a schematic diagram of a GNSS rover process with ambiguity fixing in accordance with some embodiments of the invention;

FIG. 50 is a schematic diagram of a GNSS rover process with ambiguity fixing in accordance with some embodiments of the invention;

FIG. 51 is a schematic diagram of a GNSS rover process with ambiguity fixing in accordance with some embodiments of the invention;

FIG. 52 is a schematic diagram of a GNSS rover process with ambiguity fixing in accordance with some embodiments of the invention;

FIG. 53 is a schematic diagram of a GNSS rover process with ambiguity fixing in accordance with some embodiments of the invention;

FIG. 54 is a schematic diagram of a GNSS rover process with ambiguity fixing in accordance with some embodiments of the invention;

FIG. 55 is a schematic diagram of a GNSS rover process with ambiguity fixing in accordance with some embodiments of the invention;

FIG. 56 is a schematic diagram of a GNSS rover process with ambiguity fixing in accordance with some embodiments of the invention;

FIG. 57 is a schematic diagram of a GNSS rover process with ambiguity fixing in accordance with some embodiments of the invention;

FIG. 58 is a schematic diagram of a GNSS rover process with ambiguity fixing in accordance with some embodiments of the invention;

FIG. 59 is a schematic diagram of a GNSS rover process with ambiguity fixing in accordance with some embodiments of the invention;

FIG. 60 is a schematic diagram of a GNSS rover process with ambiguity fixing in accordance with some embodiments of the invention;

FIG. 61 is a schematic diagram of a GNSS rover process with ambiguity fixing in accordance with some embodiments of the invention; and FIG. 62 is a schematic diagram of a GNSS rover process with ambiguity fixing in accordance with some embodiments of the invention.

Appendix A
PROVISIONAL APPLICATION FOR UNITED STATES PATENT

DETAILED DESCRIPTION

Part 1: System Overview

GNSS include GPS, Galileo, Glonass, Compass and other similar positioning systems. While the examples given here are directed to GPS processing the principles are applicable to any such positioning system.

Definition of Real time: In this document the term "Real time" is mentioned several times. In the scope of the inventions covered by the following embodiments this term means that there is an action (e.g., data is processed, results are computed) as soon the required information for that action is available. Therefore, certain latency exists, and it depends on different aspects depending on the component of the system. The required information for the application covered in this document is usually GNSS data, and/or GNSS corrections, as described below.

The network processors running in real time are able to provide results for one epoch of data from a network of monitoring receivers after: (1a) The data is collected by each of the monitoring receivers (typically less than 1 msec); (1b) The data is transmitted from each receiver to the processing center (typically less than 2 sec); (1c) The data is processed by the processor. The computation of the results by the network processors typically takes between 0.5 and 5 seconds depending on the processor type, and amount of data to be used.

It is usual that data that do not follow certain restrictions in transmission delay (e.g., 3 sec) are rejected or buffered and therefore not immediately used for the current epoch update. This avoids the enlargement of the latency of the system in case one or more stations are transmitting data with an unacceptable amount of delay.

A rover receiver running in real time is able to provide results for one epoch of data after the data is collected by receiver (typically less than 1 msec) and: (2a) The correction data is generated by the processing center (see 1a,1b,1c); (2b) The correction data (if required) is received from the processing center (typically less than 5 sec); (2c) The data is processed (typically less than 1 msec).

Appendix A
PROVISIONAL APPLICATION FOR UNITED STATES PATENT

To avoid or minimize the effect of data latency caused by (2a) and (2b), a delta phase approach can be used so updated receiver positions can be computed (typically in less than 1 msec) immediately after the data is collected and with correction data streams. The delta phase approach is described for example in US Patent 7,576,690 granted August 18, 2009 to U. Vollath.

Figure 1:
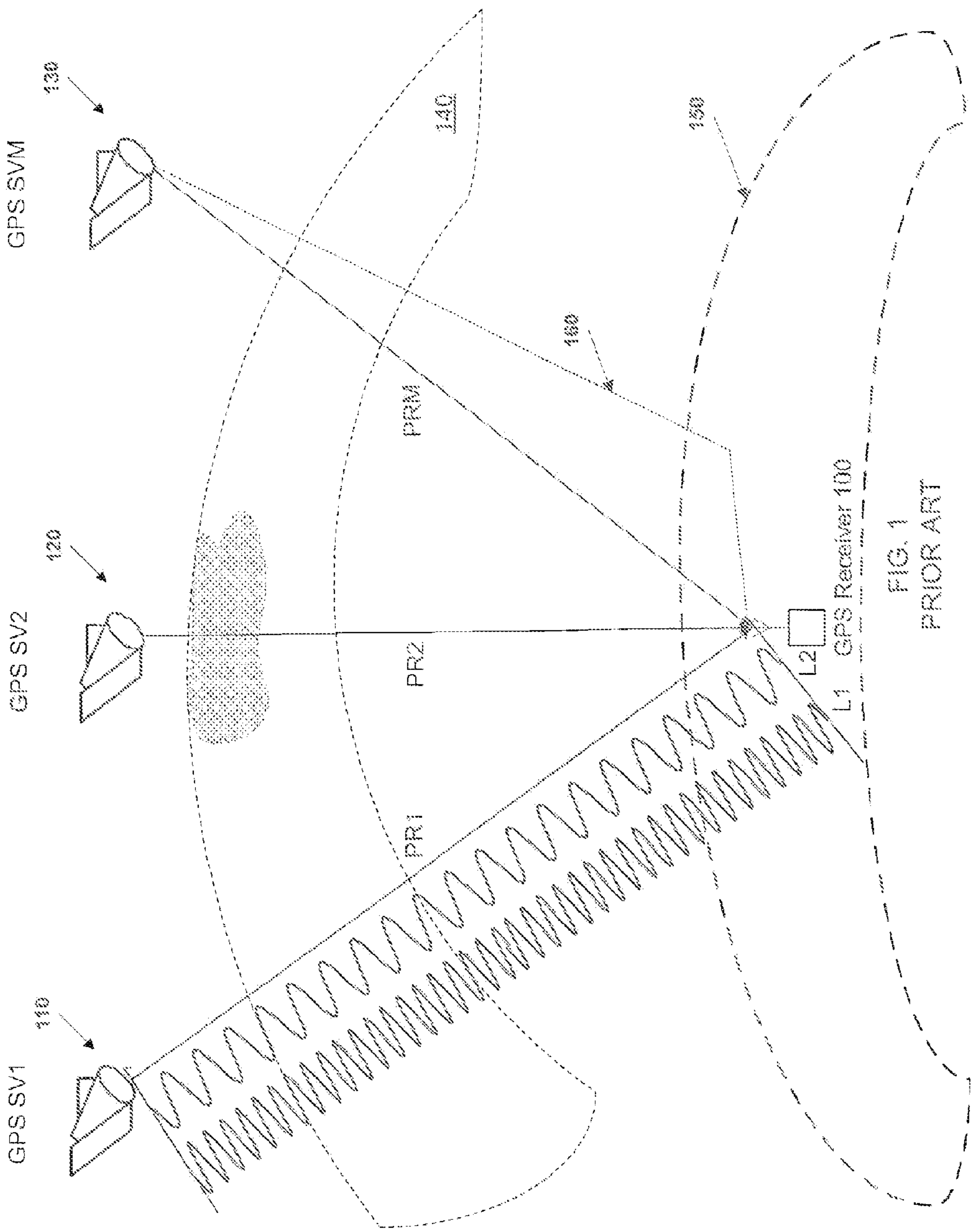
FIG. 1 shows a high-level view of a system in accordance with some embodiments of the invention.
Figure 2:
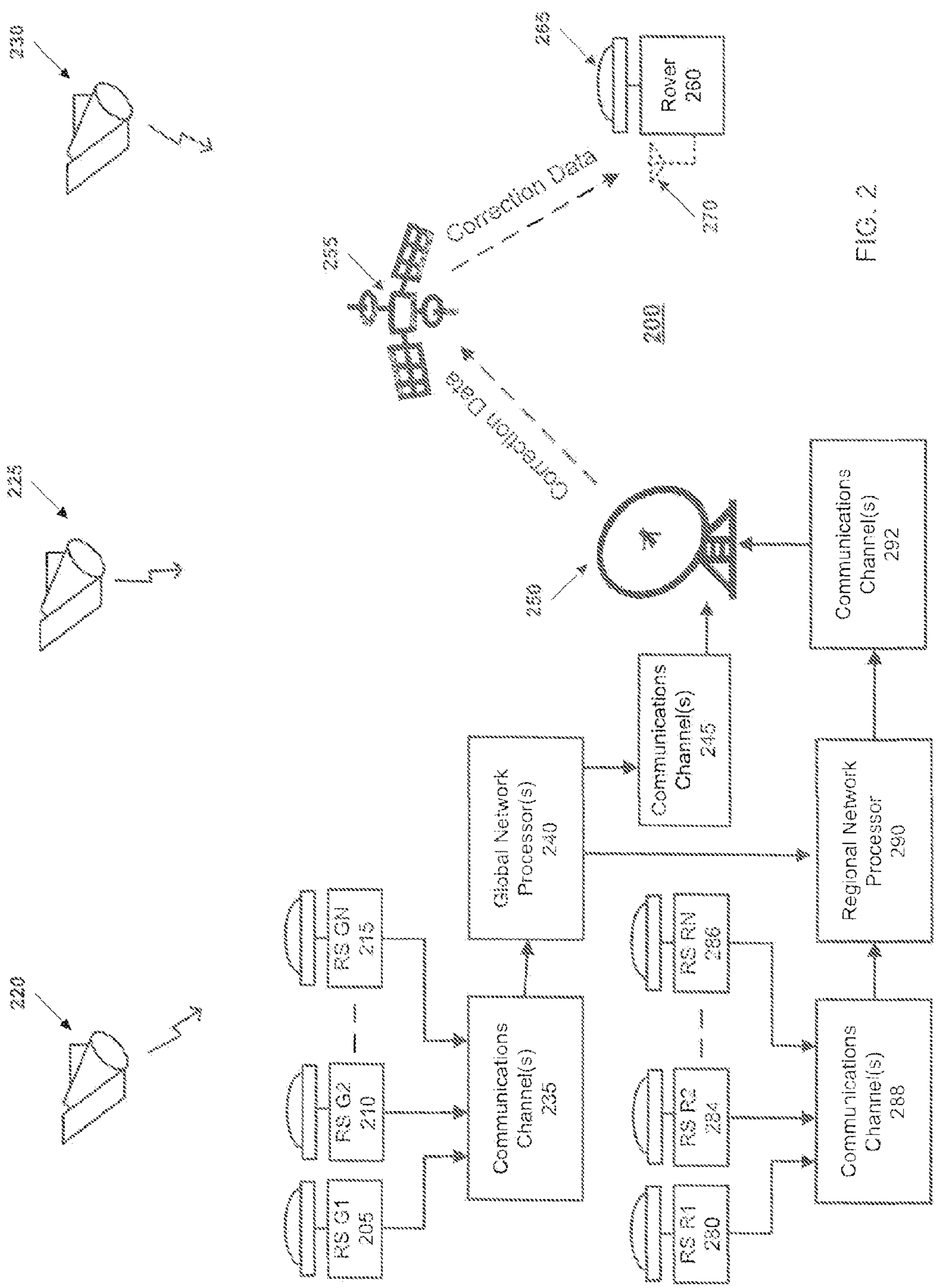
FIG. 2 shows a high-level view of a system and system data in accordance with some embodiments of the invention.

FIG. 1 and FIG. 2 show high level views of a system 100 in accordance with some embodiments of the invention. Reference stations of a worldwide tracking network, such as reference stations 105, 110, ... 115, are distributed about the Earth. The position of each reference station is known very precisely, e.g., within less than 2 cm. Each reference station is equipped with an antenna and tracks the GNSS signals transmitted by the satellites in view at that station, such as GNS satellites 120, 125, ... 130. The GNSS signals have codes modulated on each of two or more carrier frequencies. Each reference station acquires GNSS data 205 representing, for each satellite in view at each epoch, carrier-phase (carrier) observations 210 of at least two carriers, and pseudorange (code) observations 215 of the respective codes modulated on at least two carriers. The reference stations also obtain the almanac and ephemerides 220 of the satellites from the satellite signals. The almanac contains the rough position of all satellites of the GNSS, while the so-called broadcast ephemerides provide more precise predictions (ca. 1 m) of the satellites' positions and the satellites' clock error (ca. 1.5 m) over specific time intervals.

GNSS data collected at the reference stations is transmitted via communications channels 135 to a network processor 140. Network processor 140 uses the GNSS data from the reference stations with other information to generate a correction message containing precise satellite position and clock data, as detailed below. The correction message is transmitted for use by any number of GNSS rover receivers. The correction message is transmitted as shown in FIG. 1 via an uplink 150 and communications satellite 155 for broadcast over a wide area; any other suitable transmission medium may be used including but not limited to radio broadcast or mobile telephone link. Rover 160 is example of a GNSS rover receiver having a GNSS antenna 165 for receiving and tracking the signals of GNSS satellites in view at its location, and optionally having a communications antenna 170. Depending on the transmission band of the correction message, it can be received by rover 160 via GNSS antenna 165 or communications antenna 170.

Appendix A
PROVISIONAL APPLICATION FOR UNITED STATES PATENT

Part 2: Network Architecture

Figure 3:
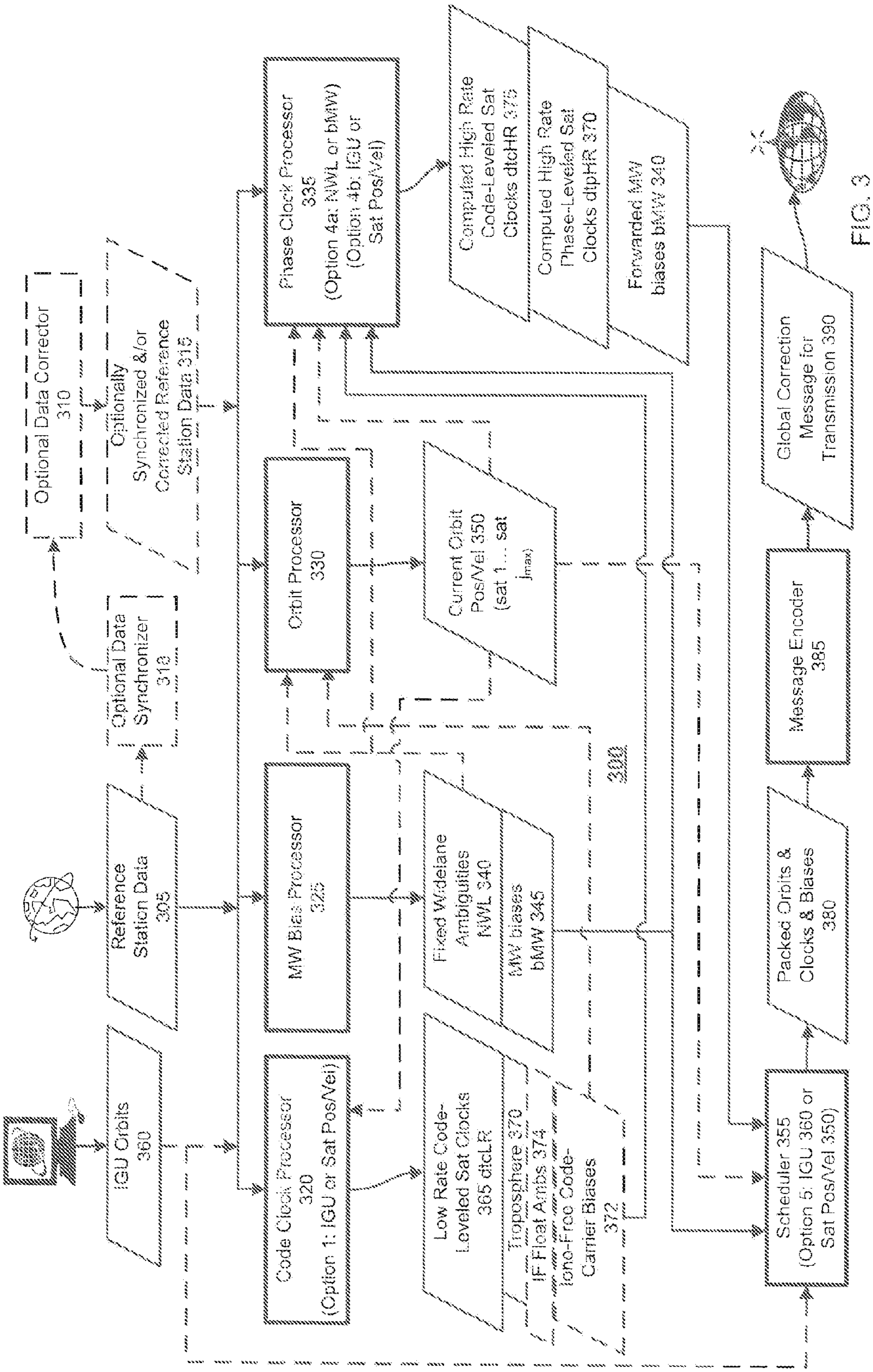
FIG. 3 is a schematic diagram of network processor architecture in accordance with some embodiments of the invention.

FIG. 3 is a schematic diagram showing principal components of the process flow 300 of a network processor 140 in accordance with some embodiments of the invention. GNSS data from the global network of reference stations 310 is supplied without corrections as GNSS data 305 or after correction by an optional data corrector 310 as corrected GNSS data 315, to four processors: a standard clock processor 320, a Melbourne-Wübbena (MW) bias processor 325, an orbit processor 330, and a phase clock processor 335.

Data corrector 310 optionally analyzes the raw GNSS data 305 from each reference station to check for quality of the received observations and, where possible, to correct the data for cycle slips, which are jumps in the carrier-phase observations occurring, e.g., each time the receiver has a loss of lock. Commercially-available reference stations typically detect cycle slips and flag the data accordingly. Cycle slip detection and correction techniques are summarized, for example, in *G. Seeber*, SATELLITE GEODESY, 2nd Ed. (2003) at pages 277-281. Data corrector 310 optionally applies other corrections. Though not all corrections are needed for all the processors, they do no harm if applied to the data. For example as described below some processors use a linear combination of code and carrier observations in which some uncorrected errors are canceled in forming the combinations.

Observations are acquired epoch by epoch at each reference station and transmitted with time tags to the network processor 140. For some stations the observations arrive delayed. This delay can range between milliseconds and minutes. Therefore an optional synchronizer 318 collects the data of the corrected reference station data within a predefined time span and passes the observations for each epoch as a set to the processor. This allows data arriving with a reasonable delay to be included in an epoch of data.

The MW bias processor 325 takes either uncorrected GNSS data 305 or corrected GNSS data 315 as input, since it uses the Melbourne-Wübbena linear combination which cancels out all but the ambiguities and the biases of the phase and code observations. Thus only receiver and satellite antenna corrections are important for the widelane processor 325. Based on this linear combination, one MW bias per satellite and one widelane ambiguity per receiver-satellite pairing are computed. The biases are smooth (not noisy) and exhibit only some sub-daily low-rate Appendix A
PROVISIONAL APPLICATION FOR UNITED STATES PATENT variations. The widelane ambiguities are constant and can be used as long as no cycle slip occurs in the observations on the respective satellite-receiver link. Thus the bias estimation is not very time critical and can be run, e.g., with a 15 minute update rate. This is advantageous because the computation time grows with the third power of the number of stations and satellites. As an example, the computation time for a reasonable network with 80 stations can be about 15 seconds. The values of fixed widelane ambiguities 340 and/or widelane biases 345 are optionally used in the orbit processor 330 and/or the phase clock processor 335, and/or are supplied to a scheduler 355. MW bias processor 325 is described in detail in Part 7 below.

Some embodiments of orbit processor 330 are based on a prediction-correction strategy. Using a precise force model and starting with an initial guess of the unknown values of the satellite's parameters (initial position, initial velocity and dynamic force model parameters), the orbit of each satellite is predicted by integration of the satellite's nonlinear dynamic system. The sensitivity matrix containing the partial derivatives of the current position to the unknown parameters is computed at the same time. Sensitivities of the initial satellite state are computed at the same time for the whole prediction. That is, starting with a prediction for the unknown parameters, the differential equation system is solved, integrating the orbit to the current time or into the future. This prediction can be linearized into the direction of the unknown parameters. Thus the partial derivatives (sensitivities) serve as a measure of the size of the change in the current satellite states if the unknown parameters are changed, or vice versa.

In some embodiments these partial derivatives are used in a Kalman filter to improve the initial guess by projecting the GNSS observations to the satellite's unknown parameters. This precise initial state estimate is used to again integrate the satellite's dynamic system and determine a precise orbit. A time update of the initial satellite state to the current epoch is performed from time to time. In some embodiments, ionospheric-free ambiguities are also states of the Kalman filter. The fixed widelane ambiguity values 340 are used to fix the ionospheric-free ambiguities of the orbit processor 330 to enhance the accuracy of the estimated orbits. A satellite orbit is very smooth and can be predicted for minutes and hours. The precise orbit predictions 350 are optionally forwarded to the standard clock processor 320 and to the phase clock processor 335 as well as to a scheduler 355.

Appendix A
PROVISIONAL APPLICATION FOR UNITED STATES PATENT

Ultra-rapid orbits 360, such as IGU orbits provided by the International GNSS Service (IGS), can be used as an alternative to the precise orbit predictions 355. The IGU orbits are updated four times a day and are available with a three hour delay.

Standard clock processor 320 computes code-leveled satellite clocks 360 (also called standard satellite clocks), using GNSS data 305 or corrected GNSS data 315 and using precise orbit predictions 355 or ultra-rapid orbits 365. Code-leveled means that the clocks are sufficient for use with ionospheric-free code observations, but not with carrier-phase observations, because the code-leveled clocks do not preserve the integer nature of the ambiguities. The code-leveled clocks 360 computed by standard clock processor 320 represent clock-error differences between satellites. The standard clock processor 320 uses the clock errors of the broadcast ephemerides as pseudo observations and steers the estimated clocks to GPS time so that they can be used to compute, e.g., the exact time of transmission of a satellite's signal. The clock errors change rapidly, but for the use with code measurements, which are quite noisy, an accuracy of some centimeter is enough. Thus a "low rate" update rate of 30 seconds to 60 seconds is adequate. This is advantageous because computation time grows with the third power of number of stations and satellites. The standard clock processor 325 also determines troposphere zenith delays 365 as a byproduct of the estimation process. The troposphere zenith delays and the code-leveled clocks are sent to the phase clock processor 335. Standard clock processor 320 is described in detail in Part 6 below.

The phase clock processor 335 optionally uses the fixed widelane ambiguities 340 and/or MW biases 345 from widelane processor 325 together with the troposphere zenith delays 365 and the precise orbits 350 or IGU orbits 360 to estimate single-differenced clock errors and narrowlane ambiguities for each pairing of satellites. The single-differenced clock errors and narrowlane ambiguities are combined to obtain single-differenced phase-leveled clock errors 370 for each satellite (except for a reference satellite) which are single-differenced relative to the reference satellite. The low-rate code leveled clocks 360, the troposphere zenith delays 365 and the precise orbits 350 or IGU orbits 360 are used to estimate high-rate code-leveled clocks 375. Here, the computational effort is linear with the number of stations and to the third power with the number of satellites. The rapidly-changing phase-leveled clocks 370 and code-leveled clocks 375 are available, for example, with a delay of 0.1 sec – 0.2 sec. The high-rate phase-leveled clocks 370 and the high-rate code-leveled clocks 375 are sent to the scheduler 355 together with the MW biases 340. Phase clock processor 340 is described in detail in Part 9 below.

Scheduler 355 receives the orbits (precise orbits 350 or IGU orbits 360), the MW biases 340, the high-rate phase-leveled clocks 370 and the high-rate code-leveled clock 375. Scheduler 355 packs these together and forwards the packed orbits and clocks and biases 380 to a message encoder 385 which prepares a correction message 390 in compressed format for transmission to the rover. Transmission to a rover takes for example about 10 sec – 20 sec over a satellite link, but can also be done using a mobile phone or a direct internet connection or other suitable communication link. Scheduler 355 and message encoder are described in detail in Part 10 below.

Appendix A
PROVISIONAL APPLICATION FOR UNITED STATES PATENT

Part 3: Observation Data Corrector

Figure 4:
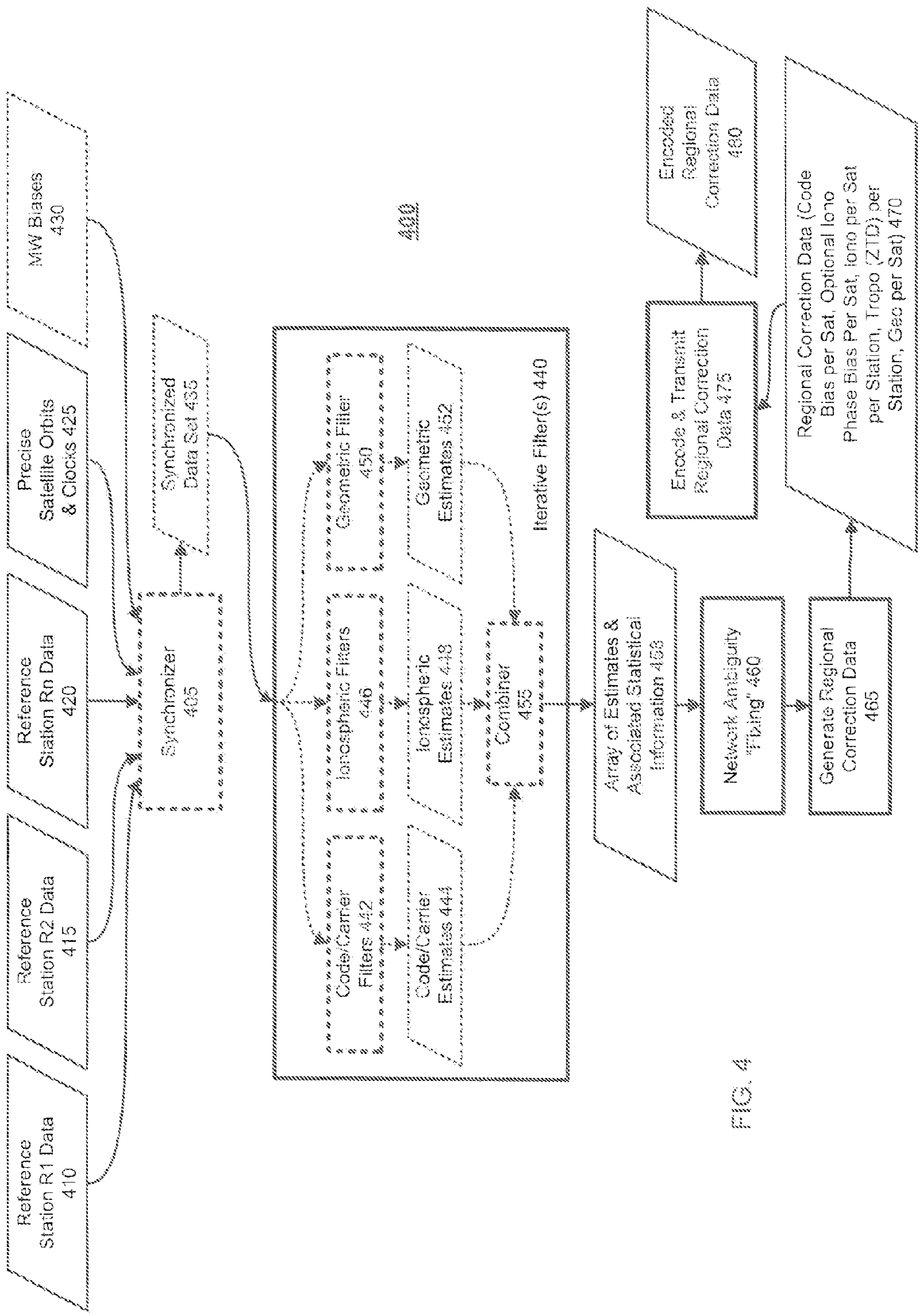
FIG. 4 is a schematic diagram of data correction in accordance with some embodiments of the invention.
Figure 5:
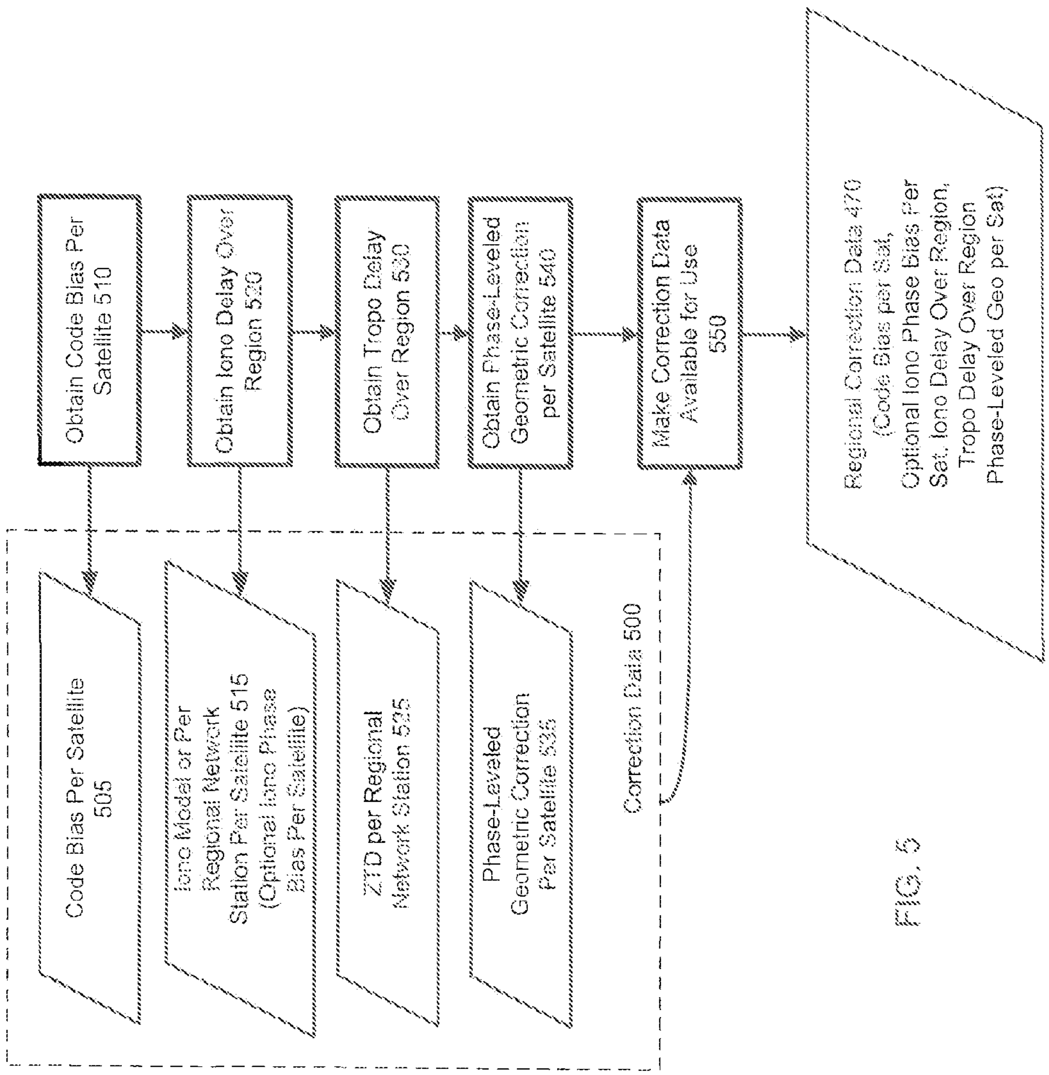
FIG. 5 is a schematic view of linear combinations of observations in accordance with some embodiments of the invention.

FIG. 4 is a schematic diagram of data correction in accordance with some embodiments of the invention. Optional observation corrector 310 corrects the GNSS signals collected at a reference station for displacements of the station due to centrifugal, gyroscopic and gravitational forces acting on the Earth, the location of the station's antenna phase center relative to the station's antenna mounting point, the location of the satellite's antenna phase center relative to the satellite's center of mass given by the satellite's orbit, and variations of those phase centers depending on the alignment of the station's antenna and the satellite's antenna.

The main contributors to station displacements are solid Earth tides up to 500 mm, ocean tidal loadings up to 100 mm, and pole tides up to 10 mm. All of these depend on where the station is located. More description is found in McCarthy, D.D., Petit, G. (eds.), *IERS Conventions (2003)*, IERS Technical Note No. 32, and references cited therein.

Ocean tides caused by the forces of astronomical bodies – mainly the moon – acting on the Earth's loose masses, also cause the Earth's tectonic plates to be lifted and lowered. This well-known effect shows up as recurring variations of the reference stations' locations. The solid Earth tides are optionally computed for network processing as well as for rover processing, as the effect should not be neglected and the computational effort is minor.

The second largest effect is the deformation of the Earth's tectonic plates due to the load of the oceans varying over time with the tides. Ocean tide loading parameters used to quickly compute the displacement of a station over time depend on the location of the station. The computational effort to derive these parameters is quite high. They can be computed for a given location, using any of the well-known models available at the online ocean-tide-loading service provided by the Onsala Space Observatory Ocean, http://www.oso.chalmers.se/~loading/, Chalmers: Onsala Space Observatory, 2009. The lower accuracy parameters, e.g., from interpolation of a precomputed grid, are sufficient for the applications discussed here.

The smallest effect mentioned here is that due to pole tides. This displacement is due to the lift of a tectonic plate caused by the centrifugal and gyroscopic effects generated by the polar motion of the Earth. Earth orientation parameters are used for this computation. These are updated Appendix A
PROVISIONAL APPLICATION FOR UNITED STATES PATENT regularly at the International Earth Rotation & Reference System Service, International Earth Rotation & Reference System Service, http://hpiers.obspm.fr/, L'Observatoire de Paris, 2009, and are not easily computed. This minor effect is therefore optionally neglected in the rover processing.

Absolute calibrated antenna models are used to compute the offsets and variations of receiver and satellite antenna phase centers. A description is found at J. Kouba, *A Guide to Using International GPS Service (IGS) Products, Geodetic Survey Division Natural Resources Canada*, February 2003. Calibration data collected by the IGS is made available in antex files at http://igscb.jpl.nasa.gov/, 2009; satellite antenna offset information is found for example in the IGS absolute antenna file igs05.atx.

Another effect is the antenna phase wind-up. If a receiver antenna is moving relative to the sender antenna the recorded data shows a phase shift. If this effect is neglected, a full turn of the satellite around the sending axis will cause an error of one cycle in the carrier-phase detected at the receiver. Since the satellite's orientation relative to the receiver is well known most of the time, this effect can be modeled as described in Wu J.T., Hajj G.A., Bertiger W.I., & Lichten S.M., *Effects of antenna orientation on GPS carrier phase*, MANUSCRIPTA GEODAETICA, Vol. 18, pp. 91 – 98 (1993).

The relative movement of the station and the satellite is mainly due to the orbiting satellite. If a satellite is eclipsing - this means the satellite's orbit crosses the Earth's shadow - additional turns of the satellite around its sending axis are possible. For example, GPS Block IIA satellites have a noon turn and a shadow crossing maneuver, while GPS Block IIR satellites have a noon turn and a midnight turn. If the sun, the Earth and the satellite are nearly collinear it is hard to compute the direction of the turn maneuvers, and an incorrect direction will cause an error in the carrier-phase of one cycle. The satellite's yaw attitude influences the phase wind-up and the satellite antenna corrections. More detailed descriptions are found in Kouba, J., *A simplified yaw-attitude model for eclipsing GPS satellites*, GPS SOLUTIONS (2008) and Bar-Sever, Y.E., *A new model for GPS yaw attitude*, JOURNAL OF GEODESY, Vol. 70, pp. 714-723 (1996).

The sun position is needed to compute the satellite's body-fixed coordinate frame, since the $x$ axis is defined by the cross product of the satellite's position and the sun's position. This Appendix A
PROVISIONAL APPLICATION FOR UNITED STATES PATENT coordinate system is used to compute the yaw attitude, the satellite's antenna correction (offset and variations, mapped into sine of sight) and the phase wind-up correction. The moon's position is also needed for the solid Earth tides. How to compute the position of the sun and the moon is found, for example, in Seidelmann, P.K. (ed.), *Explanatory Supplement to the Astronomical Almanac*, University Science Books, U.S. (1992).

Further corrections can also be applied, though these are of only minor interest for the positioning accuracy level demanded by the marketplace.

Additional effects as corrections for relativistic effects, ionospheric and troposphere delays do not need to be considered in the optional data corrector 310. Relativistic corrections are usually applied to the satellite clocks. The major first order effect due to the ionosphere is eliminated using an ionospheric free combination of the GNSS observations, and the effect due to the troposphere is in some embodiments partly modeled and partly estimated.

Appendix A
PROVISIONAL APPLICATION FOR UNITED STATES PATENT

Part 4: Forming Linear Combinations

4.1 Basic Modeling Equations

For code $P_{ikm}^j$ and carrier phase $\Phi_{ik}^j$ observations[1] between receiver $i$ and satellite $j$ on frequency band $k$ and modulation type $m$ the following observation model is assumed that relates the observations to certain physical quantities, $$P_{ikm}^j = \rho_i^j + c\Delta t_i - c\Delta t^j + T_i^j + I_{P,ik}^j + b_{P,ikm} - b_{P,km}^j + m_{P,ik}^j + \varepsilon_{P,ik}^j. \quad (1)$$

$$\Phi_{ik}^j = \rho_i^j + c\Delta t_i - c\Delta t^j + T_i^j + I_{\Phi,ik}^j + b_{\Phi,ik} - b_{\Phi,k}^j + \lambda_k N_{ik}^j + m_{\Phi,ik}^j + \varepsilon_{\Phi,ik}^j. \quad (2)$$

with

| | |
|---|---|
| $\rho_i^j$ | geometrical range from satellite $j$ to receiver $i$ |
| $c$ | speed of light |
| $\Delta t_i$ | receiver $i$ clock error |
| $\Delta t^j$ | satellite $j$ clock error |
| $T_i^j$ | tropospheric delay from satellite $j$ to receiver $i$ |
| $I_{P,ik}^j = \frac{I_{1i}^j}{f_k^2} + \frac{2I_{2i}^j}{f_k^3} + \frac{3I_{3i}^j}{f_k^4}$ | code ionospheric delay on frequency $f_k$ |
| $I_{\Phi,ik}^j = -\frac{I_{1i}^j}{f_k^2} - \frac{I_{2i}^j}{f_k^3} - \frac{I_{3i}^j}{f_k^4}$ | carrier phase ionospheric delay on frequency $f_k$ |
| $b_{P,ikm}$ | code receiver bias |
| $b_{P,km}^j$ | code satellite bias |
| $b_{\Phi,ik}$ | phase receiver bias |
| $b_{\Phi,k}^j$ | phase satellite bias |
| $N_{ik}^j$ | integer ambiguity term from satellite $j$ to receiver $i$ on |

[1] The modulation type dependency in the phase observation is suppressed by assuming that the different phase signals on a frequency band are already shifted to a common base inside the receiver, e.g. L2C is assumed to be shifted by -0.25 cycles to compensate the 90 degrees rotation of the quadrature phase on which it is modulated.

Appendix A
PROVISIONAL APPLICATION FOR UNITED STATES PATENT

| | |
|---|---|
| | wavelength $\lambda_k$ |
| $m^j_{P,ik}$ | code multipath from satellite $j$ to receiver $i$ |
| $m^j_{\Phi,ik}$ | phase multipath from satellite $j$ to receiver $i$ |
| $\varepsilon^j_{P,ik}$ | code random noise term |
| $\varepsilon^j_{\Phi,ik}$ | phase random noise term |

Examples of different modulation types (also called code types) are in case of GPS L1C/A, L1P, L1C on L1-frequency band and L2C, L2P on L2-frequency band and in case of Glonass L1C/A, L1P and L2C/A, L2P.

Notice that the symbol $\Phi$ that is used here for carrier phase observations, is also used for the time transition matrix in the Kalman filter context. For both cases, $\Phi$ is the standard symbol used in the scientific literature and we adopted this notation. The meaning of $\Phi$ will be always clear from the context.

In the following we neglect the second order $\frac{I^j_{2i}}{f^3_k}$ and third order $\frac{I^j_{3i}}{f^4_k}$ ionospheric terms that are typically in the range of less than 2 cm (Morton, van Graas, Zhou, & Herdtner, 2008), (Datta-Barua, Walter, Blanch, & Enge, 2007). In this way, $I^j_{P,ik} = \frac{I^j_i}{f^2_k} = -I^j_{\Phi,ik}$ with $I^j_i := I^j_{1i}$ . Only under very severe geomagnetic active conditions the second and third order terms can reach tens of centimeters. However, these conditions occur only for a few days in many years. The higher order ionospheric terms can be taken into account by ionospheric models based on the Appleton-Hartree equation that relates the phase index of refraction of a right hand circularly polarized wave propagating through the ionosphere to the wave frequency $f_k$, the electron density and the earth magnetic field. Approximations to the Appleton-Hartree equation allow to relate the parameters $I^j_{2i}, I^j_{3i}$ of the second and third order ionospheric terms to the first order ionospheric estimation parameter $I^j_i := I^j_{1i}$ that is a measure of the total electron content along the signal propagation path. Thus higher order ionospheric terms can be corrected on base of observation data on at least two frequencies.

Appendix A
PROVISIONAL APPLICATION FOR UNITED STATES PATENT

In the following we will often talk about ionospheric-free (IF) linear combinations. However, notice that these linear combinations only cancel the first order ionospheric term and are thus not completely ionospheric-free.

1. Linear Combinations of Observations

By combining several code $P^j_{ikm}$ and carrier phase $\Phi^j_{ik}$ observations in a linear way $$LC = \sum_{i,j,k,m} a^j_{P,ikm} P^j_{ikm} + a^j_{\Phi,ik} \Phi^j_{ik} \quad \text{with } a^j_{P,ikm}, a^j_{\Phi,ik} \in R \text{ for all } i,j,k,m \tag{3}$$

some of the physical quantities can be eliminated from the linear combination LC so that these quantities do not have to be estimated if the linear combination is used as the observation input for an estimator. In this way some linear combinations are of special importance.

Single difference (SD) observations between two satellites $j_1$ and $j_2$ eliminate all quantities that are not satellite dependent, i.e. that do not have a satellite index $j$.

Defining $X^{j_1 j_2} := X^{j_2} - X^{j_1}$, the between satellite SD observations are formally obtained by substituting each index $j$ by $j_1 j_2$ and ignoring all terms without a satellite index $j$ $$P^{j_1 j_2}_{ikm} = \rho^{j_1 j_2}_i - c\Delta t^{j_1 j_2} + T^{j_1 j_2}_i + I^{j_1 j_2}_{P,ik} - b^{j_1 j_2}_{P,km} + m^{j_1 j_2}_{P,ik} + \varepsilon^{j_1 j_2}_{P,ik}, \tag{4}$$

$$\Phi^{j_1 j_2}_{ik} = \rho^{j_1 j_2}_i - c\Delta t^{j_1 j_2} + T^{j_1 j_2}_i + I^{j_1 j_2}_{\Phi,ik} - b^{j_1 j_2}_{\Phi,k} + \lambda_k N^{j_1 j_2}_{ik} + m^{j_1 j_2}_{\Phi,ik} + \varepsilon^{j_1 j_2}_{\Phi,ik}. \tag{5}$$

In this way the receiver clock and receiver bias terms have been eliminated in the linear combination.

In the same way single difference observations between two receivers $i_1$ and $i_2$ eliminate all quantities that are not receiver dependent, i.e. that have no receiver index $i$.
By generating the difference between two receivers $i_1$ and $i_2$ on the between satellite single difference observations (4) and (5), double difference (DD) observations are obtained that also eliminate all receiver dependent terms from (4) and (5).

Appendix A
PROVISIONAL APPLICATION FOR UNITED STATES PATENT

Defining $X_{i_1 i_2}^{j_1 j_2} := X_{i_2}^{j_1 j_2} - X_{i_1}^{j_1 j_2} = \left(X_{i_2}^{j_2} - X_{i_2}^{j_1}\right) - \left(X_{i_1}^{j_2} - X_{i_1}^{j_1}\right)$, the DD observations are formally obtained from (4) and (5) by substituting each index $i$ by $i_1 i_2$ and ignoring all terms without a receiver index $i$ $$P_{i_1 i_2, km}^{j_1 j_2} = \rho_{i_1 i_2}^{j_1 j_2} + T_{i_1 i_2}^{j_1 j_2} + I_{P, i_1 i_2, k}^{j_1 j_2} + m_{P, i_1 i_2, k}^{j_1 j_2} + \varepsilon_{P, i_1 i_2, k}^{j_1 j_2}. \quad (6)$$

$$\Phi_{i_1 i_2, k}^{j_1 j_2} = \rho_{i_1 i_2}^{j_1 j_2} + T_{i_1 i_2}^{j_1 j_2} + I_{\Phi, i_1 i_2, k}^{j_1 j_2} + \lambda_k N_{i_1 i_2, k}^{j_1 j_2} + m_{\Phi, i_1 i_2, k}^{j_1 j_2} + \varepsilon_{\Phi, i_1 i_2, k}^{j_1 j_2}. \quad (7)$$

In this way also the satellite clock and the satellite biases have been eliminated in the linear combination.

In the following we assume that all code observations $P_{ikm}^j$ correspond to the same modulation type so that the modulation type index $m$ can be suppressed.

For our purposes two linear combinations that cancel the first order ionospheric delay $\frac{I_i^j}{f_k^2}$ in different ways are of special importance, the iono-free linear combination for code and carrier phase and the Melbourne-Wuebbena (MW) linear combination $\Phi_{i,WL}^j - P_{i,NL}^j$ consisting of the widelane (WL) carrier phase $\frac{\Phi_{i,WL}^j}{\lambda_{WL}} := \frac{\Phi_{i1}^j}{\lambda_1} - \frac{\Phi_{i2}^j}{\lambda_2}$ and narrowlane (NL) code $\frac{P_{i,NL}^j}{\lambda_{NL}} := \frac{P_{i1}^j}{\lambda_1} + \frac{P_{i2}^j}{\lambda_2}$ observations with wavelengths $\lambda_{WL} = \frac{c}{f_{WL}} := \frac{c}{f_1 - f_2}$ and $\lambda_{NL} = \frac{c}{f_{NL}} := \frac{c}{f_1 + f_2}$, (Melbourne, 1985), (Wübbena, 1985), $$\begin{aligned} P_{i,NL}^j \;=\; & \rho_i^j + c\Delta t_i - c\Delta t^j + T_i^j \quad + \lambda_{NL}\left(\frac{b_{P,i1}}{\lambda_1} + \frac{b_{P,i2}}{\lambda_2}\right) - \lambda_{NL}\left(\frac{b_{P,1}^j}{\lambda_1} + \frac{b_{P,2}^j}{\lambda_2}\right) \\ & + \lambda_{NL}\left(\frac{I_i^j}{\lambda_1 f_1^2} + \frac{I_i^j}{\lambda_2 f_2^2}\right) \quad + \lambda_{NL}\left(\frac{m_{P,i1}^j + \varepsilon_{P,i1}^j}{\lambda_1} + \frac{m_{P,i2}^j + \varepsilon_{P,i2}^j}{\lambda_2}\right) \end{aligned} \quad (8)$$

Appendix A
PROVISIONAL APPLICATION FOR UNITED STATES PATENT $$\begin{aligned}\Phi_{i,WL}^j &= \rho_i^j + c\Delta t_i - c\Delta t^j + T_i^j + \lambda_{WL}\left(\frac{b_{\Phi,i1}}{\lambda_1} - \frac{b_{\Phi,i2}}{\lambda_2}\right) - \lambda_{WL}\left(\frac{b_{\Phi,1}^j}{\lambda_1} - \frac{b_{\Phi,2}^j}{\lambda_2}\right) \\ &- \lambda_{WL}\left(\frac{I_i^j}{\lambda_1 f_1^2} - \frac{I_i^j}{\lambda_2 f_2^2}\right) + \lambda_{WL}\underbrace{\left(N_{i1}^j - N_{i2}^j\right)}_{=:N_{i,WL}^j} + \lambda_{WL}\left(\frac{m_{\Phi,i1}^j + \varepsilon_{\Phi,i1}^j}{\lambda_1} - \frac{m_{\Phi,i2}^j + \varepsilon_{\Phi,i2}^j}{\lambda_2}\right)\end{aligned} \quad (9)$$

so that $$\begin{aligned}\Phi_{i,WL}^j - P_{i,NL}^j &= \underbrace{\lambda_{WL}\left(\frac{b_{\Phi,i1}}{\lambda_1} - \frac{b_{\Phi,i2}}{\lambda_2}\right) - \lambda_{NL}\left(\frac{b_{P,i1}}{\lambda_1} + \frac{b_{P,i2}}{\lambda_2}\right)}_{=:b_{i,MW}} + \\ &- \underbrace{\left[\lambda_{WL}\left(\frac{b_{\Phi,1}^j}{\lambda_1} - \frac{b_{\Phi,2}^j}{\lambda_2}\right) - \lambda_{NL}\left(\frac{b_{P,1}^j}{\lambda_1} + \frac{b_{P,2}^j}{\lambda_2}\right)\right]}_{=:b_{MW}^j} + \lambda_{WL}N_{i,WL}^j + \\ &+ \underbrace{\lambda_{WL}\left(\frac{m_{\Phi,i1}^j}{\lambda_1} - \frac{m_{\Phi,i2}^j}{\lambda_2}\right) - \lambda_{NL}\left(\frac{m_{P,i1}^j}{\lambda_1} + \frac{m_{P,i2}^j}{\lambda_2}\right)}_{=:m_{i,MW}^j} + \\ &+ \underbrace{\lambda_{WL}\left(\frac{\varepsilon_{\Phi,i1}^j}{\lambda_1} - \frac{\varepsilon_{\Phi,i2}^j}{\lambda_2}\right) - \lambda_{NL}\left(\frac{\varepsilon_{P,i1}^j}{\lambda_1} + \frac{\varepsilon_{P,i2}^j}{\lambda_2}\right)}_{=:\varepsilon_{i,MW}^j} + \\ &= b_{i,MW} - b_{MW}^j + \lambda_{WL}N_{i,WL}^j + m_{i,MW}^j + \varepsilon_{i,MW}^j\end{aligned} \quad (10)$$

where the ionospheric term in the WL-phase cancels with the ionospheric term in the NL-code due to $$\begin{aligned}-\lambda_{WL}\left(\frac{1}{\lambda_1 f_1^2} - \frac{1}{\lambda_2 f_2^2}\right) - \lambda_{NL}\left(\frac{1}{\lambda_1 f_1^2} + \frac{1}{\lambda_2 f_2^2}\right) &= -\frac{c}{f_1 - f_2}\left(\frac{c}{f_1} - \frac{c}{f_2}\right) - \frac{c}{f_1 + f_2}\left(\frac{c}{f_1} + \right. \\ &= -\frac{c^2}{f_1 - f_2}\frac{f_2 - f_1}{f_1 f_2} - \frac{c^2}{f_1 + f_2}\frac{f_2 +}{f_1 f_2} \\ &= +\frac{c^2}{f_1 f_2} - \frac{c^2}{f_1 f_2} \\ &= 0\end{aligned}$$

Neglecting the usually unmodeled multipath $m_{i,MW}^j$ and random noise terms $\varepsilon_{i,MW}^j$, equation (10) simplifies to Appendix A
PROVISIONAL APPLICATION FOR UNITED STATES PATENT $$\Phi_{i,WL}^{j} - P_{i,NL}^{j} = b_{i,MW} - b_{MW}^{j} + \lambda_{WL} N_{i,WL}^{j} \tag{11}$$

or in a between satellite single difference (SD) version to $$\Phi_{i,WL}^{j_1 j_2} - P_{i,NL}^{j_1 j_2} = -b_{MW}^{j_1 j_2} + \lambda_{WL} N_{i,WL}^{j_1 j_2} \tag{12}$$

Note that the satellite bias cancels in the double difference (DD) (between receivers and between satellites) Melbourne-Wuebbena (MW) observation, $$\Phi_{i_1 i_2,WL}^{j_1 j_2} - P_{i_1 i_2,NL}^{j_1 j_2} = \lambda_{WL} N_{i_1 i_2,WL}^{j_1 j_2} \tag{13}$$

Thus the DD-WL ambiguities $N_{i_1 i_2,WL}^{j_1 j_2}$ are directly observed by the DD-MW observations.

The iono-free linear combination on code $P_{i,IF}^{j} := \frac{f_1^2 P_{i1}^j - f_2^2 P_{i2}^j}{f_1^2 - f_2^2}$ and carrier phase $\Phi_{i,IF}^{j} := \frac{f_1^2 \Phi_{i1}^j - f_2^2 \Phi_{i2}^j}{f_1^2 - f_2^2}$ results in $$\begin{aligned} P_{i,IF}^{j} &= \rho_i^j + c\Delta t_i - c\Delta t^j + T_i^j + \underbrace{\frac{f_1^2 b_{P,i1} - f_2^2 b_{P,i2}}{f_1^2 - f_2^2}}_{=:b_{P,i,IF}} - \underbrace{\frac{f_1^2 b_{P,1}^j - f_2^2 b_{P,2}^j}{f_1^2 - f_2^2}}_{=:b_{P,IF}^j} \\ &\quad + \underbrace{\frac{f_1^2 m_{P,i1}^j - f_2^2 m_{P,i2}^j}{f_1^2 - f_2^2}}_{=:m_{P,i,IF}^j} + \underbrace{\frac{f_1^2 \varepsilon_{P,i1}^j - f_2^2 \varepsilon_{P,i2}^j}{f_1^2 - f_2^2}}_{=:\varepsilon_{P,i,IF}^j} \\ &= \rho_i^j + c\Delta t_i - c\Delta t^j + T_i^j + b_{P,i,IF} - b_{P,IF}^j + m_{P,i,IF}^j + \varepsilon_{P,i,IF}^j \end{aligned} \tag{14}$$

and $$\begin{aligned} \Phi_{i,IF}^{j} &= \rho_i^j + c\Delta t_i - c\Delta t^j + T_i^j + \underbrace{\frac{f_1^2 b_{\Phi,i1} - f_2^2 b_{\Phi,i2}}{f_1^2 - f_2^2}}_{=:b_{\Phi,i,IF}} - \underbrace{\frac{f_1^2 b_{\Phi,1}^j - f_2^2 b_{P,2}^j}{f_1^2 - f_2^2}}_{=:b_{\Phi,IF}^j} \\ &\quad + \underbrace{\frac{f_1^2 \lambda_1 N_{i1}^j - f_2^2 \lambda_2 N_{i2}^j}{f_1^2 - f_2^2}}_{=:\lambda_{IF} N_{i,IF}^j} + \underbrace{\frac{f_1^2 m_{\Phi,i1}^j - f_2^2 m_{\Phi,i2}^j}{f_1^2 - f_2^2}}_{=:m_{\Phi,i,IF}^j} + \underbrace{\frac{f_1^2 \varepsilon_{\Phi,i1}^j - f_2^2 \varepsilon_{\Phi,i2}^j}{f_1^2 - f_2^2}}_{=:\varepsilon_{\Phi,i,IF}^j} \\ &= \rho_i^j + c\Delta t_i - c\Delta t^j + T_i^j + b_{\Phi,i,IF} - b_{\Phi,IF}^j + \lambda_{IF} N_{i,IF}^j + m_{\Phi,i,IF}^j + \varepsilon_{\Phi,i,IF}^j \end{aligned} \tag{15}$$

Appendix A
PROVISIONAL APPLICATION FOR UNITED STATES PATENT

Neglecting the usually unmodeled multipath $m^j_{P,i,IF}$, $m^j_{\Phi,i,IF}$ and random noise terms $\varepsilon^j_{P,i,IF}$, $\varepsilon^j_{\Phi,i,IF}$, (14) and (15) simplify to $$P^j_{i,IF} = \rho^j_i + c\Delta t_i - c\Delta t^j + T^j_i + b_{P,i,IF} - b^j_{P,IF}. \quad (16)$$

$$\Phi^j_{i,IF} = \rho^j_i + c\Delta t_i - c\Delta t^j + T^j_i + b_{\Phi,i,IF} - b^j_{\Phi,IF} + \lambda_{IF} N^j_{i,IF}. \quad (17)$$

or in a between satellite single difference (SD) version to $$P^{j_1j_2}_{i,IF} = \rho^{j_1j_2}_i - c\Delta t^{j_1j_2} + T^{j_1j_2}_i - b^{j_1j_2}_{P,IF}. \quad (18)$$

$$\Phi^{j_1j_2}_{i,IF} = \rho^{j_1j_2}_i - c\Delta t^{j_1j_2} + T^{j_1j_2}_i - b^{j_1j_2}_{\Phi,IF} + \lambda_{IF} N^{j_1j_2}_{i,IF}. \quad (19)$$

The iono-free wavelength $\lambda_{IF}$ just depends on the ratio of the involved frequencies that are listed for different GNSS in Table 1 and Table 2.

Table 1

| | GPS | | | Galileo | | | | |
|---|---|---|---|---|---|---|---|---|
| | L1 | L2 | L5 | E2L1E1 | E5a | E5b | E5a/b | E6 |
| 10.23 MHz · | 154 | 120 | 115 | 154 | 115 | 118 | 116.5 | 125 |

Table 2

| Glonass $(k=-7,\ldots,+6)$ $\frac{L1}{L2}=\frac{9}{7}$ | |
|---|---|
| L1 | L2 |
| (1602 + k · 9/16 ) MHz | (1246 + k · 7/16 ) MHz |

Defining $F_1, F_2 \in N$ by $$\begin{aligned} f_1 &=: F_1 \gcd(f_1, f_2) \\ f_2 &=: F_2 \gcd(f_1, f_2) \end{aligned} \quad \Rightarrow \quad \frac{f_1}{f_2} = \frac{F_1}{F_2} \quad (20)$$

where gcd is an abbreviation for the greatest common divisor, it follows for the iono-free wavelength Appendix A
PROVISIONAL APPLICATION FOR UNITED STATES PATENT $$
\begin{aligned}
\lambda_{IF} N^j_{i,IF} &:= \frac{f_1^2 \lambda_1 N^j_{i1} - f_2^2 \lambda_2 N^j_{i2}}{f_1^2 - f_2^2} &&= \lambda_1 \frac{f_1^2 N^j_{i1} - f_2^2 \frac{\lambda_2}{\lambda_1} N^j_{i2}}{f_1^2 - f_2^2} = \lambda_1 \frac{f_1^2 N^j_{i1} - f_2^2 \frac{f_1}{f_2} N}{f_1^2 - f_2^2} \\
&= \lambda_1 \frac{\frac{f_1^2}{f_2^2} N^j_{i1} - \frac{f_1}{f_2} N^j_{i2}}{\frac{f_1^2}{f_2^2} - 1} &&= \lambda_1 \frac{\frac{F_1^2}{F_2^2} N^j_{i1} - \frac{F_1}{F_2} N^j_{i2}}{\frac{F_1^2}{F_2^2} - 1} = \lambda_1 \frac{F_1}{F_2^2} \frac{F_1 N^j_{i1} - F_2 N^j_{i2}}{\frac{F_1^2 - F_2^2}{F_2^2}} \\
&= \underbrace{\lambda_1 \frac{F_1}{F_1^2 - F_2^2}}_{=:\lambda_{IF}} \underbrace{\left(F_1 N^j_{i1} - F_2 N^j_{i2}\right)}_{:=N^j_{i,IF}}
\end{aligned}
\qquad (21)
$$

The factors $F_1, F_2$ are listed for different GNSS frequency combinations together with the resulting iono-free wavelengths in Table 3.

Table 3

| GNSS | Freq. bands | $F_1 / F_2$ | $\lambda_1 / m$ | $\lambda_{NL} / m$ | $\frac{\lambda_{IF}}{\lambda_1} = \frac{F_1}{F_1^2 - F_2^2}$ |
|---|---|---|---|---|---|
| GPS | L1-L2 | 77/60 | 0.1903 | 0.1070 | 0.0331 |
| | L1-L5 | 154/115 | 0.1903 | 0.1089 | 0.0147 |
| | L2-L5 | 24/23 | 0.2442 | 0.1247 | 0.5106 |
| Galileo | L1-E5a | 154/115 | 0.1903 | 0.1089 | 0.0147 |
| | L1-E5b | 77/59 | 0.1903 | 0.1077 | 0.0315 |
| | L1-E6 | 154/125 | 0.1903 | 0.1050 | 0.019 |
| | E5b-E5a | 118/115 | 0.2483 | 0.1258 | 0.1688 |
| | E6-E5a | 25/23 | 0.2344 | 0.1221 | 0.2604 |
| | E6-E5b | 125/118 | 0.2344 | 0.1206 | 0.0735 |
| Glonass | L1-L2 | 9/7 | $\frac{c}{(1602 + k \cdot 9/16) \cdot 10^6}$ | $\frac{c}{(2848 + k) \cdot 10^6}$ | 0.2813 |

(22)

Appendix A
PROVISIONAL APPLICATION FOR UNITED STATES PATENT

Since for most frequency combinations the iono-free wavelength $\lambda_{IF}$ is too small for reliable ambiguity resolution (the frequency combination L2-L5 is a mentionable exception), the following relation between the iono-free ambiguity $N^j_{i,IF}$ and the widelane ambiguity $N^j_{i,WL}$ is of special importance. By using the definitions $$\left.\begin{array}{lll} N^j_{i,WL} & := & N^j_{i1} - N^j_{i2} \\ N^j_{i,NL} & := & N^j_{i1} + N^j_{i2} \end{array}\right\} \Leftrightarrow \begin{array}{lll} N^j_{i1} & = & \frac{1}{2}\left(N^j_{i,NL} + N^j_{i,WL}\right) \\ N^j_{i2} & = & \frac{1}{2}\left(N^j_{i,NL} - N^j_{i,WL}\right) \end{array} \quad (23)$$

the iono-free ambiguity term can be rewritten as $$\begin{aligned} \lambda_{IF} N^j_{i,IF} &:= \frac{f_1^2}{f_1^2 - f_2^2}\lambda_1 N^j_{i1} - \frac{f_2^2}{f_1^2 - f_2^2}\lambda_2 N^j_{i2} \\ &= \underbrace{\left(\frac{f_1^2}{f_1^2 - f_2^2}\frac{c}{f_1} + \frac{f_2^2}{f_1^2 - f_2^2}\frac{c}{f_2}\right)}_{\frac{cf_1}{(f_1-f_2)(f_1+f_2)} - \frac{cf_2}{(f_1-f_2)(f_1+f_2)} = \frac{c}{f_1 - f_2} =: \lambda_{WL}} \frac{1}{2} N^j_{i,WL} + \underbrace{\left(\frac{f_1^2}{f_1^2 - f_2^2}\frac{c}{f_1} - \frac{f_2^2}{f_1^2 - f_2^2}\frac{c}{f_2}\right)}_{\frac{cf_1}{(f_1-f_2)(f_1+f_2)} - \frac{cf_2}{(f_1-f_2)(f_1+f_2)} = \frac{c}{f_1+f_2} =: \lambda_{NL}} \frac{1}{2} N^j_{i,NL} \\ &= \frac{1}{2}\lambda_{NL} N^j_{i,NL} + \frac{1}{2}\lambda_{WL} N^j_{i,WL} \qquad ; \; N^j_{i,NL} = N^j_{i1} + N^j_{i2} = N^j_{i1} + \frac{1}{2}\left(N^j_{i,NL} - N^j_{i,WL}\right) \\ &= \lambda_{NL} N^j_{i1} + \frac{1}{2}\left(\lambda_{WL} - \lambda_{NL}\right) N^j_{i,WL} \end{aligned} \quad (24)$$

Thus, once the widelane ambiguity $N^j_{i,WL}$ has been fixed to integer on base of the Melbourne-Wübbena linear combination (11), the relation (24) can be used for integer resolution of the unconstrained narrowlane ambiguity $N^j_{i1}$ (especially when $\lambda_{NL} >> \lambda_{IF}$, see Table 3), $$N^j_{i1} = \frac{1}{\lambda_{NL}}\left(\lambda_{IF} N^j_{i,IF} - \frac{1}{2}\left(\lambda_{WL} - \lambda_{NL}\right) N^j_{i,WL}\right) \quad (25)$$

We call $N^j_{i1}$ the unconstrained or free narrowlane ambiguity since it occurs in (24) in combination with the narrowlane wavelength $\lambda_{NL}$ and does not depend on whether the fixed widelane is even or odd. Since $N_{NL} = N_{WL} + 2N_2$ (see (23)), $N_{NL}$ always has to have for consistency reasons the same even/odd status as $N_{WL}$ and is therefore already constrained to some extent.

Appendix A
PROVISIONAL APPLICATION FOR UNITED STATES PATENT

Part 5: Kalman Filter Overview

Some embodiments of the standard clock processor 320, the MW bias processor 325, the orbit processor 330 and the phase clock processor 335 use a Kalman filter approach.

Figure 6:
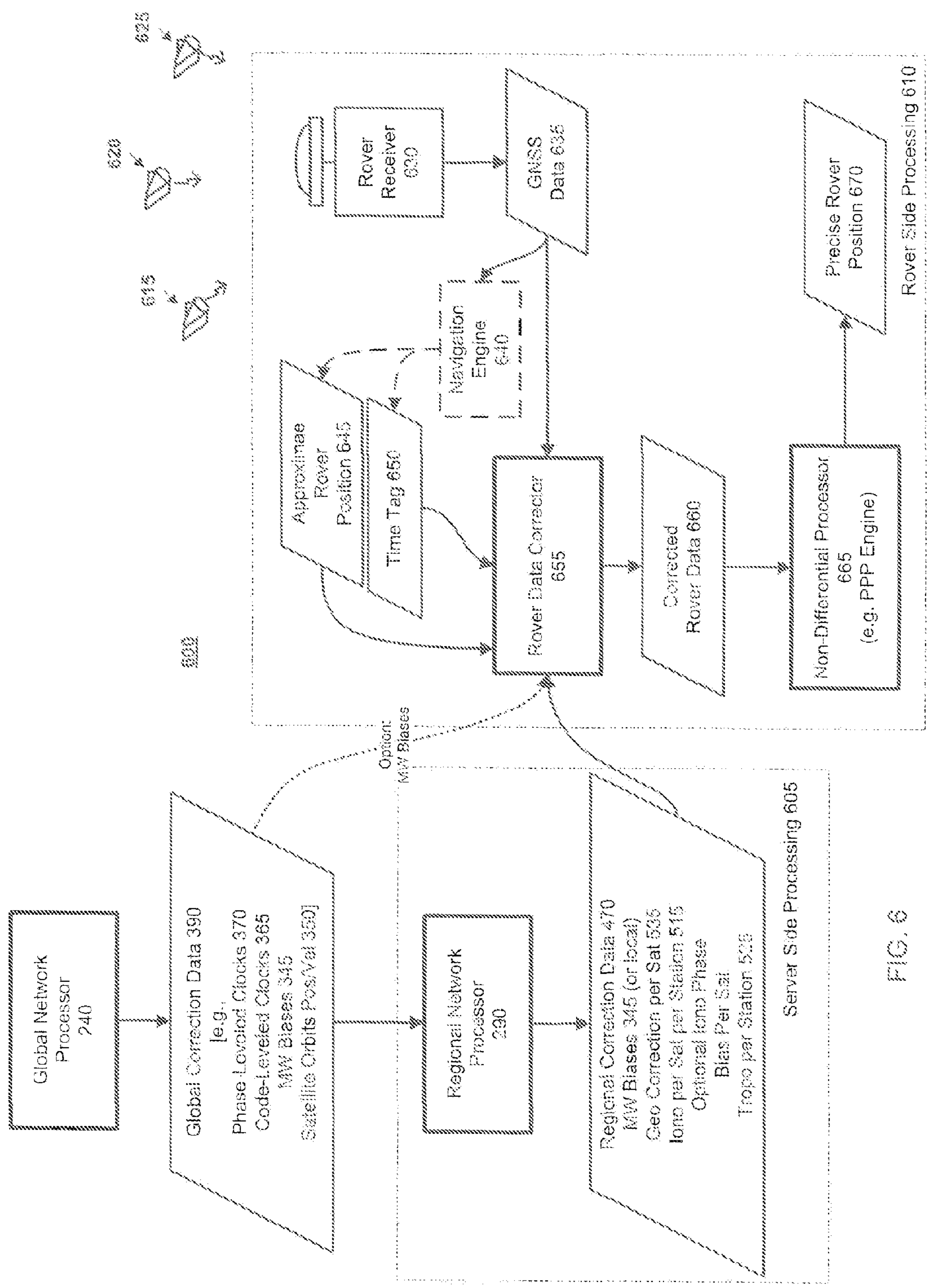
FIG. 6 is a schematic view of a generic Kalman filter process.

FIG. 6 shows a diagram of the Kalman filter algorithm 600. The modeling underlying the Kalman filter equations relate the state vector $x_k$ at time step $k$ (containing the unknown parameters) to the observations (measurements) $z_k$ via the design matrix $H_k$ and to the state vector at time step $k-1$ via the state transition matrix $\Phi_{k-1}$ together with process noise $w_{k-1}$ and observation noise $v_k$ whose covariance matrices are assumed to be known as $Q_k, R_k$, respectively. Then the Kalman filter equations predict the estimated state $\hat{x}_{k-1}$ together with its covariance matrix $P_{k-1}$ via the state transition matrix $\Phi_{k-1}$ and process noise input described by covariance matrix $Q_{k-1}$ to time step $k$ resulting in predicted state $\hat{x}_k^-$ and predicted covariance matrix $P_k^-$. Predicted state matrix and state covariance matrix are then corrected by the observation $z_k$ in the Kalman filter measurement update where the gain matrix $K_k$ plays a central role in the state update as well as in the state covariance update.

Appendix A
PROVISIONAL APPLICATION FOR UNITED STATES PATENT

Part 6: Code-Leveled Clock Processor

The estimated absolute code-leveled low-rate satellite clocks 365 are used in positioning solutions, for example to compute the precise send time of the GNSS signal and also to obtain a quick convergence of float position solutions, e.g., in precise point positioning. For send time computation a rough, but absolute, satellite clock error estimate can be used. Even the satellite clocks from the broadcast message are good enough for this purpose. However, the quality of single-differenced pairs of satellite clock errors is important to achieve rapid convergence in positioning applications. For this purpose a clock accuracy level of ca. 10 cm is desired.

Some embodiments use quality-controlled ionospheric-free combinations of GNSS observations from a global tracking network, optionally corrected for known effects, to estimate (mostly) uninterrupted absolute code-leveled satellite clock errors.

The raw GNSS reference station data 305 are optionally corrected by data corrector 310 to obtain corrected network data 315 as described in Part 3 above.

For each station, ionospheric-free combinations derived from observation of signals with different wavelengths (e.g. L1 and L2) and the broadcasted clock error predictions are used as an input for the filter:

(26)

$$P_{r,IF}^{s} - c\Delta t_{rel}^{s} = \rho_r^s + c\Delta t_{P,r} - c\Delta t_P^s + T_r + \varepsilon_{P,r,IF}^s$$

(27)

$$\Phi_{r,IF}^{s} - c\Delta t_{rel}^{s} = \rho_r^s + c\Delta t_{P,r} - c\Delta t_P^s + T_r + \lambda N_r^s + \varepsilon_{\Phi,r,IF}^s$$

$$\Delta t_{brc}^{s} = \Delta t^s + \delta^s \tag{28}$$

where $P_{r,IF}^{s}$ is the ionospheric-free code combination for each receiver-satellite pair $r,s$ $\Phi_{r,IF}^{s}$ is the ionospheric-free phase observation for each receiver-satellite pair $r,s$ $\Delta t_{brc}^{s}$ is the broadcast satellite clock error prediction Appendix A

PROVISIONAL APPLICATION FOR UNITED STATES PATENT $\rho_r^s$ is the geometric range from satellite $s$ to receiver $r$ $\Delta t_{rel}^s$ represents the relativistic effects for satellite $s$ $c\Delta t_{P,r} := c\Delta t_r + b_{P,r,IF}$ is the clock error for receiver $r$ $c\Delta t_P^s := c\Delta t^s + b_{P,IF}^s$ is the clock error for satellite $s$ $T_r$ is the troposphere delay observed at receiver $r$ $\varepsilon_{P,r,IF}^s$ represents noise in the code measurement $\varepsilon_{\Phi,r,IF}^s$ represents noise in the carrier measurement $\lambda N_r^s := \lambda_{IF} N_{r,IF}^s + b_{\Phi,r,IF} - b_{P,r,IF} - \left(b_{\Phi,IF}^s - b_{P,IF}^s\right)$ is the float carrier ambiguity from satellite $s$ to receiver $r$ The geometric range $\rho_r^s$ at each epoch can be computed from a precise satellite orbit and a precise reference station location. The relativistic effects $\Delta t_{rel}^s$ can be computed using the satellite orbits. The respective noise terms $\varepsilon_{P,r,IF}^s$ and $\varepsilon_{\Phi,r,IF}^s$ are not the same for code and carrier observations. Differencing the phase observation and code observation directly leads to a rough estimate of the carrier ambiguity $N_r^s$ though influenced by measurement noise $\varepsilon_{P,r,IF}^s$ and $\varepsilon_{\Phi,r,IF}^s$:

$$\Phi_{r,IF}^s - P_{r,IF}^s = \lambda N_r^s + \varepsilon_{\Phi,r,IF}^s + \varepsilon_{P,r,IF}^s \tag{29}$$

Thus as an input for the filter this difference $\Phi_{r,IF}^s - P_{r,IF}^s$, the phase measurement $\Phi_{r,IF}^s$ and the broadcasted satellite clock error prediction $\Delta t_{brc}^s$ is used. The difference $\Phi_{r,IF}^s - P_{r,IF}^s$ is a pseudo measurement for the ambiguities, which are modeled as constants. The converged ambiguities are used to define the level of the clock errors.

Appendix A
PROVISIONAL APPLICATION FOR UNITED STATES PATENT

Once the ambiguities are converged, the phase measurement $\Phi^s_{r,IF}$ provides a measurement for the clock errors and the troposphere. For the troposphere $T_r = (1 + c_{T,r})\hat{T}_r$ it is sufficient to estimate only one scaling factor per receiver $c_{T,r}$. A mapping to different elevations is computed using a troposphere model $\hat{T}_r$. The scaling factor can be assumed to vary over time like a random walk process.

For the satellite clocks a linear time discrete process is assumed $$\Delta t^s(t_{i+1}) = \Delta t^s(t_i) + w_1^s(t_i) + (\Delta\dot{t}^s(t_i) + w_2^s(t_i))(t_{i+1} - t_i) \tag{30}$$

with random walks $w_1^s$ and $w_2^s$ overlaid on the clock error $\Delta t^s$ and on the clock error rate $\Delta\dot{t}^s$. The receiver clocks are usually not as precise as the satellite clocks and are often unpredictable. Thus the receiver clocks are modeled as white noise to account for any behavior they might exhibit.

The system of receiver and satellite clocks is underdetermined if only code and phase observations are used. Thus all clock estimates can have a common trend (any arbitrary function added to each of the clocks). In a single difference this trend cancels out and each single difference clock is correct. To overcome this lack of information the broadcast clock error predictions can be used as pseudo observations for the satellite clock errors to keep the system close to GPS time.

The assumption of a random walk on the clock rate is equal to the assumption of a random run on the clock error itself. Optionally a quadratic clock error model is used to model changes in the clock rate. This additional parameter for clock rate changes can also be modeled as a random walk. The noise input used for the filter can be derived by an analysis of the clock errors using for example the (modified) Allan deviation or the Hadamard variance. The Allan deviation is described in *A. van Dierendonck, Relationship between Allan Variances and Kalman Filter Parameters*, PROCEEDINGS OF THE 16TH ANNUAL PRECISE TIME AND TIME INTERVAL (PTTI) SYSTEMS AND APPLICATION MEETING 1984, pp. 273-292. The Hadamard variance is described in *S. Hutsell, Relating the Hadamard variance to MCS Kalman filter clock estimation*, 27TH Appendix A
PROVISIONAL APPLICATION FOR UNITED STATES PATENT ANNUAL PRECISE TIME AND TIME INTERVAL (PTTI) APPLICATIONS AND PLANNING MEETING 1996, pp. 291-301.

There are many different approaches to overcome the underdetermined clock system besides adding the broadcasted satellite clock errors as pseudo-observations. One is to fix one of the satellite or receiver clock errors to the values of an arbitrarily chosen function (e.g. 0 or additional measurements of a good receiver clock). Another is to fix the mean of all clocks to some value, for example to the mean of broadcasted or ultra-rapid clock errors as done in *A. Hausschild, Real-time Clock Estimation for Precise Orbit Determination of LEO-Satellites*, ION GNSS 2008, Sept. 16-19, 2008, Savannah, Georgia, 9 pp. This is taken into account in deriving the clock models; the system model and the noise model fits the clock error difference to the fixed clock error and no longer to the original clock error.

Figure 7:
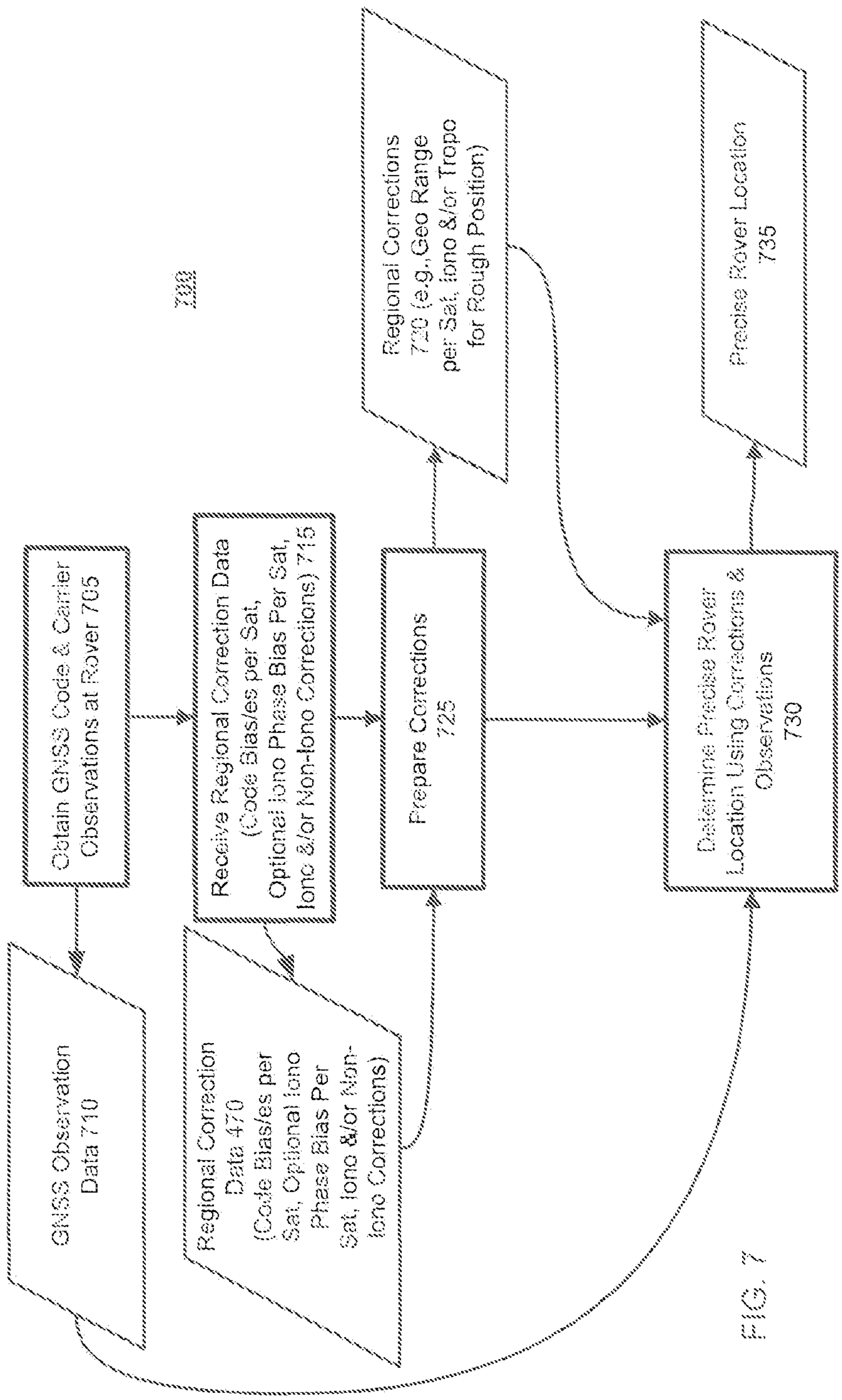
FIG. 7 is a schematic diagram of a code-leveled clock processor in accordance with some embodiments of the invention.

FIG. 7A is a schematic diagram of a "standard" code-leveled clock processor 320 in accordance with some embodiments of the invention. An iterative filter such as a Kalman filter 705 uses for example ionospheric-free linear combinations 710 of the reference station observations and clock error models 715 with broadcast satellite clocks 720 as pseudo-observations to estimate low-rate code-leveled (standard) satellite clocks 365, tropospheric delays 370, receiver clocks 725, satellite clock rates 730, (optionally) ionospheric-free float ambiguities 374, and (optionally) ionospheric-free code-carrier biases 372.

Further improvements can be made to quality of the clocks. Single differences of the estimated clock errors can exhibit a slow drift due to remaining errors in the corrected observations, errors in the orbits, and unmodeled biases between phase and code measurements. After some time the single differences of the estimated clock errors no longer match a code-leveled clock. To account for such a drift, the mismatch between code and phase measurements is optionally estimated and applied to the estimated clock errors. In some embodiments this is done by setting up an additional filter such as filter 735 of FIG. 7A with only one bias per satellite and one per receiver, to estimate the ionospheric-free code-carrier biases 372 as indicated by "option 1." The receiver biases are modeled for example as white noise processes. The satellite biases are modeled for example as random walk with an appropriate small input noise, because only low rate variations of the satellite biases are expected. Observations used for this filter are, for example, an ionospheric-free code combination 740, reduced by the tropospheric delay 370, the satellite clock errors 365 and the receiver clock errors 725 estimated in the above standard code-leveled clock filter 705. Rather than setting up the additional filter such as filter 730, the iono-free code-carrier biases are in some embodiments modeled as additional states in the code-leveled clock estimation filter 705, as indicated by "option 2."

Appendix A
PROVISIONAL APPLICATION FOR UNITED STATES PATENT

Part 7: MW (Melbourne-Wübbena) Bias Processor

Part 7.1 MW Bias: Motivation

The range signals emitted by navigation satellites and received by GNSS receivers contain a part for which delays in the satellite hardware are responsible. These hardware delays are usually just called satellite biases or uncalibrated delays. In differential GNSS processing the satellite biases do not play any role when both receivers receive the same code signals (e.g. in case of GPS both L1C/A or both L1P). However, the biases are always important for Precise Point Positioning (PPP) applications where the precise positioning of a single rover receiver is achieved with the help of precise satellite clocks and precise orbits determined on base of a global network of reference stations (as e.g. by the International GNSS service (IGS)) (Zumberge, Heflin, Jefferson, Watkins, & Webb, 1997), (Héroux & Kouba, 2001). Here the knowledge of satellite biases can allow to resolve undifferenced (or between satellite single differenced) integer ambiguities on the rover which is the key to fast high precision positioning without a reference station (Mervart, Lukes, Rocken, & Iwabuchi, 2008), (Collins, Lahaye, Héroux, & Bisnath, 2008).

Usually the satellite biases are assumed to be almost constant over time periods of weeks (Ge, Gendt, Rothacher, Shi, & Liu, 2008), and their variations can be neglected (Laurichesse & Mercier, 2007), (Laurichesse, Mercier, Berthias, & Bijac, 2008). Our own intensive studies revealed by processing in the here proposed way GPS data of a global network of reference stations over several months that there are daily repeating patterns in the Melbourne-Wuebbena (MW) linear combination of satellite biases of size up to about 14 cm over 6 hours[2], as well as drifts over a month of up to about 17 cm and sometimes sudden bias level changes (of arbitrary size) of individual satellites within seconds (e.g. GPS PRN 24 on 2008.06.26). Therefore the real-time estimation of satellite biases as a dynamical system in a sequential least squares filter (like e.g. a Kalman filter ((Grewal & Andrews, 2001), (Bierman, 1977)) and the transmission of these biases to PPP based rover receivers (in addition to precise satellite clocks and orbits) becomes important for integer ambiguity resolution on the rover.

[2] Nevertheless, the daily repeatability of the MW satellite biases is usually in the range of 2 to 3 cm which is consistent with the literature.

Appendix A
PROVISIONAL APPLICATION FOR UNITED STATES PATENT

Part 7.2 MW Bias: Process Flow

Figure 11:
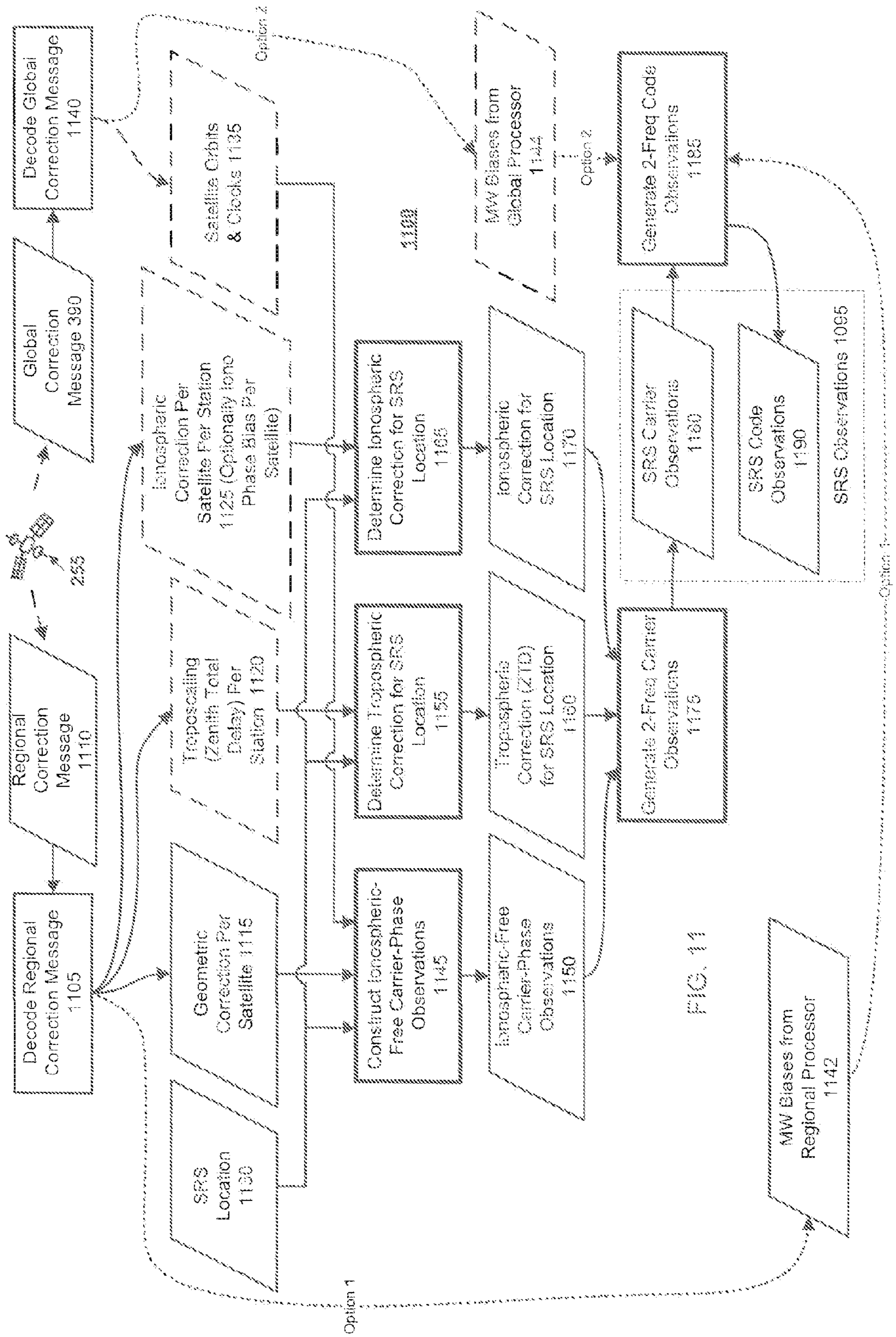
FIG. 11 is a schematic diagram of a Melbourne-Wübbena bias process flow in accordance with some embodiments of the invention.

FIG. 11 is a schematic diagram of a process flow 1100 for MW satellite bias and WL ambiguity determination in accordance with some embodiments. GNSS observation data 305 on code and carrier phase on at least two frequencies from a number of reference station receivers is used as the main input into the process. These observations are optionally corrected at 310 for effects that do not require estimation of any model parameters. Among the corrections typically used in PPP applications for the MW linear combination are especially the receiver and satellite antenna offsets and variations; higher order ionospheric terms are of importance since these corrections do not cancel in this linear combination. The optionally corrected GNSS observation data 315 is then forwarded to a module 1105 that generates linear combinations 1110 of the code and phase observations on two frequencies. The determined MW observation combinations 1110 are then input into a sequential filter 1115 (such as a Kalman filter) that relates MW observations $\Phi^j_{i,WL} - P^j_{i,NL}$ to the estimation parameters, i.e., the MW satellite biases $b^j_{MW}$ 1120, WL ambiguities $N^j_{i,WL}$ 1125 and optionally MW receiver biases $b_{i,MW}$ 1130 via Equation (11) in the undifferenced case or via Equation (12) in the between satellite single difference case.

Importantly, process noise input on the MW satellite biases $b^j_{MW}$ ensures that the biases can vary over time. Due to the periodic behavior of satellite biases, optionally the biases may also be modeled by harmonic functions, e.g. as $$b^j_{MW} = b^j_0 + b^j_1 \sin(\alpha^j) + b^j_2 \cos(\alpha^j) \tag{31}$$

where $\alpha^j$ defines the position of satellite j in the orbit (e.g. $\alpha^j$ could be the argument of latitude or the true anomaly) and $b^j_0, b^j_1, b^j_2$ are the estimated parameters that need much less process noise than a single parameter $b^j_{MW}$ and can therefore further stabilize the estimation process.

In addition to the observation data, a single MW bias constraint 1140 and several ambiguity constraints 1145 are input to the filter [935]. These constraints are additional arbitrary equations that are e.g. of the form $$b^{j_0}_{WL} = 0 \tag{32}$$

Appendix A
PROVISIONAL APPLICATION FOR UNITED STATES PATENT $$N_{i,WL}^{j} = \text{round}(N_{i,WL}^{j}) \tag{33}$$

and that are added to the filter with a very low observation variance of e.g. $10^{-30}\,m^2$. The constraints ensure that the system of linear equations in the filter 1115 is not underdetermined so that the variances of the model parameters immediately become of the same order as the observation variance. They have to be chosen in a careful way so that the system of linear equations is not over-constrained by constraining a double-difference WL ambiguity which is directly given by the MW observations (see equation (13). By constraining the ambiguities to an arbitrary integer, information about the integer nature of the ambiguities comes into the system. In a Kalman filter approach where the system of equations in (11) or (12) (optionally together with (31)) is extended by arbitrary equations for the initial values of all parameters so that always a well defined float solution (with variances of the size of the initial variances) exists, it is preferable to constrain the ambiguities to the closest integer of the Kalman filter float solution.

The estimated MW satellite biases 1120 are either directly used as the process output or after an optional additional WL ambiguity fixing step. Therefore the estimated WL ambiguities 1125 are optionally put into an ambiguity fixer module 1135. The resulting fixed WL ambiguities 340 (that are either fixed to integer or float values) are used as the second process output. Optionally the fixed WL ambiguities 340 are fed back into the filter 1115 (or into a filter copy or a secondary filter without ambiguity states (compare FIG. 24A – FIG. 25D) to get satellite MW bias output 1120 which is consistent with integer WL ambiguities.

The MW satellite biases 1120 are transferred for example via the scheduler 355 to rover receivers where they help in fixing WL ambiguities at the rover. Network WL ambiguities 1125 or 340 can be forwarded to the phase clock processor 335 and orbit processor 330 where they help in fixing iono-free (IF) ambiguities when the reference station data 305 from the same receiver network is used in these processors. Alternatively, instead of the network WL ambiguities 1125 or 340], MW satellite biases 1120 are transferred to orbit processor 330 and phase clock processor 335 to derive WL ambiguities in a station-wise process for the network receivers in the same way as it is done on the rover. Then the derived WL ambiguities help in fixing IF ambiguities. With such an approach, GNSS data from different reference station networks can be used in the different processors.

Appendix A
PROVISIONAL APPLICATION FOR UNITED STATES PATENT

Figure 12:
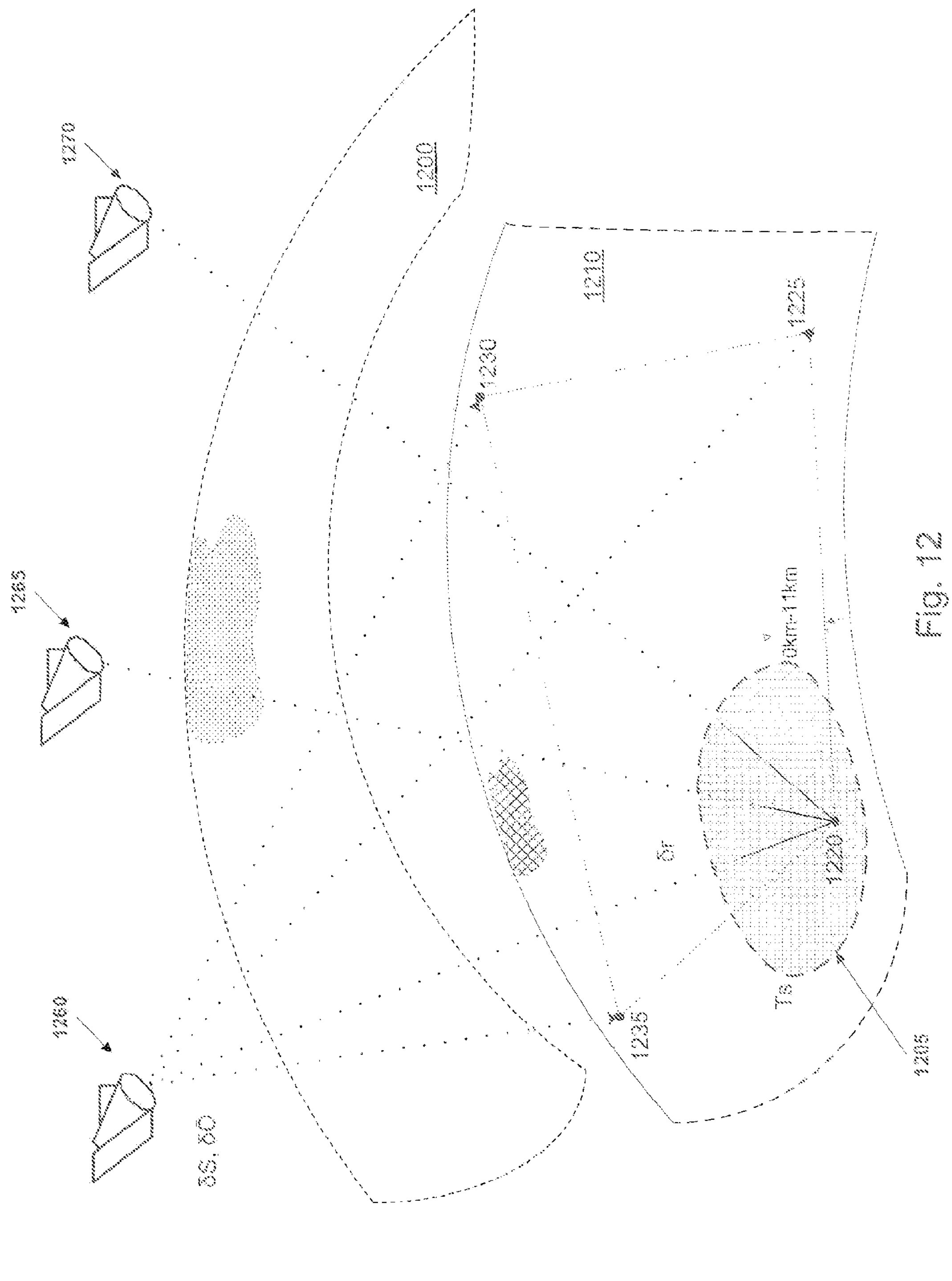
FIG. 12 is a schematic diagram of a Melbourne-Wübbena bias process flow in accordance with some embodiments of the invention.
Figure 13:
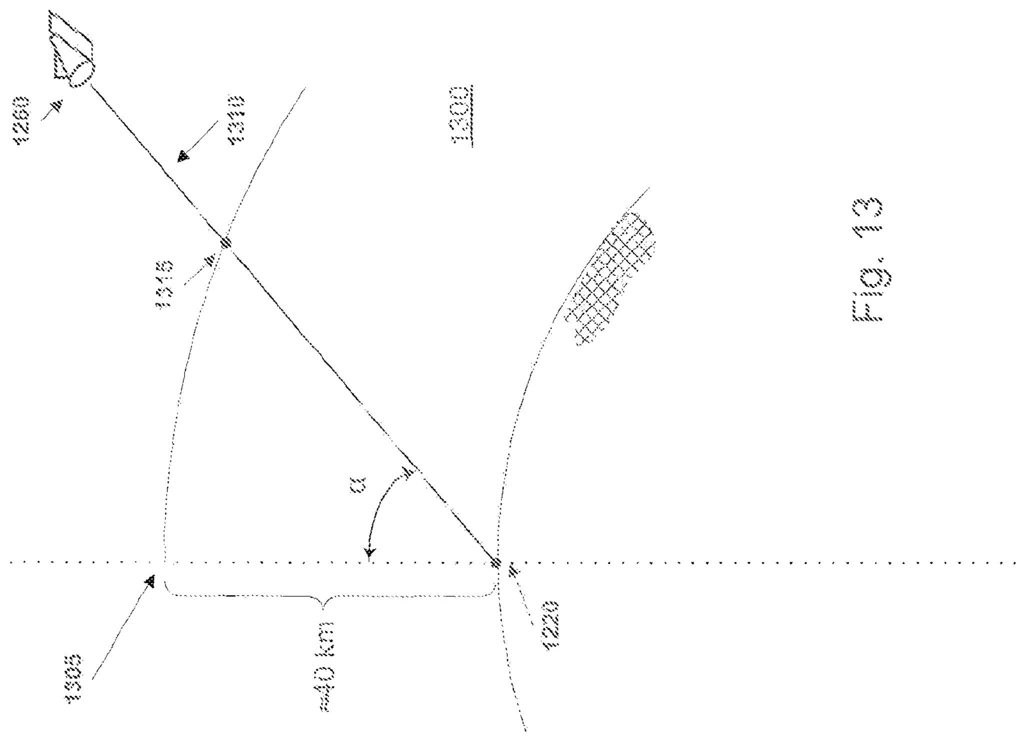
FIG. 13A shows filter states of an undifferenced Melbourne-Wübbena bias processor in accordance with some embodiments of the invention.
FIG. 13B shows filter states of a single-differenced Melbourne-Wübbena bias processor in accordance with some embodiments of the invention.

FIG. 12 shows a schematic diagram of a processing architecture 1200 in accordance with some embodiments. Code and carrier phase observations 1205 (e.g., from reference station data 305) on at least two frequencies from a number of reference station receivers are put into a linear combiner 1210 that generates a set of Melbourne-Wuebbena (MW) linear combinations 1220, one such MW combination for each station-satellite pairing from code and carrier phase observations on two frequencies. If more than two frequencies are available several MW combinations can be generated for a single station-satellite pairing. These MW observations are then put into a processor 1225 that estimates at least MW biases per satellite 1230 and WL ambiguities per station-satellite pairing 1235 based on modeling equations (11) in the undifferenced case or (12) in the between satellite single difference case (both optionally together with (31)). The processor is usually one or more sequential filters such as one or more Kalman filters. Since it can also consist of several filters, here the more general term processor is used. Process noise 1240 input on the MW satellite biases in the processor allows them to vary from epoch to epoch even after the convergence phase of filtering. The outputs of the process are the estimated satellite MW biases 1230 and network WL ambiguities 1235.

Thus, some embodiments provide a method of processing a set of GNSS signal data derived from code observations and carrier-phase observations at multiple receivers of GNSS signals of multiple satellites over multiple epochs, the GNSS signals having at least two carrier frequencies, comprising: forming an MW (Melbourne-Wübbena) combination per receiver-satellite pairing at each epoch to obtain a MW data set per epoch; and estimating from the MW data set per epoch an MW bias per satellite which may vary from epoch to epoch, and a set of WL (widelane) ambiguities, each WL ambiguity corresponding to one of a receiver-satellite link and a satellite-receiver-satellite link, wherein the MW bias per satellite is modeled as one of (i) a single estimation parameter and (ii) an estimated offset plus harmonic variations with estimated amplitudes.

Broadcast satellite orbits 1245 contained in the navigation message are optionally used, for example with coarse receiver positions 1250, to reduce the incoming observations to a minimal elevation angle under which a satellite is seen at a station. The receiver positions 1250 are optionally given as an additional input, or alternatively can be derived as known in the art from the code observations and the broadcast satellite orbit. The restriction to observations of a minimal elevation can be done at any place before putting the observations into the processor.

Appendix A
PROVISIONAL APPLICATION FOR UNITED STATES PATENT

However, performing the restriction directly after pushing the code and carrier phase observations into the process avoids unnecessary computations.

Figure 13B:
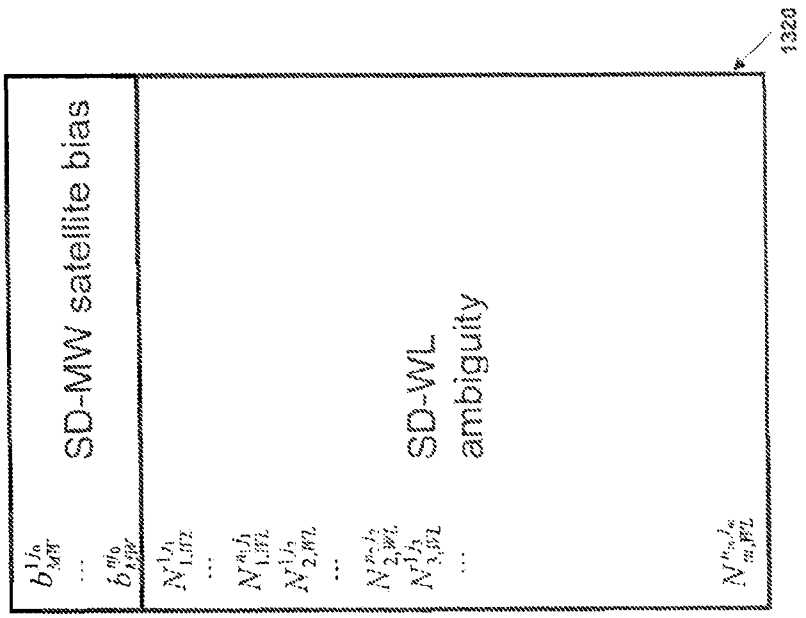
Figure 13A:
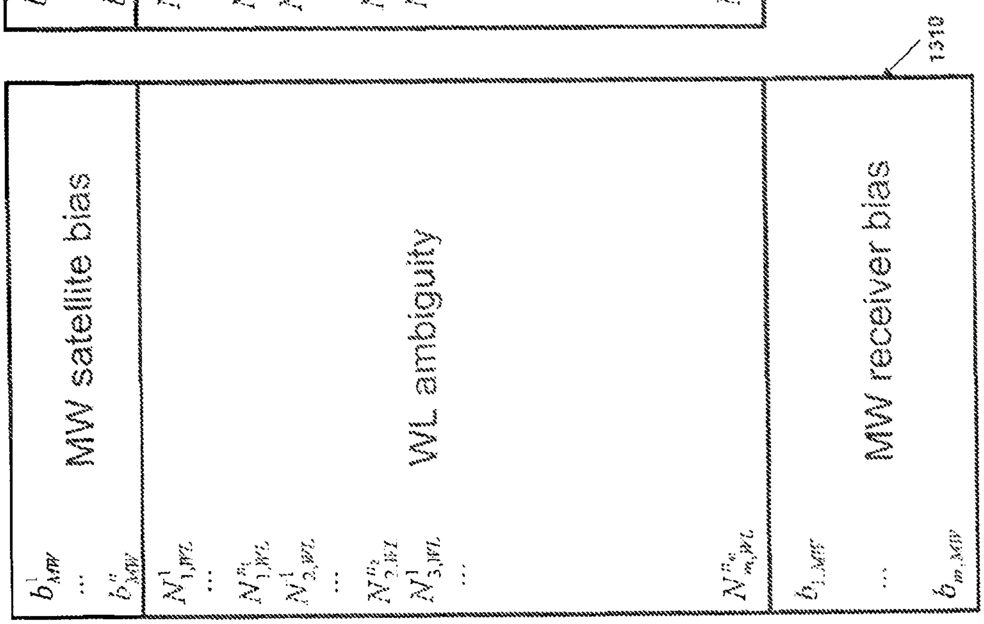
Figure 14:
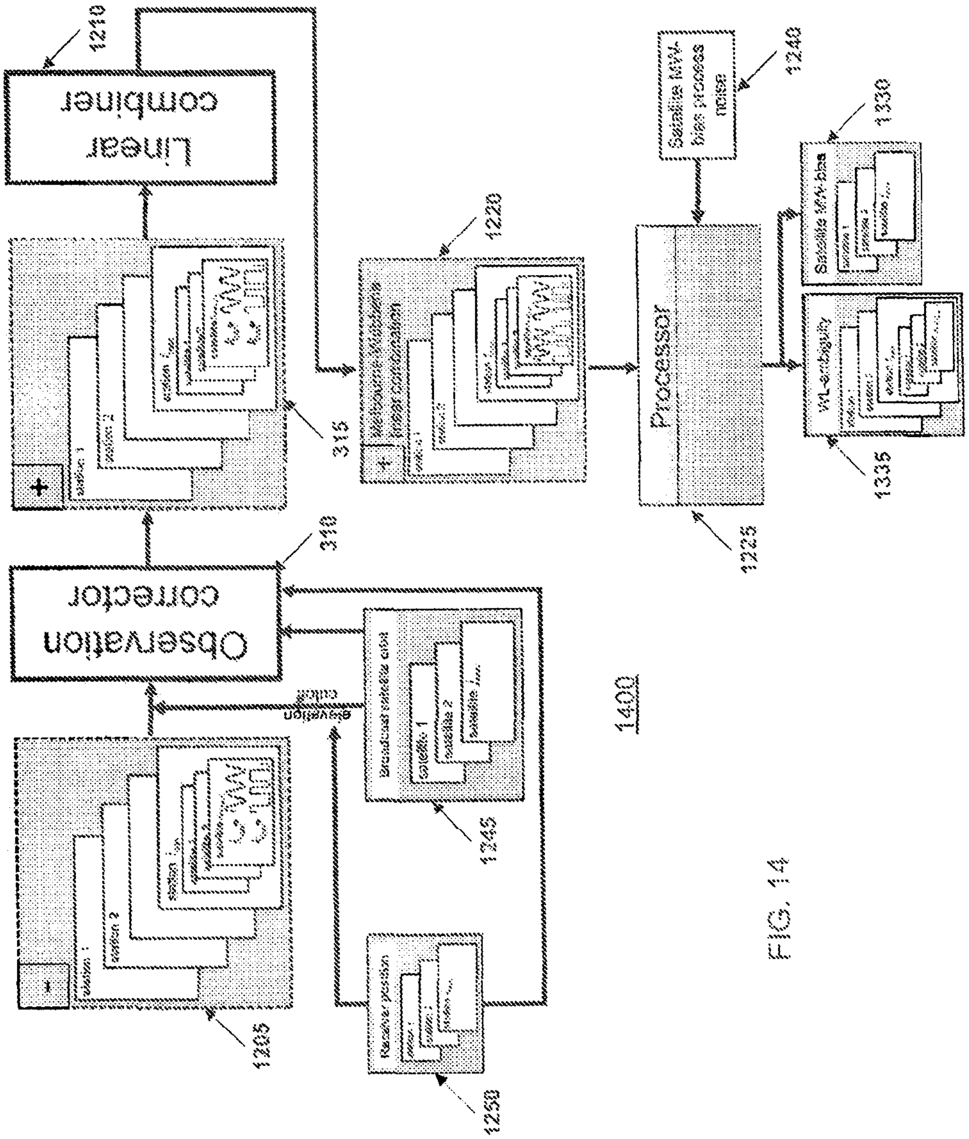
Figure 15:
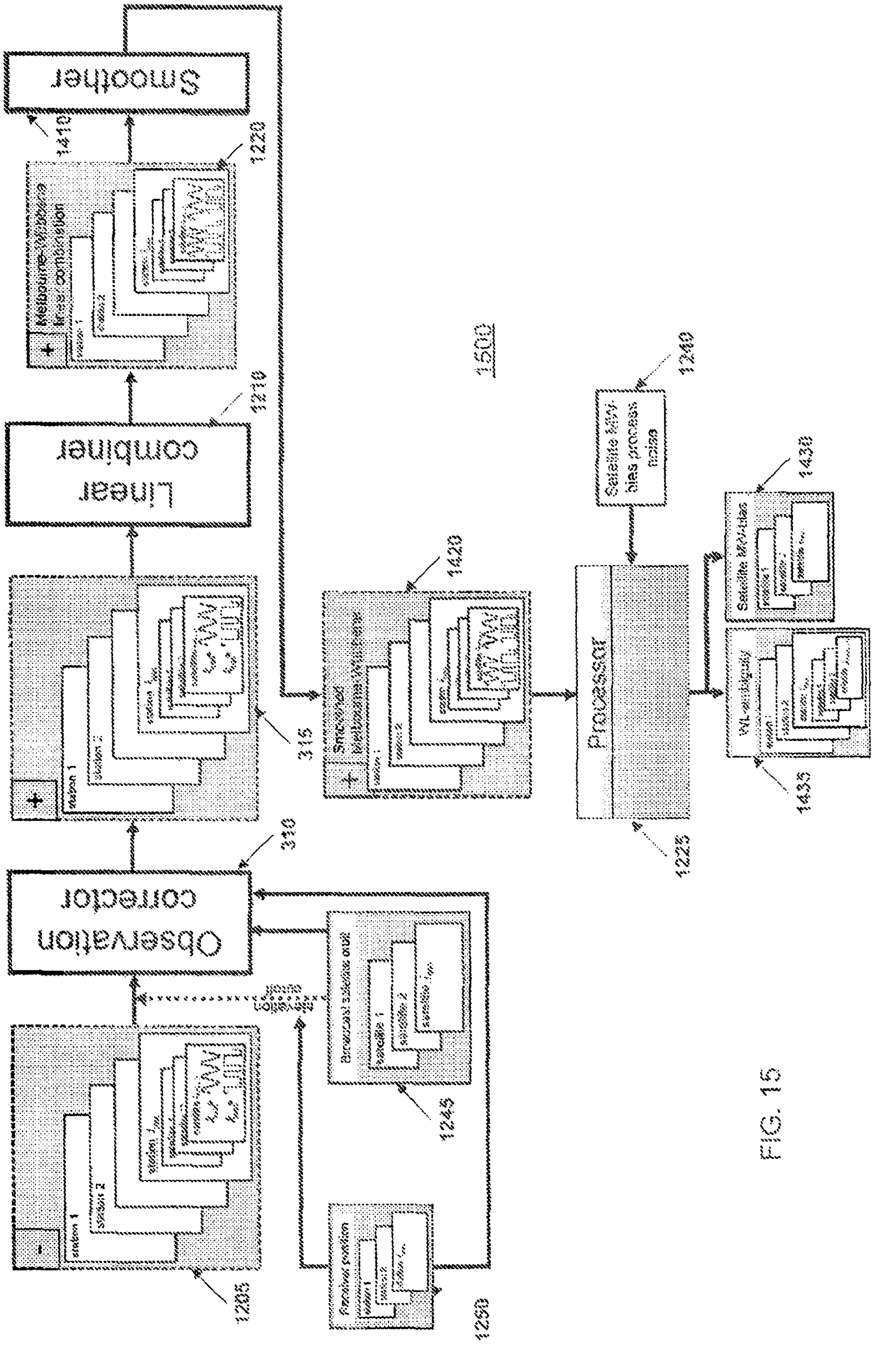
Figure 16:
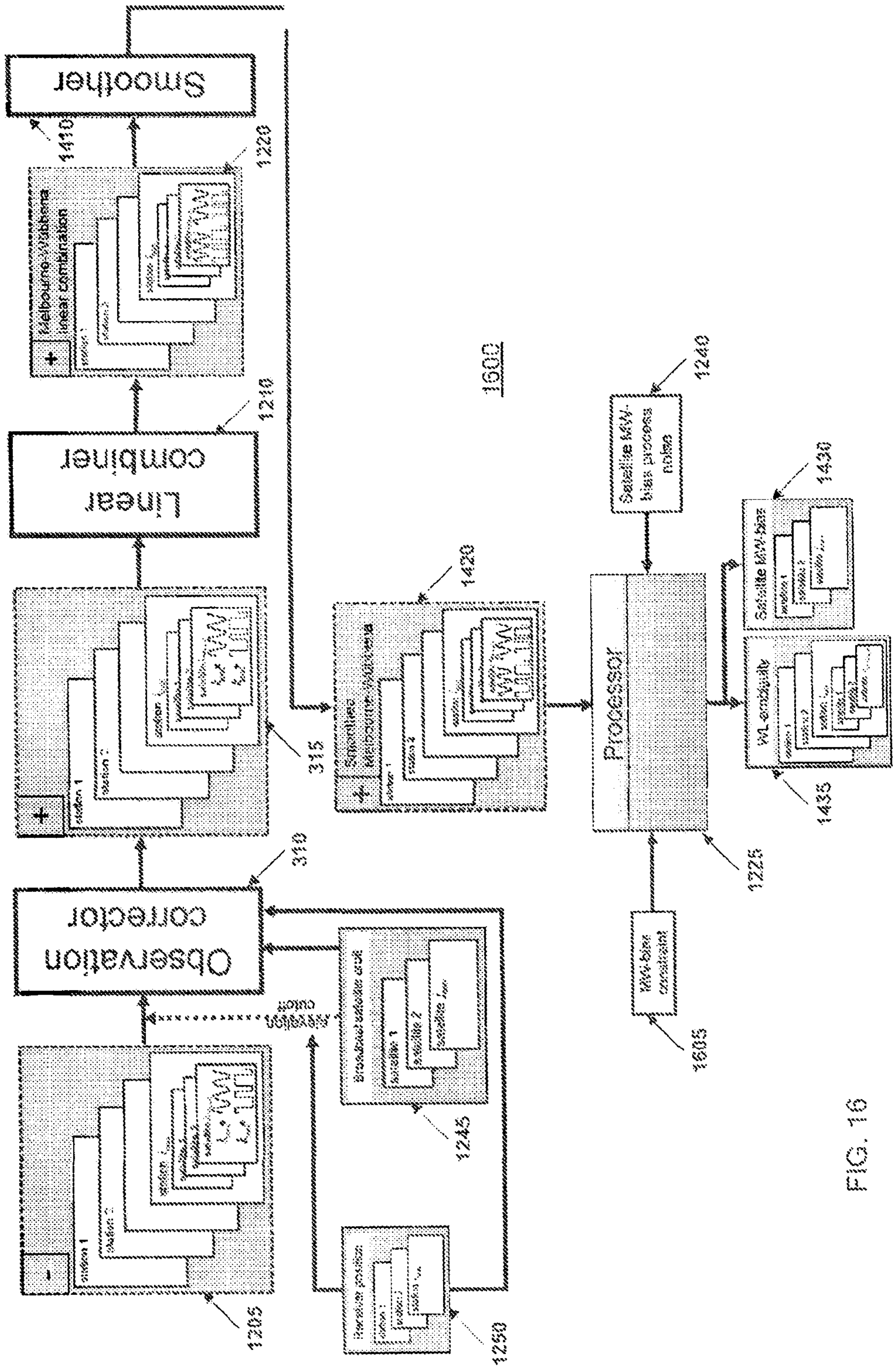
Figure 17:
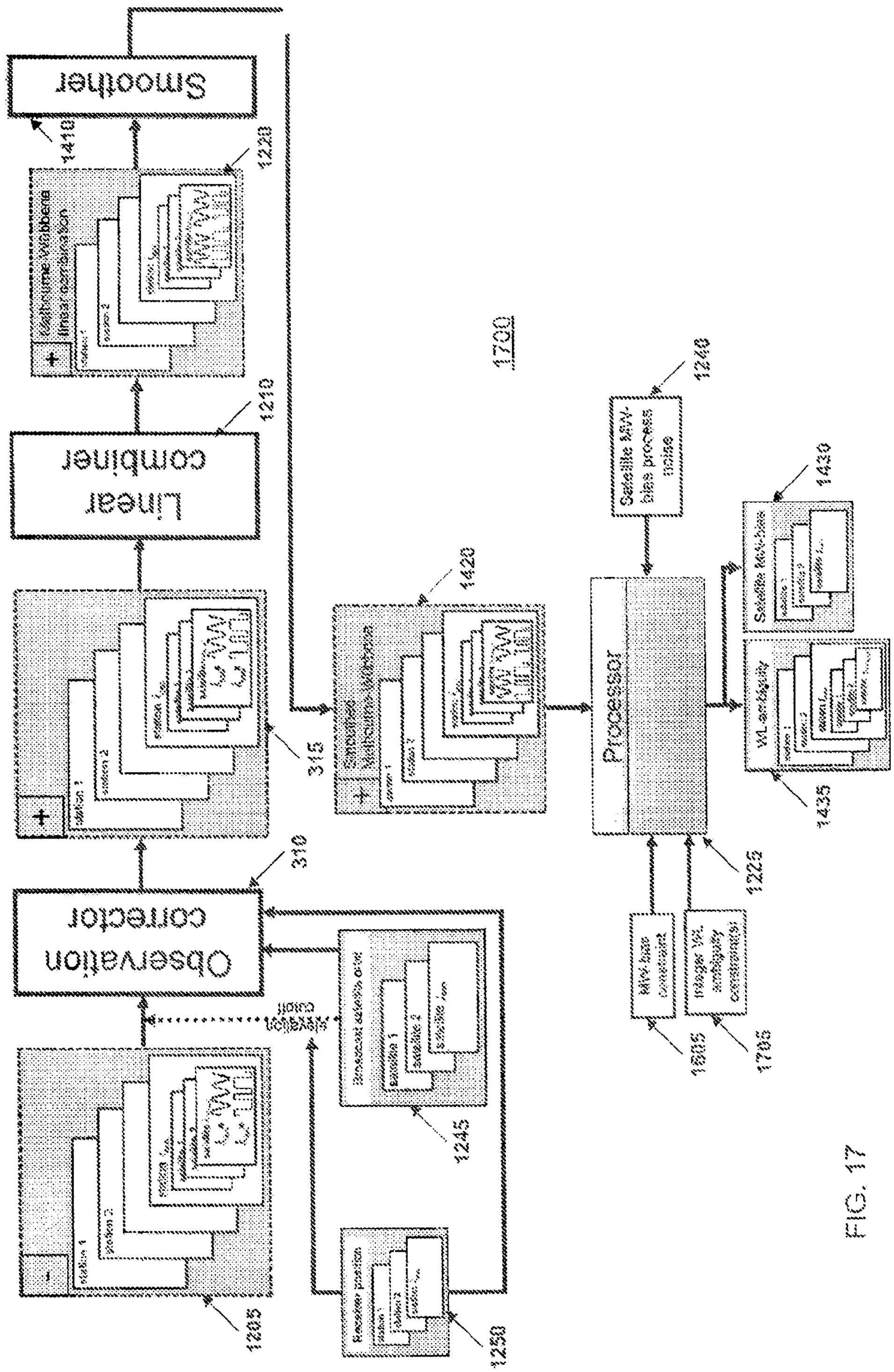
Figure 18:
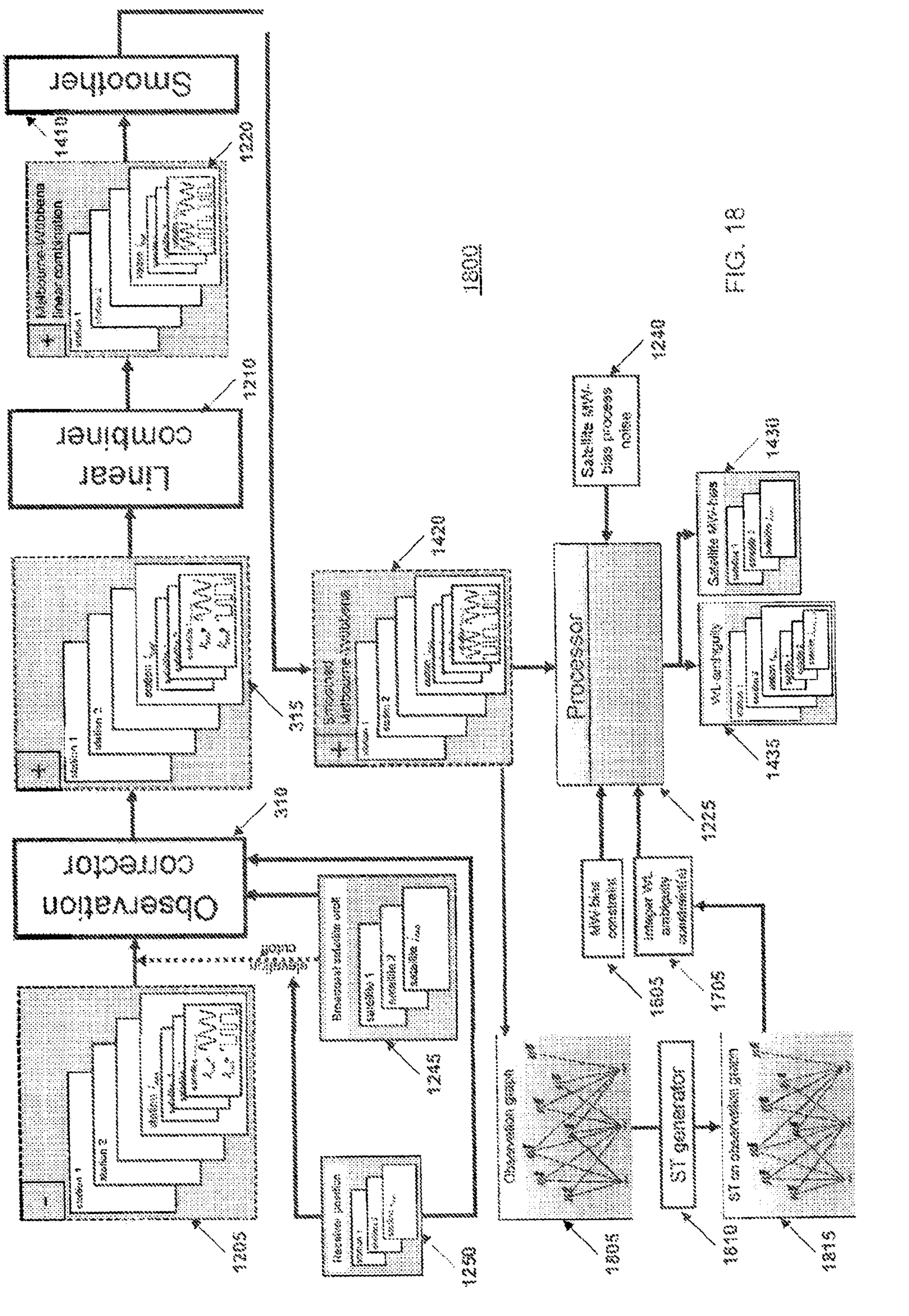

FIG. 13A and FIG. 13B show respectively the state vectors for the undifferenced (= zero-differenced (ZD)) and single differenced embodiments, listing parameters to be estimated. The ZD state vector 1310 comprises $n$ satellite bias states $b^j_{MW}$, a number of ambiguity states $N^j_{i,WL}$ that changes over time with the number of satellites visible at the stations, and $m$ receiver bias states $b_{i,MW}$. The SD state vector 1320 comprises $n$ satellite bias states $b^{jj_0}_{MW}$ to a fixed reference satellite $j_0$ that can be either a physical or an artificial satellite. In addition, the SD state vector comprises the same number of ambiguity states as in the ZD case. However, here each ambiguity represents a SD ambiguity to a physical or artificial satellite. Each station can have its own choice of reference satellite. In the SD case no receiver bias states are necessary, so that there are always $m$ less states in the SD state vector 1320 than in the comparable ZD state vector 1310. More details about artificial reference satellites follow in Part 7.4.

Part 7.3 MW Process: Correcting and Smoothing

Figure 14:
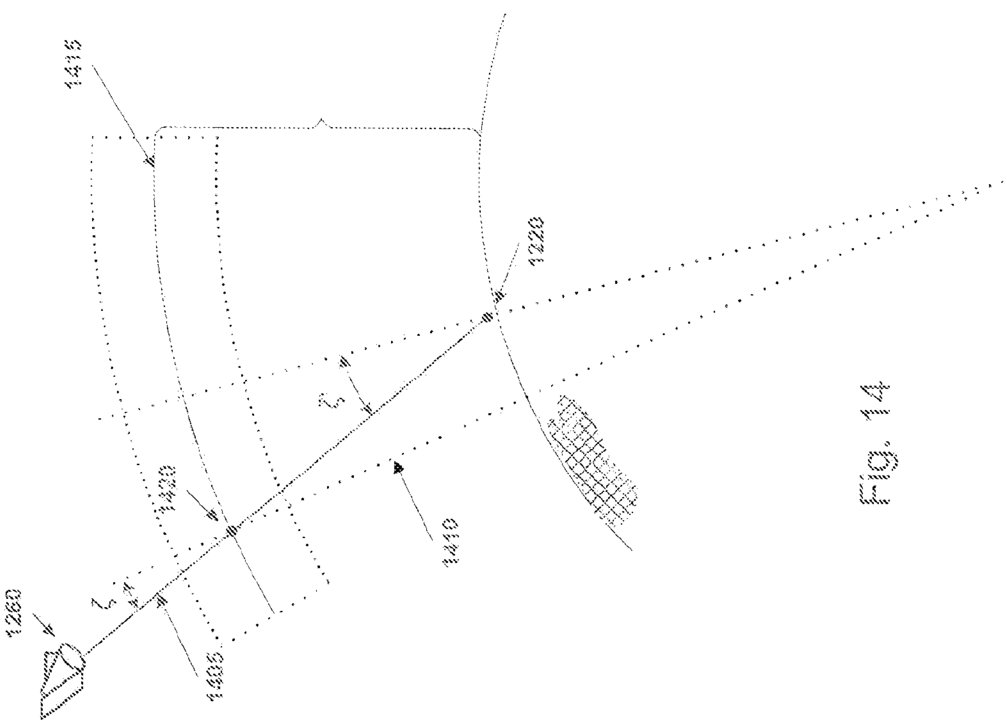
FIG. 14 is a schematic diagram of a Melbourne-Wübbena bias processor in accordance with some embodiments of the invention.

FIG. 14 shows a process 1400 with tbe addition of observation correction to the MW process of FIG. 12. Some embodiments add the observation data corrector module 310 of FIG. 3. Code and carrier phase observations 1205 on at least two frequencies from a number of reference stations (e.g., from reference station data 305) are corrected in the optional observation data corrector 310 for effects that do not require estimation of any model parameters (especially receiver and satellite antenna offsets and variations, and higher order ionospheric effects). Knowledge of the broadcast satellite orbits 1245 and the coarse receiver positions 1250 is used for this. The corrected observation data 1310 are then optionally fed into the process of FIG. 12 to produce MW satellite biases 1330 and widelane ambiguities 1335.

Figure 15:
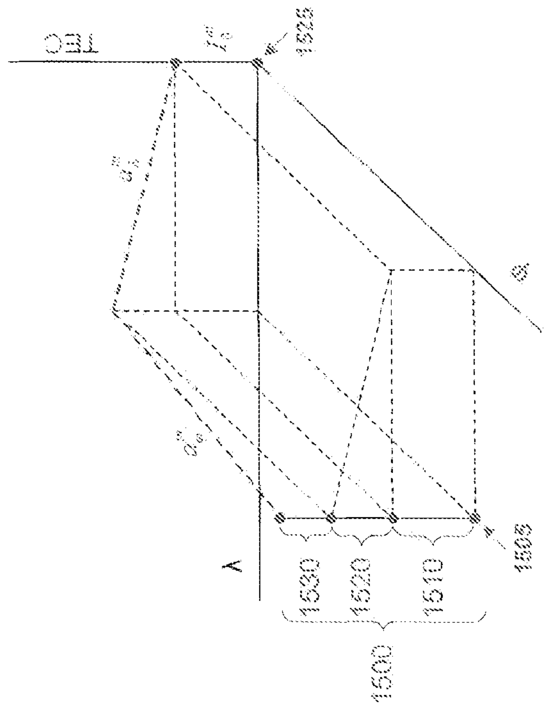
FIG. 15 is a schematic diagram of a Melbourne-Wübbena bias processor in accordance with some embodiments of the invention.

In FIG. 15, code and carrier phase observations 1205 on at least two frequencies from a number of reference stations (e.g., from reference station data 305) are optionally corrected in the observation data corrector 310, then combined in a linear combiner 1210 to form Melbourne-Wuebbena linear combinations 1220 and finally smoothed over several epochs in a smoother 1410 to form smoothed Melbourne-Wuebbena combinations 1420. Alternatively, smoothing can be done on the original observations or on any other linear combination of the original observations before generating the MW linear combination. In any case, the resulting smoothed MW observations are put into the processor 1225 for estimating MW satellite biases 1430 and WL ambiguities 1435 as in the embodiments of FIG. 12 and FIG. 14.

Smoothing means to combine multiple observations over time, e.g. by a simple averaging operation, to obtain a reduced-noise observation. MW smoothing is done to reduce the multipath error present in (10) that is not explicitly modeled in the processor 1225, e.g., as in modeling equations (11) and (12). Smoothing is motivated by the expectation that the MW observation is almost constant over short time periods since the MW observation only consists of hardware biases and a (constant) ambiguity term. A reasonable smoothing interval is, for example, 900 seconds. An additional advantage of smoothing the MW observations is that an observation variance can be derived for the smoothed observation from the input data by the variance of the mean value, $$\sigma^2_{\text{obs,MW}} = \frac{\sum_{t=1}^{n}(x_t - \bar{x})^2}{(n-1)n} \quad \text{with} \quad \bar{x} = \frac{1}{n}\sum_{t=1}^{n} x_t \tag{34}$$

where $x_t$ is the MW observation at smoothing epoch $t$ and $n$ is the number of observations used in the smoothing interval. To ensure that this variance really reflects multipath and not just a too-small number of possibly unreliable observations in the smoothing interval, it is advantageous to accept a smoothed observation as filter input only when a minimal number of observations is available, e.g. 80% of the theoretical maximum. Note that the statistical data that holds mean value and variance of the Melbourne-Wuebbena observation has to be reset in case of an unrepaired cycle slip since this observation contains an ambiguity term. Of course, a cycle slip also requires a reset of the corresponding ambiguity in the filter.

If smoothing is done by a simple averaging operation over a fixed time interval, smoothing implies different data rates in the process. Observations 1205 are coming in with a high data rate, while smoothed MW observations 1420 are forwarded to the processor with a lower data rate. This kind of smoothing has the advantage that observations put into the processor are not correlated and can therefore be handled in a mathematically correct way. The alternative of using some kind of a (weighted) moving average allows to stay with a single (high) data rate, but has the disadvantage that the resulting smoothed observations become mathematically correlated.

Appendix A
PROVISIONAL APPLICATION FOR UNITED STATES PATENT

Part 7.4 MW Process: MW Bias Constraint

Figure 16:
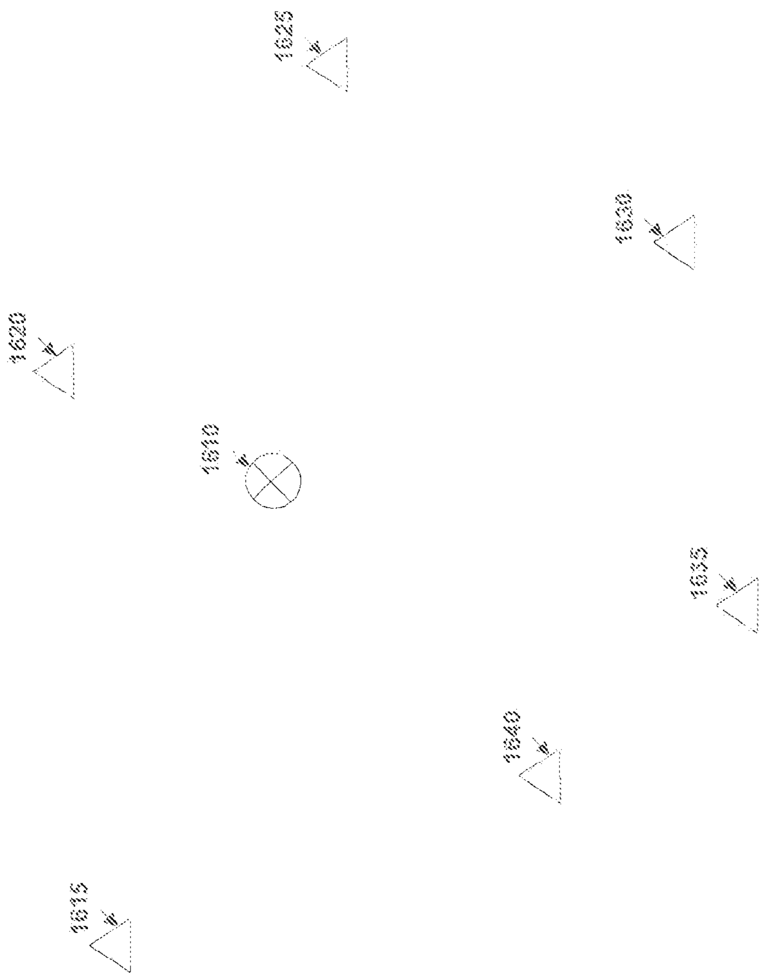
FIG. 16 is a schematic diagram of a Melbourne-Wübbena bias processor in accordance with some embodiments of the invention.

FIG. 16 shows a process 1600 with the addition of one or more MW bias constraints to the process of FIG. 15, which can similarly be added to the embodiments shown in FIG. 12, FIG. 14. At least one MW bias constraint 1605 like (32) is put into the processor to reduce the rank defect in modeling equations (11) or (12).

The rank defect in (11) or (12) becomes apparent by counting the number of observations and the number of unknowns in these equations. For example in (11), if there are $i = 1,\ldots,m$ stations and $j = 1,\ldots,n$ satellites and it is assumed that all satellites are seen at all stations, there will be $m \cdot n$ Melbourne-Wuebbena observations. However, at the same time there are also $m \cdot n$ unknown ambiguities $N^j_{i,WL}$ in addition to $m$ receiver biases $b_{i,MW}$ and $n$ satellite biases $b^j_{MW}$, resulting in $m \cdot n + m + n$ unknowns. Thus the system of equations defined by (11) can only be solved if the number of arbitrary constraints introduced into the system is the number of unknowns minus the number of observations, i.e. $(m \cdot n + m + n) - (m \cdot n) = m + n$.

Most of these constraints should be ambiguity constraints as the following consideration demonstrates. For $n$ satellites $n-1$ independent between-satellite single differences can be generated. In the same way, from $m$ stations $m-1$ between station single differences can be derived. In a double difference (DD) between stations and satellites these independent single differences are combined, resulting in $(m-1)\cdot(n-1) = m \cdot n - (m + n - 1)$ double difference observations. Since as in (13) the DD ambiguities are uniquely determined by the DD-MW observations, the difference between the $m \cdot n$ ambiguities in (11) and the $m \cdot n - (m + n - 1)$ unique DD ambiguities should be constrained, resulting in $m + n - 1$ ambiguity constraints. Thus from the $m + n$ required constraints all but one should be ambiguity constraints. The remaining arbitrary constraint should be a constraint on the biases. This statement remains true in the more general case when not all satellites are seen at all stations and thus the number of required constraints can no longer be counted in the demonstrated simple way. The constraint on the biases itself is an arbitrary equation like (32) or more generally of the form Appendix A
PROVISIONAL APPLICATION FOR UNITED STATES PATENT $$\sum_i a_i b_{i,MW} + \sum_j a^j b^j_{MW} = b \quad \text{with} \quad a_i, a^j, b \in R \tag{35}$$

In the single difference case (12) the constraint on the biases is more straightforward. The state vector of the satellite biases does not contain all possible SD biases but only the independent ones. This is achieved by taking an arbitrary reference satellite and choosing as states only the SD biases to the reference. To be prepared for a changing reference satellite in case the old reference satellite is not observed anymore, it is preferable to also have a state for the reference satellite. However, the SD bias of the reference to itself has to be zero.

$$b^{j_{ref} j_{ref}}_{MW} = b^{j_{ref}}_{MW} - b^{j_{ref}}_{MW} \equiv 0 \tag{36}$$

This equation is added as a constraint. Note, however, that the SD bias states are not necessarily interpreted as SDs to a physical reference satellite. It is also possible to have an artificial reference satellite with a bias that is related to the biases of the physical satellites (this ensures that the artificial satellite is connected to the physical satellites)

$$\sum_j a^j b^j_{MW} = b \quad \text{with} \quad a^j, b \in R \tag{37}$$

By specifying arbitrary values for $a^j, b$ (with at least one $a^j \neq 0$) and introducing (37) as a constraint into (12), the information about the bias of the reference satellite comes into the system.

With knowledge of MW satellite biases (as they are derived from the system proposed here) from a different source, it is also reasonable to introduce more than one bias constraint into the system. For example, if all MW satellite biases are constrained, it is in a single-difference approach not necessary to introduce any ambiguity constraints into the system, since (12) can be rewritten as $$\Phi^{j_1 j_2}_{i,WL} - P^{j_1 j_2}_{i,NL} + b^{j_1 j_2}_{MW} = \lambda_{WL} N^{j_1 j_2}_{i,WL} \tag{38}$$

Appendix A
PROVISIONAL APPLICATION FOR UNITED STATES PATENT

Thus all SD ambiguities $N_{i,WL}^{j_1 j_2}$ are uniquely determined with knowledge of the SD-MW satellite biases. It is exactly this relation that helps a rover receiver to solve for its WL ambiguities with the help of the here derived MW satellite biases.

In the undifferenced approach, one ambiguity constraint per station is introduced when the MW satellite biases for all satellites are introduced as constraints into the system.

All bias constraints to handle the rank defect in modeling equations (11) or (12) are avoided if one additional ambiguity constraint is introduced instead. However, this additional ambiguity constraint is not arbitrary. It is chosen such that the double difference relation (13) is fulfilled. However, (13) does not contain the unmodeled multipath and just determines a float value for the DD ambiguity. Thus, deriving an integer DD ambiguity value from (13) is prone to error.

To better distinguish between arbitrary ambiguity constraints and ambiguity constraints that have to fulfill the DD ambiguity relation (13), we usually call the second kind of constraints ambiguity fixes. While constraints are arbitrary and do not depend on the actual observations, fixes do. Constraints cannot be made to a wrong value, fixes can. Which of the ambiguities can be constrained to an arbitrary value is described in Part 7.6.

Part 7.5 MW Bias Process: WL Ambiguity Constraints

Figure 17:
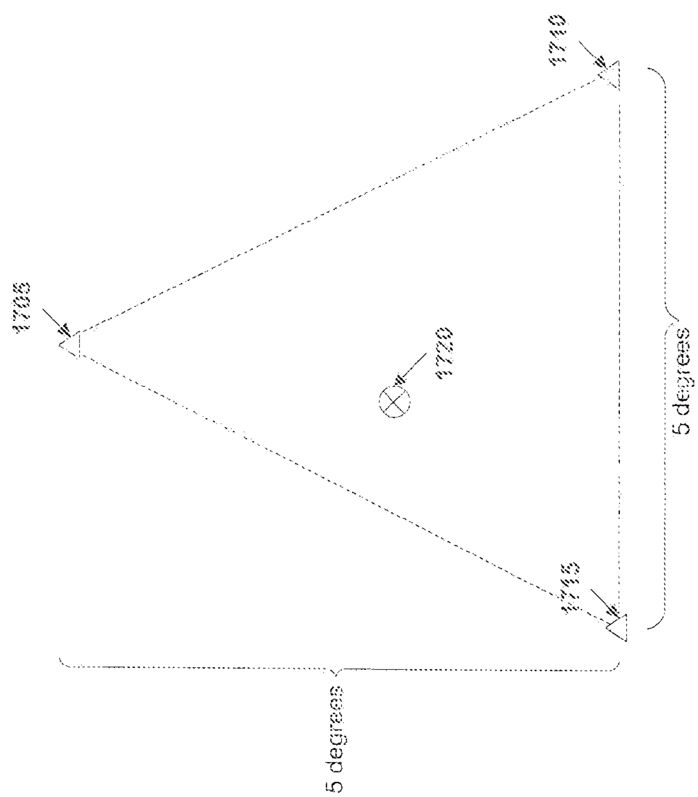
FIG. 17 is a schematic diagram of a Melbourne-Wübbena bias processor in accordance with some embodiments of the invention.
Figure 19:
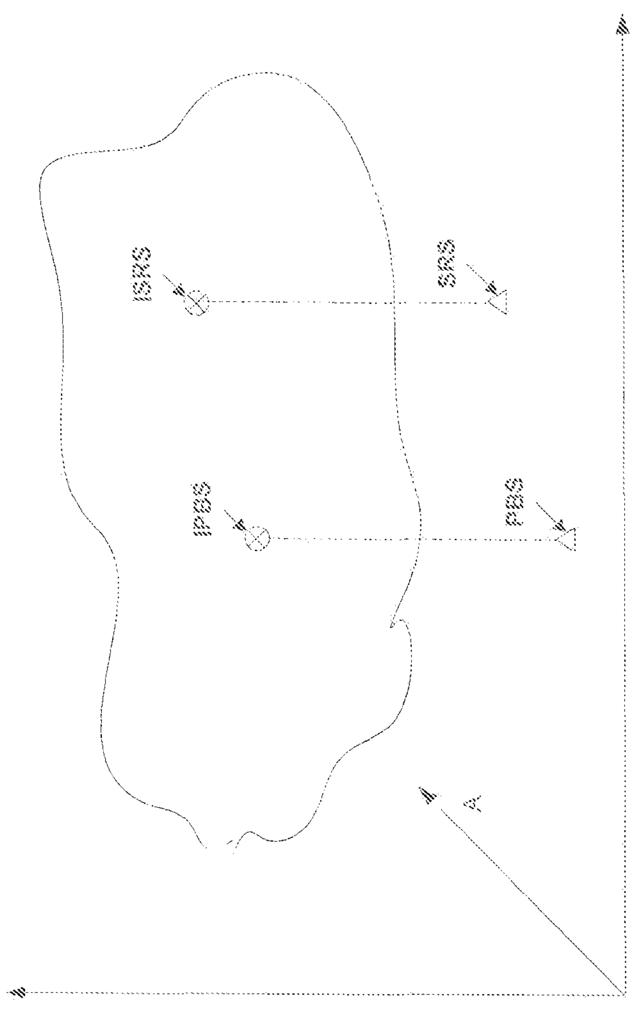

FIG. 17 shows a process 1700 with the addition of one or more WL ambiguity constraints to the process of FIG. 16, which can similarly be added to the embodiments shown in FIG. 12, FIG. 14 and FIG. 15. At least one WL ambiguity integer constraint 1705 as in Equation (33) is put into the processor 1225 to further reduce the rank defect in modeling equations (11) or (12).
As for FIG. 16, the correct number of arbitrary ambiguity constraints in a network with $i = 1,\ldots,m$ stations and $j = 1,\ldots,n$ satellites, where all satellites are seen at all stations, is $m+n-1$. However, in a global network with reference stations distributed over the whole Earth not all satellites are seen at all stations. For this case, choosing the correct number of arbitrary ambiguity constraints and determining the exact combinations that are not restricted by the DD ambiguity relation (13) is described in Part ___.

Appendix A
PROVISIONAL APPLICATION FOR UNITED STATES PATENT

Although the constrained ambiguities that are not restricted by the DD ambiguity relation (13) could be constrained to any value in order to reduce the rank effect in the modeling equations (11) or (12), it is desirable to constrain these ambiguities to an integer value so that the integer nature of the ambiguities comes into the system. This helps later on when for the remaining unconstrained float ambiguities, integer values are searched that are consistent with (13) and to which these ambiguities can be fixed.

In a Kalman filter approach where equations (11) or (12) are extended by equations for the initial values of the parameters, there is always a well defined float solution for all parameters (that has, however, a large variance if the initial variances of the parameters have also been chosen with large values). In this case it is reasonable to constrain the ambiguities to the closest integer of their Kalman filter float solution since this disturbs the filter in the least way and gives the solution that is closest to the initial values of the parameters. It is also advantageous to constrain the ambiguities one after the other, looking up after each constraint the updated float ambiguity of the next ambiguity to be constrained. Such a procedure helps to stabilize the filter in cases of network outages where many ambiguities are lost, receiver biases are modeled as white noise parameters and just already converged satellite biases have a defined value.

Part 7.6 MW Bias Process: Determining WL Ambiguity Constraints

FIG. 18 shows a process 1800 with the addition of determining one or more WL ambiguity constraints for the process of FIG. 17 so as to avoid under- and over-constraining of the modeling equations (11) or (12).

Under-constraining means that too few constraints have been introduced to overcome the rank defect in (11) or (12). Over-constraining means that arbitrary constraints have been introduced that are inconsistent with the DD ambiguity relation (13). Thus, a system can be at the same time over- and under-constrained.

The MW observation input 1420 defines an observation graph, 1805, i.e. a number of edges given by observed station-satellite links. Based on this graph a spanning tree (ST) 1815 is generated by an ST generator 1810 that connects all stations and satellites (in the undifferenced case (11)) or just all satellites (in the between satellite single differenced case (12)) without introducing loops.

Appendix A
PROVISIONAL APPLICATION FOR UNITED STATES PATENT

The resulting ST 1815 defines the WL ambiguity constraints 1705, i.e., which WL ambiguities are constrained.

FIG. 19A shows at 1900 how observed station-satellite links can be interpreted as an abstract graph, i.e. a number of vertices connected by edges. The stations at the bottom of FIG. 19A and the satellites at the top of FIG. 19A are identified as vertices and the station-satellite pairs (each pair corresponding to observations at a station of a satellite's signals) as edges. The abstract graph 1910 of FIG. 19B does not distinguish any more between stations and satellites and instead shows the edges as links between vertices.

In graph theory a tree is a graph without closed loops. An example is shown at 1920 in FIG. 19C, where the tree is marked with bold lines. A spanning tree on a graph is a tree that connects (or spans) all vertices, as in FIG. 19C.

Instead of building the spanning tree based on the current observation graph, it can alternatively be based on all station-satellite ambiguities that are currently in the filter. These ambiguities correspond to station-satellite links that were observed in the past but that are not necessarily observed anymore in the current epoch. We call the station-satellite links defined by the filter ambiguities the filter graph. Notice that it is a bit arbitrary for how long ambiguities are kept in the filter when they are no longer observed. If a fixed slot management for the ambiguities in the filter is used that holds a maximal number of ambiguities for each station so that a newly observed ambiguity on a rising satellite will throw out the oldest ambiguity if all slots are already used, this time of keeping a certain ambiguity does not have to be specified. It will be different for each satellite on each station. However, such a slot management guarantees that after some time each station holds the same number of ambiguities.

In general the filter graph contains more station-satellite links than the observation graph. It contains in addition stations that are not observed anymore (which often occurs for short time periods in a global network), satellites no longer observed at any station (e.g. since a satellite became unhealthy for a short time period), or just station-satellite links that fall below the elevation cutoff. Working on the filter graph is of special importance when the later described ambiguity fixing is also done on the filter graph and ambiguity constraints and fixes are introduced on the original filter and not on a filter copy.

Appendix A
PROVISIONAL APPLICATION FOR UNITED STATES PATENT

In the single-differenced observation graph 1960 of FIG. 19G two satellites are usually connected by several edges since the two satellites are usually observed at several stations. Each edge connecting two satellites corresponds to an (at least in the past) observed satellite-station-satellite link, i.e., a single-difference observation. Of course, also the SD filter graph 1970 of FIG. 19H contains more edges than the SD observation graph 1960.

Constraining the ambiguities determined by a spanning tree over the observation or the filter graph can avoid under- and over-constraining of modeling equations (11) or (12). This is illustrated for the undifferenced case in FIG. 19D. A spanning tree (ST) on the observation graph or filter graph connects all vertices without introducing loops (see emphasized edges in FIG. 19C). FIG. 19D shows at 1930 in addition to the spanning tree edges (in dark grey) that are constrained to an arbitrary integer value, also a single satellite bias constraint S1 depicted in dark grey. The satellite bias is visualized as a circle since its contribution to the observation is the same for all receiver observations of this satellite.

Constraining the ST edges together with one additional satellite bias S1 allows to resolve the underdetermined linear system of equations (11): The observation R1-S1 together with the satellite bias constraint S1 and the ambiguity constraint R1-S1 allows to uniquely solve for receiver bias R1 (compare equation (11)). Once receiver bias R1 is known, the observation R1-S2 together with the ambiguity constraint R1-S2 allows to solve for satellite bias S2. In the same way all other receiver and satellite biases can be computed with the help of the ST constrained ambiguities. The spanning property of the ST ensures that all satellite and receiver biases are reached while the tree property ensures that there are no loops that would constrain a double difference observation (13). Once all satellite and receiver biases are known, the remaining ambiguities (e.g. R2-S1, R2-S4 and R2-S5 in FIG. 19D) can be directly computed from the remaining observations one after the other.

In the SD case shown in FIG. 19G and 19H the argumentation is quite similar. Constraining one SD satellite bias to an arbitrary value (e.g., constraining the bias of a physical reference satellite to 0), the SD satellite bias of the next satellite can be determined with the help of an SD observation between the first and second satellite and the ambiguity constraint from the SD spanning tree between the two satellites (compare equation (12)). Once the second satellite bias is known the third bias can be calculated. In the same way all other satellite biases are determined with the help of the SD spanning tree constraints. By adding one ambiguity constraint per station to an arbitrary satellite, all remaining SD ambiguities (single-differenced against a station-specific reference satellite) in the filter can be resolved one after the other.

The relation underlying this description between an undifferenced (= zero-differenced (ZD)) spanning tree 1975 and a SD spanning tree 1980 is depicted in FIG. 19I. Connecting each station with a single satellite by introducing one ambiguity constraint per station and adding to these constraints the ones given by an ST on the SD observation graph (or filter graph), defines the same constraints that are given by an ST on a ZD observation graph (or filter graph) 1985. Building up a spanning tree on a graph is not a unique process. For a given graph there exist many trees that span the graph. To make the generation of a spanning tree more unique the use of a minimum spanning tree (with respect to some criterion) is proposed in Part 7.7.

Part 7.7 MW Bias Process: Minimum Spanning Tree

Fig. 21A shows at 2110 a spanning tree (ST) on an undifferenced observation graph. FIG. 21B shows at 2120 a minimum spanning tree (MST) (Cormen, Leiserson, Rivest, & Stein, 2001) on the undifferenced observation graph of FIG. 21A. FIG. 20 shows the ST generator 1810 of FIG. 18 replaced with an MST generator 2010. For building up an MST on a graph, each edge has an edge weight resulting in a so-called weighted graph. The MST is defined as the spanning tree with the overall minimal edge weight. The edge weight can be assigned in any of a variety of ways. One possible way is based on the current receiver-satellite geometry and therefore use the station positions 1250 and the satellite positions 1245 as inputs. The connections between the coarse receiver positions 1250, the broadcast satellite orbits 1245 and the MST generator 2010 are depicted in FIG. 20.

The edges in the undifferenced observation graph or filter graph are given by station-satellite links. In some embodiments the edge weight is the geometric distance from receiver to satellite or a satellite-elevation-angle-related quantity (like the inverse elevation angle or the zenith distance (=90°-elevation)).

Appendix A
PROVISIONAL APPLICATION FOR UNITED STATES PATENT

The edges in the single-differenced observation graph or filter graph are given by satellite-receiver-satellite links connecting two different satellites over a station. In some embodiments the edge weight is the geometric distance from satellite to receiver to satellite, or a combination of the elevations under which the two satellites are seen at the receiver. In some embodiments the combination of the two elevations is the sum of the inverse elevations, the sum of the zenith distances, the minimal inverse elevation, or the minimal zenith distance.

In FIG. 21 A and FIG. 21B the ST and MST edges are marked with an "X." The ST 2110 in FIG. 21A and the MST 2120 in FIG. 21B are identical, and the ST 2130 in FIG. 21C and the MST 2140 in FIG. 21D are identical, reflecting the fact that each ST can be obtained as an MST by definition of suitable edge weights.

An MST is well defined (i.e. it is unique) if all edge weights are different. Assigning the weights to the edges allows control on how the spanning tree is generated. In embodiments using geometrical based weights the MST is generated in a way that highest satellites (having smallest geometrical distance and smallest zenith distance, or smallest value of 1/elevation) are preferred. These are also the station-satellite links that are least influenced by the unmodeled multipath. In these embodiments the weights prefer those edges for constraining which should shift the least multipath into other links when constraining the ambiguities to an integer value. In embodiments using low elevation station-satellite links with high multipath for constraining, the multipath is shifted to links with higher elevation satellites. This can result in the counter-intuitive effect that ambiguities on high elevation satellites become more difficult to fix to an integer value.

Generating an MST on a given weighted graph is a standard task in computer science for which very efficient algorithms exist. Examples are Kruskal's, Prim's, and Boruvka's algorithms.

FIG. 22 shows an alternative way of choosing the edge weights of the observation graph or filter graph on which the MST (defining the constrained ambiguities) is generated. In some embodiments, the edge weights are derived from the ambiguity information in the filter, i.e. from the values of the WL ambiguities 1435, or from the variances 2210 of the WL ambiguities, or from both.

Appendix A
PROVISIONAL APPLICATION FOR UNITED STATES PATENT

A particular interesting edge weight used in some embodiments is the distance of the corresponding ambiguity to its closest integer value. In this way the MST chooses the ambiguities for constraining that span the observation/filter graph and that are as close as possible to integer. Thus the states in the processor are influenced in a minimal way by the constraints to integer. An additional advantage is that the constraints of the last epoch will also be favored in the new epoch since their distance to integer is zero which prevents from over-constraining the filter when the constraints are directly applied to the filter and no filter copy is used. The same goal is reached by using the variance of the ambiguity as an edge weight. Constrained ambiguities have a variance of the size of the constraining variance, e.g., $10^{-30} m^2$, and are thus favored in the MST generation in some embodiments. In some embodiments each combination of ambiguity distance to integer and ambiguity variance is used as an edge weight. In some embodiments the combination of an edge weight derived from the station-satellite geometry and from ambiguity information is used. In some embodiments for example, in the first epoch a geometrically motivated weight is chosen (to minimize effects from unmodeled multipath and to ensure that constraints stay in the system for a long time) and in later epochs an ambiguity-derived weight (to avoid over-constraining) is chosen.

Part 7.8 MW Bias Process: WL Ambiguity Fixing

FIG. 23 shows fixing of the WL ambiguities before they are sent out (e.g. for use in the phase clock processor 335 or orbit processor 300). In some embodiments the WL ambiguity state values 1435 are forwarded together with at least the WL ambiguity variances 2210 from the filter to an ambiguity fixer 2305 module. The ambiguity fixer module 2305 outputs the fixed WL ambiguities 2310.

The ambiguity fixer module 2305 can be implemented in a variety of ways.

Threshold based integer rounding: In some embodiments a simple fixer module checks each individual ambiguity to determine whether it is closer to integer than a given threshold (e.g., closer than $a = 0.12$ WL cycles). If also the standard deviation of the ambiguity is below a second given threshold (e.g , $\sigma = 0.04$ so that $a = 3\sigma$ ) the ambiguity is rounded to the next integer for fixing. Ambiguities that do not fulfill these fixing criteria remain unfixed. In some embodiments the satellite elevation angle corresponding to the ambiguity is taken into account as an additional fixing criterion so that e.g. only ambiguities above 15° are fixed.

Optimized sequence, threshold based integer bootstrapping: A slightly advanced approach used in some embodiments fixes ambiguities in a sequential way. After the fix of one component of the ambiguity vector, the fix is reintroduced into the filter so that all other not yet fixed ambiguity components are influenced over their correlations to the fixed ambiguity. Then the next ambiguity is checked for fulfilling the fixing criteria of distance to integer and standard deviation. In some embodiments the sequence for checking ambiguity components is chosen in an optimal way by ordering the ambiguities with respect to a cost function, e.g. distance to integer plus three times standard deviation. In this way the most reliable ambiguities are fixed first. After each fix the cost function for all ambiguities is reevaluated. After that, again the ambiguity with the smallest costs is checked for fulfilling the fixing criteria. The fixing process stops when the best ambiguity fixing candidate does not fulfill the fixing criteria. All remaining ambiguities remain unfixed.

Integer least squares, (generalized) partial fixing: A more sophisticated approach used in some embodiments takes the covariance information of the ambiguities from the filter into account. The best integer candidate $N_1$ is the closest integer vector to the least squares float ambiguity vector $\hat{N} \in R^v$ in the metric defined by the ambiguity part of the (unconstrained) state covariance matrix $P_{\hat{N}} \in R^v \times R^v$, both obtained from the filter, i.e.

$$N_1 = \arg\min_{N \in Z^v} \left(N - \hat{N}\right)^t P_{\hat{N}}^{-1} \left(N - \hat{N}\right) \tag{39}$$

However, since the observation input to the filter is, due to measurement noise, only precise to a certain level also the resulting estimated float ambiguity vector $\hat{N}$ is only reliable to a certain level. Then a slightly different $\hat{N}$ may lead to a different $N \in Z^v$ that minimizes (39). Therefore in some embodiments the best integer candidate is exchanged with e.g. the second best integer candidate by putting other noisy measurements (e.g. from other receivers) into the filter. To identify the reliable components in the ambiguity vector that can be fixed to a unique integer with a high probability, the minimized quantity $\left(N - \hat{N}\right)^t P_{\hat{N}}^{-1} \left(N - \hat{N}\right)$ is compared in some Appendix A
PROVISIONAL APPLICATION FOR UNITED STATES PATENT embodiments under the best integer candidates in a statistical test like the ratio test. If $N_i$ is the i'th best $(i > 1)$ integer candidate this implies that $\left(N_i - \hat{N}\right)' P_{\hat{N}}^{-1}\left(N_i - \hat{N}\right) > \left(N_1 - \hat{N}\right)' P_{\hat{N}}^{-1}\left(N_1 - \hat{N}\right)$, or $$F_i := \frac{\left(N_i - \hat{N}\right)' P_{\hat{N}}^{-1}\left(N_i - \hat{N}\right)}{\left(N_1 - \hat{N}\right)' P_{\hat{N}}^{-1}\left(N_1 - \hat{N}\right)} > 1 \tag{40}$$

The quotient in (40) is a random variable that follows an F-distribution. Some embodiments basically follow the description in (Press, Teukolsky, Vetterling, & Flannery, 1996). The probability that $F_i$ would be as large as it is if $\left(N_i - \hat{N}\right)' P_{\hat{N}}^{-1}\left(N_i - \hat{N}\right)$ is smaller than $\left(N_1 - \hat{N}\right)' P_{\hat{N}}^{-1}\left(N_1 - \hat{N}\right)$ is denoted as $Q(F_i|\nu,\nu)$ whose relation to the beta function and precise algorithmic determination is given in (Press, Teukolsky, Vetterling, & Flannery, 1996). In other words, $Q(F_i|\nu,\nu)$ is the significance level at which the hypothesis $\left(N_i - \hat{N}\right)' P_{\hat{N}}^{-1}\left(N_i - \hat{N}\right) < \left(N_1 - \hat{N}\right)' P_{\hat{N}}^{-1}\left(N_1 - \hat{N}\right)$ can be rejected. Thus each candidate for which e.g. $Q(F_i|\nu,\nu) \geq 0.05$ can be declared as comparable good as $N_1$. The first candidate $i_0 + 1$ for which $Q(F_{i_0+1}|\nu,\nu) < 0.05$ is accepted as significantly worse than $N_1$.

Then all the components in the vectors $N_1, N_2, \ldots, N_{i_0}$ that have the same value can be taken as reliable integer fixes. The components in which these ambiguity vectors differ should not be fixed to an integer. However, among these components there can exist certain linear combinations that are the same for all vectors $N_1, N_2, \ldots, N_{i_0}$. These linear combinations can also be reliably fixed to an integer.

In some embodiments determination of the best integer candidate vectors is performed via the efficient LAMBDA method (Teunissen, 1995).

FIG. 23B shows the WL ambiguities are sent out (e.g. for use in the phase clock processor 335 or orbit processor 300). In some embodiments the components of the high-dimensional ambiguity vector are fixed to float values that are given by a linear combination of the best integer candidates.

Appendix A
PROVISIONAL APPLICATION FOR UNITED STATES PATENT

In these embodiments the WL ambiguity state values 1435 are forwarded together with the ambiguity variance-covariance matrix 2210 from the filter to an integer ambiguity searcher module 2320. Integer ambiguity searcher module 2320 outputs a number of integer ambiguity candidate sets 2323 that are then forwarded to an ambiguity combiner module 2325 that also gets the least squares ambiguity float solution 1435 and the ambiguity variance-covariance matrix 2210 from the filter as an input. The least squares ambiguity float solution 1435 is used together with the ambiguity variance-covariance matrix 2210 for forming a weight for each integer ambiguity candidate. In the ambiguity combiner module 2325 the weighted integer ambiguity candidates are summed up. The output is a fixed WL ambiguity vector 2330 that can then be forwarded to the phase clock processor 335 and orbit processor 330.

To derive the weights for the integer ambiguity vectors, note that the least squares ambiguity float vector $\hat{N}$ is the expectation value of a multidimensional Gaussian probability function $p(N)$, i.e.

$$\hat{N} = \int\limits_{N \in R^v} N\, p(N)\, dN \quad \text{with} \quad p(N) = \frac{e^{-\frac{1}{2}(N-\hat{N})^T P_{\hat{N}}^{-1}(N-\hat{N})}}{\int\limits_{N \in R^v} e^{-\frac{1}{2}(N-\hat{N})^T P_{\hat{N}}^{-1}(N-\hat{N})} dN} \tag{41}$$

Thus an ambiguity expectation value that recognizes the integer nature of the ambiguities is given by $$\breve{N} := \sum_{N \in Z^v} N\, \breve{p}(N) \quad \text{with} \quad \breve{p}(N) = \frac{e^{-\frac{1}{2}(N-\hat{N})^T P_{\hat{N}}^{-1}(N-\hat{N})}}{\sum\limits_{N \in Z^v} e^{-\frac{1}{2}(N-\hat{N})^T P_{\hat{N}}^{-1}(N-\hat{N})}} \tag{42}$$

Since the summation over the whole integer grid $N \in Z^v$ cannot be computed in practice, the sum is in some embodiments restricted to the best integer ambiguity candidates $$\breve{N} \approx \sum_{i \text{ with } \breve{p}(N_i) < \varepsilon} N_i\, \breve{p}(N_i) \quad \text{with} \quad \breve{p}(N_i) \approx \frac{e^{-\frac{1}{2}(N_i-\hat{N})^T P_{\hat{N}}^{-1}(N_i-\hat{N})}}{\sum\limits_{i \text{ with } \breve{p}(N_i) < \varepsilon} e^{-\frac{1}{2}(N_i-\hat{N})^T P_{\hat{N}}^{-1}(N_i-\hat{N})}} \tag{43}$$

Appendix A
PROVISIONAL APPLICATION FOR UNITED STATES PATENT

The $\tilde{p}(N_i)$ are the desired weights for the best integer ambiguity candidates. The ambiguity candidates themselves can be determined in an efficient way with the LAMBDA method (Teunissen, 1995).

Part 7.9 MW Bias Process: Using Fixed WL Ambiguities

FIG. 24A shows an embodiment 2400. In this way the estimated MW biases 1430 are made consistent with the fixed WL ambiguities 2330. These fixed-nature MW satellite biases from the network are transferred to the rover receiver where they help in fixing WL ambiguities.

The fixed WL ambiguities 2330 can be introduced into the processor 1225 in several different ways. FIG. 24B, FIG. 24C and FIG. 24D show details of three possible realizations of the processor 1225 that differ in the manner of feeding back the fixed WL ambiguities into the MW bias estimation process.

In the embodiment 2400 the processor 1225 comprises a single sequential filter 2410 (such as a Kalman filter) that holds states 2415 for satellite MW biases, states 2420 for WL ambiguities and - in case of the undifferenced observation model (11) - also states 2425 for receiver MW biases. In the single differenced (SD) observation model (12) no receiver bias states occur. In addition to these states, which contain the values of the least-squares best solution of the model parameters for the given observations, the filter also contains variance-covariance (vc) information 2430 of the states. The vc-information is usually given as a symmetric matrix and shows the uncertainty in the states and their correlations. It does not directly depend on the observations but only on the observation variance, process noise, observation model and initial variances. However, since the observation variance is derived from the observations when smoothing is enabled (see Part 7.3), there can also be an indirect dependence of the vc-matrix 2430 on the observations.

The filter input comprises MW observations (e.g., smoothed MW observations 1420) and satellite MW-bias process noise 1240 (see Part 7.2), a MW bias constraint 1605 (see Part 7.4), integer WL ambiguity constraints 1705 (see Part 7.5) and, optionally, shifts from a bias and ambiguity shifter 24 (discussed in Part 7.10).

Appendix A
PROVISIONAL APPLICATION FOR UNITED STATES PATENT

The filter output of primary importance comprises the satellite MW biases 1430, the (float) WL ambiguities 1430 and the (unconstrained) WL ambiguity part 2210 of the vc-matrix 2430. The ambiguity information is forwarded to an ambiguity fixer module (see Part 7.8) that outputs (float or integer) fixed WL ambiguities 2310. These fixed WL ambiguities 2310 are output for use in the orbit processor 330 and the phase clock processor 335. In addition, the fixed WL ambiguities 2310 are reintroduced into the filter by adding them as pseudo observations with a very small observation variance (of e.g. $10^{-30}m^2$). The resulting satellite MW biases 1430 are output to the rover and, optionally, to the orbit processor 330 and the phase clock processor 335. Since they are consistent with the fixed WL ambiguities, we call them fixed MW biases.

Note that, if an ambiguity were fixed to a wrong integer, the wrong ambiguity would remain in the filter 2410 until a cycle slip on that ambiguity occurs or it is thrown out of the filter (such as when it has not been observed anymore for a certain time period or another ambiguity has taken over its ambiguity slot in the filter 2410). If this were to occur the MW biases would be disturbed for a long time. However, an advantage of this approach is that also ambiguity fixes remain in the filter that have been fixed to integer when the satellites were observed at high elevations but having meanwhile moved to low elevations and could not be fixed anymore or that are even no longer observed. These ambiguity fixes on setting satellites can stabilize the solution of MW biases a lot.

Note also that a float ambiguity should not be fixed with a very small variance (of e.g. $10^{-30}m^2$) in the single filter 2410 since in this way new observations cannot improve anymore the ambiguity states by bringing them closer to an integer. In some embodiments the float ambiguity is fixed with a variance that depends on its distance to integer so that the observation variance tends to zero when the distance to the closest integer tends to zero and tends to infinity when the distance to the closest integer tends to 0.5. However, for fixing float ambiguities the approaches used in the embodiments of FIG. 24C and FIG. 24D are more suitable.

In the embodiment 2440 of FIG 24C the processor 1225 comprises two sequential filters 2445 and 2450 where the process flow for the first filter 2445 is almost identical with the filter 2410 of FIG. 24B. The difference is that no fixed WL ambiguities 1430 are fed back into filter 2445. Instead, each time new fixed WL ambiguities 2310 are available (e.g. after each observation update), a filter copy 2450 of the first filter 2445 is made and then the fixed WL ambiguities 2310

Appendix A
PROVISIONAL APPLICATION FOR UNITED STATES PATENT are introduced as pseudo-observations into the filter copy 2450. The original filter 2445 thus remains untouched so that no wrong fixes can be introduced into it. The filter copy 2450 outputs fixed satellite MW biases 2455 (e.g., as MW biases 345).

A disadvantage of this approach is that only currently observed ambiguities can be fixed and introduced into the filter copy 2550. All prior ambiguity fixes are lost. However, this is a preferred way of processing when the whole ambiguity space is analyzed at once as it is done in the integer least squares partial fixing and integer candidate combination approaches (see Part 7.8).

Embodiment 2460 of FIG. 24D shows an alternative approach to feed the fixed WL ambiguities into the estimation process. Here the fixed WL ambiguities 2310 are forwarded to an ambiguity subtracter module 2665 that reduces the MW observations 1420 by the ambiguities. The resulting ambiguity-reduced MW observations 2670 are put into a second filter 2475 that does not have any ambiguity states but only satellite MW bias states 2480 and - in the undifferenced approach (11) - also receiver MW bias states 2485. This second filter 2475 just needs a single MW bias constraint 2490 and process noise on satellite MW biases 2480 as additional inputs. In case biases are shifted in the first filter 2440 they also have to be shifted in the second filter 2475.

The second filter 2475 outputs fixed satellite MW biases 2450.

Note that in this approach the ambiguities are not fixed with a very small observation variance (of e.g. $10^{-30}\,m^2$) but only with the usual observation variance of the MW observations. By inserting observations over time with the same fixed ambiguity, the weak ambiguity constraint is more and more tightened. All prior ambiguity fixes remain in the filter to some extent. A wrong fix that is detected after some time will be smoothed out. Thus it is also quite reasonable to put float-ambiguity-reduced MW observations into the filter.

Since the second filter 2475 does not have ambiguity states that build the majority of states in the first filter, the second filter 2475 is very small and can be updated at a very high rate of, e.g. every second, without running into performance problems. Thus in some embodiments the original MW observations without any prior smoothing are input into this filter.

Appendix A
PROVISIONAL APPLICATION FOR UNITED STATES PATENT

Part 7.10 MW Bias Process: Shifting MW Biases

FIG. 25A shows an embodiment 2500 in which the process described in Part 7.8 is augmented with an external satellite MW bias shifter module 2505. The term *external* means, in contrast to the shifting module shown in FIG. 25C where the shifting is applied on the filter. Note that all the ambiguity constraining and fixing related steps as well as the correction and smoothing steps are optional.

The bias shifter module 2505 shifts the satellite MW biases 1430 to produce satellite MW biases 2510 in a desired range of at least one WL cycle. This is possible since as seen from Equation (11) a shift in a satellite bias by $n$ WL cycles are absorbed by the WL ambiguities corresponding to this satellite, e.g.

$$\begin{aligned}\Phi_{i,WL}^{j}-P_{i,NL}^{j} &= b_{i,MW} - b_{MW}^{j} + \lambda_{WL}N_{i,WL}^{j} \\ &= b_{i,MW} - \underbrace{\left(b_{MW}^{j}+n\lambda_{WL}\right)}_{=:\tilde{b}_{MW}^{j}} + \lambda_{WL}\underbrace{\left(N_{i,WL}^{j}-n\right)}_{=:\tilde{N}_{i,WL}^{j}}\end{aligned} \tag{44}$$

Similar shifts are possible for receiver biases.

FIG. 25B shows the impact of shifting MW biases as in equation (44). Each MW combination is depicted in FIG. 25B as the distance between a receiver (e.g., one of receivers 2525, 2530, 2535, 2540) and a satellite 2545. This distance is represented by the sum of a receiver bias (which is the same for all satellites and therefore visualized as a circle around the receiver such as 2550), a satellite bias (that is the same for all receivers and therefore visualized as a circle 2555 around the satellite) and an ambiguity (that depends on the receiver-satellite pair and is therefore visualized as a bar such as bar 2560 for the pairing of receiver 2525 and satellite 2545). Reducing the satellite bias by the wavelength of one WL cycle (as depicted by smaller circle 2565) increases all related ambiguities by the wavelength of one WL cycle. The receiver biases are untouched by this operation.

An advantage of shifting satellite MW biases into a defined range is that in this way the biases can be encoded with a fixed number of bits for a given resolution. This allows to reduce the necessary bandwidth for transferring satellite MW biases to the rover which is in some embodiments done over expensive satellite links.

Although all satellite biases $b^j_{MW}/\lambda_{WL}$ can be mapped for a certain fixed time e.g. into the range $[-0.5,+0.5[$ it is preferable to extend this range e.g. to $[-1,+1[$ in order to avoid frequent jumps in the MW satellite biases when they leave the defined range. Due to the oscillating behavior of MW satellite biases, the satellite biases at the border of the defined range close to -0.5 or +0.5 might often leave this range. For example, a bias moving to $-0.5-\varepsilon$ is then mapped to $+0.5-\varepsilon$. Then the bias oscillates back to $+0.5+\varepsilon$ and is then mapped back to $-0.5+\varepsilon$. In practice, it has been found that with a range of $[-1,+1[$ bias jumps can be avoided for several months.

Note that MW bias jumps can also be handled at the rover by comparing the latest received MW bias value with the previous one. If the values differ by approximately one cycle a bias jump is detected and the correct bias reconstructed. The situation is complicated by the fact that WL ambiguities consistent with shifted satellite MW biases are used in the phase clock processor to determine iono-free (IF) biases that are also sent to the rover. Reconstructing the MW bias at the rover after a jump requires also an adaptation of the IF bias by $\frac{1}{2}(\lambda_{WL}-\lambda_{NL})$.

FIG. 25C shows an alternative to the external satellite MW bias shifter module 2505 of FIG. 25A. Satellite MW biases 1430 and WL-ambiguities 1435 are sent to an internal shifter module 2580 that determines on the basis of equation (44) shifts for MW biases and WL ambiguities such that the biases are mapped to the desired range. Then all these shifts are applied to the bias and ambiguity states in the filter. In this way biases have to be shifted only once while in the approach of FIG. 25A the shifts are repeated each time satellite MW biases are output.

However, note that unshifted and shifted WL ambiguities are not allowed to be used at the same time in a single filter. This is e.g. important when WL ambiguities are forwarded to the orbit processor 330 for fixing IF ambiguities. If fixed IF ambiguities are reintroduced into a single original filter (and no filter copy as in FIG. 24C is used), WL ambiguities of different epochs Appendix A
PROVISIONAL APPLICATION FOR UNITED STATES PATENT come together in the filter. It has to be ensured that the WL ambiguities of different epochs are the same. If this is not the case the corresponding IF ambiguity is reset.

Part 7.11 MW Bias Process: Numerical Examples

The behavior of daily solutions for MW satellite biases was monitored over a time period of 61 days in June and July 2008 and the difference of each daily solution to the first day of this period (June 1). PRN 16 was chosen as the reference satellite with bias value 0. All biases were mapped into the interval [0,1[. Drifts of different sizes in the satellite biases are clearly detectable. All the larger drifts occur for block IIA satellites. Individual satellites show drifts of about 0.2 WL cycles within a month. These values would motivate a satellite bias update of perhaps once per day. However, for PRN 24 there is a sudden bias jump on June 26 of almost 0.2 WL cycles. The occurrence of such events demonstrates the importance of real-time estimation and transmission of MW satellite biases.

In another example the MW satellite biases for the time period from Oct. 02 to 14, 2008 were continuously processed in a Kalman filter. Again PRN 16 was chosen as the reference. The result shows that each satellite has its own daily pattern with some kind of repetition already after 12 hours (the time a GPS satellite needs for one revolution). The variations of the satellite biases are up to about 0.16 WL cycles within 6 hours. The difference of the MW satellite biases to the values they had 24 hours before demonstrates that the day to day repeatability is usually below 0.03 WL cycles. However, this day to day repeatability does not well reflect the large inner day variations of the MW satellite biases.

The filtered satellite WL biases are dependent on their process noise input. With a noise input variance between $10^{-6}$ and $10^{-7}$ squared WL cycles per hour the periodical behavior and the sudden bias level change on June 26 is well reflected. With less noise input these patterns are not detected. Due to this analysis a process noise input variance of $5 \cdot 10^{-7}$ squared WL cycles per hour on satellite WL biases is recommended.

Appendix A
PROVISIONAL APPLICATION FOR UNITED STATES PATENT

Part 7.12 MW Bias Process: References

Bierman, G. J. (1977). *Factorization Methods for Discrete Sequential Estimation.* New York: Academic Press, Inc.

Collins, P. (2008). Isolating and Estimating Undifferenced GPS Integer Ambiguities. *Proceedings of ION-NTM-2008*, (pp. 720-732). San Diego, Calif.

Collins, P., Gao, Y., Lahaye, F., Héroux, P., MacLeod, K., & Chen, K. (2005). Accessing and Processing Real-Time GPS Corrections for Precise Point Positioning - Some User Considerations. *Proceedings of ION-GNSS-2005*, (pp. 1483-1491). Long Beach, Calif.

Collins, P., Lahaye, F., Héroux, P., & Bisnath, S. (2008). Precise Point Positioning with Ambiguity Resolution using the Decoupled Clock Model. *Proceedings of ION-GNSS-2008*. Savannah, Georgia.

Cormen, T. H., Leiserson, C. E., Rivest, R. L., & Stein, C. (2001). Chapter 23: Minimum Spanning Trees. In *Introduction to Algorithms* (Second Edition ed., pp. 561-579). MIT Press and McGraw-Hill.

Datta-Barua, S., Walter, T., Blanch, J., & Enge, P. (2007). Bounding Higher Order Ionosphere Errors for the Dual Frequency GPS User. *Radio Sci., 43, RS5010, doi:10.1029/2007RS003772* .

Ge, M., Gendt, G., Rothacher, M., Shi, C., & Liu, J. (2008). Resolution of GPS carrier-phase ambiguities in Precise Point Positioning (PPP) with daily observations. *Journal of Geodesy , Vol. 82*, pp. 389-399.

Grewal, M. S., & Andrews, A. P. (2001). *Kalman Filtering: Theory and Practice Using MATLAB.* New York: Wiley-Interscience.

Héroux, P., & Kouba, J. (2001). GPS Precise Point Positioning Using IGS Orbit Products. *Phys. Chem. Earth (A) , Vol. 26* (No. 6-8), pp. 572-578.

Laurichesse, D., & Mercier, F. (2007). Integer ambiguity resolution on undifferenced GPS phase measurements and its application to PPP. *Proceedings of ION-GNSS-2007*, (pp. 839-448). Fort Worth, Texas.

Laurichesse, D., Mercier, F., Berthias, J., & Bijac, J. (2008). Real Time Zero-difference Ambiguities Fixing and Absolute RTK. *Proceedings of ION-NTM-2008*, (pp. 747-755). San Diego, Calif.

Melbourne, W. (1985). The case for ranging in GPS-based geodetic systems. *Proceedings of the First International Symposium on Precise Positioning with the Global Positioning System. Vol. 1*, pp. 373-386. Rockville, Maryland: US Dept. of Commerce.

Appendix A
PROVISIONAL APPLICATION FOR UNITED STATES PATENT

Mervart, L., Lukes, Z., Rocken, C., & Iwabuchi, T. (2008). Precise Point Positioning With Ambiguity Resolution In Real-Time. *Proceedings of ION-GNSS-2008*. Savannah, Georgia.

Morton, Y., van Graas, F., Zhou, Q., & Herdtner, J. (2008). Assessment of the Higher Order Ionosphere Error on Position Solutions. *ION GNSS 21st International Meeting of the Satellite Division*. Savannah, GA, USA.

Press, W. H., Teukolsky, S. A., Vetterling, W. T., & Flannery, B. P. (1996). F-Distribution Probability Function. In *Numerical Recipes in C* (p. 229). Cambridge University Press.

Schaer, S. (2000, May 09). *IGSMAIL-2827: Monitoring (P1-C1) code biases*. Retrieved from http://igscb.jpl.nasa.gov/mail/igsmail/2000/msg00166.html.

Teunissen, P. (1995). The least-squares ambiguity decorrelation adjustment: a method for fast GPS integer ambiguity estimation. *Journal of Geodesy, Vol. 70, No. 1-2*, pp. 65-82.

Wübbena, G. (1985). Software Developments for Geodetic Positioning with GPS using TI 4100 code and carrier measurements. *Proceedings of the First International Symposium on Precise Positioning with the Global Positioning System. Vol. 1*, pp. 403-412. Rockville, Maryland: US Dept. of Commerce.

Zumberge, J., Heflin, M., Jefferson, D., Watkins, M., & Webb, F. (1997). Precise point positioning for the efficient and robust analysis of GPS data from large networks. *Journal of Geophysical Research, Vol. 102* (No. B3), pp. 5005-5018.

Appendix A
PROVISIONAL APPLICATION FOR UNITED STATES PATENT

Part 8: Orbit Processor

Precise (cm-accurate) orbits allow precise satellite clock estimation and precise positioning. Orbit accuracy has a direct influence on the final position accuracy of the rover using precise satellite orbits and clocks data a described herein.

Part 8.1 Option 1: Use IGS-published ultra-rapid orbits

The International GNSS Service (IGS) provides predicted satellite orbits which can be downloaded via the Internet. A description of these orbits can be found in J. KOUBA, A GUIDE TO USING INTERNATIONAL GPS SERVICE (IGS) PRODUCTS, Geodetic Survey Division, Natural Resources Canada, February 2003, 31 pages and at http://igscb.jpl.nasa.gov/components/prods.html.

The IGS Ultra-rapid (predicted) orbits, also called IGU orbits, are generated and published four times a day at 3, 9, 15, 21 hours of the UTC day. IGS claims a 5 cm orbit standard deviation, though our analyses have shown that individual satellite orbit errors can go up to 60 cm. In one case we have seen a 2 meter error.

Market requirements for commercial positioning service demand precise orbits with errors less than 3 cm and with high reliability and availability. The currently available IGU orbits do no meet these requirements. Nevertheless, they are useful either for positioning applications where the requirements are less demanding, or as a countercheck to detect gross errors in orbits estimated as described below.

Part 8.2 Option 2: Determine Satellite Orbits in Real Time

Referring to FIG. 1, observation data is streamed in real time from globally distributed GNSS reference stations, such as reference stations 105, 110, 115, to network processor 140. In some embodiments, the network processor estimates the satellite orbits in real time using a Kalman-filter approach in a numerically stable UD-Filter implementation as described in G. Bierman, *Factorization Methods for Discrete Sequential Estimation*, Academic Press, Inc., New York, 1977. Hereafter the term real time refers to processing immediately after observation data is Appendix A
PROVISIONAL APPLICATION FOR UNITED STATES PATENT available, typically in less than one second. The time-dependent filter state $x(t)$ is set up in the following way

| | | |
|---|---|---|
| | $x_{cr}(t)$ | receiver clock errors |
| | $x_{cs}(t)$ | satellite clock errors |
| | $x_{qs}(t)$ | satellite dependent orbit parameters |
| $x(t) =$ | $x_r(t)$ | receiver positions |
| | $x_{ZDT}(t)$ | zenith tropospheric delays for each station |
| | $x_{EOP}(t)$ | earth orientation parameters |
| | | (EOP: $x_p$, $y_p$, $UT1-UTC$ or length of day) |
| | $x_{AMB}$ | carrier-phase ambiguities |
| | $x_{if-bias}$ | iono-free biases |

$x_{cr}(t)$ is the vector with all receiver clock errors in the network. Each station has at least one clock offset but may have also drift and drift rates, depending on the type and stability of the station clock. The receiver clocks are modeled, for example, as white noise processes or as stochastic processes (e.g., random walk, Gauss Markov) depending on the type and stability of the station clock.

$x_{cs}(t)$ is the vector with the satellite clocks. The vector contains a clock offset and a drift but may have drift and drift rates depending on the type and stability of the satellite clock (Rubidium, Cesium or Hydrogen maser). The satellite clocks are modeled, for example, as white noise processes or as stochastic processes depending on the type and stability of the satellite clock.

$x_{qs}(t)$ is the vector with the satellite dependent dynamic orbit parameters. This includes the satellite positions and velocities and additional force model parameters, which are Appendix A
PROVISIONAL APPLICATION FOR UNITED STATES PATENT $$x_{qs}(t) = \begin{bmatrix} x_s(t) \\ \dot{x}_s(t) \\ x_{slr}(t) \\ x_{harm}(t) \end{bmatrix} \quad (45)$$

where $x_s(t)$ is the satellite position vector (one per satellite) in the inertial reference frame (X,Y,Z).

$\dot{x}_s(t)$ is the satellite velocity vector (one per satellite) in the inertial reference frame (X,Y,Z).

$x_{slr}(t)$ is the vector with the solar radiation pressure parameters. It consists of a component in the sun-satellite direction, a second component in the direction of the solar radiation panel axis and a third component perpendicular on the first 2 axes. All three components are modeled for example as stochastic processes.

$x_{harm}(t)$ is the vector with harmonic coefficients for the orbit components along-track, radial and cross-track or in a satellite body fixed coordinate system. They are modeled for example as stochastic processes.

$x_r(t)$ is the station position vector in the Earth centered / Earth fixed reference frame. Stations can be either fixed or unknown in the estimation process.

$x_{ZTD}(t)$ is the vector with the tropospheric zenith delays estimated for each station. Tropospheric gradients are optionally also estimated. These parameters are modeled for example as stochastic processes.

$x_{EOP}(t)$ are earth orientation parameters (EOPs) estimated routinely in real time. The vector consists of the offsets to the conventional pole ($x_p$, $y_p$) and the difference between UT1 and UTC time scales ($UT1-UTC$ or length of day). The precisely-known EOP parameters are used to transition between the inertial and the earth-fixed reference frames. All three parameters are estimated for example as stochastic processes.

Appendix A

PROVISIONAL APPLICATION FOR UNITED STATES PATENT $x_{AMB}$ each satellite-station link has an individual carrier phase ambiguity in the filter state. These parameters are modeled for example as constants.

$x_{if-bias}$ ionospheric-free code-carrier biases, one bias per receiver-satellite pair. Code and carrier have biases, which are different from receiver to receiver and satellite to satellite and might vary with time These parameters are modeled for example via stochastic processes.

The ionospheric-free dual-frequency combinations of code and carrier observations have different biases, which vary with time. While these parameters can be estimated as additional unknowns in the orbit processor Kalman filter, they are optionally estimated in a separate processor (e.g. in standard clock processor 320 as ionospheric-free code-carrier biases 372, shown in FIG. 3) and applied to the pseudorange observations used in the orbit processor.

For linearization purposes, some embodiments have the filter set up to estimate differences to a reference trajectory and to initial force model parameters. In these embodiments the state vector for each satellite is $$x_{qs}(t_k) = \begin{bmatrix} r(t_k) - r_0(t_k) \\ p(t_k) - p_0(t_k) \\ y - y_0 \end{bmatrix} = \begin{bmatrix} \Delta r(t_k) \\ \Delta p(t_k) \\ \Delta y \end{bmatrix} \quad (46)$$

where $x_{qs}(t_k)$ is the satellite state vector at time $t_k$ $r(t_k)$ is the satellite position and velocity in the inertial reference frame $r_0(t_k)$ represents the reference trajectory created by a numerical orbit integrator $p(t_k)$ is the vector with stochastic force model parameters $p_0(t_k)$ is the vector with approximate initial stochastic force model parameters $y$ is the vector with constant force model parameters $y_0$ is the vector with approximate constant force model parameters and where $$r(t_k)=\begin{bmatrix} x_x(t_k) \\ \dot{x}_x(t_k) \end{bmatrix} \tag{47}$$

The prediction in the filter model for the satellite dependent part is done via the following relation $$\begin{bmatrix} \Delta r(t_{k+1}) \\ \Delta p(t_{k+1}) \\ \Delta y \end{bmatrix} = \begin{bmatrix} \Phi_{rr}(t_{k+1},t_k) & \Phi_{rp}(t_{k+1},t_k) & \Phi_{ry}(t_{k+1},t_k) \\ 0 & M_k & 0 \\ 0 & 0 & 1 \end{bmatrix} \begin{bmatrix} \Delta r(t_k) \\ \Delta p(t_k) \\ \Delta y \end{bmatrix} + \begin{bmatrix} 0 \\ w_k \\ 0 \end{bmatrix} \tag{48}$$

with $$\Phi_{rr}(t_{k+1},t_k)=\left[\frac{\partial r(t_{k+1})}{\partial r(t_k)}\right], r(t)=r_0(t) \tag{49}$$

$$\Phi_{rp}(t_{k+1},t_k)=\left[\frac{\partial r(t_{k+1})}{\partial p(t_k)}\right], r(t)=r_0(t), p(t)=p_0(t) \tag{50}$$

$$\Phi_{ry}(t_{k+1},t_k)=\left[\frac{\partial r(t_{k+1})}{\partial y}\right], r(t)=r_0(t), y=y_0 \tag{51}$$

These matrices are computed for example by integration of the variational equations as described in the section below on numerical orbit integration.

$M_k$ is the matrix describing the stochastic noise modeling $w_k$ is the noise input

Part 8.3 Numerical orbit integration

The satellite motion in orbit can be described by a second order differential equation system $$\ddot{x}=\ddot{x}(x,\dot{x},q) \tag{52}$$

Appendix A
PROVISIONAL APPLICATION FOR UNITED STATES PATENT with $\ddot{x}$ acceleration in the inertial reference frame $x$ position in the inertial reference frame $\dot{x}$ velocity in the inertial reference frame $q$ vector of satellite dependent force model unknowns and initial position/velocity The vector $q$ is defined as $$q = \begin{bmatrix} r(t_0) \\ a \end{bmatrix} \tag{53}$$

where $r(t_0)$ are the initial position and velocity in inertial reference frame $a$ is the vector with dynamic force model parameters Satellite position $x(t)$ and velocity $\dot{x}(t)$ at time $t$ are derived from satellite position $x(t_0)$ and velocity $\dot{x}(t_0)$ at time $t_0$ using, for example, a numerical integration (a predictor-corrector method of higher order).

$$\dot{x}(t) = \dot{x}(t_0) + \int \ddot{x}(t)dt \tag{54}$$

$$x(t) = x(t_0) + \int \dot{x}(t)dt \tag{55}$$

The real-time filter uses the partial derivatives of the accelerations $\ddot{x}(t)$ with respect to the unknown parameters $q$ $$\left[\frac{\partial \ddot{x}}{\partial q}\right] = \left[\frac{\partial \ddot{x}}{\partial x}\right]\left[\frac{\partial x}{\partial q}\right] \tag{56}$$

The equation of this example ignores derivatives with respect to satellite velocity since there are no relevant velocity-dependent forces acting on GNSS satellites in medium earth orbit.

Appendix A
PROVISIONAL APPLICATION FOR UNITED STATES PATENT

The following matrix is computed for epoch $t_i$:

$$\Phi_{rq}(t_i,t_0)=\begin{bmatrix}\dfrac{\partial x}{\partial q(t_i,t_0)}\\ \dfrac{\partial \dot{x}}{\partial q(t_i,t_0)}\end{bmatrix} \quad (57)$$

The matrix for the next epoch $t_{i+1}$ can then be computed via the chain rule $$\Phi_{rq}(t_{i+1},t_0)=\Phi_{rq}(t_{i+1},t_i)\Phi_{rq}(t_i,t_0) \quad (58)$$

The partial derivatives of the observations with respect to the unknowns $q$ can again be derived via chain rule $$\frac{\partial l}{\partial q}=\frac{\partial l}{\partial r}\Phi_{rq} \quad (59)$$

These partials are used in the observation update of the filter.

The following models are used to compute the accelerations $\ddot{x}$ acting on the satellite; some embodiments use these for the integration process:

1. The Earth's gravity field is modeled by available models such as the EIGEN-CG01C or the EGM96 model. These are spherical harmonic expansions with very high resolution. Some embodiments use up to degree and order 12 for orbit integration.
2. Gravitational forces due to the attraction by sun, moon and planets.
3. The gravitational forces of sun and moon acting on the Earth's figure will deform the Earth. This effect also changes the gravity field; it is called "Solid Earth Tide" effect. Some embodiments follow the recommendations of the IERS Conventions 2003.
4. Some embodiments account for the Solid Earth Pole Tide, caused by the centrifugal effect of polar motion. This tide must not be confused with Solid Earth Tides. Some embodiments follow the recommendations of the IERS Conventions 2003.

Appendix A
PROVISIONAL APPLICATION FOR UNITED STATES PATENT

5. The gravitational forces of sun and moon acting on the oceans will change the gravity field; this is called the "Ocean Tide" effect. Some embodiments use the CSR3.0 model recommended by the IERS Conventions 2003.
6. Some embodiments also consider the relativistic acceleration, which depends upon position and velocity of the satellite.
7. The solar radiation pressure, the acceleration acting on GNSS satellites, is most difficult to model. Some embodiments consider three components: a first component in the sun-satellite direction, a second component in the direction of the solar radiation panel axis (y-bias) and a third component perpendicular to the first two axes.
8. Some embodiments also model residual errors mainly induced by the insufficient knowledge of the force models via harmonic functions as described in the following.

GNSS satellites like GPS, GLONASS, GALILEO and COMPASS satellites are in mid earth orbits (MEO) of approximately 26000 km. The following table shows the accelerations acting on GNSS satellites and their effects after a one-day orbit integration.

| Perturbation | Acceleration [$m/s^2$] | Orbit prediction error after one day [m] |
|---|---|---|
| Earth's gravitation | 0.59 | 330000000 |
| Earth's oblateness | $5 \cdot 10^{-5}$ | 24000 |
| Lunar direct tides | $5 \cdot 10^{-6}$ | 2000 |
| Solar direct tides | $2 \cdot 10^{-6}$ | 900 |
| Higher degree terms in geopotential | $3 \cdot 10^{-7}$ | 300 |
| Direct solar radiation pressure | $9 \cdot 10^{-8}$ | 100 |
| Radiation pressure along solar panel axis | $5 \cdot 10^{-10}$ | 6 |
| Earth albedo (solar radiation due to reflection by earth) | $3 \cdot 10^{-9}$ | 2 |
| Solid Earth tides | $1 \cdot 10^{-9}$ | 0.3 |
| Ocean tides | $1 \cdot 10^{-10}$ | 0.06 |
| General relativity | $3 \cdot 10^{-10}$ | 0.3 |
| Venus in lower conjunction | $2 \cdot 10^{-10}$ | 0.08 |

Appendix A
PROVISIONAL APPLICATION FOR UNITED STATES PATENT

Part 8.4 Harmonic Force Modeling

Some embodiments handle residual errors by introducing a harmonic model having a cosine term and a sine term in each of the along-track, radial and cross-track directions. As the residuals have a period of about one revolution of the satellite about the Earth, the harmonics depend on the argument of latitude of the satellite:

$$\ddot{x}_{residual} = \begin{pmatrix} A_1 \cos u + A_2 \sin u \\ A_3 \cos u + A_4 \sin u \\ A_5 \cos u + A_6 \sin u \end{pmatrix} = \begin{pmatrix} A_1 & A_2 \\ A_3 & A_4 \\ A_5 & A_6 \end{pmatrix} \begin{pmatrix} \cos u \\ \sin u \end{pmatrix} \quad (60)$$

with $A_1, A_2$ ... amplitudes to be estimated for along-track $A_3, A_4$ ... amplitudes to be estimated for cross-track $A_5, A_6$ ... amplitudes to be estimated for radial component $u$ ... argument of latitude of the satellite Alternatively to the use of along track, cross track and radial components, the satellite related system (sun-satellite direction, solar panel direction and the normal to both) can be used, to model solar radiation pressure.

Part 8.5 Transformation from Inertial to Earth-Fixed Reference Frame

Some embodiments transform from Inertial to the Earth-fixed reference frame using the IAU 2000A precession/nutation formulas, which follow the IERS Conventions 2003.

Part 8.6 Earth orientation parameters

Some embodiments take Earth orientation parameters (EOPs) from the IERS rapid files GPSRAPID.DAILY. These files are provided by IERS on a daily basis and are based on the combination of the most recently available observed and modeled data (including VLBI 24-hour and intensive, GPS, and AAM (Atmospheric Angular Momentum)). The combination process Appendix A
PROVISIONAL APPLICATION FOR UNITED STATES PATENT involves applying systematic corrections and slightly smoothing to remove the high frequency noise. GPSRAPID.DAILY contains the values for the last 90 days from Bulletin A for x/y pole, UT1-UTC, dPsi, dEps, and their errors and predictions for next 15 days at daily intervals.

After the interpolation, UT1 is corrected for diurnal and/or semidiurnal variations due to Ocean Tides. The polar motion angles are corrected for diurnal variations due to tidal gravitation for a non-rigid Earth, as well as for diurnal and/or semidiurnal variations due to Ocean Tides. Corrections are computed according to:

$$\Delta A = \sum_f B_{Af} \sin\theta_f + C_{Af} \cos\theta_f, \quad A \in \{UT1, x_P, y_P\} \tag{61}$$

Amplitudes $B_{Af}$, $C_{Af}$ for 41 diurnal and 30 semi-diurnal Ocean Tidal constituents are listed in tables 8.2 and 8.3 in the IERS Conventions (2003). The EOPs from the GPSRAPID.DAILY are introduced as approximate values for the real-time estimation process, keeping linearization errors at a minimum.

Part 8.7 Startup of the Real-Time System

When starting the system for the first time or after interruptions of more than a day, some embodiments derive initial values for satellite position velocity and force model parameters using satellite broadcast ephemerides or IGU orbits. Some embodiments use a least-squares fit to adapt a numerically integrated orbit to the broadcast elements from the satellite navigation message or to the IGU orbit for the satellite. The adapted orbit initial state is then integrated for a time period of up to two days into the future. The satellite positions, velocities and partials are stored in a "partials" file for use by the real-time system.

FIG. 26A shows an embodiment of the startup process 2600 for the real-time orbit processor. An orbit integrator 2605 predicts the orbital states (position and velocity) of each satellite into the future starting from an approximate orbit vector 2615, an initial state taken for example from the broadcast satellite ephemeris or the IGS ultra-rapid orbit IGU by using numerical integration and modeling all relevant forces acting on the satellites, e.g., predicted Earth orientation parameters from IERS. During this process an orbit prediction 2620 is generated, which holds all predicted Appendix A
PROVISIONAL APPLICATION FOR UNITED STATES PATENT orbital states and the partial derivatives. In a next step an adaptation process fits the predicted orbit to the broadcast orbit or IGU orbit via a least squares batch process. This process is iterated until the initial orbital states for the satellites are no longer changing. Then the partials file 2620 is forwarded to the real-time real-time orbit process 2630 of FIG. 26B.

FIG. 26B shows an embodiment of a real-time orbit process 2630. Process 2630 obtains values for an initial start vector 2635 from partials file 2635; these values are used to construct predicted observations for an iterative filter 2640 on a regular basis, e.g., every 150 seconds. Iterative filter 2640 is, for example, a classical Kalman filter or a UD factorized filter or a Square Root Information Filter (SRIF} The orbit start vector 2635 contains the partial derivatives of the current orbit state and force model parameters with respect to the start vector and EOPs and are used to map the partials of the observations to the start vector and force model unknowns. Kalman filter 2640 receives iono-free linear combinations 2645 of observation data from the reference stations in real time, e.g., each epoch, such as once per second, and predicted Earth orientation parameters (EOP) 2610. With each observation update, Kalman filter 2640 provides improved values for the state vector parameters: receiver clocks 2655 (one per station), zenith tropospheric delays 2660 (one per station), satellite clocks 2665 (one per satellite), optional satellite clock rates 2670 (one per satellite), and orbit start vectors 2680 (one orbit start vector per satellite). In the embodiment of FIG. 26B, orbit state vector 2680 is supplied from time to time (e.g., each epoch, such as once per second) and mapped via the orbit mapper 2682 to the current-epoch orbit position/velocity vector 350.

Orbit mapper 2682 uses the partial derivatives from the partials file and the following relationship to derive satellite position and velocity at the current epoch $t_i$ from the state vector at epoch $t_0$ .(Fig 26C).

$$r(t_i) = r_0(t_i) + \Phi_{rq}(t_i, t_0) x_{qs}(t_0) = r_0(t_i) + \begin{bmatrix} \frac{\partial r(t_i)}{\partial r(t_0)} & \frac{\partial r(t_i)}{\partial p(t_0)} & \frac{\partial r(t_i)}{\partial y} \end{bmatrix} \begin{bmatrix} \Delta r(t_0) \\ \Delta p(t_0) \\ \Delta y \end{bmatrix} \quad (62)$$

with $r_0(t_i)$ ... reference trajectory (position and velocity) created by a numerical orbit integrator Appendix A
PROVISIONAL APPLICATION FOR UNITED STATES PATENT $\Phi_{rq}(t_i,t_0)$ … partials of the position and velocity at $t_i$ with respect to the start vector $x_{qs}(t_0)$ … at $t_i$ estimated difference of the start vector (state vector) at $t_0$ Next $r(t_i)$ which is given in the inertial reference frame is transformed into the Earth centered / Earth fixed reference frame.

The current-epoch orbit position/velocity vector 350 in the Earth centered / Earth fixed reference frame is forwarded to the standard clock processor 320, to the phase clock processor 335 and to the scheduler 355 of FIG. 3.

Some embodiments of process 2630 avoid linearization errors by restarting the numerical integration in an orbit integrator 2685 from time to time, such as every 6 or 12 or 24 hours. Orbit mapper 2684 uses the partial derivatives from the partials file and the following relationship to derive a new orbit state vector 2690 in the inertial reference frame at time $t_0 + x$ *hours* from the start vector at epoch $t_0$ (Fig 26D).

$$r(t_i) = r_0(t_i) + \Phi_{rq}(t_i,t_0)x_{qs}(t_0) = r_0(t_i) + \begin{bmatrix} \frac{\partial r(t_i)}{\partial r(t_0)} & \frac{\partial r(t_i)}{\partial p(t_0)} & \frac{\partial r(t_i)}{\partial y} \end{bmatrix} \begin{bmatrix} \Delta r(t_0) \\ \Delta p(t_0) \\ \Delta y \end{bmatrix} \quad (63)$$

with $r_0(t_i)$ … reference trajectory (position and velocity) created by a numerical orbit integrator $\Phi_{rq}(t_i,t_0)$ … partials of the position and velocity at $t_i$ with respect to the start vector $x_{qs}(t_0)$ … at $t_i$ estimated difference of the start vector (state vector) at $t_0$ Predicted EOPs 2610 (e.g., from IERS) and estimated EOPs together with updated new orbit start vector 2690 are used as inputs to orbit integrator 2685 to transform coordinates between the inertial frame and the earth-fixed frame, e.g., following the IERS Conventions.

Appendix A
PROVISIONAL APPLICATION FOR UNITED STATES PATENT

This numerical integration runs in the background and generates a new partials file 2635 which is used to update the predicted observations of Kalman filter 2640. The start vector for the numerical integration of orbit integrator 2675 is for example the latest best estimate of the real-time system, orbit start vector 2690.

Part 8.8 Fixing ambiguities in Real-Time Orbit Determination

Kalman filter 2640 uses the ionospheric-free dual-frequency combinations 2645 of the L1 and the L2 GNSS observations. The ionospheric-free combination usually leads to a very small wavelength $$\begin{aligned}\lambda_{IF} N_{IF} &:= \frac{f_1^2 \lambda_1 N_1 - f_2^2 \lambda_2 N_2}{f_1^2 - f_2^2} \\ &= \underbrace{\lambda_1 \frac{F_1}{F_1^2 - F_2^2}}_{=:\lambda_{IF}} \underbrace{\left(F_1 N_1 - F_2 N_2\right)}_{:=N_{IF}} \quad \text{with} \quad \begin{aligned} f_1 &=: F_1 \gcd(f_1, f_2) \\ f_2 &=: F_2 \gcd(f_1, f_2) \end{aligned}\end{aligned} \tag{64}$$

The factors $F_1$ and $F_2$ are given in Table 3. For example, for GPS L1 and L2 frequencies with $F_1 = 77, F_2 = 60$ and $\lambda_1 = 0.1903m$ the resulting iono-free wavelength is $\lambda_{IF} = \lambda_1 \frac{F_1}{F_1^2 - F_2^2} \approx 6mm$. This is below the noise level of the phase observations so that there is no possibility to directly fix the iono-free ambiguity to the correct integer value. Notice that for the iono-free combination between L2 and L5 the iono-free wavelength is with $\lambda_{IF} \approx 12.47cm$ large enough for reliable ambiguity resolution.

To make use of the integer nature of the L1 and L2 ambiguities one could try to solve for the L1 and L2 ambiguities, which is difficult due to the unknown ionospheric contribution to the L1 and L2 carrier phase observations at the stations. A preferred approach is to solve for carrier-phase ambiguities by fixing the widelane ambiguities $N_{WL} := N_1 - N_2$ in a first step. . Substituting $N_2$ in (64) by $N_2 = N_1 - N_{WL}$ results in Appendix A
PROVISIONAL APPLICATION FOR UNITED STATES PATENT $$\lambda_{IF} N_{IF} = \lambda_{NL} N_1 + \frac{1}{2}(\lambda_{WL} - \lambda_{NL}) N_{WL} \quad (65)$$

with $\lambda_{WL} := \frac{c}{f_1 - f_2}$ and $\lambda_{NL} := \frac{c}{f_1 + f_2}$. Thus, once $N_{WL}$ is known, (65) can be solved for $N_1$ by using the float value from the filter for $\lambda_{IF} N_{IF}$. After fixing the $N_1$ ambiguity vector to integer or to a weighted average of integer values it can be reinserted into (65) to get a fixed value for $\lambda_{IF} N_{IF}$.

In some embodiments the widelane ambiguities $N_{WL}$ are computed in the widelane bias processor 325 and are transferred to the orbit processor 2630 for example every epoch. For embodiments in which the orbit processor 2630 processes ionospheric-free observations, the ambiguities estimated are ionospheric-free ambiguities $\lambda_{IF} N_{IF}$.

For embodiments in which the widelane ambiguities $N_{WL}$ are provided by the MW bias processor 325, equation (65) can also be used to reformulate the Kalman filter equations (by subtracting $\frac{1}{2}(\lambda_{WL} - \lambda_{NL}) N_{WL}$ from the observations) and estimate the $N_1$ ambiguities directly.

As an alternative to resolving the $N_1$ ambiguity with a given integer widelane ambiguity, the equations above can be formulated such that $N_2$ or narrowlane ambiguities are estimated instead; the approaches are equivalent because all these ambiguities are linearly related.

Some embodiments of ambiguity "fixing" mechanism 2695 employ any suitable techniques known in the art, such as Simple rounding, , Bootstrapping , Integer Least Squares based on the Lambda Method, or Best Integer Equivariant (Verhagen, 2005, Teunissen and Verhagen, 2007) The term "fixing" as used here is intended to include not only fixing of ambiguities to integer values using techniques such as rounding, bootstrapping and Lambda search, but also to include forming a weighted average of integer candidates to preserve the integer nature of the ambiguities if not fixing them to integer values. The weighted average approach is described in detail in unpublished patent applications PCT/US2009/004476, PCT/US2009/004472, Appendix A
PROVISIONAL APPLICATION FOR UNITED STATES PATENT PCT/US2009/004474, PCT/US2009/004473, and PCT/US2009/004471 which are incorporated herein by this reference.

Analyses have shown that the orbit quality is significantly improved by "fixing" the ambiguities, either as integer values or as weighted averages of integer candidates.

Part 8.9 Orbit Processing at IGS Analysis Centers

GNSS orbit determination is done by a variety of IGS Analysis Centers. To our knowledge none of these Centers provides real-time orbit estimation as proposed here.

The CODE Analysis Center (AC) uses a batch least squares approach as described in Dach et al. (2007) and not a sequential filter implementation as described here. Details on the modeling are also described in Beutler et al. (1994). The CODE AC participates in the generation of the IGS Ultra-rapid orbits (IGU). Orbit positions correspond to the estimates for the last 24 hours of a 3-day long-arc analysis plus predictions for the following 24 hours. This is done every 6 hours while the processing and prediction time span is shifted by 6 hours in each step.

The Geoforschungszentrum GFZ estimates orbits and computes a contribution to the IGS Ultra-rapid orbits. The approach is documented by Ge et al. (2005, 2006). Their processing and that of the CODE process is based on a batch least squares approach. GFZ does ambiguity resolution, but only in post-processing mode. No attempt is documented on real-time efforts involving a sequential filter.

The European Space Operation Centre ESOC of ESA also contributes to the IGS Ultra-rapid orbit computation. The approach is documented by Romero et al. (2001) and Dow et al. (1999). The approach is also based only on a prediction of satellite orbits. No true real-time processing is done.

The Jet Propulsion Laboratory JPL, USA, determines GPS satellite orbits with their system based on the GIPSY-OASIS II software package developed for the US Global Positioning System, general satellite tracking, orbit determination and trajectory studies. Details are published in US Patent 5,963,167 of Lichten et al. The JPL system allows a fully automatic operation and delivery of validated daily solutions for orbits, clocks, station locations and other information with no human intervention. This data contributes to the orbits published by the IGS including the Ultra-rapid orbit service providing IGU orbits. US Patent 5,828,336 of Yunck et al. describes the implementation of a real-time sequential filter.

The approach of embodiments of the present invention differs from that of US Patent 5,828,336 in at least these ways:

- the approach described in US Patent 5,828,336 appears to use smoothed pseudo-ranges only; an example observation update rate given is 5 minutes
- the JPL system described in US Patent 5,828,336 does not appear to fix carrier-phase ambiguities
- the approach of US Patent 5,828,336 uses an ionospheric model

Part 8.10 References

Beutler, G., E. Brockmann, W. Gurtner, U. Hugentobler, L. Mervart, and M. Rothacher (1994), *Extended Orbit Modeling Techniques at the CODE Processing Center of the International GPS Service for Geodynamics (IGS): Theory and Initial Results*, Manuscripta Geodaetica, 19, 367-386, April 1994.

Bierman, Gerald J. (1977): *Factorization Methods for Discrete Sequential Estimation*, Academic Press, Inc., New York Dach, R., U. Hugentobler, P. Fridez, M. Meindl (eds.) (2007), *Documentation of the Bernese GPS Software Version 5.0*, January 2007

Dow, J., Martin-Mur, T.J., *ESA/ESOC Processing Strategy Summary*, IGS Central Bureau web site, igscb.jpl.nasa.gov/igscb/center/analysis/esa.acn, 1999

Ge, M., G. Gendt, G.Dick and F.P. Zhang (2005), *Improving carrier-phase ambiguity resolution in global GPS*, Journal of Geodesy, Volume 80, Number 4, July 2006, DOI: 10.1007/s00190-005-0447-0

Appendix A
PROVISIONAL APPLICATION FOR UNITED STATES PATENT

Ge, M., G. Gendt, G.Dick, F.P. Zhang and M. Rothacher (2006), *A new data processing strategy for huge GNSS global networks*, Journal of Geodesy, Volume 79, number 1-3, June 2005, DOI: 10.1007/s00190-006-0044-x Landau, Herbert (1988): *Zur Nutzung des Global Positioning Systems in Geodäsie und Geodynamik: Modellbildung, Software-Entwicklung und Analyse.* Heft 36 der Schriftenreihe des Studiengangs Vermessungswesen der Universität der Bundeswehr München, Dezember 1988

Lichten, S., Yoaz Bar-Sever, Winy Bertiger, Michael Heflin, Kenneth Hurst, Ronald J. Muellerschoen, Sien-Chong Wu, Thomas Yunck, James Zumberge (1995) *GIPSY-OASIS II: A HIGH PRECISION GPS DATA PROCESSING SYSTEM AND GENERAL SATELLITE ORBIT ANALYSIS TOOL*, Proceedings of NASA Technology Transfer Conference, Oct 24-26, 1995, Chicago, Ill.

Lichten, Stephen M., Wu Sien-Chong, Hurst Kenneth, Blewitt Geoff, Yunck Thomas, Bar-Sever Yoaz, Zumberge James, Bertiger William I., Muellerschoen Ronald J., Thornton Catherine, Heflin Michael (1999), *Analyzing system for global positioning system and general satellite tracking*, United States Patent 5963167, October 5, 1999.

McCarthy, Dennis D. and Gérard Petit (2003), *IERS CONVENTIONS, IERS (International Earth Rotation Service) Technical Note 32*, October 2003

Romero, I., C. Garcia Martínez, J.M. Dow, R. Zandbergen (2001), *Moving GPS Precise Orbit Determination Towards Real-Time*, Proceedings GNSS 2001, Seville, Spain, May 2001.
Yunck, Thomas P., William I. Bertiger, Stephen M. Lichten, Anthony J. Mannucci, Ronald J. Muellerschoen, Sien-Chong Wu, (1998), *Robust real-time wide-area differential GPS navigation*, US Patent 5828336, October 27, 1998.

Teunissen, P.J.G, S. Verhagen (2009); *GNSS Carrier Phase Ambiguity Resolution: Challenges and Open Problems*, In M.G. Sideris (ed.); Observing our Changing Earth, Inteernational Association of Geodesy Symposia 133, Spinger Verlag Berlin-Heidelberg 2009.

Appendix A
PROVISIONAL APPLICATION FOR UNITED STATES PATENT

Verhagen, Sandra (2995): *The GNSS integer ambiguities: estimation and validation*, Publications on Geodesy 58, Delft, 2005. 194 pages., ISBN-13: 978 90 6132 290 0. ISBN-10: 90 6132 290 1.

Appendix A
PROVISIONAL APPLICATION FOR UNITED STATES PATENT

Part 9: Phase Clock Processor

Referring to FIG. 3, the phase clock processor 335 receives as input MW biases $b^j_{MW}$ 345 (one per satellite) and/or widelane ambiguities $N^j_{i,WL}$ 340 (one per satellite-receiver pair), precise orbit information 350 (one current orbit position/velocity per satellite), troposphere information 370 (one troposphere zenith delay per station), low-rate code leveled clocks 365 (one low-rate code-leveled clock error per satellite) and the reference-station GNSS observation data 305 or 315. The phase clock processor 335 generates from these inputs the computed high-rate code-leveled clocks 375 (one high-rate code-leveled clock error per satellite) and the high-rate phase-leveled clocks 370 (one high-rate phase-leveled clock error per satellite), and forwards the MW biases 345 (one per satellite).

Part 9.1 Determining WL Ambiguities from MW Biases

Neglecting multipath, a useful characteristic of the Melbourne-Wübbena (MW) linear combination $\Phi^j_{i,WL} - P^j_{i,NL}$ is that, aside from some remaining noise $\varepsilon^j_{i,MW}$, only the satellite MW biases $b^j_{MW}$ and the receiver MW biases $b_{i,MW}$ and the widelane ambiguity term $\lambda_{WL} N^j_{i,WL}$ remain:

$$\Phi^j_{i,WL} - P^j_{i,NL} = b_{i,MW} - b^j_{MW} + \lambda_{WL} N^j_{i,WL} + \varepsilon^j_{i,MW} \qquad (66)$$

To get rid of the noise $\varepsilon^j_{i,MW}$, the Melbourne-Wübbena linear combination for each satellite is in some embodiments reduced by the satellite MW bias $b^j_{MW}$ for that satellite and smoothed (e.g., averaged) over time. Single-differencing between satellites then cancels out the receiver MW bias $b_{i,MW}$, leaving only a single-differenced widelane ambiguity term per satellite-receiver-satellite connection. The single-differenced widelane ambiguities are computed using the (constant) widelane wavelength $\lambda_{WL}$. Since only single-differenced widelane ambiguities are used in the phase clock processor, this method is in some embodiments used as a substitute for using the widelane ambiguities 340 from the MW bias processor 325 and/or for a quality check on the widelane ambiguities 340 received from the MW bias processor 325.

Appendix A
PROVISIONAL APPLICATION FOR UNITED STATES PATENT

Part 9.2 Single-Differenced Phase-Leveled Clocks

The location of each reference station is precisely known. The precise location of each satellite at each epoch is given by the current orbit position/velocity data 350 from orbit processor 330. The geometric range $\rho_i^j$ between a satellite $j$ and a reference station $i$ at each epoch is calculated from their known locations. The tropospheric delay $T_i^j$ for each reference station is received from the code clock processor 320.

The ionospheric-free linear combination $$\Phi_{i,IF}^j = \rho_i^j + c\Delta t_{\Phi,i} - c\Delta t_\Phi^j + T_i^j + \lambda_{IF} N_{i,IF}^j + \varepsilon_{\Phi,i,IF}^j \qquad (67)$$

is reduced by the (known) geometric range $\rho_i^j$ and the (known) troposphere delay $T_i^j$, leaving as unknowns only the ionospheric-free ambiguity term $\lambda_{IF} N_{i,IF}^j = \lambda_{NL} N_1^j + \frac{1}{2}(\lambda_{WL} - \lambda_{NL})$, the satellite phase clock error term $c\Delta t_\Phi^j := c\Delta t + b_{\Phi,IF}^j$ and the receiver phase clock error term $c\Delta t_{\Phi,i} := c\Delta t + b_{\Phi,i,IF}$.

Single-differencing the observations of two satellites at the same receiver cancels out the receiver clock error.

Reducing this single difference by the according single difference widelane ambiguity leads to the single difference phase clock together with a single difference $N_1$ ambiguity (often also called narrowlane ambiguity in this context since its corresponding wavelength here is $\lambda_{NL}$).

$$\Phi_{i,IF}^{j_1 j_2} - \rho_i^{j_1 j_2} - T_i^{j_1 j_2} - \frac{1}{2}(\lambda_{WL} - \lambda_{NL}) N_{i,WL}^{j_1 j_2} = -c\Delta t_\Phi^{j_1 j_2} + \lambda_{NL} N_1^{j_1 j_2} + \varepsilon_{\Phi,i,IF}^{j_1 j_2} \qquad (68)$$

This is computed for each station observing the same pair of satellites. At this point it is impossible to distinguish between the single difference satellite clock error and the single Appendix A
PROVISIONAL APPLICATION FOR UNITED STATES PATENT difference narrowlane ambiguity term, which is an integer multiple of the narrowlane wavelength. If the single difference ambiguity is set to zero a single difference phase clock $$c\Delta\tilde{t}_{\Phi,i}^{j_1j_2} := -\left(\Phi_{i,IF}^{j_1j_2} - \rho_i^{j_1j_2} - T_i^{j_1j_2} - \frac{1}{2}(\lambda_{\mathrm{WL}} - \lambda_{\mathrm{NL}})N_{i,\mathrm{WL}}^{j_1j_2}\right) \tag{69}$$

shifted by an integer number of narrowlane cycles is achieved. This phase clock has a non fixed narrowlane status. The difference of two of those single difference clocks is an integer number of narrowlane cycles.

Part 9.3 Smoothed Single-Differenced Phase Clocks

For each pair of satellites, the single-differenced phase clock errors observed from different stations shifted to a common level using fixed narrowlane ambiguities is averaged to get a more precise clock error:

$$c\Delta\bar{t}_{\Phi}^{j_1j_2} = \frac{1}{n}\sum_{i=1}^{n}(c\Delta\tilde{t}_{\Phi,i}^{j_1j_2} + \lambda_{NL}N_{i1}^{j_1j_2}) \tag{70}$$

Part 9.4 Phase Clock Estimation

Part 9.4.1 Spanning-Tree-Based Phase Clocks

Some embodiments use a spanning-tree approach to estimate phase-leveled clocks. To compute a single-differenced clock error between any arbitrary pair of satellites, a set of single difference-phase clocks is needed for the satellite-to-satellite links such that there is a unique path to reach each satellite via satellite-to-satellite links starting from a dedicated reference satellite. If all satellites are nodes of a graph, such a path is called spanning tree. If each edge of the graph is equipped with a weight, a minimum spanning tree is a spanning tree with a minimal sum of edge weights. Some embodiments use a discrete category based weighting scheme for an edge between two satellites and assign the following phase clock values to the edge:

i Several edges connecting satellites $j_1$ and $j_2$ have a fixed $N_1$ ambiguity:

(Weighted) averaged single-differenced clock $c\overline{\Delta t}_{\Phi}^{j_1j_2}$, Appendix A
PROVISIONAL APPLICATION FOR UNITED STATES PATENT ii Only a single edge connecting satellites $j_1$ and $j_2$ has a fixed $N_1$ ambiguity:

$c\Delta\tilde{t}_{\Phi,i}^{j_1 j_2} + \lambda_{NL} N_{i1}^{j_1 j_2}$, iii No edge connecting satellites $j_1$ and $j_2$ has a fixed $N_1$ ambiguity : $c\Delta\tilde{t}_{\Phi,i}^{j_1 j_2}$ for receiver $i$ with min(elevation(j1,j2) is maximal., iv No WL ambiguity available for edge connecting satellites $j_1$ and $j_2$: Don't use such an edge; thus no phase clock has to be defined;

Each edge of category (i) has a lower weight than an edge of category (ii), each edge of category (ii) has a lower weight than an edge of category (iii) etc. Edges within each category have a continuous weight that is in some embodiments derived in category (i) from the variance of the average and in category (ii) and (iii) from the elevations under which the satellites in the single difference are seen at the corresponding station.

If the minimum spanning tree uses an edge without a fixed narrowlane status, the narrowlane ambiguity $N_{i1}^{j_1 j_2}$ is set to zero and achieves fixed status. Choosing a reference satellite with phase clock error $c\Delta t_{\Phi}^{j_{ref}}$ set to zero, single-differenced phase clock errors $c\Delta t^{j_{ref} j_2}$ to all other satellites are computed solving a linear system. The satellite's phase clock error is then defined as $c\Delta t_{\Phi}^{j_2} := c\Delta t_{\Phi}^{j_{ref} j_2}$

Part 9.4.2 Filter Estimation of Phase Clocks

Some embodiments use a filter approach to estimate phase-leveled clocks. A filter is set up with all satellite phase clock errors as states. The state of the reference satellite's clock error $c\Delta t_{\Phi}^{j_{ref}}$ is set to zero. In some embodiments all links from the spanning tree and in addition all links with fixed narrowlanes are added to the filter to estimate more precise single-differenced phase clock errors.

Part 9.5 Narrowlane Filter Bank

Appendix A
PROVISIONAL APPLICATION FOR UNITED STATES PATENT

Once a set of single-differenced phase clock errors is estimated, e.g., as in Part 9.4, all observations for shifted single-differenced phase clocks in Part 9.2 are reduced by the clock errors estimated in Part 9.4:

$$N_{i1}^{j_1 j_2} \approx \frac{1}{\lambda_{NL}}\left(c\Delta\bar{t}_{\Phi}^{j_1 j_2} - c\Delta\tilde{t}_{\Phi,t}^{j_1 j_2}\right). \tag{71}$$

What remains is an observable for the integer narrowlane offset. For each station a narrowlane filter with a narrowlane ambiguity state per satellite is updated with those observations.

Part 9.6 High-Rate Single-Differenced Code-Leveled Clocks

The phase clock processor 335 also computes high-rate code-leveled clocks.

Part 9.6.1 Buffering Low-Rate Code-Leveled Clocks

GNSS observations (reference station data 305 or 315) for a time (e.g., an epoch) $t_1$ are buffered for use when the low-rate information with the same time tag ($t_1$) arrives from the code-leveled clock processor 360; this information comprises two of: clock errors 365, tropospheric delays 370, and ionospheric-free float ambiguities 374. Thus, GNSS observations matched in time with the low-rate clock processor information are always available from an observation buffer. When a set of low-rate code leveled clocks 365 arrive they are combined with the GNSS observations and with the tropospheric delays 370 and with time-matched satellite position/velocity information 350 to compute the carrier ambiguities.

FIG. 27A shows at 2700 the flow of data for the case where the satellite clocks (clock errors) 365 and the tropospheric delays 370 are used. GNSS observations arrive over time at the phase clock processor 335 with (e.g. epoch) time tags $t_0$, $t_1$, $t_2$, $t_3$, etc. Low-rate code leveled clocks $c\Delta t_P^j$ and tropospheric delays $T$ arrive asynchronously over time with time tags $t_0$, $t_1$, $t_2$, $t_3$, etc. An observation buffer 2705 holds the observations. These are combined for each time $t_i$ in a combiner 2710 with satellite position/velocity data, with the low-rate code-leveled clocks $c\Delta t_P^j$ and with the tropospheric delays $T$ to produce the ionospheric-free float ambiguity terms Appendix A
PROVISIONAL APPLICATION FOR UNITED STATES PATENT $\lambda N_i^j := \lambda_{IF} N_{i,IF}^j + b_{\Phi,i,IF} - b_{P,i,IF} - \left(b_{\Phi,IF}^j - b_{P,IF}^j\right)$. A process 2715 computes the single-differenced code-leveled clocks 2720.

FIG. 27B shows at 2715 the flow of data for the case where the ionospheric-free float ambiguities 374 and the tropospheric delays 370 are used. GNSS observations arrive over time at the phase clock processor 335 with (e.g. epoch) time tags $t_0$, $t_1$, $t_2$, $t_3$, etc. Ionospheric-free float ambiguity terms $\lambda N_i^j$ and tropospheric delays $T$ arrive asynchronously over time with time tags $t_0$, $t_1$, $t_2$, $t_3$, etc. An observation buffer 2720 holds the observations. These are combined for each time $t_i$ in a combiner 2710 with the ionospheric-free ambiguity terms $\lambda N_i^j$, with the low-rate code-leveled clocks $c\Delta t_P^j$ and with the tropospheric delays $T$ to produce the ionospheric-free a ambiguity terms $\lambda N_i^j$. A process 2740 computes the single-differenced code-leveled clocks 2720.

Part 9.6.2 Computing Ambiguities in the Phase Clock Processor

The data combiner (2710 or 2735) forms an ionospheric-free linear combination of the carrier-phase observation, and reduces this by the geometric range $\rho_i^j$ (computed using the receiver and satellite positions), the tropospheric delay $T_i^j$ and the low-rate code-leveled satellite clock error $c\Delta t_P^j$ (e.g., clocks 365). After this reduction the receiver clock error and a float ambiguity remains. If this is done using between-satellite single-differenced observations, the receiver clock is eliminated and thus only the single-differenced ionospheric-free ambiguity term remains:

$$\Phi_{i,IF}^{j_1 j_2}(t_1) - \rho_i^{j_1 j_2}(t_1) - T_i^{j_1 j_2}(t_1) + c\Delta t_P^{j_1 j_2}(t_1) = \lambda N_i^{j_1 j_2}(t_1) + \varepsilon_{\Phi,i,IF}^{j_1 j_2}(t_1) \quad (72)$$

with $c\Delta t_P^{j_1 j_2} := c\Delta t^{j_1 j_2} + b_{P,IF}^{j_1 j_2}$ and float ambiguity $\lambda N_i^{j_1 j_2} := \lambda_{IF} N_{i,IF}^{j_1 j_2} - \left(b_{\Phi,IF}^{j_1 j_2} - b_{P,IF}^{j_1 j_2}\right)$ which is a constant value and is kept to be used until the next update of low rate clocks.

As an alternative to computing the ionospheric-free ambiguities in the phase clock processor 335, the ionospheric-free float ambiguities are obtained from a previous processor, such as ionospheric-free float ambiguities 374 from the low-rate code clock processor 320.

Appendix A
PROVISIONAL APPLICATION FOR UNITED STATES PATENT

Part 9.6.3 Using Iono-Free Ambiguities to Compute High Rate Code Clocks

Once iono-free ambiguities are known for time $t_1$, single-differenced ionospheric-free linear combinations at any time in the future ( e.g. $t_2$ ) can be used for each pair of satellites along with tropospheric delay and current geometric range:

$$\Phi_{i,IF}^{j_1 j_2}(t_2) - \rho_i^{j_1 j_2}(t_2) - T_i^{j_1 j_2}(t_2) - \lambda N_i^{j_1 j_2}(t_1) = -c\Delta t_P^{j_1 j_2}(t_2) + \varepsilon_{\Phi,i,IF}^{j_1 j_2}(t_2) + \varepsilon_{\Phi,i,IF}^{j_1 j_2}(t_1) \tag{73}$$

The result of this computation is the single-differenced phase-leveled satellite clock error $c\Delta t_P^{j_1 j_2}$. With this it is possible to estimate high-rate single-differenced code-leveled clock errors $c\Delta t_P^{j_{ref} j_2}$ between a given satellite $j_2$ and a chosen reference satellite $j_{ref}$. If only the between-satellite single-differenced clock errors are of interest, the reference satellite clock error $c\Delta t_P^{j_{ref}}$ is set to zero.

FIG. 28A shows a first embodiment 2800 for preparing the undifferenced (also called ZD or Zero-Differenced) high-rate code-leveled satellite clocks 375. Precise satellite orbit information, e.g., satellite position/velocity data 350 or 360, and GNSS observations, e.g., reference station data 305 or 315, are supplied as inputs to a first process 2805 and as inputs to a second process 2810. The first process 2805 estimates a set of ionospheric-free float ambiguities 2815. These are supplied to the second process 2810 which estimates the undifferenced high-rate code-leveled satellite clocks (clock errors) 375.

FIG. 28B shows a second embodiment 2820 for preparing the undifferenced (also called ZD or Zero-Differenced) high-rate code-leveled satellite clocks 375. Precise satellite orbit information, e.g., satellite position/velocity data 350 or 360, and GNSS observations, e.g., reference station data 305 or 315, are supplied as inputs to a low-rate code-leveled clock processor 2825, e.g., code clock processor 320, and as inputs to a high-rate code-leveled clock processor 2830. The low-rate code-leveled clock processor 2825 prepares ionospheric-free float ambiguities 2835, e.g., ionospheric-free float ambiguities 374, and tropospheric delays 2840, e.g., tropospheric delays 370. The ionospheric-free float ambiguities 2835 and the tropospheric delays 2840 are supplied to the high-rate code-leveled clock processor 2830, e.g., forming a part of phase clock processor 335. The high-rate code-leveled clock processor 2830 uses the inputs at 2845 to compute single-differenced high-rate code-leveled satellite clocks 2850. A filter 2855 uses these to estimate undifferenced high-rate code-leveled satellite clocks (clock errors) 2860, e.g., high-rate code-leveled satellite clocks 375.

FIG. 28C shows a third embodiment 2865 for preparing the undifferenced high-rate code-leveled satellite clocks 375. Precise satellite orbit information, e.g., satellite position/velocity data 350 or 360, and GNSS observations, e.g., reference station data 305 or 315, are supplied as inputs to a low-rate code-leveled clock processor 2870, e.g., code clock processor 320, and as inputs to a high-rate code-leveled clock processor 2875. The low-rate code-leveled clock processor 2870 prepares low-rate code-leveled clocks 2880, e.g., low-rate code-leveled satellite clocks 365, and tropospheric delays 2882, e.g., tropospheric delays 370. The low-rate code-leveled satellite clocks 2880 and the tropospheric delays 2882 are supplied to the high-rate code-leveled clock processor 2875, e.g., forming a part of phase clock processor 335. The high-rate code-leveled clock processor 2884 uses the inputs at 2884 to compute ionospheric-free float ambiguities 2886 which are used at 2888 to compute single-differenced high-rate code-leveled satellite clocks 2890. A filter 2892 uses these to estimate undifferenced high-rate code-leveled satellite clocks (clock errors) 2894, e.g., high-rate code-leveled satellite clocks 375.

Part 9.6.4 Clock Shifter

Single-differenced phase-leveled clock errors $c\Delta t_{\Phi}^{j_{ref}j_2}$ and single-differenced code-leveled clock errors $c\Delta t_{P}^{j_{ref}j_2}$ are estimated as in the course of estimating phase-leveled satellite clocks and high-rate single-differenced code-leveled satellite clocks. The single-differenced high-rate code-leveled satellite clocks have the same accuracy as single differences of the low-rate code-leveled satellite clocks. The phase-leveled satellite clocks are constructed to preserve the integer nature of the narrowlane ambiguity if used for single-differenced ionospheric-free carrier-phase observations together with the precise satellite orbits and the widelane ambiguities, derived from the MW biases, used in the clock estimation. Thus the quality of a single-differenced phase-leveled clock error is not changed if this clock error is shifted by an integer number of narrowlane cycles. Since the phase-leveled satellite clock errors will always be used in a single difference, such a shift which is applied all satellite clock errors will cancel out again in the single- Appendix A
PROVISIONAL APPLICATION FOR UNITED STATES PATENT differencing operation. In accordance with some embodiments the following shift is applied to the phase-leveled satellite clock errors to keep their values close to the low-rate code-leveled satellite clock errors and reduce their noise.

Thus in some embodiments an integer number of narrowlane cycles $$s_{NL}^{j_{ref}j_2} = \text{Round}(c\Delta t_P^{j_{ref}j_2} - c\Delta t_\Phi^{j_{ref}j_2}) \tag{74}$$

is added to each of the phase-leveled satellite clock errors to minimize the distance to the high-rate code-leveled satellite clocks.

In some embodiments the low-rate code-leveled clock errors are approximated with a continuous steered clock $c\Delta t_{P,steered}^j$. The value of the steered clock of the reference satellite $$s_{ref} = c\Delta t_{P,steered}^{j_{ref}} \tag{75}$$

is then added to all high-rate clocks. Doing so, all clocks are close to the code-leveled low-rate clocks, but the reference clock is smooth.

In some embodiments the mean of the difference between the high-rate phase-leveled satellite clocks and their corresponding steered low-rate clock is computed and added to all shifted phase-leveled satellite clock errors. The same is done for the high-rate code-leveled satellite clocks. This procedure pushes some noise into the reference clock.

$$\begin{aligned} s_{P,noise} &= \frac{1}{n}\sum_{j=1}^{n}\left(c\Delta t_P^{j_{ref}j_2} - c\Delta t_{P,steered}^{j_{ref}j_2}\right) \\ s_{\Phi,noise} &= \frac{1}{n}\sum_{j=1}^{n}\left(c\Delta t_\Phi^{j_{ref}j_2} - c\Delta t_{P,steered}^{j_{ref}j_2} + s_{NL}^{j_{ref}j_2}\right) \end{aligned} \tag{76}$$

The shifted clock errors read as $$\begin{aligned} c\Delta t_P^{j_2} &= c\Delta t_P^{j_{ref}j_2} + s_{P,noise} + s_{ref} \\ c\Delta t_\Phi^{j_2} &= c\Delta t_\Phi^{j_{ref}j_2} + s_{\Phi,noise} + s_{ref} + s_{NL}^{j_{ref}j_2} \end{aligned} \tag{77}$$

The shifting is mainly done to keep the phase-leveled satellite clock errors near GPS time and therefore make certain transmission methods applicable. In addition the clock bias $$b_{\Delta t}^{j} = c\Delta t_{P}^{j} - c\Delta t_{\Phi}^{j}, \quad (78)$$

which is the difference between the phase-leveled satellite clocks and code-leveled satellite clocks, can be kept within a certain range.

Part 9.6.5 Jump messages

If the clock bias leaves its range or if the phase-leveled clocks' satellite-to-satellite links have been estimated without using fixed narrowlane ambiguities, the shift will change and a jump message is sent. This also means that the phase-leveled satellite clock error changes its level.

Part 9.7 Phase Clock Processor Embodiments

FIG. 29 shows an architecture 2900 of a phase clock processor 335 in accordance with some embodiments of the invention. The inputs to the phase clock processor are: MW biases and/or fixed WL ambiguities 2095 (e.g., MW biases 345 and/or fixed WL ambiguities 340), low-rate (LR) code-leveled clocks 2910 (one per satellite, e.g., low-rate code-leveled satellite clocks 365), satellite orbit information (e.g., precise satellite orbit position/velocities 350 and/or IGU orbit data 360), tropospheric delays 2920 (one per reference station, e.g., tropospheric delays 370), and GNSS observations 2925 (of multiple satellites at multiple reference stations, e.g, reference station data 305). The choice of MW biases or fixed WL ambiguities gives two options. A first option is to use the low-rate MW biases together with the low-rate orbit information 2915 and the GNSS observations 2925 in an optional fixer bank 2930 to fix the WL ambiguities. These are then provided at a high rate (HR) as single-differenced fixed WL ambiguities 2935 to a computation process 2940. A second option is use the low-rate fixed WL ambiguities directly to supply single-differenced (SD) fixed WL ambiguities to the process 2940. By high-rate is meant that the single-differenced fixed WL ambiguities used in the high-rate process 2940 remain the same from epoch to epoch in process 2940 between low-rate updates.

The low-rate code-leveled clocks 2910 are used in process 2945 to compute low-rate single-differenced ionospheric-free float ambiguities 2950. These are used with the low-rate orbit data 2915 and the low-rate tropospheric delays 2920 and the high-rate GNSS observations 2925 in a process 2955 to compute single-differenced high-rate code-leveled clocks 2960 (one per satellite, such as high-rate code-leveled satellite clocks 375).

Appendix A
PROVISIONAL APPLICATION FOR UNITED STATES PATENT

The high-rate single-differenced fixed WL ambiguities 2935 are used with the low-rate orbit data 2915 and the low-rate tropospheric delays 2920 and the GNSS observations 2925 in a process 2940 which computes high-rate phase-leveled clocks 2945 (one per satellite, such as high-rate phase-leveled satellite clocks 375). The high-rate phase-leveled clocks 2945 are used together with the orbit data 2915 and the tropospheric delays 2920 and the GNSS observations 2925 in an ambiguity fixer bank 2975 which attempts to fix single-differenced ambiguities, e.g., L1 ambiguities. The single-diffierenced fixed ambiguities 2980 are pushed into the process 2965 to aid the computation of high-rate phase-leveled clocks 2970.

The MW biases and/or fixed WL ambiguities 2905 and the low-rate code-leveled clocks 2910 and the single-differenced high-rate code-leveled clocks 2960 and high-rate phase-leveled clocks 2970 are fed into a process 2985 which shifts and combines these to deliver a high rate data flow 2990 containing (at least) high-rate phase-leveled satellite clocks, high-rate code-leveled clocks and high-rate MW biases. Data 2990 is supplied to scheduler 355 as described in FIG. 3.

FIG. 30A shows an embodiment 3000 of a process for estimating high-rate phase-leveled satellite clocks. Precise satellite orbit information, e.g., satellite position/velocity data 350 or 360, and GNSS observations, e.g., reference station data 305 or 315, are supplied at low rate as inputs to a first process 3015 and at high rate as inputs to a second process 3020. The first process 3015 estimates ambiguities 3025, one set of ambiguities per receiver. Each ambiguity corresponds to one of a receiver-satellite link and a satellite-receiver-satellite link. These ambiguities are supplied at low rate to the second process 3020 which estimates the high-rate phase-leveled clocks 3030.

In general a linear combination of carrier phase observations has receiver-dependent parameters $p_r$ like receiver position, receiver clock error or receiver biases, satellite-dependent parameters $p^s$ like the satellite position, and receiver-satellite-link dependent parameters $p_r^s$ like the tropospheric or the ionospheric delay. Let $\Omega_{rk}^s, k \in L$ be linear combinations of code and carrier phase observations with wavelength $\lambda_k$ and ambiguity $N_{rk}^s$. A code and carrier phase combination as assumed here can be written as Appendix A
PROVISIONAL APPLICATION FOR UNITED STATES PATENT $$\hat{\Omega}_r^s := \sum_{k \in \hat{L}} a_k \Omega_{rk}^s = f(p_r, p^s, p_r^s) + c\Delta t^s + \sum_{k \in \hat{L}} a_k (b_k^s + \lambda_k N_{rk}^s) + \varepsilon_r^s, \tag{79}$$

with $\hat{L} \subseteq L, \hat{L}$ not empty and real factors $a_k \in \Re$.

Note that $f : \Re^{n_p} \to \Re$ is linear in most of the parameters. If a mapping exists to convert between a receiver-satellite link dependent parameter and a receiver dependent parameter, it can be used to reduce the number of unknowns. As an example the troposphere delay can be modeled as a delay at zenith, which is mapped to line of sight. Thus instead of having one parameter per receiver-satellite link, only one parameter per receiver is needed.

Using special linear combinations such as an ionospheric-free combination, parameters can be canceled out. Each additional input of at least one of the parameters contained in $p_r$, $p^s$ and $p_r^s$ simplifies and accelerates the estimation process. In satellite-receiver-satellite single differences the parameters $p_r$ cancel out. In the following all can be done in single or zero difference, but this will not be mentioned explicitly in each step.

If all parameters $p_r, p^s, p_r^s$ and $c\Delta t^s$ are known and the noise is neglected, the remaining part $\sum_{k \in \hat{L}} a_k (b_k^s + \lambda_k N_{rk}^s)$ is not unique without additional information. Setting the ambiguities for a specific satellite-receiver combination to zero will shift the biases accordingly. If the ambiguities are known, the level of the bias is defined; if the bias is known, the level of ambiguities is defined.

In some linear combinations $\Omega_{rk}^s$ of code and carrier-phase observations the parameter $p_r, p^s, p_r^s$ and $c\Delta t^s$ cancel out, as do the receiver biases $b_{rk}$. This allows estimating the biases $b_k^s$, $b_{rk}$ and the ambiguities $N_{rk}^s$ separated from the other parameter.

Not all satellite biases can be estimated separately from the satellite clock error $c\Delta t^s$. In this case the sum of the real satellite clock and the biases are estimated together and the result is just referred as the satellite clock error. In this case shifting a bias is equivalent with shifting a clock.

Appendix A
PROVISIONAL APPLICATION FOR UNITED STATES PATENT

In the following a distinction is made between ambiguities belonging to biases and ambiguities belonging to clock errors. The clock ensemble and also the biases ensemble estimated from GNSS observations are underdetermined. Thus one of the satellite or receiver clock errors or any combination of them can be set to any arbitrary value or function to make the system solvable. In some embodiments one of the clocks is set to zero, or additional measurements or constraints for one of the clock errors or a linear combination of clock errors are added. The examples given here always have a reference clock or bias set to zero, for purposes of illustration, but this is not a requirement and another approach can be used.

Process I (3015): In a first step all other input parameters are used to reduce the linear combination of carrier phase observations. Depending on the linear combination used, there are small differences in how to estimate phase-leveled satellite clock errors. One option is to use a single, big filter: In this case, all remaining unknown parameters of $p_r$, $p^s$ and $p_r^s$, the satellite clock errors, including biases, and all ambiguities of $\hat{\Omega}_r^s$ are modeled as states in one filter, e.g. a Kalman filter. As an example the filter used for orbit determination in Part 8.__ [ORBIT_PROCESSOR], the one used for code-leveled clocks in Part 6.__ [CLOCK_PROCESSOR] (except the integer nature of ambiguities) or the Melbourne-Wübbena bias processor in Part 8.__ [WL_PROCESSOR] can be used. Another option is to perform a hierarchical estimation.

In some embodiments using linear combinations $\Omega_{rk}^s$ of code and carrier-phase observations in which the parameters $p_r$, $p^s$, $p_r^s$ and $c\Delta t^s$ cancel out, the biases and ambiguities of $\Omega_{rk}^s$ estimated in an auxiliary filter and can be used to simplify the main filter.

Another option is to use a bank of filters rather than a single filter or rather than a main filter with auxiliary filter. If all parameter beside the ambiguities are known, in at least one of the code and carrier-phase combinations $\hat{\Omega}_r^s$ or $\Omega_{rk}^s, k \in \hat{L}$ the ambiguities can be estimated in a filter bank with one filter for each ambiguity or one filter for each receiver. This is done for single-differenced observations in the phase clock processor to estimate the widelane ambiguities using the Melbourne-Wübbena linear combination and Melbourne-Wübbena biases as input.

A further option is to use a combination of a main filter with a bank of filters. In some embodiments the results of the filter banks are used to reduce the carrier-phase combinations $\hat{\Phi}_r^s$ in the main filter used to estimate the remaining unknowns.

At least one set of fixed ambiguities is sent from process I (3015) to process II (3020), but all the estimated parameters could be sent in addition.

Process II (3025): In process II the linear combination $\hat{\Omega}_r^s$ is reduced by all input parameters from process I or additional sources. If no fixed ambiguities are available for the ambiguities from process I that belong to the clock error, a subset of those ambiguities defined e.g. by a spanning tree is in some embodiments set to any arbitrary integer number and used like fixed ambiguities as discussed above. If this subset changes or is replaced by fixed ambiguities of process I, the resulting satellite phase clock errors may change their level. All remaining unknowns are modeled as states in a filter, e.g. a Kalman filter.

As in FIG. 30A, some embodiments estimate the ambiguities at a first rate and estimate a phase-leveled clock per satellite at a second rate higher than the first rate. The ambiguities estimated in process I (3005) are constant as long the receiver has no cycle slip. Thus an estimated ambiguity can be used for a long time. Also some of the other states like the troposphere estimated in process I (3005) vary slowly and can be assumed to be constant for a while. If the observations of process II (3020) are reduced by those constant and slowly varying parameters, the filter used to estimate clock errors has only a view unknowns left and is therefore quite fast. In general, processor II can work at a higher update rate than process I.

FIG. 30B is a simplified schematic diagram of an alternate phase clock processor embodiment 3035 with WL ambiguities input as in option 2 of FIG. 29 (compare with process 2965). Satellite orbit data 3005 (e.g., 350 or 360), GNSS observations 3010 (e.g., 305 or 315), tropospheric delays 3040 (e.g., 370) and fixed WL ambiguities 3045 (e.g., 340) are supplied to a filter bank 3050 of process I (3015). Filter bank 3050 estimates single-differenced free narrowlane ambiguities 3055. The SD free NL ambiguities 3055 and the fixed WL ambiguities 3045 are combined in a process 3060 with the satellite orbit data 3005, the GNSS observations 3010, and the tropospheric delays 3040 to compute single-differenced satellite clocks 3062. These are applied to a narrowlane filter bank 3064 to estimate single-differenced- satellite clocks 3066. A spanning tree process 3068 (e.g. MST) is applied to these to produce a set of single-differenced Appendix A
PROVISIONAL APPLICATION FOR UNITED STATES PATENT satellite clocks 3070. These are fed back to the filter bank 3050 of process I (3015) to improve the estimation of the single-differenced free narrowlane ambiguities 3055.

FIG. 30C is a simplified schematic diagram of an alternate phase clock processor embodiment 3075 with MW biases input as in option 1 of FIG. 29 (compare with process 2965). Satellite orbit data 3005 (e.g., 350 or 360), GNSS observations 3010 (e.g., 305 or 315), tropospheric delays 3040 (e.g., 370) and fixed WL ambiguities 3045 (e.g., 340) are supplied to a filter bank 3078 of process I (3015). Filter bank 3078 estimates single-differenced free narrowlane ambiguities 3088. A filter bank 3082 uses the MW satellite biases 3045 to estimate WL ambiguities 3084. As in FIG. 30B, the SD free NL ambiguities 3055 and the fixed WL ambiguities 3084 are combined in a process 3060 with the satellite orbit data 3005, the GNSS observations 3010, and the tropospheric delays 3040 to compute single-differenced satellite clocks 3062. These are applied to a narrowlane filter bank 3064 to estimate single-differenced- satellite clocks 3066. A spanning tree process 3068 (e.g. MST) is applied to these to produce a set of single-differenced satellite clocks 3070. These are fed back to the filter bank 3078 of process I (3015) to improve the estimation of the single-differenced free narrowlane ambiguities 3080.

FIG. 31 shows an embodiment 3100 in which estimating a phase-leveled clocks per satellite comprises using at least the satellite orbit information, the ambiguities and the GNSS signal data to estimate a set of phase-leveled clocks per receiver, each phase-leveled clock corresponding to one of a receiver-satellite link and a satellite-receiver-satellite link; and using a plurality of the phase-leveled clocks to estimate one phase-leveled clock per satellite. The satellite orbit information 3105 (e.g, 350 or 360) and the GNSS observations 3110 (e.g., 305 or 315) are used in a first process 3115 to determine the ambiguities 3120. The ambiguities 3120 are used with the satellite orbit information 3105 and the GNSS observations 3110 in a second process 3125 to estimate the set of phase leveled clocks 3130, each phase-leveled clock corresponding to one of a receiver-satellite link and a satellite-receiver-satellite link. These are used in a third process 3135 to estimate satellite clocks 3140, one per satellite.

Instead of having a big filter, the problem can be decoupled using a small filter for each satellite-to-satellite link to estimate clock errors per receiver-satellite link or in single difference case per satellite-receiver-satellite link. Afterwards those clock errors per link can be combined either Appendix A
PROVISIONAL APPLICATION FOR UNITED STATES PATENT using only links defined by a spanning tree (e.g., as at 3058) or using a filter with one clock error state per satellite.

In some embodiments, the ambiguities are estimated using at least one previously-estimated phase-leveled clock per satellite. As mentioned above, the known fixed ambiguities define the clock error level, and (vice versa) a known clock error leads to ambiguities fitting this clock error. Thus the feedback of clock error estimates to process I allows to estimate ambiguities without having a dedicated clock error state. Since process II can already produce clock error estimates before having all ambiguities fixed, this feedback is advantageous in such a scenario to fix ambiguities belonging to clock errors. Using clock error estimates from a second phase clock processor as input to process I allows to estimate ambiguities fitting those clocks and finally to estimate satellite clock errors at the same level as the other processor's clock errors.
FIG. 32 shows one such embodiment 3200. The satellite orbit information 3205 (e.g, 350 or 360) and the GNSS observations 3210 (e.g., 305 or 315) are used in a first process 3215 to determine the ambiguities 3220. The ambiguities 3220 are used with the satellite orbit information 3205 and the GNSS observations 3210 in a second process 3225 to estimate the set of phase leveled clocks 3230. These are fed back to the first process 3215 where they are used in estimating the ambiguities 3220. For this embodiment it is advantageous to have a secondary clock processor as a back up which is available to immediately provide clock error estimates without level change in case of a failure of the primary clock processor.

In some embodiments at least one additional phase-leveled clock per satellite estimated from an external source is obtained and used to estimate the ambiguities. FIG. 33 shows one such embodiment 3300. In part 3355, the satellite orbit information 3305 (e.g, 350 or 360) and the GNSS observations 3310 (e.g., 305 or 315) are used in a first process 3315 to determine the ambiguities 3320. The ambiguities 3320 are used with the satellite orbit information 3305 and the GNSS observations 3310 in a second process 3325 to estimate the set of phase leveled clocks 3330. In part 3385, the satellite orbit information 3355 (e.g, 350 or 360) and the GNSS observations 3310 (e.g., 305 or 315) are used with one or more of satellite clocks 3330 in a first process 3365 to estimate the ambiguities 3370. In this embodiment part 3335 is an external source of the satellite clocks 3330 with respect to part 3385. The ambiguities 3370 are used with the satellite orbit information 3355 and the GNSS observations 3360 in a second process 3375 to estimate the set of phase leveled clocks 3380.

Appendix A
PROVISIONAL APPLICATION FOR UNITED STATES PATENT

In some embodiments, at least one set of ambiguities per receiver is determined for additional receivers, each ambiguity corresponding to one of a receiver-satellite link and a satellite-receiver-satellite link. After determining the ambiguities for the additional receivers, at least the precise orbit information, the ambiguities for the additional receivers and the GNSS signal data are used to estimate the at least one additional phase-leveled clock per satellite.

FIG. 34 shows one such embodiment 3400. In part 3455, the satellite orbit information 3405 (e.g, 350 or 360) and the GNSS observations 3310 (e.g., 305 or 315) are used in a first process 3415 to determine the ambiguities 3420. The ambiguities 3420 are used with the satellite orbit information 3405 and the GNSS observations 3410 in a second process 3425 to estimate the set of phase leveled clocks 3430. In part 3485, the satellite orbit information 3455 (e.g, 350 or 360, but optionally from a different orbit processor associated with a different network of reference stations) and the GNSS observations 3410 (e.g., 305 or 315, but optionally from a different network of reference stations) are used with one or more of satellite clocks 3430 in a first process 3465 to estimate the ambiguities 3470. The ambiguities 3470 are used with the satellite orbit information 3455 and the GNSS observations 3460 in a second process 3475 to estimate the set of phase leveled clocks 3480.

The primary and secondary clock processors can also be of different kind. This option can be used to estimate the ambiguities close to the level of clock errors based on a different linear combination (e.g. code clock error or different phase combination). Using those ambiguities in process II will lead to clock errors close to clock errors input in process I.

Appendix A
PROVISIONAL APPLICATION FOR UNITED STATES PATENT

Part 10: Scheduler & Message Encoder

FIG. 35 is a schematic diagram showing a scheduler 355 and a message encoder 385 in accordance with some embodiments of the invention.

Methods and apparatus for encoding and transmitting satellite information are described in US Patent Application Publication 2009/0179792 A1 and 2009/0179793 A1.

Appendix A
PROVISIONAL APPLICATION FOR UNITED STATES PATENT

Part 11: Rover Processing with Synthesized Reference Station Data

Rodrigo Leandro
Ulrich Vollath
Xiaoming Chen

Part 11.1 Introduction

Existing RTK rover positioning engines are typically designed to process differenced data; the rover data is differenced with base station data and the filters operate on the differenced data. The GNSS observations are contaminated with a number of errors such as satellite clock error, receiver clock error, troposphere delay error. and ionospheric delay error. The satellite-dependent errors (e.g. satellite clock error) can be eliminated if the difference between the observations of two receivers observing the same satellite is used. If those receivers are located close enough to each other (e.g. a few kilometers under normal conditions) then the atmosphere-related errors can also be eliminated. In case of VRS (Virtual Reference Station) the difference is done not between two stations, but between the rover station and a virtual station, whose data is generated using observations from a network of receivers. From this network it is possible to create knowledge of how errors behave over the region of the network, allowing differential positioning over longer distances.

Prior approaches for Precise Point Positioning (PPP) and PPP with ambiguity resolution (PPP/RTK) remove modeled errors by applying them as corrections (subtracting the errors) to the rover data. Though this works, using a rover receiver configured to process differenced data requires a change in data preparation in that single-differencing has to be replaced by rover-data-only error correction before the data can be processed.

This implies two different modes of operation inside the rover's positioning engine. In practice this results in separate processors for PPP and RTK. This consumes a lot of software development resource, and occupies more of the rover's CPU memory for the additional modules and data.

Appendix A
PROVISIONAL APPLICATION FOR UNITED STATES PATENT

Part 11.2 Global Virtual Reference Station Positioning

Some embodiments of the invention are based on a substantially different approach, in which a Synthesized Base Station (SBS) data stream is generated for any position on or near the Earth's surface using precise satellite information (e.g., precise orbits and clocks). This data stream is equivalent to having a real reference station near the rover.

For processing at the rover, a Real-Time Kinematic (RTK) positioning engine is used that is adapted to the different error characteristics of PPP as compared to traditional Virtual Reference Station (VRS) processing. Unlike traditional VRS processing, some embodiments of the invention use a processing approach which does not rely on small ionospheric residuals. And in contrast with traditional VRS processing, some embodiments of the invention optionally process different pseudorange observables.

PPP and PPP/RTK functionality are retained, with comparatively low software development and few changes in the rover positioning engine, while retaining the advantage of well-proven RTK engines that had been developed and perfected with many man-years of development time. Examples of such functionality include processing of data collected under canopy and dealing with delays in the reference data/corrections (low-latency positioning).

PPP-RTK studies using the SBS technique have proven the high performance of such a system. A positioning accuracy of 10 cm horizontal (95%) was achieved after about 600 seconds (mean) when processing a test data set. Convergence to the typical long baseline and VRS survey accuracy of 2.54 cm horizontal (95%) was achieved after 900 seconds (mean). This suggests that SBS techniques described here can provide sub-inch horizontal-positioning performance.

Part 11.2 Generating SBS Data

The SBS technique enables the generation of virtual GNSS data (data from a virtual GNSS reference/base station) for any position on or near the Earth's surface using precise satellite information (e.g., orbits, clocks). The core of the processing is done inside a module which responsible for the generation of the virtual data. The aim of such data generation is to make it possible to use GNSS satellite precise information in a GNSS receiver running an RTK Engine Appendix A
PROVISIONAL APPLICATION FOR UNITED STATES PATENT (RTK Engine is described in Part __ [RTK DESCRIPTION]). Therefore the receiver's antenna position is computed by the RTK engine with differential GNSS data processing (i.e. difference between observations of a reference receiver and a rover receiver) using the SBS data as coming from the (virtual) reference receiver, and the rover receiver. The technique therefore allows that a differential GNSS processor is used to compute positions anywhere without the explicit need of a nearby reference station.

The SBS module uses at least one of the following:

- Phase-leveled clocks: These are the satellite clock offsets computed as described in Part 9.__ [PHASE CLOCK DESCRIPTION].
- Code-leveled clocks): These are the satellites clock offsets computed as described in Part 6.__ [STANDARD CLOCK DESCRIPTION].
- Melbourne-Wuebenna bias: These are the satellite biases for the Melbourne-Wuebenna phase and code combination computed as described in Part 8.__ [WL BIAS DESCRIPTION].
- Jump messages: These messages can indicate whether or not the satellite phase clock had a change of level in the recent past (e.g. 10 minutes). The reasons for a level change are pointed out in Part 9.__ [PHASE CLOCK DESCRIPTION]. Whenever a jump (level change) occurs in the satellite phase clock offset, some action has to be taken on the rover. This action might be the reset of the satellite's ambiguity(ies) in the RTK engine;
- Approximate rover position: This is the position for which the virtual base data will be generated. The approximate position of the rover can be used for example so that geometric-dependent components (e.g. satellite position) are the same as for the rover data.
- Time tag: This is the time (epoch) for which the virtual data has to be generated. The virtual data has to be created for certain instants of time (epochs) that depend on the rover observation time tags, so that it can be used in the differential data processing together with the rover data.

Given one or more items of the list above as input the SBS module generates as output a set of GNSS virtual observations. These observations comprise and are not restricted to: L1 code, L2 code, L1 phase, L2 phase, L1 cycle slip information, L2 cycle slip information, exact virtual base position. Once the virtual reference station dataset is available it can be Appendix A
PROVISIONAL APPLICATION FOR UNITED STATES PATENT delivered to the RTK engine for differential processing with the rover's own GNSS observation data and optionally using the precise satellite data. The RTK engine can then apply conventional RTK processing to compute the rover coordinates (see Part ___ [RTK DESCRIPTION]).

Part 11.3 Moving Base

The best corrections for kinematic rovers are obtained when the SBS position and the synthesized reference station data for the SBS position are updated frequently, e.g., for every epoch of rover observations a new set of SBS data is generated. Some embodiments use as the SBS position a first estimate of the rover position, derived for example from a simple navigation solution using the rover observations.

In the case of prior-art Virtual Reference Station (VRS) processing, a moving rover can result in a significant separation between the rover position and the VRS location for which the VRS data is synthesized. Some implementations mitigate this by changing the VRS position when this distance exceeds a certain threshold. This can lead to resets of the RTK engine in most implementations.

For attitude determination (heading, blade control etc.), typical RTK processing engines are usually capable of processing data from a moving base station; frequent updating of the SBS position and the synthesized reference station data for the SBS position do not require modification of these rover processing engines.

Part 11.4 SBS Embodiments

FIG. 38 shows an embodiment 3800 of SBS processing in accordance with the invention. Rover receiver 3805 receives GNSS signals from multiple GNSS satellites, of which three are shown at 3810, 3815 and 3820. Receiver 3805 derives GNSS data 3825 from code observations and carrier-phase observations of the GNSS signal over multiple epochs.

Precise satellite data 3830 for the GNSS satellites are received, such as via a correction message 390 broadcast by a communications satellite 3835 or by other means, and decoded by a message Appendix A
PROVISIONAL APPLICATION FOR UNITED STATES PATENT decoder 3832. A SBS module 3835 receives the precise satellite data 3830 and also receives information which it can use as a virtual base location, such as an approximate rover position with time tag 3842 generated by an optional navigation processor 3845. The approximate rover position is optionally obtained from other sources as described below.

SBS module 3835 uses the precise satellite data 3830 and the approximate rover position with time tag 3842 to synthesize base station data 3850 for the virtual base location. The base station data 3850 comprises, for example, synthesized observations of L1 code, L2 code, L1 carrier-phase and L2 carrier-phase, and optionally includes information on L1 cycle slip, L2 cycle slip, and the virtual base location. The SBSD module 3835 is triggered by an event or arrival of information which indicates that a new epoch of synthesized base station data is to be generated. In some embodiments the trigger is the availability of a rover observation epoch data set. In some embodiments the trigger is the current rover time tag. In some embodiments one epoch of synthesized base station data 3850 is generated for each epoch of GNSS data observations 3825. In some embodiments the trigger is the availability of an updated set of precise satellite data 3830.

In some embodiments a differential processor 3855, such as a typical RTK positioning engine of an integrated GNSS receiver system 3700, receives the precise satellite data 3830, the synthesized base station data 3850, and the GNSS data 3825 of rover receiver 3805, and uses these to determine a precise rover position 3860. Synthesized base station data 3850 is substituted for base station data in such processing.

FIG. 39 shows clock prediction between an observation time Obs 0 and a subsequent observation time OBs 1.

FIG. 40 is a schematic block diagram of the SBS module 3835.

The SBS module 3835 uses at least one of the following:

- Phase-leveled clocks 370: These are the satellite clock offsets computed as described in Part 9: Phase Clock Processor;
- Code-leveled clocks 365: These are the satellite clock offsets computed as described in Part 6: Standard Clock Processor;

Appendix A
PROVISIONAL APPLICATION FOR UNITED STATES PATENT

- Melbourne-Wübbena biases 345: These are the satellite biases for the Melbourne-Wübbena phase and code combination computed as described in Part 8: Widelane Bias Processor;
- Jump messages (e.g., from correction message 390): Jump messages indicate when the satellite phase clock has had a change of level in the recent past (e.g. 10 minutes). The reasons for a level change are pointed out in Part 9.__ [PHASE CLOCK DESCRIPTION]. When a jump (level change) in the satellite phase clock offset is indicated, action is taken at the rover such as reset of the satellite's ambiguity(ies) in the RTK engine.
- Approximate rover position 3840: This is the position for which the virtual base data will be generated. The approximate position of the rover can be used so geometric-dependent components (e.g. satellite position) are the same as for the rover data.
- Time tag 3842: This is the time for which the virtual data is to be generated. The synthesized base station data 3850 is created for certain instants of time that depend on the rover observation time tags, so that it can be used in the differential data processing together with the rover data.

Given one or more of these items as input the SBS module 3850 generates as output 3850 a set of GNSS virtual observations. These observations comprise and are not restricted to: L1 code, L2 code, L1 phase, L2 phase, L1 cycle slip information, L2 cycle slip information, and exact virtual base position. The virtual base station is delivered to the differential processor 3855 as is the rover's GNSS data 3825 and, optionally, the precise satellite data 3830. The differential processor 3855 computes the coordinates of the precise rover position 3860, as described in Part __[RTK DESCRIPTION].

At any instant the SBS module 3835 may receive one or more of the following: approximate rover position 3840, precise satellite data 3830, and/or a time tag 3842. The approximate rover position 3840 is stored at 4005 as an updated current virtual base position. The precise satellite data 3840 is saved at 4010. The time tag 3842 is saved at 4015. Any of these items, or an optional external trigger 4020, can be used as a trigger event at decision point 4025 begin the generation of a new set of synthesized base station data 3850.

Appendix A
PROVISIONAL APPLICATION FOR UNITED STATES PATENT

The satellite data for the current time tag is evaluated at 4030. This means that the satellite position and clock error that are stored are converted to the correct transmission time of the signal, so they can be consistently used with the rover observations. This is done because the stored satellite position and clock errors do not necessarily match the time tag of each requested epoch of the SBS module. The precise satellite data set for the current time tag 4035 is used at 4040 to synthesize a base station data set for the current time tag. At 4040, the satellite position and satellite velocity are computed for the current time tag. The geometric range between the virtual base station $i$ and the satellite $j$ is computed for example as:

$$\rho_i^j = \sqrt{\left((X^j - X_i)^2 + (Y^j - Y_i)^2 + (Z^j - Z_i)^2\right)} \tag{40.1}$$

where $X^j, Y^j, Z^j$ is the satellite position at the time of the current time tag, and $X_i, Y_i, Z_i$ is the virtual base station location at the time of the current time tag.

The neutral atmosphere (or, troposphere) delay $T_i^j$ is computed for example using a prediction model. E For examples of prediction models see [Leandro 2009], [Leandro et al. 2006a], or [Leandro et al. 2006b].

The ionospheric delay $I_i^j$ for L1 frequency is computed for example using an ionosphere model. This can be a prediction model, such as the GPS broadcast ionosphere model [ICD-GPS], or something more sophisticated. Optionally the ionospheric delay can be set to zero.

The uncorrected synthesized base station data set for the time of the time tag is then computed for example as:

$$\Phi_{i,1}^{j}{}' = \rho_i^j - c\Delta t_\Phi^j + T_i^j - I_i^j \tag{40.2}$$

$$\Phi_{i,2}^{j}{}' = \rho_i^j - c\Delta t_\Phi^j + T_i^j - \frac{f_1^2}{f_2^2} I_i^j \tag{40.3}$$

$$P_{i,1}^{j}{}' = \rho_i^j - c\Delta t_P^j + T_i^j + I_i^j + \frac{f_2}{f_1}\left(\lambda_{WL} \cdot b_{MW}^j - c\Delta t_\Phi^j + c\Delta t_P^j\right) \tag{40.4}$$

Appendix A
PROVISIONAL APPLICATION FOR UNITED STATES PATENT $$P_{i,2}^{j}{}' = \rho_i^j - c\Delta t_P^j + T_i^j + \frac{f_1^2}{f_2^2} I_i^j + \frac{f_1}{f_2}\left(\lambda_{WL} \cdot b_{MW}^j - c\Delta t_\Phi^j + c\Delta t_P^j\right) \qquad (40.5)$$

where $\Phi_{i,1}^{j}{}'$ is the synthesized L1 carrier observation for the virtual base location, $\Phi_{i,2}^{j}{}'$ is the synthesized L2 carrier observation for the virtual base location, $P_{i,1}^{j}{}'$ is the synthesized L1 code observation for the virtual base location, and $P_{i,2}^{j}{}'$ is the synthesized L2 code observation for the virtual base location.

The uncorrected synthesized base station data set 4045 is corrected at 4050 to create a synthesized base station data set 3850 for the current time tag. The corrections includes one or more of the effects described in Part __[CORRECTION MANAGER DESCRIPTION], such as solid earth tides, phase wind-up, and antenna phase center variation. The corrected synthesized base station data set is:

$$\Phi_{i,1}^{j} = \Phi_{i,1}^{j}{}' - C_{i,1}^{j} \qquad (40.6)$$

$$\Phi_{i,2}^{j} = \Phi_{i,2}^{j}{}' - C_{i,2}^{j} \qquad (40.7)$$

$$P_{i,1}^{j} = P_{i,1}^{j}{}' - C_{i,1}^{j} \qquad (40.8)$$

$$P_{i,2}^{j} = P_{i,2}^{j}{}' - C_{i,2}^{j} \qquad (40.9)$$

The synthesized base station data set generation is then complete for the current time tag and is delivered to the differential processor 3855.

In some embodiments the differential processor 3855 uses the broadcast ephemeris to determine the satellite position and clock error, as in this mode of positioning only approximate quantities are needed for the satellite. This is also true when the differential processor is using SBS data, however in some embodiments the processor optionally uses the available precise satellite data.

FIG. 41 is a schematic block diagram of a typical RTK positioning engine …

Appendix A
PROVISIONAL APPLICATION FOR UNITED STATES PATENT

FIG. 42 shows an alternate embodiment 4200 which is a variant of the processing 3800 of FIG. 38. In this embodiment the precise satellite data 3830 and rover observation data 3825 are sent to a PPP (Precise Point Positioning) engine 4210 rather or in addition to the differential processor 3855. The PPP engine 4210 delivers the rover coordinates in place of or in addition to those from the differential processor 3855.

FIG. 43 is a simplified view of the embodiment of FIG. 38. The synthesized GNSS data 3850 is created for a given location using precise satellite data 3830. The synthesized data 3850 is forwarded to the differential processor 3855 which, also using the rover GNSS data 3825, computes the rover position 3860.

FIG. 44 is a timing diagram of a low-latency version of the processing of FIG. 38, FIG. 42 or FIG. 44. In this variant, the arrival an epoch of rover observation data (e.g., 3825) or an epoch time tag (e.g., 3842) is used as a trigger for the generation of synthesized base station data (e.g., 3850). For example, a set of synthesized base station data (e.g., 3850) is generated for each epoch of rover observation data (e.g., 3825). The virtual base location (e.g., approximate rover position 3840) is updated from time to time as indicated by timing marks 4402 - 4408. Precise satellite data (e.g., precise satellite data 3830) is received from time to time as indicated by timing marks 4410 – 4424. Rover data (e.g., rover observations 3825) are received from time to time as indicated by timing marks 4426 – 4454. The arrivals of virtual base locations, the precise satellite data and the rover data are asynchronous. Each arrival of an epoch of rover data (indicated by a respective one of timing marks 4426 – 4454) results in the generation of a corresponding set of virtual base station data (indicated by a respective one of timing marks 4456 – 4484). In each case it is preferred to use the latest virtual base station location and the latest precise satellite data when processing an epoch of rover observation data with the corresponding virtual base station data. Each pairing of rover data and virtual base station data, e.g., of timing mark pair 4424 and 4456, results in the generation of a corresponding rover position, e.g, of timing mark 4485. Generated rover positions are indicated by timing marks 4485 – 4499.

In some embodiments a new SBS data epoch is created at each time a new rover data epoch is observed. FIG. 45 is a timing diagram of a high-accuracy version of the processing of FIG. 38, FIG. 42 or FIG. 43. In this variant, the arrival of a set of precise satellite data (e.g., 3830) is used as a trigger for the generation of synthesized base station data (e.g., 3850). For example, a set of Appendix A
PROVISIONAL APPLICATION FOR UNITED STATES PATENT synthesized base station data (e.g., 3850) is generated for each set of precise satellite data (e.g., 3850). The virtual base location 3840 (e.g., approximate rover position) is updated from time to time as indicated by timing marks 4502 - 4508. Precise satellite data (e.g., precise satellite data 3830) are received from time to time as indicated by timing marks 4510 – 4524. Synthesized base station data (e.g., 3850) are generated for example from each new set of precise satellite data, as indicated by timing marks 4526 – 4540. Rover data (e.g., rover observations 3825) are received from time to time as indicated by timing marks 4542 – 4570. The arrivals of virtual base locations, the precise satellite data and the rover data are asynchronous, but in this variant the synthesized base station data sets are synchronized (have the same time tags) as with precise satellite data sets, e.g., indicated by timing marks 4510 and 4526, 4512 and 4528, etc. Each new epoch of rover data is processed using the most recent synthesized base station data set. For example the rover data epochs arriving at timing marks 4544 and 4536 are processed using synthesized base station data prepared at timing mark 4526, etc.

In some embodiments a new SBS data epoch is created each time a new precise satellite data set is obtained. FIG. 46 shows a variant 4600 of the process of FIG. 38, FIG. 42 or FIG. 43 in which the virtual base location 4605 is taken from any of a variety of sources. Some embodiments take as the virtual base location 4605 (a) the autonomous position 4610 of the rover as determined for example by the rover's navigation engine 3845 using rover data 3825. Some embodiments take as the virtual base station location 4605 (b) a previous precise rover position 4615 for example a precise rover position 4220 determined for a prior epoch by differential processor 3855 or by PPP engine 4210. Some embodiments take as the virtual base location 4605 (c) the autonomous position 4610 of the rover as determined for example by the SBS module 3835 using rover data 3825. Some embodiments take as the virtual base location 4605 (d) the autonomous position 4610 of the rover as determined for example by the SBS module 3835 using rover data 3825 and precise satellite data 3830. Some embodiments take as the virtual base station location 4605 an approximate rover location obtained from one or more alternate position sources 4620, such as a rover position determined by an inertial navigation system (INS) 4625 collocated with the rover, the position of a mobile phone (cell) tower 4630 in proximity to a rover collocated with a mobile telephone communicating with the tower, user input 4635 such as a location entered manually by a user for example with the aid of keyboard 3755 or other user input device, or any other desired source 4640 of a virtual base station location.

Appendix A
PROVISIONAL APPLICATION FOR UNITED STATES PATENT

Regardless of the source, some embodiments update the virtual base station location 4605 or 3840 from time to time for use by SBS module 3835 as indicated by arrow 4645. The virtual base station location 4605 can be updated for example:

- (a) never,
- (b) for each epoch of rover data,
- (c) for each $n^{th}$ epoch of rover data,
- (d) after a predetermined time interval,
- (e) when the distance between the approximate rover antenna position (e.g., 3840) or autonomous rover antenna position (e.g., 4610) and the virtual base station location (e.g., 4605) exceeds a predetermined threshold,
- (f) when the distance between the approximate rover antenna position (e.g., 3840) or autonomous rover antenna position (e.g., 4610) and the precise rover antenna position (e.g., 4220) exceeds a predetermined threshold,
- (g) for each update of the approximate rover antenna position (e.g., 3840),
- (h) for each update of the precise rover antenna position (e.g., 4220).

For case (a), the first virtual base station location (e.g., 4605) that is provided to SBS module 3835 is used for the whole period during which the data processing is done. For case (b), the virtual base station location (e.g., 4605) is updated every time a new epoch of the rover data 3825 is collected, as this new epoch can be used to update the rover approximate position 3840 which can be used as the virtual base station location 4805. For cases (b) and (c) the virtual base station location 4605 is updated every time a certain number (e.g., 1 to 10) of epochs of rover data 3825 is collected. In case (d) the virtual base station location 4605 is updated at a certain time interval (e.g., every 10 seconds). Case (e) can be viewed as a mixture of cases (a) and (b), where the current virtual base station location 4605 is kept as long as the distance between the current virtual base station location and the approximate rover antenna position is less than a limiting distance (e.g., 100 m). Case (f) is similar to case (e), except that the distance between the virtual base station location and a recent precise rover position is used. For case (g) the virtual base station location is updated each time the approximate rover antenna position changes. For case (h) the virtual base station location is updated each time the precise rover antenna position changes.

Appendix A
PROVISIONAL APPLICATION FOR UNITED STATES PATENT

In some embodiments the virtual base station location 3840 used for the generation of the SBS data comes from the autonomous position solution of the rover receiver, e.g., approximate rover position 3840. In some embodiments the virtual base station location 3840 is not the same position as the autonomous position solution, but somewhere close to it.
Some embodiments use as the virtual base station location 3840 a source such as: an autonomously determined position of the rover antenna, a previously determined one of said rover antenna positions, a synthesized base station data generating module (e.g., 3835), a precise rover position (e.g., 4220), a position determined by a PPP engine (e.g., 4210), a position determined by an inertial navigation system (e.g., 4625), a mobile telephone tower location (e.g., 4630), information provided by a user (e.g., 4635), or any other selected source (e.g., 4540).

In some embodiments the virtual base station location 3840 is not kept constant throughout the rover observation period but is updated if certain conditions are met such as: never, for each epoch of rover data, when the distance between an approximate rover antenna position and the virtual base station location exceeds a predetermined threshold, for each update of the rover antenna positions, and for a specific GNSS time interval. In some embodiments a change of the virtual base station location 3840 location is used to trigger the generation of a new SBS epoch of data.

In some embodiments the SBS data is used for any kind of between-station differential GNSS processor, no matter what type data modeling is involved, such as processors using: aided inertial navigation (INS), integrated INS and GNSS processing, normal real-time kinematic (RTK), Instant RTK ( IRTK, e.g., using L1/L2 for fast on-the-fly ambiguity resolution), Differential GPS (DGPS) float-solution processing, and/or triple-differenced processing. In some embodiments the SBS data is used in post-processing of rover data. In some embodiments the SBS data is used in real time (i.e., as soon as the rover observation is available and a SBS record can be generated for it). In some embodiments the time tag of the rover matches the time tag of the SBS data within a few milliseconds.

Appendix A
PROVISIONAL APPLICATION FOR UNITED STATES PATENT

Part 11. 5 SBS References

Leandro R.F., Santos, M.C. and Langley R.B., (2006a). "UNB Neutral Atmosphere Models: Development and Performance". Proceedings of ION NTM 2006, Monterey, California, January, 2006.

Leandro R.F., Santos, M.C. and Langley R.B., (2006b). "Wide Area Neutral Atmosphere Models for GNSS Applications". Proceedings of ION GNSS 2006, Fort Worth, Texas, September, 2006.

Leandro, R. F. (2009). Precise Point Positioning with GPS: A New Approach for Positioning, Atmospheric Studies, and Signal Analysis. Ph.D. dissertation, Department of Geodesy and Geomatics Engineering, Technical Report No. 267, University of New Brunswick, Fredericton, New Brunswick, Canada, 232 pp.

Appendix A
PROVISIONAL APPLICATION FOR UNITED STATES PATENT

Part 12: Rover Processing with Ambiguity Fixing

Part 12.1 Ambiguity Fixing Introduction

The common high accuracy absolute positioning solution (also called Precise Point Positioning, or PPP) makes use of precise satellite orbit and clock error information. This solution also uses iono-free observations because there is no information available about the behavior of the ionosphere for the location of the rover receiver (few cm). High accuracy absolute positioning solutions in this scenario have always been based on float estimates of carrier-phase ambiguities, as it was not possible to maintain the integer nature of those parameters using un-differenced iono-free observations. Another issue concerning the integer nature of un-differenced ambiguities is the presence of non-integer phase biases in the measurements. These biases have to be also present in the correction data (e.g. clocks), otherwise the obtained ambiguities from the positioning filter will not be of integer nature.

Typical observation models used in prior-art processing are:

$$\phi = R + dT - dt + T + N_{if} \quad (1)$$

$$P = R + dT - dt + T \quad (2)$$

where $\phi$ is the phase observation at the rover of a satellite signal (measured data)

$P$ is the code observation at the rover of a satellite signal (measured data)

$R$ is the range from satellite to rover at the transmission time of the observed signals $dT$ is the receiver clock (also called herein a code-leveled receiver clock or receiver code clock or standard receiver clock)

$dt$ is the satellite clock (also called herein a code-leveled satellite clock or satellite code clock or standard satellite clock)

$T$ is the tropospheric delay of the satellite to rover signal path $N_{if}$ is the iono-free ambiguity Appendix A
PROVISIONAL APPLICATION FOR UNITED STATES PATENT Typical prior-art PPP processing uses the ionospheric-free phase $\phi$ and code $P$ observations (measurements) of the signals of multiple satellites along with externally-provided satellite clock information $dt$ in an attempt to estimate values for the receiver position ( $X^r$ , $Y^r$ ,and $Z^r$ ), receiver clock $dT$ , tropospheric delay $T$ and the iono-free float ambiguities $N_{if}^{Float}$ . The state vector of parameters to be estimated in a Kalman-filter implementation, for each satellite $j$ observed at the rover is thus:

$$\begin{Bmatrix} X^r \\ Y^r \\ Z^r \\ dT \\ T \\ N_{if}^{j\ Float} \end{Bmatrix} \qquad (3)$$

Embodiments of the invention provide for absolute positioning which takes into account the integer nature of the carrier-frequency ambiguities in real time processing at the rover. By real time processing is meant that the observation data is processed as soon as: (a) the data is collected; and (b) the necessary information (e.g. satellite corrections) are available for doing so. Novel procedures use special satellite clock information so that carrier-phase (also called phase) ambiguity integrity is maintained in the ambiguity state values computed at the rover. The rover's processing engine handles the satellite clock error and a combination of satellite biases that are applied to the receiver observations.

Prior-art PPP engines are not able to use phase-leveled clocks, or at least are not able to take advantage of the integer nature of these clocks. Some embodiments of the invention make use of this new information, e.g., in a modified position engine at the rover.

One goal of using phase-leveled satellite clocks and bias information is to obtain supposed integer ambiguities, which are used to obtain an enhanced position solution which takes advantage of the integer nature of the ambiguities. This improves the position solution (4710) as compared with a position solution (4705) in which the ambiguities are considered to be float numbers, as shown in Figure 47.

Appendix A
PROVISIONAL APPLICATION FOR UNITED STATES PATENT

The result of such prior-art PPP processing does not allow the integer nature iono-free ambiguities $N_{if}$ to be reliably determined, but instead only enables estimation of iono-free float ambiguities $N_{if}^{Float}$. The iono-free float ambiguities $N_{if}^{Float}$ can be viewed as including additional effects that can be interpreted as an error $e$ such that:

$$N_{if}^{Float} = [\alpha N_{WL}^{Integer} + \beta N_1^{Integer}] + e \quad (4)$$

$$N_{if}^{Float} = N_{if}^{PL} + e \quad (5)$$

where $N_{if}^{Float}$ is an iono-free float ambiguity representing a combination of an iono-free integer ambiguity $N_{if}^{Integer}$ and an error $e$ $N_{WL}^{Integer}$ is a Widelane integer ambiguity $\alpha$ is an Widelane ambiguity coefficient $N_1^{Integer}$ is an L1 integer ambiguity $\beta$ is an L1 ambiguity coefficient $N_{if}^{PL}$ is a phase-leveled iono-free ambiguity In some particular cases it is possible to consider $N_{if}^{Float} \cong N_{if}^{integer}$ in a practical way. Therefore there are cases where the formulation of the float ambiguity $N_{if}^{Float}$ as a composition of other two integer-nature ambiguity (as in $N_{if}^{Float} = [\alpha N_{WL}^{Integer} + \beta N_1^{Integer}] + e$ ) is not necessary.

Part 12.2 Determining iono-free phase-leveled ambiguities $N_{if}^{PL}$: Option 1

Appendix A
PROVISIONAL APPLICATION FOR UNITED STATES PATENT

Some embodiments of the invention are based on eliminating the un-wanted effects, or in other words the iono-free float ambiguity error $e$ to allow determination of iono-free phase-leveled ambiguities $N_{if}^{PL}$. To eliminate the error $e$, the phase observation model is redefined:

$$\phi = R + dT_p - dt_p + T + N_{if}^{PL} \qquad (6)$$

where $dT_p$ is a phase-leveled receiver clock (also called a receiver phase clock)

$dt_p$ is a phase-leveled satellite clock (also called a satellite phase clock)

$N_{if}^{PL}$ is a phase-leveled iono-free ambiguity

Satellite phase clock $dt_p$ in (6) is phase-based and has integer nature and, in contrast to Eq. (4), it can provide phase-leveled ambiguities free of error $e$, so that:

$$N_{if}^{PL} = [\alpha N_{WL}^{Integer} + \beta N_1^{Integer}] \qquad (7)$$

The phase-leveled iono-free ambiguity $N_{if}^{PL}$ is not an integer but yet has an integer nature; the phase-leveled iono-free ambiguity $N_{if}^{PL}$ can be interpreted as a combination of two integer ambiguities. One way of doing so is assuming that it is a combination of a widelane integer ambiguity $N_{WL}^{Integer}$ and an L1 integer ambiguity $N_1^{Integer}$ in which the widelane ambiguity coefficient $\alpha$ and the L1 ambiguity coefficient are not necessarily integers.

The phase-leveled clock $dt_p$ can be quite different from a standard (code-leveled) satellite clock $dt$. To avoid confusion, the term $dt_p$ is used to denote the phase-leveled satellite clock and the term $dt_c$ is used herein to denote the standard (code-leveled) satellite clock, i.e., $dt_c = dt$.

The introduction of the phase-leveled satellite clock term $dt_p$ in (6) means that the corresponding receiver clock term $dT_p$ is also phase leveled. The term $dT_p$ is used herein to denote the phase- Appendix A
PROVISIONAL APPLICATION FOR UNITED STATES PATENT leveled receiver clock and the term $dT_c$ is used to denote the standard (code-leveled) receiver clock, i.e., $dT_c = dT$. In a positioning engine where phase and code measurements are used simultaneously two clock states are therefore modelled for the receiver; in this formulation these are the phase-leveled receiver clock $dT_p$ and the standard (code-leveled) receiver clock $dT_c$.

As mentioned above, typical prior-art PPP processing attempts to estimate values for four parameters for each observed satellite: receiver coordinates $X^r$, $Y^r$, and $Z^r$, receiver clock $dT$, tropospheric delay $T$ and the iono-free float ambiguities $N_{if}^{Float}$. The introduction of phase-leveled clock terms adds one further parameter to be estimated in the rover engine: phase-leveled receiver clock $dT_p$. The restated observation models are therefore as shown in equations (6) and (2), respectively and reproduced here:

$$\phi = R + dT_p - dt_p + T + N_{if}^{PL} \tag{8}$$

$$P = R + dT_c - dt_c + T \tag{9}$$

In this formulation each observation type (phase $\phi$ or code $P$) is corrected with its own clock type (phase-leveled satellite clock $dt_p$ or code-leveled satellite clock $dt_c$). Some embodiments of the invention therefore use the phase $\phi$ and code $P$ observations (measurements) of the signals of multiple satellites observed at a rover along with externally-provided code-leveled (standard) satellite clock information $dt_c$ and phase-leveled satellite clock information $dt_p$ to estimate values for range $R$, code-leveled receiver clock $dT_c$, phase-leveled receiver clock $dT_p$, tropospheric delay $T$ and the iono-free phase-leveled ambiguities $N_{if}^{PL}$. The state vector of parameters to be estimated in a Kalman-filter implementation, for each satellite $j$ observed at the rover is thus:

$$\begin{Bmatrix} X^r \\ Y^r \\ Z^r \\ dT_c \\ dT_p \\ T \\ N_{if}^{j\ PL} \end{Bmatrix} \quad (10)$$

Part 12.3 Determining iono-free phase-leveled ambiguities $N_{if}^{PL}$ : Option 2

A second formulation for handling the phase-leveled information is to substitute for the code-leveled receiver clock $dT_c$ an offset $\delta dT_p$ representing the difference between the code-leveled receiver clock $dT_c$ and the phase-leveled receiver clock $dT_p$ :

$$\delta dT_p = dT_c - dT_p \quad (11)$$

so that equations (6) and (2) become, respectively:

$$\phi = R + dT_p - dt_p + T + N_{if}^{PL} \quad (12)$$

$$P = R + dT_p + \delta dT_p - dt_c + T \quad (13)$$

Accordingly, some embodiments of the invention use the phase $\phi$ and code $P$ observations (measurements) of the signals of multiple satellites observed at a rover along with externally-provided code-leveled (standard) satellite clock information $dt_c$ and phase-leveled satellite clock information $dt_p$ to estimate values for range $R$ , phase-leveled receiver clock $dT_p$ , receiver-clock offset $\delta dT_p$ , tropospheric delay $T$ and the iono-free phase-leveled ambiguities $N_{if}^{PL}$ . The state vector of parameters to be estimated in a Kalman-filter implementation, for each satellite $j$ observed at the rover is thus:

$$\left\{\begin{matrix} X^r \\ Y^r \\ Z^r \\ dT_p \\ \delta dT_p \\ T \\ N_{if}^{j\,PL} \end{matrix}\right\} \qquad (14)$$

This second formulation still has five types of parameters to be estimated, but because $\delta dT_p$ is an offset there is less process noise in the Kalman filter than for state vector (10). The advantage of such model as compared to option 1 is that the stochastic model can be setup differently, meaning that the noise level assigned to a clock bias state (e.g. $\delta dT_p$ ) can be different from a clock state (e.g. $dT_c$ ). Assuming that phase- and code-leveled clocks behave in a similar way, the noise level needed for modelling a bias state should be less than for modelling a clock state.

Part 12.4 Determining iono-free phase-leveled ambiguities $N_{if}^{PL}$ : Option 3

A third formulation for handling the phase-leveled information is to substitute for the phase-leveled receiver clock $dT_p$ an offset $-\delta dT_p$ representing the difference between the phase-leveled receiver clock $dT_p$ and the code-leveled receiver clock $dT_c$ :

$$-\delta dT_p = dT_p - dT_c \qquad (15)$$

so that equations (6) and (2) become, respectively:

$$\phi = R - dT_p + dT_c - dt_p + T + N_{if}^{PL} \qquad (16)$$

$$P = R + dT_c + \delta dT_c - dt_c + T \qquad (17)$$

Accordingly, some embodiments of the invention use the phase $\phi$ and code $P$ observations (measurements) of the signals of multiple satellites observed at a rover along with externally-provided code-leveled (standard) satellite clock information $dt_c$ and phase-leveled satellite clock information $dt_p$ to estimate values for range $R$, code-leveled receiver clock $dT_c$, receiver-clock offset $-\delta dT_p$, tropospheric delay $T$ and the iono-free phase-leveled ambiguities $N_{if}{}^{PL}$. The state vector of parameters to be estimated in a Kalman-filter implementation, for each satellite $j$ observed at the rover is thus:

$$\begin{Bmatrix} X^r \\ Y^r \\ Z^r \\ dT_c \\ -\delta dT_p \\ T \\ N_{if}^{j\ PL} \end{Bmatrix} \tag{18}$$

This third formulation still has five types of parameters to be estimated, but because $-\delta dT_p$ is an offset there is less process noise in the Kalman filter than for state vector (10).

Part 12.5 Determining iono-free phase-leveled ambiguities $N_{if}{}^{PL}$: Option 4

A fourth formulation for handling the phase-leveled information first estimates the iono-free float ambiguities $N_{if}^{j\ Float}$ using code-leveled (standard) satellite clocks $dt_c$ for phase observations $\phi$ and for code observations $P$ as in (3), and shifts the iono-free float ambiguities $N_{if}^{j\ Float}$ afterward using the phase-leveled clock information to obtain the iono-free phase-leveled ambiguities $N_{if}{}^{PL}$.

The starting point for this formulation is:

$$\phi = R + dT_c - dt_c + T + N_{if}{}^{Float} \tag{19}$$

$$P = R + dT_c - dt_c + T \tag{20}$$

Note that (19) and (20) are identical to (1Error! Reference source not found.) and (2), since $dT_c = dT$ and $dt_c = dt$.

Appendix A
PROVISIONAL APPLICATION FOR UNITED STATES PATENT

This fourth formulation, as in the typical prior-art PPP processing discussed above, uses the phase $\phi$ and code $P$ observations (measurements) of the signals of multiple satellites observed at a rover along with externally-provided code-leveled (standard) satellite clock information $dt_c$ to estimate values for range $R$, code-leveled receiver clock $dT_c$, tropospheric delay $T$ and the iono-free float ambiguities $N_{if}^{Float}$. The state vector of parameters to be estimated in a Kalman-filter implementation, for each satellite $j$ observed at the rover is thus:

$$\begin{Bmatrix} X^r \\ Y^r \\ Z^r \\ dT_c \\ T \\ N_{if}^{j\,Float} \end{Bmatrix} \tag{21}$$

As with the prior-art PPP processing, the estimation of parameter values of state vector (21) does not allow the iono-free float ambiguities $N_{if}^{j\,Float}$ to be reliably determined as iono-free phase-leveled ambiguities $N_{if}^{PL}$:

$$N_{if}^{Float} = N_{if}^{PL} + e = [\alpha N_{WL}^{Integer} + \beta N_1^{Integer}] + e \tag{22}$$

where $N_{if}^{Float}$ is an iono-free float ambiguity representing a combination of a iono-free phase-leveled ambiguity $N_{if}^{PL}$ and an error $e$ $N_{WL}^{Integer}$ is a Widelane integer ambiguity $\alpha$ is an Widelane ambiguity coefficient $N_1^{Integer}$ is an L1 integer ambiguity $\beta$ is an L1 ambiguity coefficient Appendix A
PROVISIONAL APPLICATION FOR UNITED STATES PATENT This fourth formulation assumes that error $e$ represents the difference between the code-leveled (standard) satellite clock $dt_c$ and the phase-leveled satellite clock $dt_p$:

$$e = dt_c - dt_p \tag{23}$$

so that $$N_{if}^{PL} = N_{if}^{Float} - (dt_c - dt_p) \tag{24}$$

$$N_{if}^{PL} = [\alpha N_{WL}^{Integer} + \beta N_1^{Integer}] + e - e \tag{25}$$

$$N_{if}^{PL} = [\alpha N_{WL}^{Integer} + \beta N_1^{Integer}] \tag{26}$$

To summarize, this fourth formulation obtains iono-free float ambiguities $N_{if}^{Float}$ from (19) and then shifts each of these by the difference between the standard (code-leveled) satellite clock $dt_c^j$ and the phase-leveled clock $dt_p^j$ for the respective satellite $j$ to obtain the iono-free phase-leveled ambiguities $N_{if}^{PL}$ as shown in (24).

For this purpose, the rover can be provided with (1) the standard (code-leveled) satellite clock $dt_c^j$ and the phase-leveled clock $dt_p^j$ for each satellite $j$ observed at the rover, or (2) the standard (code-leveled) satellite clock $dt_c^j$ and a clock bias $\delta t_c$ representing the difference between the standard (code-leveled) satellite clock $dt_c^j$ and the phase-leveled clock $dt_p^j$, or (3) the phase-leveled clock $dt_p^j$ and a clock bias $\delta t_p$ representing the difference between the phase-leveled clock $dt_p^j$ and the standard (code-leveled) satellite clock $dt_c^j$. These are equivalent for processing purposes as can be seen from (24).

This fourth formulation has advantages and disadvantages. A disadvantage is that it assumes the behavior of the standard (code-leveled) satellite clock $dt_c^j$ and the phase-leveled clock $dt_p^j$ for each satellite $j$ observed at the rover is substantially the same over the period of time for the ambiguity was computed. An advantage is that jumps (integer cycle slips) which might occur in the phase clock estimations can be more easily handled in processing at the rover.

Appendix A
PROVISIONAL APPLICATION FOR UNITED STATES PATENT

Part 12.6 Determining position using Melbourne-Wuebenna biases $b_{WL}^{j}$ :

After the iono-free phase-leveled ambiguities $N_{if}^{j\ PL}$ are determined for a given epoch, they can be single-differenced as $\nabla^{ab} N_{if}^{PL}$ , single-differenced integer (fixed) widelane ambiguities $\nabla^{ab} N_{WL}^{Integer}$ can be removed from them to obtain single-differenced L1 float ambiguities $\nabla^{ab} N_{1}^{Float}$ , and the single-differenced L1 float ambiguities $\nabla^{ab} N_{1}^{Float}$ can be fixed as single-differenced L1 integer ambiguities $\nabla^{ab} N_{1}^{Integer}$ .

Single-differenced widelane integer ambiguities $\nabla^{ab} N_{WL}^{Integer}$ are estimated in a widelane-ambiguity filter which runs in parallel with the geometry filter of the rover's processing engine. The rover receiver is provided with a Melbourne-Wuebenna bias $b_{MW}^{j}$ for each of the $j$ satellites in view, e.g., from an external source of data corrections - see Part 7.__ [WL BIAS PROCESSOR DESCRIPTION]. Melbourne-Wuebenna bias $b_{MW}^{j}$ can be computed as:

$$\frac{\phi_{WL}^{j} - P_{NL}^{j}}{\lambda_{WL}} = N_{WL}^{j\ Integer} + b_{MW}^{j} - b_{MW}^{R} \tag{27}$$

where

- $\phi_{WL}^{j}$ is the widelane carrier-phase combination of rover observations of satellite $j$
- $P_{NL}^{j}$ is the narrowlane code combination of rover observations of satellite $j$
- $\lambda_{WL}$ is the widelane wavelength
- $N_{WL}^{j\ Integer}$ is the widelane integer ambiguity for satellite j
- $b_{MW}^{R}$ is the Melbourne-Wuebenna bias for the rover $R$ .

The widelane ambiguity filter eliminates the rover's Melbourne-Wuebenna bias $b_{WL}^{R}$ by differencing (27) for each pairing of satellites "a" and "b" to obtain the single-differenced widelane integer ambiguities $\nabla^{ab} N_{WL}^{Integer}$ :

Appendix A
PROVISIONAL APPLICATION FOR UNITED STATES PATENT $$\nabla^{ab} N_{WL}^{\ Integer} = \nabla^{ab}\left(\frac{\overline{\phi_{WL} - P_{NL}}}{\lambda_{WL}}\right) - \nabla^{ab} b_{MW} \tag{28}$$

where $$\nabla^{ab} b_{MW} = b^{a}_{MW} - b^{b}_{MW} \tag{29}$$

Once the single-differenced widelane integer ambiguities $\nabla^{ab} N_{WL}^{\ Integer}$ are known, they are removed from the single-differenced iono-free phase-leveled ambiguities $\nabla^{ab} N_{if}^{\ PL}$ to obtain the single-differenced L1 float ambiguities $\nabla^{ab} N_{1}^{\ Float}$.

The float Kalman filter used to estimate the iono-free phase-leveled ambiguities $N_{if}^{\ PL}$ (or the iono-free float ambiguities $N_{if}^{j\ Float}$ in the third alternate formulation discussed above) also gives $C_{N_{if}}$, the covariance matrix of the iono-free phase-leveled ambiguities $N_{if}^{\ PL}$. Because the widelane ambiguities are integer (fixed) values after their values are found, $C_{N_{if}}$ is the same for $N_{if}^{\ PL}$ as for $N_{if}^{j\ Float}$.

From (7) it is known that:

$$\nabla N_{if}^{ab\,PL} = \alpha \nabla N_{WL}^{ab\,Integer} + \beta \nabla N_{1}^{ab\,Float} \tag{30}$$

where

- $\nabla N_{if}^{ab\,PL}$ is the single-difference phase-leveled iono-free ambiguity (differenced between satellites "a" and "b")
- $\nabla N_{WL}^{ab\,Integer}$ is the single-difference widelane integer ambiguity (differenced between satellites "a" and "b')
- $\nabla N_{1}^{ab\,Float}$ is the single-difference L1 float ambiguity (differenced between satellites "a" and "b")

Therefore

Appendix A
PROVISIONAL APPLICATION FOR UNITED STATES PATENT $$\nabla N_1^{ab\,Float} = \frac{\nabla N_{if}^{ab\,PL} - \alpha \nabla N_{WL}^{ab\,Integer}}{\beta} \tag{31}$$

Because $\nabla N_{WL}^{ab\,Integer}$ are fixed (integer) values, it is assumed that the respective covariance matrices of the L1 float ambiguities $N_1^{ab\,Float}$ and the iono-free phase-leveled ambiguities $N_{if}^{j\,PL}$ are related by:

$$C_{N_1^{Float}} = C_{Nif^{PL}} \cdot F^2 \tag{32}$$

where $C_{N_1^{Float}}$ is the covariance matrix of the L1 float ambiguities $N_1^{j\,Float}$ $C_{Nif^{PL}}$ is the covariance matrix of the iono-free phase-leveled ambiguities $N_{if}^{j\,PL}$ $F$ is a factor to convert the units of the variances from iono-free cycles to L1 cycles.

The desired "fixed" (integer-nature) single-differenced L1 float ambiguities $\nabla N_1^{ab\,Integer}$ can be determined from the single-differenced L1 float ambiguities $\nabla N_1^{ab\,Float}$ and the covariance matrix $C_{N_1^{Float}}$ of the L1 float ambiguities $N_1^{ab\,Float}$ using well-known techniques, such as Lambda (Jonge et al. 1994), modified Lambda (Chan et al. 2005), weighted averaging of candidate sets, or others.

Having determined the single-differenced integer widelane ambiguities $\nabla N_{WL}^{ab\,Integer}$ and the single-differenced integer L1 ambiguities, integer-nature iono-free ambiguities $\nabla N_{if}^{ab\,Integer}$ are determined from:

$$\nabla N_{if}^{ab\,Integer} = \alpha \nabla N_{WL}^{ab\,Integer} + \beta \nabla N_1^{ab\,Integer} \tag{33}$$

Appendix A
PROVISIONAL APPLICATION FOR UNITED STATES PATENT

The integer-nature iono-free ambiguities $\nabla N_{if}^{ab,Integer}$ are introduced ("pushed") as a pseudo-observation into the Kalman float filter (or optionally a copy of it) to determine a rover position based on integer-nature ambiguities. The state vector of the float filter copy is thus:

$$\begin{Bmatrix} X^r \\ Y^r \\ Z^r \\ dT_c \\ T \end{Bmatrix} \tag{34}$$

The rover position can then be determined with an accuracy (and precision) substantially better than for the typical prior-art PPP processing in which the ambiguities are considered to be float numbers, as shown in FIG. [47]

Part 12.7 Ambiguity Fixing References

Jonge de, P.J., and C.C.J.M. Tiberius (1994). A new GPS ambiguity estimation method based on integer least squares. *Proceedings of the 3rd International Symposium on Differential Satellite Navigation Systems DSNS'94,* London, UK, April 18-22, Paper No. 73, 9 pp.

X. -W. Chang, X. Yang and T. Zhou (2005). MLAMBDA: a modified LAMBDA method for integer least-squares estimation. Journal of Geodesy, Springer Berlin / Heidelberg. Volume 79, Number 9 / December, 2005, pp.552-565.

Appendix A
PROVISIONAL APPLICATION FOR UNITED STATES PATENT

Part 13: Summary of Some of the Inventive Concepts

Section 13A: MW (Melbourne-Wübbena) Bias Processing (A-2565)

[BR Note: Abstract (FIG. 8A)]

1. [MW Processing] A method of processing a set of GNSS signal data derived from code observations and carrier-phase observations at multiple receivers of GNSS signals of multiple satellites over multiple epochs, the GNSS signals having at least two carrier frequencies, comprising:
   a. forming an MW (Melbourne-Wübbena) combination per receiver-satellite pairing at each epoch to obtain a MW data set per epoch,
   b. estimating from the MW data set per epoch an MW bias per satellite which may vary from epoch to epoch, and a set of WL (widelane) ambiguities, each WL ambiguity corresponding to one of a receiver-satellite link and a satellite-receiver-satellite link, wherein the MW bias per satellite is modeled as one of (i) a single estimation parameter and (ii) an estimated offset plus harmonic variations with estimated amplitudes.
2. The method of 1, further comprising applying corrections to the GNSS signal data.
3. The method of one of 1-2, further comprising smoothing at least one linear combination of GNSS signal data before estimating a MW bias per satellite.
4. The method of one of 1-3, further comprising applying at least one MW bias constraint.
5. The method of one of 1-4, further comprising applying at least one integer WL ambiguity constraint
6. The method of one of 1-4, further comprising using a spanning tree (ST) over one of an observation graph and a filter graph for constraining the WL ambiguities.
7. The method of one of 1-4, further comprising using a minimum spanning tree (MST) on one of an observation graph and a filter graph for constraining the WL ambiguities.
8. The method of 7, wherein the minimum spanning tree is based on edge weights, each edge weight derived from receiver-satellite geometry.

Appendix A
PROVISIONAL APPLICATION FOR UNITED STATES PATENT

9. The method of 8, wherein the edge weight is defined with respect to one of (i) a geometric distance from receiver to satellite, (ii) a satellite elevation angle, and (iii) a geometric distance from satellite to receiver to satellite, and (iv) a combination of the elevations under which the two satellites in a single differenced combination are seen at a station.

10. The method of 7, wherein the minimum spanning tree is based on edge weights, with each edge weight based on WL ambiguity information, defined with respect to one of (i) difference of a WL ambiguity to integer, (ii) WL ambiguity variance, and (iii) a combination of (i) and (ii).

11. The method of one of 1-10, further comprising fixing at least one of the WL ambiguities as an integer value.

12. The method of one of 1-10, further comprising determining candidate sets of WL integer ambiguity values, forming a weighted combination of the candidate sets, and fixing at least one of the WL ambiguities as a value taken from the weighted combination.

13. The method of one of 11-12, wherein the estimating step comprises introducing fixed WL ambiguities so as to estimate MW biases which are compatible with fixed WL ambiguities.

14. The method of 13 wherein the estimating step comprises applying an iterative filter to the MW data per epoch and wherein introducing fixed WL ambiguities comprises one of (i) putting the fixed WL ambiguities as observations into the filter, (ii) putting the fixed WL ambiguities as observations into a copy of the filter generated after each of a plurality of observation updates, and (iii) reducing the MW combinations by the fixed WL ambiguities and putting the resulting reduced MW combinations into a second filter without ambiguity states to estimate at least one MW bias per satellite.

15. The method of one of 1-14, further comprising shifting at least one MW bias by an integer number of WL cycles.

16. The method of one of 1-14, further comprising shifting at least one MW bias and its respective WL ambiguity by an integer number of WL cycles.

17. The method of one of 1-16 wherein the navigation message comprises orbit information, 18. Apparatus for perform the method of one of 1 – 17.

Appendix A
PROVISIONAL APPLICATION FOR UNITED STATES PATENT

19. A computer program comprising instructions configured, when executed on a computer processing unit, to carry out a method according to one of 1 - 17.

20. A computer-readable medium comprising a computer program according to 19.

Appendix A

PROVISIONAL APPLICATION FOR UNITED STATES PATENT

Section 13B: Orbit Processing (A-2647)

[BR Note: Abstract (FIG. 26B)]

1. A method of processing a set of GNSS signal data derived from signals of GNSS satellites observed at reference station receivers, the data representing code observations and carrier observations on each of at least two carriers over multiple epochs, comprising:
   a. obtaining an orbit start vector (2635) comprising: a time sequence of predicted positions and predicted velocities for each satellite over a first interval [of multiple epochs], and the partial derivatives of the predicted positions and predicted velocities with respect to initial positions, initial velocities, [other] force model parameters and Earth orientation parameters,
   b. obtaining ionospheric-free linear combinations (2645) of the code observations and the carrier observations for each satellite at multiple reference stations, and
   c. iteratively correcting the orbit start vector (2635) using a time sequence of the ionospheric-free linear combinations (2645) and predicted Earth orientation parameters (2610) to obtain an updated orbit start vector values (2680) comprising a time sequence of predicted positions and predicted velocities for each satellite over a subsequent interval of epochs and an estimate of Earth orientation parameters.
2. [Startup] The method of 1, wherein obtaining an orbit start vector (2635) comprises:
   i. obtaining an approximate orbit vector (2615) for the satellites,
   ii. obtaining predicted Earth orbit parameters (2610),
   iii. iteratively integrating the approximate orbit vector with the predicted Earth orbit parameters to obtain an orbit prediction (2620) for an initial time interval and, with each iteration, adapting the orbit prediction (2620) to the approximate orbit vector, and
   iv. preparing from the orbit prediction (2620) an initial set of values for the orbit start vector and partial derivatives (2635).
3. The method of 2, wherein the approximate orbit vector (2615) is obtained from one of: a broadcast satellite navigation message, IGS Ultra-rapid Orbits data, and another source of predicted orbits.

Appendix A
PROVISIONAL APPLICATION FOR UNITED STATES PATENT

4. The method of one of 2 - 3, wherein adapting the orbit prediction (2620) to the approximate orbit vector (2615) is performed using a least squares approach.
5. The method of one of 2 – 4, wherein integrating the approximate orbit vector (2615) with the predicted Earth orientation parameters (2610) to obtain an orbit prediction (2620) is iterated until the orbit prediction remains substantially constant.
6. The method of 1, wherein obtaining an orbit start vector (2635) comprises preparing the orbit start vector (2635) from a set of the updated orbit start vector values (2680) which is not older than a predetermined time interval.
7. The method of 6, wherein the predetermined time interval is not more than a few hours.
8. [Operation] The method of one of 6 - 7, wherein preparing the orbit start vector (2635) comprises: mapping a new orbit start vector (2690) from the updated orbit start vector (2680) and integrating the new orbit start vector (2690) to obtain new values for the orbit start vector (2635).
9. The method of 8, wherein integrating the new orbit start vector (2690) comprises integrating the new orbit start vector using Earth orientation parameters from the updated start vector values 2680.
10. [Kalman] The method of one of 1 - 9, wherein correcting comprises applying an iterative filter comprising one of: a Kalman filter, a UD factorized filter, and a Square Root Information Filter.
11. [Satellite parameters] The method of one of 1 - 10, wherein the updated orbit state vector (2680) further comprises estimating additional parameters for each satellite, and wherein correcting the orbit start vector comprises correcting the additional parameters for each satellite.
12. [Output] The method of one of 1 – 11, further comprising: mapping values from the updated orbit start vector 2680 to a current epoch to obtain a current-epoch orbit position and velocity for each satellite.
13. [Fixing] The method of one of 1 - 6, wherein the state vector further comprises an ionospheric-free ambiguity (2575) per receiver-satellite pair, and correcting the orbit start vector (2635) comprises estimating float values for the ionospheric-free ambiguities, and wherein the method further comprises:
    1. obtaining a value for a widelane ambiguity (340) per receiver-satellite pair, the widelane ambiguity values having integer nature, Appendix A
PROVISIONAL APPLICATION FOR UNITED STATES PATENT 2. determining integer-nature values for ambiguities linearly related to the widelane ambiguities and the ionospheric-free ambiguities from the values of the widelane ambiguities and the float values of the ionospheric-free ambiguities,
3. fixing the values of the ionospheric-free ambiguities using the integer-nature values,
4. with the values of the ionospheric-free ambiguities fixed, iteratively correcting the orbit start vector (2635) using a time sequence of the ionospheric-free linear combinations (2645) and a set of Earth orbit parameters to obtain an updated orbit start vector (2680) comprising a time sequence of predicted positions and predicted velocities for each satellite over an interval of multiple epochs and an estimate of Earth orientation parameters.

14. The method of 13, wherein the ambiguities linearly related to the widelane ambiguities and the ionospheric-free ambiguities comprise one of: narrowlane ambiguities, L1 ambiguities and L2 ambiguities.
15. [Epoch] The method of one of 1 - 14, wherein the epochs occur at a rate of about 1 Hz.
16. [Filter Update] The method of one of 1 – 15, wherein iteratively correcting the orbit start vector comprises estimating for each epoch the values of a satellite clock for each satellite and a satellite position for each satellite at each epoch.
17. [Filter Update] The method of one of 1 – 15, wherein iteratively correcting the orbit start vector comprises estimating for each epoch the values of a satellite clock for each satellite, a satellite clock drift, a satellite clock drift rate, and a satellite position for each satellite at each epoch.
18. [Orbit Estimate] The method of one of 1 - 17, wherein the predicted time sequence of approximate positions for each satellite for at least some of the epochs covers an interval of at least 150 seconds.
19. [Worldwide network] The method of one of 1 - 18, wherein the reference stations are widely distributed about the Earth and the GNSS signal data from each reference station represents code observations and carrier observations of a subset of the GNSS satellites at each epoch.
20. Apparatus adapted to perform the method of one of 1 – 19.

Appendix A
PROVISIONAL APPLICATION FOR UNITED STATES PATENT

21. A computer program comprising instructions configured, when executed on a computer processing unit, to carry out a method according to one of 1 - 19.
22. A computer-readable medium comprising a computer program according to 21.

Appendix A
PROVISIONAL APPLICATION FOR UNITED STATES PATENT

Section 13C: Phase Clock Processing (A-2585)

[BR Note: Abstract (FIG. 27)]

1. [Estimating Phase Clocks] Network Processing – Phase Clocks] A method of processing a set of GNSS signal data derived from code observations and carrier-phase observations at multiple receivers of GNSS signals of multiple satellites over multiple epochs, the GNSS signals having at least two carrier frequencies and a navigation message containing orbit information, comprising:
   a. obtaining precise orbit information for each satellite,
   b. determining at least one set of ambiguities per receiver, each ambiguity corresponding to one of a receiver-satellite link and a satellite-receiver-satellite link, and
   c. using at least the precise orbit information, the ambiguities and the GNSS signal data to estimate a phase-leveled clock per satellite.
2. The method of 1, wherein determining ambiguities is performed at a first rate and wherein estimating a phase-leveled clock per satellite is performed at a second rate higher than the first rate.
3. The method of one of 1-2, wherein estimating the phase-leveled clock per satellite comprises:
   i. using at least the precise orbit information, the ambiguities and the GNSS singal data to estimate a set of phase-leveled clocks per receiver, each phase-leveled clock corresponding to one of a receiver-satellite link and a satellite-receiver-satellite link, and
   ii. using a plurality of the phase-leveled clocks to estimate one phase-leveled clock per satellite.
4. The method of one of 1 – 3, wherein determining the ambiguities comprises using at least one phase-leveled clock per satellite previously estimated to estimate the ambiguities.
5. The method of one of 4, further comprising obtaining at least one additional phase-leveled clock per satellite estimated from an external source, and wherein determining the ambiguities comprises using said at least one additional phase-leveled clock per satellite to estimate the ambiguities.
6. The method of one of 1-5, further comprising Appendix A
PROVISIONAL APPLICATION FOR UNITED STATES PATENT 1. determining at least one set of ambiguities per receiver for additional receivers, each ambiguity corresponding to one of a receiver-satellite link and a satellite-receiver-satellite link,
2. after determining the ambiguities for the additional receivers, using at least the precise orbit information, the ambiguities for the additional receivers and the GNSS signal data to estimate the at least one additional phase-leveled clock per satellite 7. The method of one of 1 – 6, wherein the at least two carrier frequencies comprise at least two of the GPS L1, GPS L2 and GPS L5 frequencies.
8. The method of one of 1 – 7, wherein determining at least one set of ambiguities per receiver comprises at least one of: estimating float ambiguity values, estimating float ambiguity values and fixing the float ambiguity values to integer values, estimating float ambiguity values and forming at least one weighted average of integer value candidates, and constraining the ambiguity values in a sequential filter.
9. The method of one of 1 – 8, wherein the ambiguities are undifferenced between satellites.
10. The method of one of 1 – 8, wherein the ambiguities are single-differenced between satellites.
11. Apparatus adapted to perform the method of one of 1-10.
12. A computer program comprising instructions configured, when executed on a computer processing unit, to carry out a method according to one of 1 – 10.
13. A computer-readable medium comprising a computer program according to 12.

Appendix A
PROVISIONAL APPLICATION FOR UNITED STATES PATENT

Section 13D: Rover Processing with Synthesized Reference Station Data (A-2617)

[BR Note: Abstract (FIG. 38)

1. [SBS Processing] A method of determining position of a rover antenna, comprising:
    a. obtaining rover GNSS data derived from code observations and carrier phase observations of GNSS signals of multiple satellites over multiple epochs,
    b. obtaining precise satellite data for the satellites,
    c. determining a virtual base station location,
    d. generating epochs of synthesized base station data using at least the precise satellite data and the virtual base station location,
    e. applying a differential process to at least the rover GNSS data and the synthesized base station data to determine at least rover antenna positions.
2. [Low Latency] The method of 1, wherein generating epochs of synthesized base station data comprises generating an epoch of virtual base station data for each epoch of GNSS rover data.
3. [High Accuracy] The method of 1, wherein obtaining precise satellite data comprises obtaining precise satellite data in sets, wherein generating epochs of synthesized base station data comprises generating an epoch of synthesized base station data for each set of precise satellite data, and wherein applying a differential process comprises matching each set of GNSS rover data with an epoch of synthesized base station data.
4. [Virtual Base Station Location] The method of one of 1 – 3, wherein determining a virtual base station location comprises determining the virtual base station location from at least one of: an autonomously determined position of the rover antenna, a previously determined one of said rover antenna positions, a synthesized base station data generating module, an inertial navigation system, a mobile telephone tower location, and information provided by a user.
5. The method of one of 1 – 4, further comprising updating the virtual base station location on the occurrence of at least one of: never, for each epoch of rover data, when the distance between an approximate rover antenna position and the virtual base station location exceeds a predetermined threshold, and for each update of the rover antenna positions.

Appendix A
PROVISIONAL APPLICATION FOR UNITED STATES PATENT

6. The method of one of 1 – 5, wherein each epoch of the synthesized base station data is generated for a corresponding virtual base station location.
7. The method of one of 1 – 5, wherein determining the virtual base station location comprises selecting a virtual base station location close to a current approximate rover antenna position.
8. The method of one of 1 – 7, wherein a new virtual base position is determined when one or more of the following criteria is met: each rover epoch, each nth rover epoch, after a time interval, after exceeding a distance between a current approximate rover position and a current virtual base station location.
9. The method of one of 1 – 8, wherein the virtual base station location is generated for a specific GNSS time interval
10. The method of one of 1 – 9, wherein applying a differential process to at least the rover GNSS data and the synthesized base station data to determine at least rover antenna positions comprises at least one of:: aided ins (integrated ins, gnss processing); normal rtk; irtk; dgps; float; triple differenced; post processed or realtime.
11. The method of one of 1 – 10, further comprising matching each epoch of the rover GNSS data with an epoch of synthesized base station data within a few milliseconds.
12. The method of one of 1 – 11, wherein generating epochs of synthesized base station data comprises a set of synthesized base station observations for each of a plurality of discrete times, and wherein applying a differential process comprises processing each epoch of GNSS rover data with a set of synthesized base station observations for a discrete time which is within ten seconds of the epoch of the GNSS rover data being processed.
13. Apparatus adapted to perform the method of one of 1-12.
14. A computer program comprising instructions configured, when executed on a computer processing unit, to carry out a method according to one of 1 – 12.
15. A computer-readable medium comprising a computer program according to 14.

Appendix A
PROVISIONAL APPLICATION FOR UNITED STATES PATENT

Section 13E: Rover Processing with Ambiguity Fixing (A-2599)

[BR Note: Abstract (FIG. 49)]
[Draft claims to be revised]

TNL A-2599 Ambiguity Fixing

1. A method of processing a set of GNSS signal data derived from signals of a set of satellites having carriers observed at a rover antenna, wherein the data includes a carrier observation and a code observation of each carrier of each satellite, comprising:
   a. obtaining for each satellite clock corrections comprising at least two of: (i) a code-leveled satellite clock, (ii) a phase-leveled satellite clock, and (iii) a satellite clock bias representing a difference between a code-leveled satellite clock and a phase-leveled satellite clock,
   b. running a first filter which uses at least the GNSS signal data and the satellite clock corrections to estimate values for parameters comprising at least one carrier ambiguity for each satellite, and a covariance matrix of the carrier ambiguities,
   c. determining from each carrier ambiguity an integer-nature carrier ambiguity comprising one of: an integer value, and a combination of integer candidates,
   d. inserting the integer-nature carrier ambiguities as pseudo-observations into a second filter, and applying the second filter to the GNSS signal data and the satellite clock corrections to obtain estimated values for parameters comprising at least the position of the receiver.
2. The method of 1, wherein the integer-nature carrier ambiguities are between-satellite single-differenced ambiguities.
3. The method of one of 1 – 2, further comprising
   a. obtaining a set of MW corrections,
   b. running a third filter using the GNSS signal data and at least the MW corrections to obtain at least a set of WL ambiguities,
   c. using the set of WL ambiguities to obtain the integer-nature carrier ambiguity.
4. The method of 3, wherein the WL ambiguities comprise at least one of: float values, integer values, and float values based on integer candidates.

Appendix A
PROVISIONAL APPLICATION FOR UNITED STATES PATENT

5. The method of 4, wherein the covariance matrix of the ambiguities is scaled to reflect the change due to the use of the WL ambiguities.

6. The method of one of 1 – 5, wherein the WL ambiguties are between-satellite single-differenced ambiguities.

7. The method of one of 1 – 6, wherein the integer-nature ambiguities comprise at least one of: L1-L2 ionospheric-free ambiguities, L2-L5 ionospheric-free ambiguities, and carrier ambiguities of a linear combination of two or more GNSS frequencies.

8. The method of one of 1 – 6, wherein ionospheric delay information isused to fee one or more of the filters and wherein the integer-nature ambiguity comprises at least one of: carrier ambiguity of L1 frequency, carrier ambiguity of L2 frequency, carrier ambiguity of L5 frequency, and carrier ambiguity of any GNSS frequency.

9. The method of one of 1 – 8, wherein the second filter comprises: a new filter, a copy of the first filter, and the first filter.

10. The method of one of 1 – 9, where the code-leveled satellite clock is used for modeling all GNSS observations, and the float ambiguity is adapted to the level of the phase-leveled clock by applying the difference between the code-leveled satellite clock and the phase-leveled satellite clock.

11. The method of one of 1 – 9, wherein the code-leveled clock is used for modeling all GNSS code observations and the phase-leveled clock is used for modeling all GNSS carrier observations.

12. The method of one of 1 – 11, wherein determining the integer-nature carrier ambiguity from a float ambiguity comprise at least one of: rounding the float ambiguity to the nearest integer, choosing best integer candidates from a set of integer candidates generated using integer least squares, and computing float values using a set of integer candidates generated using integer least squares.

13. The method of one of 1 -12, wherein at least one of the first filter and third filter further estimates at least one of: receiver phase-leveled clock, receiver code-leveled clock, tropospheric delay, receiver clock bias representing a difference between the code-leveled receiver clock and the phase-leveled receiver clock, and multipath states.

14. The method of one of 1 -13, wherein at least one of the first filter, the second filter and the third filter is adapted ot update the estimated values for each of a plurality of epochs of GNSS signal data.

Appendix A

PROVISIONAL APPLICATION FOR UNITED STATES PATENT

15. Apparatus adapted to perform the method of one of 1-14.

16. A computer program comprising instructions configured, when executed on a computer processing unit, to carry out a method according to one of 1 – 14.

17. A computer-readable medium comprising a computer program according to 16.

Any plurality of the above described aspects of the invention may be combined to form further aspects and embodiments, with the aim of providing additional benefits notably in terms of surveying efficiency and/or system usability.

Above-described methods, apparatuses and their embodiments may be integrated into a rover, a reference receiver or a network station, and/or the processing methods described can be carried out in a processor which is separate from and even remote from the receiver/s used to collect the observations (e.g., observation data collected by one or more receivers can be retrieved from storage for post-processing, or observations from multiple network reference stations can be transferred to a network processor for near-real-time processing to generate a correction data stream and/or virtual-reference-station messages which can be transmitted to one or more rovers). Therefore, the invention also relates to a rover, a reference receiver or a network station including any one of the above apparatuses.

In some embodiments, the receiver of the apparatus of any one of the above-described embodiments is separate from the filter and the processing element. Post-processing and network processing of the observations may notably be performed. That is, the constituent elements of the apparatus for processing of observations does not itself require a receiver. The receiver may be separate from and even owned/operated by a different person or entity than the entity which is performing the processing. For post-processing, the observations may be retrieved from a set of data which was previously collected and stored, and processed with reference-station data which was previously collected and stored; the processing is conducted for example in an office computer long after the data collection and is thus not real-time. For network processing, multiple reference-station receivers collect observations of the signals from multiple satellites, and this data is supplied to a network processor which may for example generate a correction data stream or which may for example generate a "virtual reference station" correction which is supplied to a rover so that the rover can perform differential processing. The data provided to the rover may be ambiguities determined in the network processor, which the rover may use to speed its position solution, or may be in the form of corrections which the rover applies to improve its position solution. The network is typically operated as a service to rover operators, while the network operator is typically a different entity than the rover operator.

Any of the above-described methods and their embodiments may be implemented by means of a computer program. The computer program may be loaded on an apparatus, a rover, a reference receiver or a network station as described above. Therefore, the invention also relates to a computer program, which, when carried out on an apparatus, a rover, a reference receiver or a network station as described above, carries out any one of the above above-described methods and their embodiments.

The invention also relates to a computer-readable medium or a computer-program product including the above-mentioned computer program. The computer-readable medium or computer-program product may for instance be a magnetic tape, an optical memory disk, a magnetic disk, a magneto-optical disk, a CD ROM, a DVD, a CD, a flash memory unit or the like, wherein the computer program is permanently or temporarily stored. The invention also relates to a computer-readable medium (or to a computer-program product) having computer-executable instructions for carrying out any one of the methods of the invention.

The invention also relates to a firmware update adapted to be installed on receivers already in the field, i.e. a computer program which is delivered to the field as a computer program product. This applies to each of the above-described methods and apparatuses.

GNSS receivers may include an antenna, configured to received the signals at the frequencies broadcasted by the satellites, processor units, one or more accurate clocks (such as crystal oscillators), one or more computer processing units (CPU), one or more memory units (RAM, ROM, flash memory, or the like), and a display for displaying position information to a user.

Where the terms "*receiver*", "*filter*" and "*processing element*" are used herein as units of an apparatus, no restriction is made regarding how distributed the constituent parts of a unit may be. That is, the constituent parts of a unit may be distributed in different software or hardware components or devices for bringing about the intended function. Furthermore, the units may be gathered together for performing their functions by means of a combined, single unit. For instance, the receiver, the filter and the processing element may be combined to form a single unit, to perform the combined functionalities of the units.

The above-mentioned units may be implemented using hardware, software, a combination of hardware and software, pre-programmed ASICs (application-specific integrated circuit), etc. A unit may include a computer processing unit (CPU), a storage unit, input/output (I/O) units, network connection units, etc.

Although the present invention has been described on the basis of detailed examples, the detailed examples only serve to provide the skilled person with a better understanding, and are not intended to limit the scope of the invention. The scope of the invention is much rather defined by the appended claims.

Appendix A

Appendix A

Appendix A

Appendix A

Appendix A

Forming Linear Combinations

Appendix A

Appendix A

Appendix A

Figure 8:
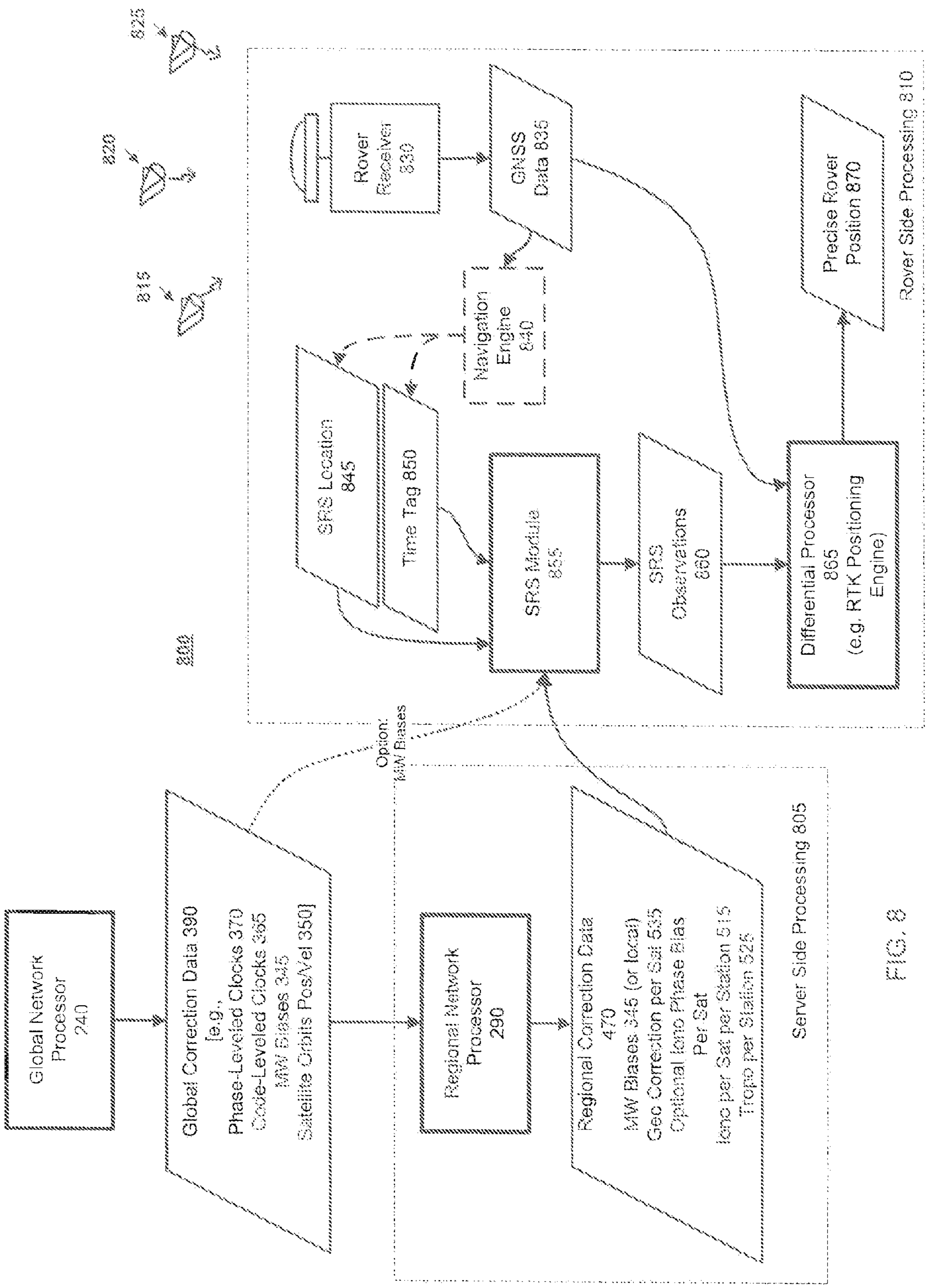
FIG. 8, FIG. 9 and FIG. 10 are deleted.
Figure 9:
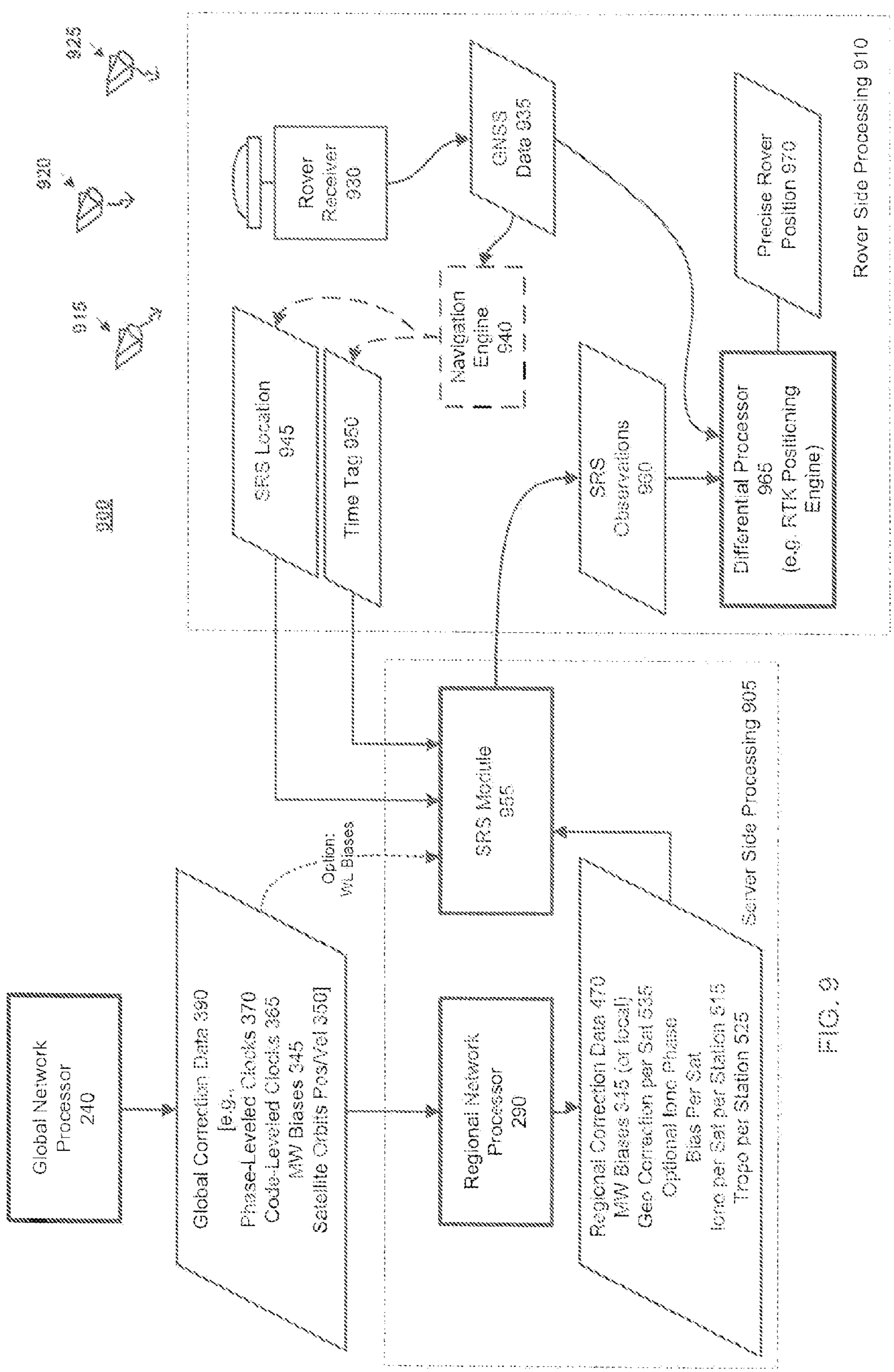
Figure 10:
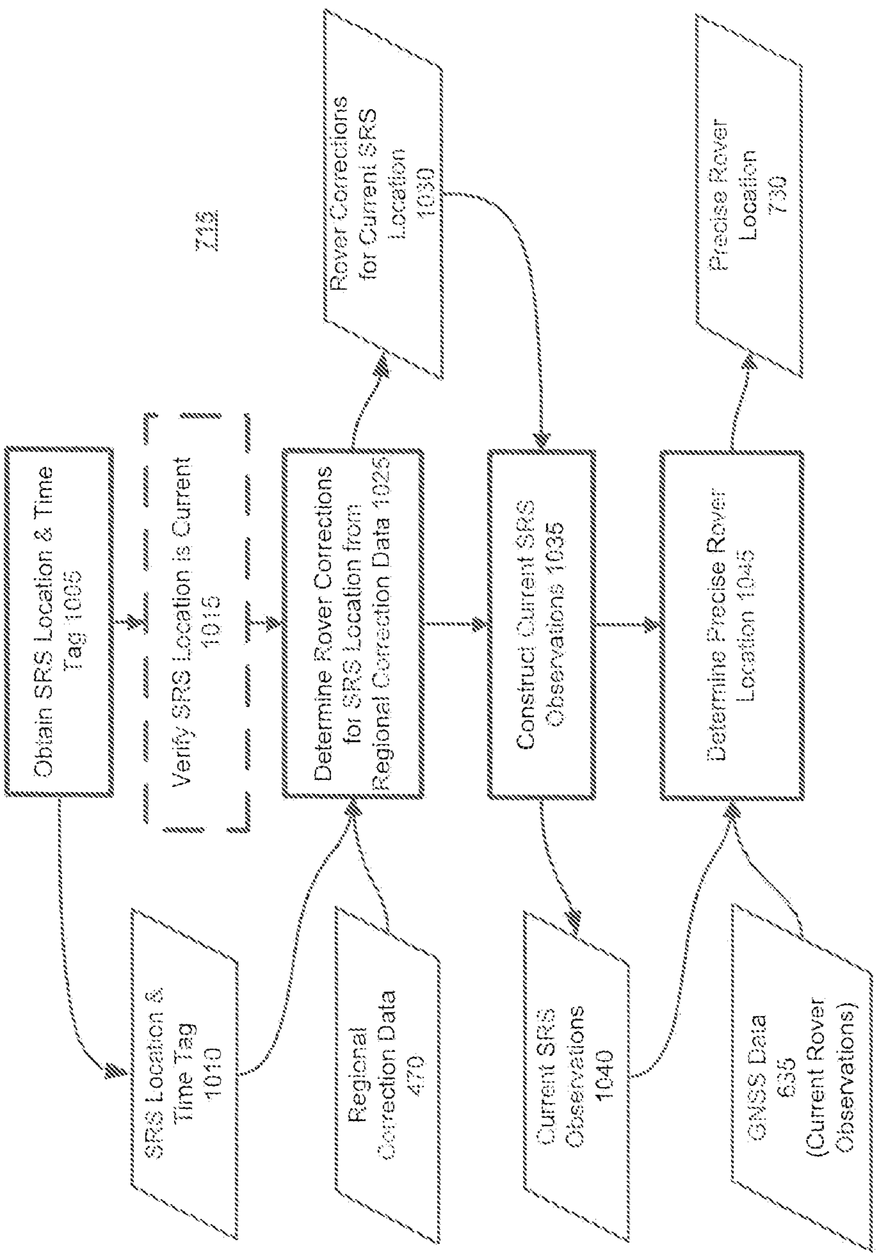

FIG. 8 Deleted
FIG. 9 Deleted
FIG. 10 Deleted

Appendix A

Appendix A

Appendix A

Appendix A

Appendix A

Appendix A

Appendix A

Appendix A

Appendix A

1900

1910

1920

1930

Appendix A

Appendix A

Appendix A

Appendix A

Appendix A

Appendix A

Appendix A

Appendix A

Appendix A

Appendix A

Appendix A

Appendix A

Appendix A

Appendix A

Appendix A

Appendix A

Appendix A

Appendix A

Appendix A

Appendix A

Appendix A

Appendix A

Appendix A

Appendix A

Appendix A

Appendix A

Appendix A

Appendix A

FIG. 35

Appendix A

Appendix A

Appendix A

Appendix A

Clock Prediction Curve

Appendix A

FIG. 41

RTK Engine

Appendix A

Appendix A

Appendix A

Appendix A

Appendix A

Appendix A

PPP Ambiguity Fixing

Appendix A

Appendix A

Appendix A

Appendix A

Appendix A

Appendix A

Appendix A

Appendix A

Appendix A

Appendix A

Appendix A

Appendix A

Appendix A

Appendix A

461 462

Appendix A

The invention claimed is:

1. A method of determining a precise position of a rover located within a region, comprising:

operating a receiver to obtain rover observations comprising code observations and carrier-phase observations of global navigation satellite system (GNSS) signals on at least two carrier frequencies;

receiving correction data comprising:

1. at least one code bias per satellite,
2. at least one of: (i) a fixed-nature Melbourne-Wübbena (MW) bias per satellite and (ii) values from which a fixed-nature MW bias per satellite is derivable, and
3. at least one of: (i) an ionospheric delay per satellite for each of multiple regional network stations, and (ii) non-ionospheric corrections;

estimating a rough position of the receiver without using corrections;

creating rover corrections from the correction data, the rover corrections determined using the rough position of the receiver;

operating a processor to determine a precise rover position using the rover observations and the rover corrections, and displaying the precise rover position on a display associated with the rover.

2. The method of claim 1, wherein the code bias per satellite comprises a code bias per satellite estimated by a global network processor.

3. The method of claim 1, wherein the ionospheric delay per satellite comprises an ionospheric delay estimated from observations of multiple regional network stations.

4. The method of claim 1, wherein the ionospheric delay per satellite is estimated from a model of ionospheric delay over the region.

5. The method of claim 1, wherein the correction data further comprises an ionospheric phase bias per satellite.

6. The method of claim 1, wherein the non-ionospheric corrections comprise a tropospheric delay for each of multiple regional network stations.

7. The method of claim 1, wherein the non-ionospheric corrections comprise a geometric correction per satellite.

8. The method of claim 1, wherein the non-ionospheric corrections comprise, for each satellite in view at the receiver, a geometric correction representing satellite position error and satellite clock error.

9. The method of claim 8, wherein creating rover corrections from the correction data comprises identifying each geometric correction with a respective satellite observed at the rover.

10. The method of claim 8, wherein using the rover observations and the rover corrections to determine a precise rover position comprises:

determining a geometric range per satellite using at least one of (i) broadcast ephemeris and (ii) precise ephemeris and, for each satellite, applying the geometric correction to the geometric range to obtain a corrected geometric range per satellite.

11. The method of claim 1, wherein the non-ionospheric corrections comprise, for each satellite in view at the rover, a geometric correction for each of three locations in the regions, and wherein creating rover corrections from the correction data comprises, for each satellite in view at the rover, determining a geometric correction for an approximate rover location from the geometric corrections for the three locations.

12. The method of claim 1, wherein the correction data comprises an ionospheric delay per satellite at multiple regional network stations, and wherein creating the rover corrections from the correction data comprises interpolating an ionospheric delay for the rough position.

13. The method of claim 1, wherein the correction data comprises an ionospheric delay per satellite at multiple regional network stations and an ionospheric phase bias per satellite, and wherein creating the rover corrections from the correction data comprises, for each satellite, interpolating an absolute ionospheric delay for the rough position and combining with the ionospheric phase bias.

14. The method of claim 1, wherein the correction data comprises a tropospheric delay per satellite at multiple regional network stations, and wherein creating the rover corrections from the correction data comprises interpolating a tropospheric delay for the rough position.

15. The method of claim 1, wherein using the rover observations and the rover corrections to determine a precise rover position comprises:

combining the rover corrections with the rover observations to obtain corrected rover observations, and determining the precise rover position from the corrected rover observations.

16. The method of claim 1, wherein using the rover observations and the rover corrections to determine a precise rover position comprises: using the rover corrections to estimate simulated reference station observables for each of multiple satellites in view at a selected location; and differentially processing the rover observations with the simulated reference station observables to obtain the precise rover position.

17. The method of claim 16, wherein using the rover corrections to estimate simulated reference station observables for each of multiple satellites in view at the selected location comprises using the rover corrections to estimate at least one simulated reference station carrier-phase observation for each of multiple satellites observable at the selected location.

18. The method of claim 16, wherein using the rover corrections to estimate simulated reference station observables for each of multiple satellites in view at the selected location comprises using the rover corrections to estimate at least one simulated reference station code observation for each of multiple satellites observable at the selected location.

19. The method of claim 16, wherein the selected location is one of (i) the rough position of the rover and (ii) a location within 100 m of the rough position of the rover.

20. The method of claim 16, wherein using the rover corrections to estimate simulated reference station observables for each of multiple satellites in view at the selected location is performed in a processor at a location remote from the rover.

21. The method of claim 16, wherein using the rover corrections to estimate simulated reference station observables for each of multiple satellites in view at the selected location is performed in a processor at the rover.

22. A computer program product comprising: a non-transitory computer usable medium having computer readable instructions physically embodied therein, the computer readable instructions when executed by a processor enabling the processor to perform the method of claim 1.

23. Apparatus for determining a precise position of a rover located within a region, comprising:

a receiver operative to obtain rover observations comprising code observations and carrier-phase observations of global navigation satellite system (GNSS) signals on at least two carrier frequencies;

a correction data receiver operative to receive correction data comprising:

1. at least one code bias per satellite,
2. at least one of: (i) a fixed-nature Melbourne-Wübbena (MW) bias per satellite and (ii) values from which a fixed-nature MW bias per satellite is derivable, and
3. at least one of: (i) an ionospheric delay per satellite for each of multiple regional network stations, (ii) non-ionospheric corrections;

a navigation engine operative to estimate a rough position of the receiver;

at least one processor operative to create rover corrections from the correction data and the rough position of the receiver, and operative to determine a precise rover position using the rover observations and the rover corrections; and a display operative to display the precise rover position.

24. The apparatus of claim 23, wherein the code bias per satellite comprises a code bias per satellite estimated by a global network processor.

25. The apparatus of claim 23, wherein the ionospheric delay per satellite comprises an ionospheric delay estimated from observations of multiple regional network stations.

26. The apparatus of claim 23, wherein the ionospheric delay per satellite is estimated from a model of ionospheric delay over the region.

27. The apparatus of claim 23, wherein the correction data further comprises an ionospheric phase bias per satellite.

28. The apparatus of claim 23, wherein the non-ionospheric corrections comprise a tropospheric delay for each of multiple regional network stations.

29. The apparatus of claim 23, wherein the non-ionospheric corrections comprise a geometric correction per satellite.

30. The apparatus of claim 23, wherein the non-ionospheric corrections comprise, for each satellite in view at the receiver, a geometric correction representing satellite position error and satellite clock error.

31. The apparatus of claim 30, wherein said at least one processor is operative to identify each geometric correction with a respective satellite observed at the rover.

32. The apparatus of claim 30, wherein said at least one processor is operative to determine a geometric range per satellite using at least one of (i) broadcast ephemeris and (ii) precise ephemeris and, for each satellite, and to apply the geometric correction to the geometric range to obtain a corrected geometric range per satellite.

33. The apparatus of claim 23, wherein the non-ionospheric corrections comprise, for each satellite in view at the rover, a geometric correction for each of three locations in the regions, and wherein the at least one processor is operative to determine, for each satellite in view at the rover, a geometric correction for an approximate rover location from the geometric corrections for the three locations.

34. The apparatus of claim 23, wherein the correction data comprises an ionospheric delay per satellite at multiple regional network stations, and wherein the at least one processor is operative to interpolate an ionospheric delay for the rough position.

35. The apparatus of claim 23, wherein the correction data comprises an ionospheric delay per satellite at multiple regional network stations and an ionospheric phase bias per satellite, and wherein the at least one processor is operative to, for each satellite, interpolate an absolute ionospheric delay for the rough position and combine with the ionospheric phase bias.

36. The apparatus of claim 23, wherein the correction data comprises a tropospheric delay per satellite at multiple regional network stations, and wherein the at least one processor is operative to interpolate a tropospheric delay for the rough position.

37. The apparatus of claim 23, wherein the at least one processor is operative to combine the rover corrections with the rover observations to obtain corrected rover observations, and to determine the precise rover position from the corrected rover observations.

38. The apparatus of claim 23, wherein the at least one processor is operative to use the rover corrections to estimate simulated reference station observables for each of multiple satellites in view at a selected location, and to differentially process the rover observations with the simulated reference station observables to obtain the precise rover position.

39. The apparatus of claim 38, wherein the at least one processor is operative to use the rover corrections to estimate at least one simulated reference station carrier-phase observation for each of multiple satellites observable at the selected location.

40. The apparatus of claim 38, wherein the at least one processor is operative to use the rover corrections to estimate at least one simulated reference station code observation for each of multiple satellites observable at the selected location.

41. The apparatus of claim 38, wherein the selected location is one of (i) the rough position of the rover and (ii) a location within 100 m of the rough position of the rover.

42. The method apparatus of claim 38, wherein the at least one processor is remote from the rover.

43. A method of determining a precise position of a rover located within a region, comprising:

operating a receiver to obtain rover observations comprising code observations and carrier-phase observations of global navigation satellite system (GNSS) signals on at least two carrier frequencies;

receiving correction data comprising:

1. at least one code bias per satellite,
2. at least one of: (i) a fixed-nature Melbourne-Wübbena (MW) bias per satellite and (ii) values from which a fixed-nature MW bias per satellite is derivable, and
3. at least one of: (i) an ionospheric delay per satellite for each of multiple regional network stations, and (ii) non-ionospheric corrections;

estimating a rough position of the receiver without using corrections;

creating rover corrections from the correction data, the rover corrections determined using the rough position of the receiver;

operating a processor to determine a precise rover position using the rover observations and the rover corrections, and transmitting the precise rover position for display on a remote device.

44. Apparatus for determining a precise position of a rover located within a region, comprising:

a receiver operative to obtain rover observations comprising code observations and carrier-phase observations of global navigation satellite system (GNSS) signals on at least two carrier frequencies;

a correction data receiver operative to receive correction data comprising:

1. at least one code bias per satellite,
2. at least one of: (i) a fixed-nature Melbourne-Wübbena (MW) bias per satellite and (ii) values from which a fixed-nature MW bias per satellite is derivable, and 3. at least one of: (i) an ionospheric delay per satellite for each of multiple regional network stations, and (ii) non-ionospheric corrections;

a navigation engine operative to estimate a rough position of the receiver;

at least one processor operative to create rover corrections from the correction data and the rough position of the receiver, and operative to determine a precise rover position using the rover observations and the rover corrections; and a transmitter operative to transmit the precise rover position for display on a remote device.

* * * * *

UNITED STATES PATENT AND TRADEMARK OFFICE
CERTIFICATE OF CORRECTION

PATENT NO. : 9,164,174 B2
APPLICATION NO. : 13/522329
DATED : October 20, 2015
INVENTOR(S) : Xiaoming Chen, Ulrich Vollath and Kendall Ferguson It is certified that error appears in the above-identified patent and that said Letters Patent is hereby corrected as shown below:

Title Page,

"Related U.S. Application Data
(60) Provisional application No. 61/396,676, filed on May 30, 2010, provisional application No. 61/337,960, filed on Feb. 14, 2010."

Should read

"Related U.S. Application Data
(60) Provisional application No. 61/396,676, filed on May 30, 2010, provisional application No. 61/337,980, filed on Feb. 14, 2010."

Signed and Sealed this
Eighth Day of March, 2016

Michelle K. Lee
*Director of the United States Patent and Trademark Office*